US011139958B2

(12) United States Patent
Smith et al.

(10) Patent No.: US 11,139,958 B2
(45) Date of Patent: Oct. 5, 2021

(54) PRIVACY-PRESERVING SANITIZATION FOR VISUAL COMPUTING QUERIES

(71) Applicant: Intel Corporation, Santa Clara, CA (US)

(72) Inventors: Ned M. Smith, Beaverton, OR (US); Shao-Wen Yang, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/145,047

(22) Filed: Sep. 27, 2018

(65) Prior Publication Data
US 2020/0159961 A1 May 21, 2020

Related U.S. Application Data

(63) Continuation-in-part of application No. PCT/US2018/040390, filed on Jun. 29, 2018.
(Continued)

(51) Int. Cl.
H04L 9/06 (2006.01)
G06F 21/64 (2013.01)
(Continued)

(52) U.S. Cl.
CPC .......... H04L 9/0643 (2013.01); G06F 9/5044 (2013.01); G06F 9/5072 (2013.01); G06F 16/535 (2019.01); G06F 16/538 (2019.01); G06F 16/54 (2019.01); G06F 16/951 (2019.01); G06F 21/44 (2013.01); G06F 21/45 (2013.01);
(Continued)

(58) Field of Classification Search
None
See application file for complete search history.

(56) References Cited

U.S. PATENT DOCUMENTS

2015/0104103 A1* 4/2015 Candelore .......... G06K 9/00288
382/195
2017/0061625 A1* 3/2017 Estrada .................... G06N 3/08
(Continued)

OTHER PUBLICATIONS

"The Visual Computing Database: a Platform for Visual Data Processing and Analysis at Internet Scale", https://pdfs.semanticscholar.org/1f7d/3bdb06ce547139dd1df83c6756fea9d37ac7.pdf, 2015, 17 pages.
(Continued)

Primary Examiner — Frank S Chen
(74) Attorney, Agent, or Firm — Alliance IP, LLC

(57) ABSTRACT

In one embodiment, an apparatus comprises a communication interface and a processor. The communication interface is to communicate with a visual computing device over a network. The processor is to: access visual data captured by a camera; detect a particular feature in the visual data, wherein the particular feature comprises a visual indication of privacy-sensitive information; sanitize the visual data to mask the privacy-sensitive information associated with the particular feature, wherein sanitizing the visual data causes sanitized visual data to be produced; and transmit, via the communication interface, the sanitized visual data to the visual computing device over the network, wherein the visual computing device is to use the sanitized visual data to process a visual query associated with the visual data.

23 Claims, 96 Drawing Sheets

Related U.S. Application Data

(60) Provisional application No. 62/691,464, filed on Jun. 28, 2018, provisional application No. 62/611,536, filed on Dec. 28, 2017.

(51) Int. Cl.

| | | |
|---|---|---|
| G06F 21/53 | (2013.01) | |
| G06N 5/02 | (2006.01) | |
| G06K 9/00 | (2006.01) | |
| G06N 3/04 | (2006.01) | |
| H04L 29/08 | (2006.01) | |
| G06F 21/45 | (2013.01) | |
| H04L 9/32 | (2006.01) | |
| H04W 4/70 | (2018.01) | |
| G06F 21/44 | (2013.01) | |
| G06K 9/46 | (2006.01) | |
| G06K 9/62 | (2006.01) | |
| G06F 16/538 | (2019.01) | |
| G06F 16/535 | (2019.01) | |
| G06F 16/54 | (2019.01) | |
| G06F 21/62 | (2013.01) | |
| G06F 9/50 | (2006.01) | |
| G06N 3/063 | (2006.01) | |
| G06N 3/08 | (2006.01) | |
| H04N 19/80 | (2014.01) | |
| G06F 16/951 | (2019.01) | |
| G06K 9/36 | (2006.01) | |
| H04N 19/46 | (2014.01) | |
| G06T 7/70 | (2017.01) | |
| G06K 9/64 | (2006.01) | |
| G06K 9/72 | (2006.01) | |
| H04W 12/02 | (2009.01) | |
| H04N 19/42 | (2014.01) | |
| H04N 19/625 | (2014.01) | |
| H04N 19/63 | (2014.01) | |
| G06T 7/223 | (2017.01) | |

(52) U.S. Cl.
CPC .......... *G06F 21/53* (2013.01); *G06F 21/6254* (2013.01); *G06F 21/64* (2013.01); *G06K 9/00228* (2013.01); *G06K 9/00335* (2013.01); *G06K 9/00624* (2013.01); *G06K 9/00979* (2013.01); *G06K 9/36* (2013.01); *G06K 9/46* (2013.01); *G06K 9/4628* (2013.01); *G06K 9/6215* (2013.01); *G06K 9/6217* (2013.01); *G06K 9/6232* (2013.01); *G06K 9/6261* (2013.01); *G06K 9/6267* (2013.01); *G06K 9/6274* (2013.01); *G06K 9/64* (2013.01); *G06K 9/72* (2013.01); *G06N 3/04* (2013.01); *G06N 3/0454* (2013.01); *G06N 3/063* (2013.01); *G06N 3/08* (2013.01); *G06N 5/022* (2013.01); *G06T 7/70* (2017.01); *H04L 9/3239* (2013.01); *H04L 67/12* (2013.01); *H04L 67/16* (2013.01); *H04N 19/46* (2014.11); *H04N 19/80* (2014.11); *H04W 4/70* (2018.02); *G06F 2209/503* (2013.01); *G06F 2221/2117* (2013.01); *G06K 2209/27* (2013.01); *G06T 7/223* (2017.01); *G06T 2207/20024* (2013.01); *G06T 2207/20052* (2013.01); *G06T 2207/20056* (2013.01); *G06T 2207/20064* (2013.01); *G06T 2207/20084* (2013.01); *G06T 2207/30242* (2013.01); *H04L 67/10* (2013.01); *H04L 2209/38* (2013.01); *H04N 19/42* (2014.11); *H04N 19/625* (2014.11); *H04N 19/63* (2014.11); *H04W 12/02* (2013.01)

(56) References Cited

U.S. PATENT DOCUMENTS

| | | | |
|---|---|---|---|
| 2017/0228599 A1* | 8/2017 | De Juan | G06K 9/00697 |
| 2018/0025175 A1* | 1/2018 | Kato | H04L 63/0428 |
| | | | 713/153 |
| 2019/0114487 A1* | 4/2019 | Vijayanarasimhan | G06N 3/04 |

OTHER PUBLICATIONS

Chu, Hong-Min., et al, "Scheduling in Visual Fog Computing: NP-Completeness and Practical Efficient Solutions", The Thirty-Second AAAI Conferenceon Artificial Intelligence (AAAI-18), Apr. 26, 2018, 9 pages.

Hasan, R., et al., "Viewer Experience of Obscuring Scene Elements in Photos to Enhance Privacy", CHI 2018, Apr. 21-26, 2018, Montreal, QC, Canada, 13 pages.

Lu, Yao., et al. "Optasia: a Relational Platform for Efficient Large-Scale Video Analytics", 2016 ACM Symposium on Cloud Computing (ACMSoCC), Oct. 2016—microsoft.com, pp. 57-70.

Padilla-Lopez, J. et al., "Visual Privacy by Context: Proposal and Evaluation of a Level-Based Visualisation Scheme", Open Access Sensors 2015, 15, www.mdpi.com/journal/sensors, Jun. 4, 2015, 24 pages.

Yu, X., et al., "Privacy Protecting Visual Processing for Secure Video Surveillance", 15th IEEE International Conference on Image Processing, Oct. 12-15, 2008, 4 pages.

* cited by examiner

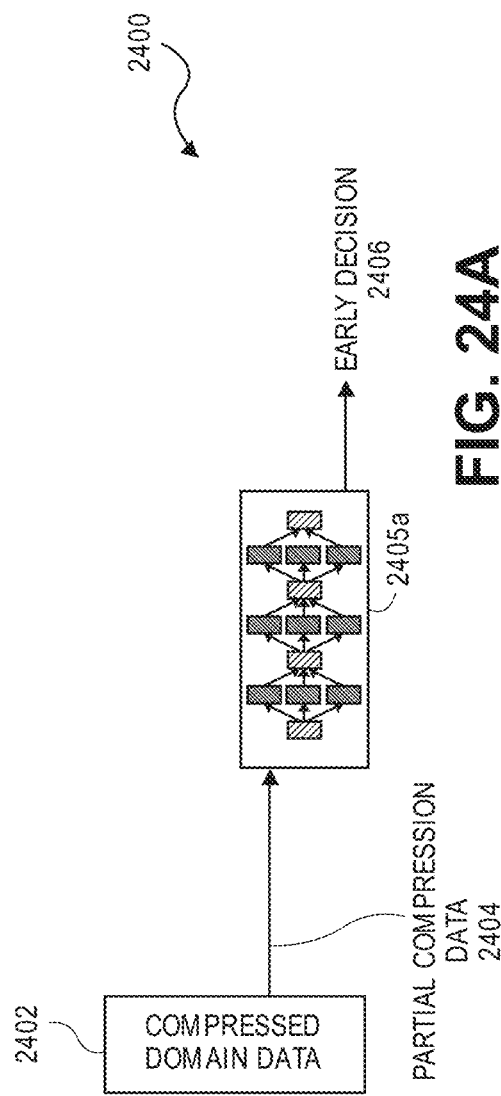
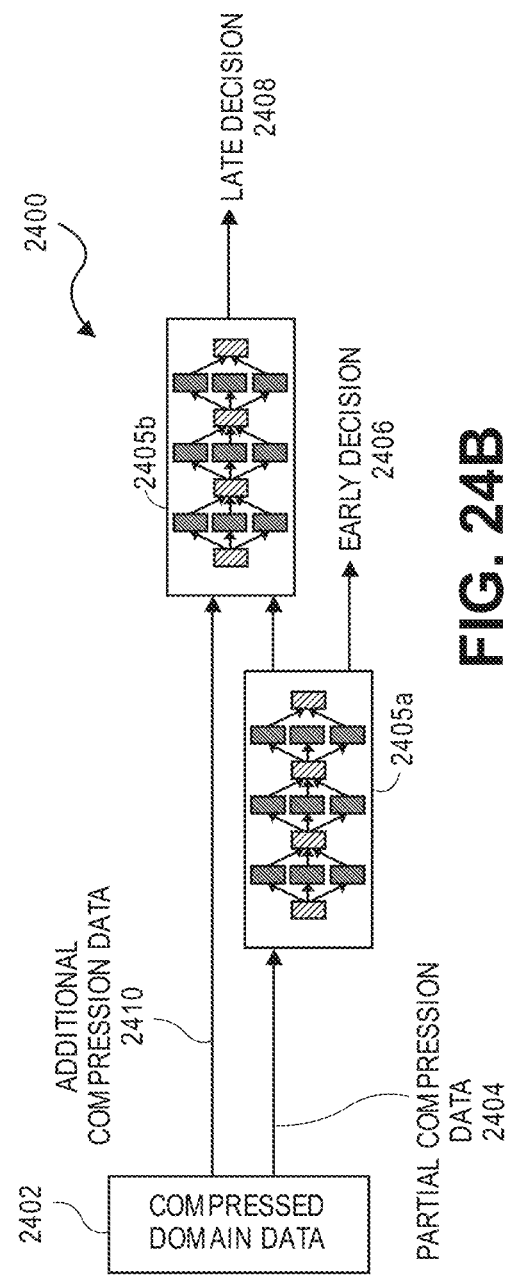
FIG. 24A
FIG. 24B

```
/* tiles_per_dimension: an integer value; area: an area object; list_of_ROIs: a list of ROIs in
the area (objects of type area); list_of_tiles: a list of the tiles defined */
void recursive_division (tiles_per_dimension, area, list_of_ROIs, list_of_tiles) {
    // Define new height/width based on number of tiles per dimension
    height = area.height / tiles_per_dimension;
    width = area.width / tiles_per_dimension;
    areas = [ ];
    // Calculate new areas within this area
    for(i = 0; i< area.height; ++i) {
        for(j = 0; j < area.width; ++j) {
            new_area.height = height;
            new_area.width = width;
            new_area.x = area.x + j * width;
            new_area.y = area.y + i * height;
            areas.append(new_area);
        }
    }
    // For each new area,
    for (k = 0; k < areas.length( ); ++k) {
        new_area = areas[k];
        roi_list = [ ];
        // Find the subset of ROIs that are in the area
        for (r = 0; r < list_of_ROIs.length( ); ++r) {
            roi = list_of_ROIs[r];
            roi_contained = contained_within(roi, new_area);
            area_contained = contained_within(new_area, roi);
            // If the ROI overlaps with or is contained within the current area
            if ( (roi_contained == all && area_contained == none)
              || (roi_contained == some && area_contained == some) )
                    roi_list.append(roi);
        }
        // If there are ROIs in the area, divide it again
        if(!roi_list.empty( ))
            recursive_division(tiles_per_dimension,
                                new_area, roi_list, list_of_tiles);
        // If there are no ROIs in the area, add it to the list of tiles
        else
            list_of_tiles.append(new_area);
    }
}
```

FIG. 74

```
enum overlap { all, some, none };
// x,y are the top left coordinates of the area
struct area {x, y, width, height};

/* region1 and region2 are objects of type area */
overlap contained_within(region1, region2) {
        // Calculate the end x and y of both regions
        region1.end_x = region1.x + region1.width;
        region1.end_y = region1.y + region1.height;
        region2.end_x = region2.x + region2.width;
        region2.end_y = region2.y + region2.height;
        // If the starting x and y of region1 are within region2
        if ( (region1.x >= region2.x && region1.x < region2.end_x)
                && (region1.y >= region2.y && region1.y < region2.end_y) )
                // If the end x and y of region1 are within region2,
                // region1 is contained by region2
                if ( region1.end_x <= region2.end_x && region1.end_y <= region2.end_y)
                        return all;
                // Otherwise region1 overlaps region2
                else
                        return some;
        // If the starting x and y of region1 are outside region2 but the
        // end x and y are within region2, then region1 overlaps region2
        else if ( (region1.x < region2.x && region1.end_x < region2.end_x
                        && region1.end_x > region2.x)
                        && (region1.y < region2.y && region1.end_y < region2.end_y
                                && region1.end_y > region2.y) )
                return some;
        // Otherwise region1 does not overlap with region2
        else
                return none;
}
```

FIG. 75

```
/* image: an area object (x, y, width, height) that is the original image dimensions; list_of_ROIs: a list
of ROIs (an ROI is an area object); tiles: will contain all tiles for the given image */
void region_based_tiling(image, list_of_ROIs, tiles) {
        start.x = 0;
        start.y = 0;
        starting_points.append(start);
        // Initialize the list of tiles to the known ROIs
        tiles = list_of_ROIs;
        // Loop until there are no starting points
        while (starting_points.size() > 0) {
                // Sort tiles in ascending order along each dimension
                sorted_x = sort_by_x(tiles);
                sorted_y = sort_by_y(tiles);
                // Let's create a new tile. Initialize the start x and y to the current starting point
                start = starting_points[0];
                tile = {start.x, start.y, 0, 0};
                // Determine the width of the tile by checking to see if there is a tile that obstructs
                // tile construction along the x axis (fix y dimension)
                obstructing_tile = find_obstructing("y", tile, image.width, sorted_x);
                // If there is already a tile at this x, then we know the width of the tile
                if (obstructing_tile.x == tile.x)
                        tile.width = obstructing_tile.width;
                // If no obstructing tiles were found, the image width is the obstructing edge
                else if (obstructing_tile.x < 0)
                        tile.width = image.width - tile.x;
                // Otherwise, calculate the width based on the obstructing tile and add new start points
                else {
                        tile.width = obstructing_tile.x - tile.x;
                        new_start.x = obstructing_tile.x;
                        new_start.y = tile.y;
                        starting_points.append(new_start); }
                // Now determine tile height by checking to see if there is a tile that obstructs
                // tile construction along the y axis (fix x dimension)
                obstructing_tile = find_obstructing("x", tile, image.height, sorted_y);
                if (obstructing_tile.y == tile.y)
                        tile.height = obstructing_tile.height;
                else if (obstructing_tile.y < 0)
                        tile.height = image.height - tile.y;
```

FIG. 78A

```
       else {
              tile.height = obstructing_tile.y - tile.y;
              new_start.x = tile.x;
              new_start.y = obstructing_tile.y;
              starting_points.append(new_start); }
       // Check to see if the tile we just created exactly matches the obstructing tile. If it
       // does, don't add it to the tile list but do add the start points
       if (tile == obstructing_tile) {
              new_start.x = tile.x + tile.width;
              new_start.y = tile.y;
              starting_points.append(new_start);
              new_start.x = tile.x;
              new_start.y = tile.y + tile.height;
              starting_points.append(new_start);}
       else
              tiles.append(tile);
       // remove the current starting point
       starting_points.remove(start);
    }
}
```

FIG. 78B

```
struct area {x, y, width, height};

/* Determine whether the region of interest (roi) is obstructing the tile (tile) */
bool is_obstructing(tile_start, tile_end, roi_start, roi_end) {
       if (tile_start >= roi_start && tile_start <= roi_end)
              return true;
       if (tile_start < roi_start && tile_end > roi_start)
              return true;
       return false;
}

/* find the first ROI that is obstructing the tile. Returns the obstructing ROI, or an empty
ROI if none are obstructing.
       fixed_dim: dimension which has been fixed; function checks for obstructing tiles in the
opposite dimension; tile: object of type area, holds start x and y; max_end: maximum value
along dimension; roi_list: list of tiles sorted in the dimension to check */
area find_obstructing(fixed_dim, tile, max_end, roi_list) {
       roi_return = {-1, -1, -1, -1};
       // Walk through the list of tiles
```

FIG. 79A

```
for (r = 0; r < roi_list.size(); ++r) {
    roi = roi_list[r];
    roi_x_end = roi.x + roi.width;
    roi_y_end = roi.y + roi.height;
    if (dim == "x") {
    // Before searching in y dimension, make sure the current roi is not
    // obstructed by the current tile (ie, the current roi is at a higher y
    // than the current tile0
            if (!is_obstructing(roi.y, roi_y_end, tile.y, max_end))
                    continue;
            fixed_start = tile.x;
            fixed_end = tile.x + tile.width;
            roi_start = roi.x;
            roi_end = roi_x_end;
    }
    else {
    // Before searching in the x dimension, make sure the current roi is
    // not obstructed by the current tile
            if (!is_obstructing(roi.x, roi_x_end, tile.x, max_end))
                    continue;
            fixed_start = tile.y;
            fixed_end = tile.y + tile.height;
            roi_start = roi.y;
            roi_end = roi_y_end;
    }
    // If the current roi is obstructing the current tile, return the roi
    if (is_obstructing(fixed_start, fixed_end, roi_start, roi_end))
            return roi;
}
// If no obstructing rois are found, return the empty roi
return roi_return;
}
```

FIG. 79B

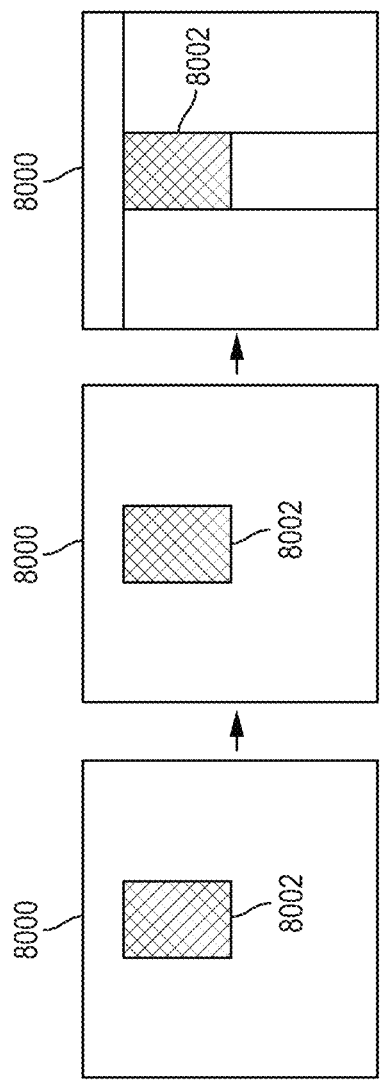

PRIVACY-PRESERVING SANITIZATION FOR VISUAL COMPUTING QUERIES

CROSS-REFERENCE TO RELATED APPLICATIONS

This patent application is a continuation-in-part of International Application PCT/US2018/040390, entitled "VISUAL FOG", with an international filing date of Jun. 29, 2018, which claims the benefit of U.S. Provisional Patent Application No. 62/691,464, entitled "VISUAL FOG", filed on Jun. 28, 2018, and also claims the benefit of U.S. Provisional Patent Application No. 62/611,536, entitled "VISUAL FOG", filed on Dec. 28, 2017, the disclosures of which are considered part of and hereby incorporated by reference in the disclosure of this application.

FIELD OF THE SPECIFICATION

This disclosure relates in general to the field of visual computing, and more particularly, though not exclusively, to privacy-preserving sanitization for visual computing queries.

BACKGROUND

Visual computing systems typically process raw visual data as input. For example, the raw visual data captured by a smart camera may be transmitted to the cloud for further processing and analytics. In many cases, however, transmission of raw visual data can compromise privacy, as certain privacy-sensitive information may be revealed or depicted by the visual data.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 24A-C illustrate an example embodiment of a multi-domain cascade convolutional neural network (CNN).

FIGS. 74 and 75 illustrate pseudocode for a recursive quadrant division algorithm associated with an analytic image format.

FIGS. 78A-B and 79A-B illustrate pseudocode for a region-based tiling algorithm associated with an analytic image format.

FIGS. 80A-C illustrate an example of a region-based tiling algorithm on an image with a single region of interest.

EMBODIMENTS OF THE DISCLOSURE

Figure 1:
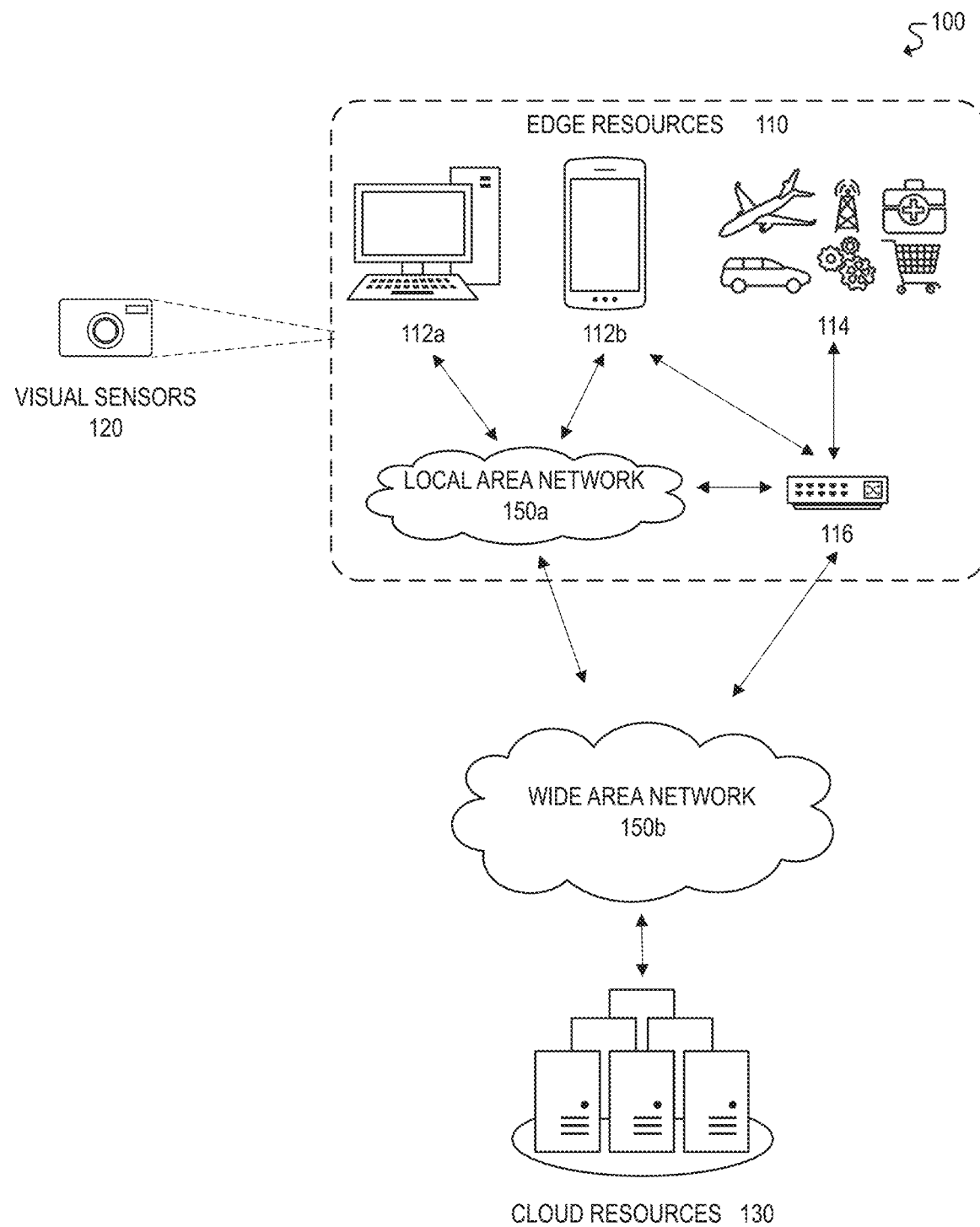
FIG. 1 illustrates an example embodiment of a visual fog system in accordance with certain embodiments.

This patent application is a continuation-in-part of International Application PCT/US2018/040390, entitled "VISUAL FOG", with an international filing date of Jun. 29, 2018, which claims the benefit of U.S. Provisional Patent Application No. 62/691,464, entitled "VISUAL FOG", filed on Jun. 28, 2018, and also claims the benefit of U.S. Provisional Patent Application No. 62/611,536, entitled "VISUAL FOG", filed on Dec. 28, 2017, the disclosures of which are considered part of and hereby incorporated by reference in the disclosure of this application.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Example embodiments that may be used to implement the features and functionality of this disclosure will now be described with more particular reference to the attached FIGURES.

Visual Fog Introduction

FIG. 1 illustrates an example embodiment of a visual fog system 100 in accordance with certain embodiments. Advancements in modern computing have led to an increased use of computer vision technologies and large-scale visual computing for a variety of mainstream computing applications. In particular, rapid deployments of cameras and other types of computer vision technologies have been leveraged for a variety of visual computing applications that rely on large-scale video analytics and visual data processing. For example, large-scale visual computing can be leveraged for security and surveillance, transportation (e.g., traffic monitoring, navigation, parking, infrastructure planning, security or amber alerts), retail (e.g., customer analytics), enterprise applications, and so forth.

Existing approaches to large-scale visual computing, however, suffer from numerous limitations. In particular, existing visual computing approaches are implemented using rigid designs that utilize resources inefficiently (e.g., processing, bandwidth, and storage resources) and provide limited functionality. For example, using existing approaches, visual data is typically captured by devices at the edge of a network and simply funneled to the cloud for processing and storage, thus relying heavily on the cloud infrastructure. Due to the large size of visual data, however, this approach typically consumes significant network bandwidth and requires substantial processing and storage resources in the cloud. As a result, existing approaches often suffer from high latency and inefficient resource utilization, and may also be inaccurate, unreliable, inflexible, and incapable of scaling efficiently.

Accordingly, this disclosure describes various embodiments of a visual fog computing system 100 for performing large-scale visual computing in an efficient and reliable manner. For example, rather than relying exclusively or primarily on cloud resources 130 for visual computing tasks, visual fog system 100 leverages both cloud 130 and edge 110 resources, which may be collectively referred to as the "fog." In this manner, visual fog system 100 can leverage all available "fog" resources to perform visual computing tasks more efficiently, thus improving resource utilization, latency, accuracy, precision, and reliability. Moreover, as described further throughout this disclosure, visual fog system 100 can be implemented using a flexible design that supports ad-hoc queries and is highly scalable, thus rendering it suitable for many visual computing applications and use cases.

In the illustrated embodiment of FIG. 1, visual fog system 100 includes edge resources 110 and a plurality of associated visual sensors 120, cloud resources 130, and communication networks 150, which are respectively discussed further below. Moreover, in various embodiments, these components of visual fog system 100 may be implemented some or all aspects of the visual computing functionality described throughout this disclosure in connection with the remaining FIGURES.

Edge resources 110 may include any equipment, devices, and/or components deployed or connected near the "edge" of a communication network. In the illustrated embodiment, for example, edge resources 110 include end-user devices 112a,b (e.g., desktops, laptops, mobile devices), Internet-of-Things (IoT) devices 114, and gateways or routers 116, as described further below. Edge resources 110 may communicate with each other and/or with other remote networks and resources (e.g., cloud resources 130) through one or more communication networks 150, such as local area network 150a and/or wide area network 150b. Moreover, in the illustrated embodiment, edge resources 110 collectively include a plurality of visual sensors 120 (e.g., cameras) for capturing visual representations and data associated with their surroundings. In some embodiments, for example, certain end-user devices 112 and/or IoT devices 114 may include one or more cameras and/or other types of visual sensors 120. Visual sensors 120 may include any type of visual or optical sensors, such as cameras, ultraviolet (UV) sensors, laser rangefinders (e.g., light detection and ranging (LIDAR)), infrared (IR) sensors, electro-optical/infrared (EO/IR) sensors, and so forth.

End-user devices 112 may include any device that enables or facilitates interaction with a user in visual fog system 100, including, for example, desktop computers, laptops, tablets, mobile phones and other mobile devices, and wearable devices (e.g., smart watches, smart glasses, headsets), among other examples.

IoT devices 114 may include any device capable of communicating and/or participating in an Internet-of-Things (IoT) system or network. IoT systems may refer to new or improved ad-hoc systems and networks composed of a variety of different devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor and/or communication interface to allow interoperation with other components of visual fog system 100, such as with cloud resources 130 and/or other edge resources 110. IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 may be built from sensors and communication modules integrated in or attached to "things," such as equipment, toys, tools, vehicles, living things (e.g., plants, animals, humans), and so forth. Alternatively, or additionally, certain IoT devices 114 may rely on intermediary components, such as edge gateways or routers 116, to communicate with the various components of system 100.

IoT devices 114 may include various types of sensors for monitoring, detecting, measuring, and generating sensor data and signals associated with characteristics of their environment. In some embodiments, for example, certain IoT devices 114 may include visual sensors 120 (e.g., cameras) for capturing visual representations and data associated with their surroundings. IoT devices 114 may also include other types of sensors configured to detect characteristics such as movement, weight, physical contact, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 114 may also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 114 and associated sensors/actuators. IoT devices 114 may include, for example, any type of equipment and/or devices associated with any type of system 100 and/or industry, including transportation (e.g., automobile, airlines), industrial manufacturing, energy (e.g., power plants), telecommunications (e.g., Internet, cellular, and television service providers), retail, medical (e.g., healthcare, pharmaceutical), and/or food and beverage, among others. In the transportation industry, for example, IoT devices 114 may include equipment and devices associated with aircrafts, automobiles, or vessels, such as navigation systems, autonomous flight or driving systems, traffic monitoring and/or planning systems, parking systems, and/or any internal mechanical or electrical components that are monitored by sensors (e.g., engines). IoT devices 114 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. IoT devices 114 may also include, for example, any type of "smart" device or system, such as smart entertainment systems (e.g., televisions, audio systems, videogame systems), smart household or office appliances (e.g., heat-ventilation-air-conditioning (HVAC) appliances, refrigerators, washers and dryers, coffee brewers), power control systems (e.g., automatic electricity, light, and HVAC controls), security systems (e.g., alarms, locks, cameras, motion detectors, fingerprint scanners, facial recognition systems), and other home automation systems, among other examples. IoT devices 114 can be statically located, such as mounted on a building, wall, floor, ground, lamppost, sign, water tower, or any other fixed or static structure. IoT devices 114 can also be mobile, such as devices in vehicles or aircrafts, drones, packages (e.g., for tracking cargo), mobile devices, and wearable devices, among other examples. Moreover, any type of edge resource 110 may also be considered as an IoT device 114, including end-user devices 112 and edge gateways 116, among other examples.

Edge gateways and/or routers 116 may be used to facilitate communication to and from edge resources 110. For example, gateways 116 may provide communication capabilities to existing legacy devices that were initially developed without any such capabilities (e.g., "brownfield" IoT devices 114). Gateways 116 can also be utilized to extend the geographical reach of edge resources 110 with short-range, proprietary, or otherwise limited communication capabilities, such as IoT devices 114 with Bluetooth or ZigBee communication capabilities. For example, gateways 116 can serve as intermediaries between IoT devices 114 and remote networks or services, by providing a front-haul to the IoT devices 114 using their native communication capabilities (e.g., Bluetooth, ZigBee), and providing a back-haul to other networks 150 and/or cloud resources 130 using another wired or wireless communication medium (e.g., Ethernet, Wi-Fi, cellular). In some embodiments, a gateway 116 may be implemented by a dedicated gateway device, or by a general-purpose device, such as another IoT device 114, end-user device 112, or other type of edge resource 110. In some instances, gateways 116 may also implement certain network management and/or application functionality (e.g., visual computing functionality, IoT application and management functionality), either separately or in conjunction with other components, such as cloud resources 130 and/or other edge resources 110.

Cloud resources 130 may include any resources or services that are hosted remotely over a network, which may otherwise be referred to as in the "cloud." In some embodiments, for example, cloud resources 130 may be remotely hosted on servers in a datacenter (e.g., application servers, database servers). Cloud resources 130 may include any resources, services, and/or functionality that can be utilized by or for edge resources 110, including but not limited to, visual computing applications and services, IoT application and management services, data storage, computational services (e.g., data analytics, searching, diagnostics and fault management), security services (e.g., surveillance, alarms, user authentication), mapping and navigation, geolocation services, network or infrastructure management, payment processing, audio and video streaming, messaging, social networking, news, and weather, among other examples.

Communication networks 150*a,b* may be used to facilitate communication between components of system 100. In the illustrated embodiment, for example, edge resources 110 are connected to local area network (LAN) 150*a* in order to facilitate communication with each other and/or other remote networks or resources, such as wide area network (WAN) 150*b* and/or cloud resources 130. In various embodiments, visual fog system 100 may be implemented using any number or type of communication network(s) 150, including local area networks, wide area networks, public networks, the Internet, cellular networks, Wi-Fi networks, short-range networks (e.g., Bluetooth or ZigBee), and/or any other wired or wireless communication networks or mediums.

In general, edge resources 110 (and in particular IoT devices 114) may generate an extremely large volume and variety of data. As one example, edge resources 110 with visual sensors 120 may generate large volumes of visual data, such as video and/or images. Edge resources 110 typically offload this data to the cloud 130 for processing and/or storage. Cloud resources 130, however, may not necessarily be suited to handle the rapidly growing volume, variety, and velocity of data generated by IoT devices 114 and other edge resources 110. For example, cloud-based processing may not be ideal in certain circumstances, such as processing time-sensitive or highly confidential data, or when faced with network bandwidth constraints, among other examples. Accordingly, in some embodiments, visual fog system 100 may leverage "edge" processing to augment the performance and capabilities of the cloud 130 using edge resources 110. Edge processing is an approach that involves processing certain data at the network edge (e.g., using edge resources 110), near where the data is generated, rather than simply funneling large volumes of data to the cloud for processing and storage. Certain data may still be sent to the cloud, as appropriate, such as for deeper analysis and/or long-term storage. Edge processing may be used to complement the shortcomings of cloud-based processing (e.g., when cloud-based processing is inefficient, ineffective, and/or unsecure), and thus improve the handling of the growing volume, variety, and velocity of data generated by IoT devices 114 and/or other edge resources 110. For example, in some cases, processing data near its source (e.g., in the network edge) rather than in the cloud may improve performance and/or avoid system failures or disasters. Edge processing may also conserve network bandwidth, which may be particularly beneficial when facing bandwidth constraints and/or limited network connectivity.

In some cases, the collective use of both edge 110 and cloud 130 resources may be referred to as "fog" computing, as functionality of the "cloud" 130 is effectively extended by the edge resources 110, thus forming a "fog" over the network edge. Moreover, in some embodiments, devices 110 in the "fog" may connect and/or communicate with each other using an interconnection standard or protocol, such as the open interconnect consortium (OIC) standard specification 1.0, released by the Open Connectivity Foundation™ (OCF) on Dec. 23, 2015, which enables devices to discover and connect with each other; Thread, a networking protocol for Internet-of-Things (IoT) devices used in "smart" home automation and similar deployments, developed by an alliance of organizations named the "Thread Group"; the optimized link state routing (OLSR) protocol; and/or the better approach to mobile ad-hoc networking (B.A.T.M.A.N.), among other examples.

Moreover, in some embodiments, fog computing may be leveraged by visual fog system 100 for large-scale visual computing applications. For example, in some embodiments, the components of visual fog system 100 (e.g., edge resources 110, cloud resources 130) may be implemented with some or all aspects of the visual computing functionality described throughout this disclosure in connection with the remaining FIGURES.

Any, all, or some of the computing devices of system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Additional embodiments associated with the implementation of a visual fog computing system 100 are described further in connection with the remaining FIGURES. Accordingly, it should be appreciated that visual fog system 100 of FIG. 1 may be implemented with any aspects of the embodiments described throughout this disclosure.

Example Internet-of-Things (IoT) Implementations

FIGS. 2-5 illustrate examples of Internet-of-Things (IoT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 2:
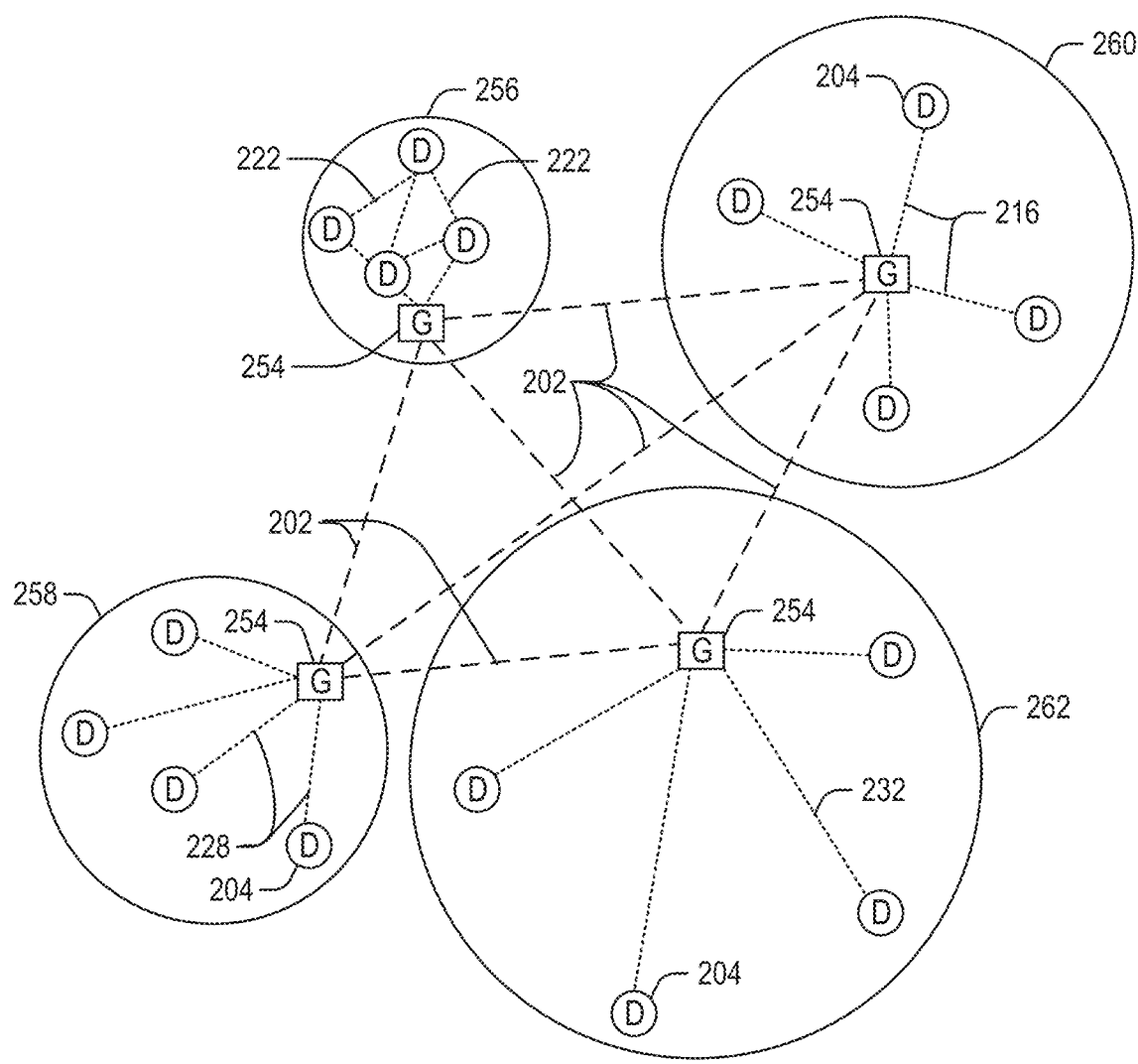
FIGS. 2, 3, 4, and 5 illustrate examples of Internet-of-Things (IoT) networks and architectures that can be used in accordance with certain embodiments.

FIG. 2 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 2-5, present a number of new challenges in a heterogeneous network of connectivity comprising a combination of wired and wireless technologies.

FIG. 2 specifically provides a simplified drawing of a domain topology that may be used for a number of internet-of-things (IoT) networks comprising IoT devices 204, with the IoT networks 256, 258, 260, 262, coupled through backbone links 202 to respective gateways 254. For example, a number of IoT devices 204 may communicate with a gateway 254, and with each other through the gateway 254. To simplify the drawing, not every IoT device 204, or communications link (e.g., link 216, 222, 228, or 232) is labeled. The backbone links 202 may include any number of wired or wireless technologies, including optical networks, and may be part of a local area network (LAN), a wide area network (WAN), or the Internet. Additionally, such communication links facilitate optical signal paths among both IoT devices 204 and gateways 254, including the use of MUXing/deMUXing components that facilitate interconnection of the various devices.

The network topology may include any number of types of IoT networks, such as a mesh network provided with the network 256 using Bluetooth low energy (BLE) links 222. Other types of IoT networks that may be present include a wireless local area network (WLAN) network 258 used to communicate with IoT devices 204 through IEEE 802.11 (Wi-Fi®) links 228, a cellular network 260 used to communicate with IoT devices 204 through an LTE/LTE-A (4G) or 5G cellular network, and a low-power wide area (LPWA) network 262, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 204, such as over the backbone links 202, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 256, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 258, for instance, may use systems that perform standards conversion to provide multi-standard connectivity, enabling IoT devices 204 using different protocols to communicate. Further systems may provide seamless interconnectivity across a multi-standard infrastructure comprising visible Internet resources and hidden Internet resources.

Communications in the cellular network 260, for instance, may be enhanced by systems that offload data, extend communications to more remote devices, or both. The LPWA network 262 may include systems that perform non-Internet protocol (IP) to IP interconnections, addressing, and routing. Further, each of the IoT devices 204 may include the appropriate transceiver for wide area communications with that device. Further, each IoT device 204 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 3 below.

Figure 3:
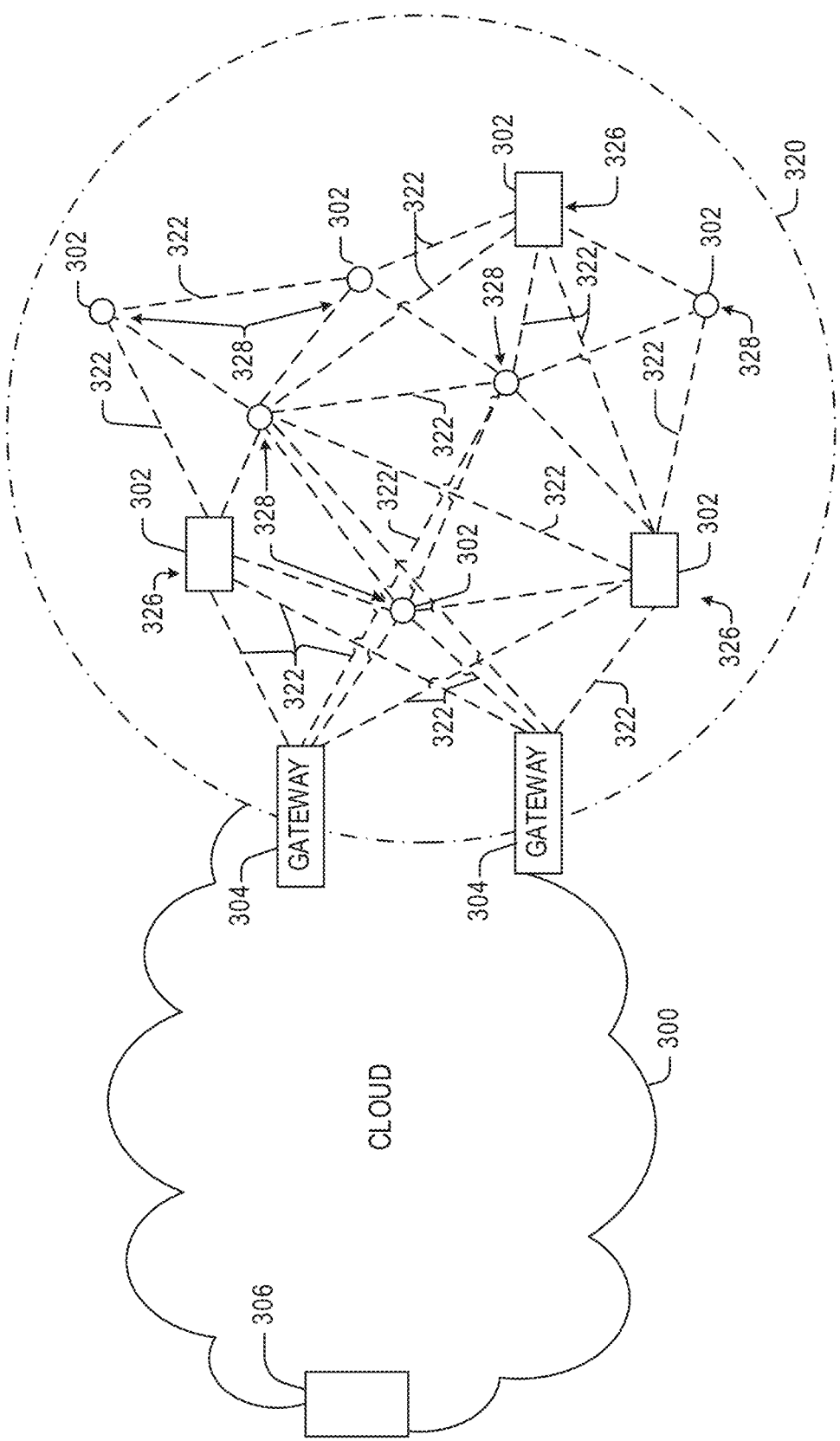

FIG. 3 illustrates a cloud computing network in communication with a mesh network of IoT devices (devices 302) operating as a fog device at the edge of the cloud computing network. The mesh network of IoT devices may be termed a fog 320, operating at the edge of the cloud 300. To simplify the diagram, not every IoT device 302 is labeled.

The fog 320 may be considered to be a massively interconnected network wherein a number of IoT devices 302 are in communications with each other, for example, by radio links 322. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 302 are shown in this example, gateways 304, data aggregators 326, and sensors 328, although any combinations of IoT devices 302 and functionality may be used. The gateways 304 may be edge devices that provide communications between the cloud 300 and the fog 320, and may also provide the backend process function for data obtained from sensors 328, such as motion data, flow data, temperature data, and the like. The data aggregators 326 may collect data from any number of the sensors 328, and perform the back-end processing function for the analysis. The results, raw data, or both may be passed along to the cloud 300 through the gateways 304. The sensors 328 may be full IoT devices 302, for example, capable of both collecting data and processing the data. In some cases, the sensors 328 may be more limited in functionality, for example, collecting the data and allowing the data aggregators 326 or gateways 304 to process the data.

Communications from any IoT device 302 may be passed along a convenient path (e.g., a most convenient path) between any of the IoT devices 302 to reach the gateways 304. In these networks, the number of interconnections provide substantial redundancy, allowing communications to be maintained, even with the loss of a number of IoT devices 302. Further, the use of a mesh network may allow IoT devices 302 that are very low power or located at a distance from infrastructure to be used, as the range to connect to another IoT device 302 may be much less than the range to connect to the gateways 304.

The fog 320 provided from these IoT devices 302 may be presented to devices in the cloud 300, such as a server 306, as a single device located at the edge of the cloud 300, e.g., a fog device. In this example, the alerts coming from the fog device may be sent without being identified as coming from a specific IoT device 302 within the fog 320. In this fashion, the fog 320 may be considered a distributed platform that provides computing and storage resources to perform processing or data-intensive tasks such as data analytics, data aggregation, and machine-learning, among others.

In some examples, the IoT devices 302 may be configured using an imperative programming style, e.g., with each IoT device 302 having a specific function and communication partners. However, the IoT devices 302 forming the fog device may be configured in a declarative programming style, allowing the IoT devices 302 to reconfigure their operations and communications, such as to determine needed resources in response to conditions, queries, and device failures. As an example, a query from a user located at a server 306 about the operations of a subset of equipment monitored by the IoT devices 302 may result in the fog 320 device selecting the IoT devices 302, such as particular sensors 328, needed to answer the query. The data from these sensors 328 may then be aggregated and analyzed by any combination of the sensors 328, data aggregators 326, or gateways 304, before being sent on by the fog 320 device to the server 306 to answer the query. In this example, IoT devices 302 in the fog 320 may select the sensors 328 used based on the query, such as adding data from flow sensors or temperature sensors. Further, if some of the IoT devices 302 are not operational, other IoT devices 302 in the fog 320 device may provide analogous data, if available.

Figure 4:
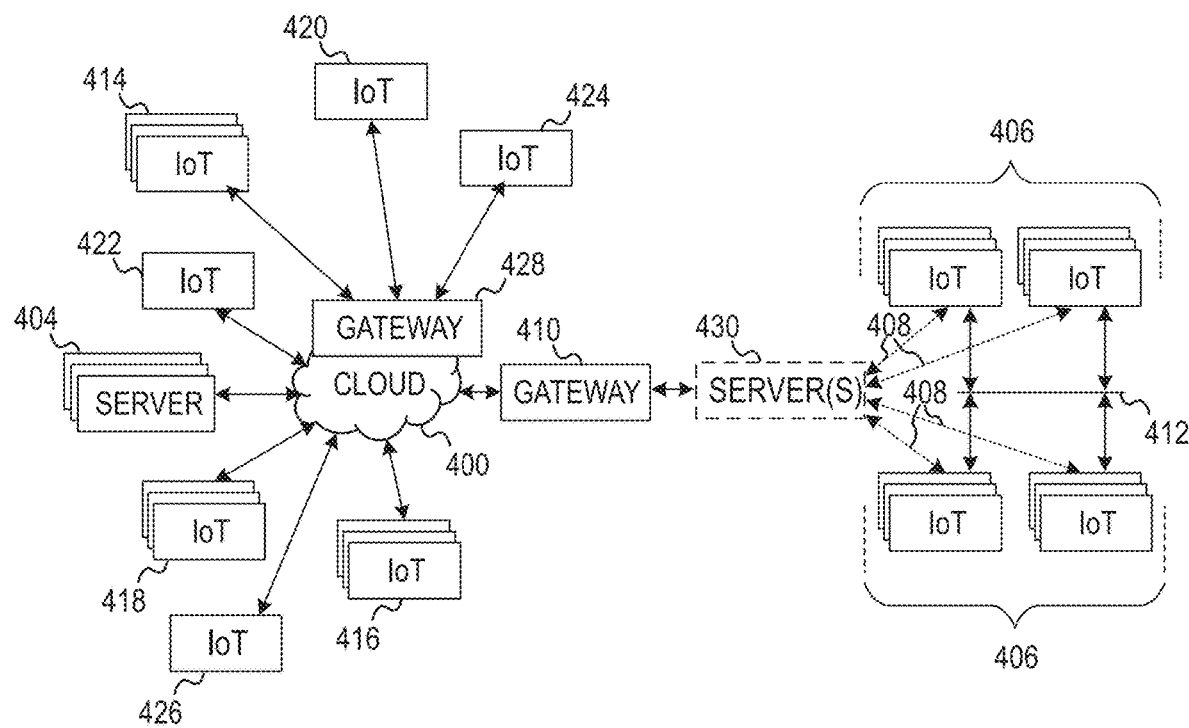

FIG. 4 illustrates a drawing of a cloud computing network, or cloud 400, in communication with a number of Internet of Things (IoT) devices. The cloud 400 may represent the Internet, or may be a local area network (LAN), or a wide area network (WAN), such as a proprietary network for a company. The IoT devices may include any number of different types of devices, grouped in various combinations. For example, a traffic control group 406 may include IoT devices along streets in a city. These IoT devices may include stoplights, traffic flow monitors, cameras, weather sensors, and the like. The traffic control group 406, or other subgroups, may be in communication with the cloud 400 through wired or wireless links 408, such as LPWA links, optical links, and the like. Further, a wired or wireless sub-network 412 may allow the IoT devices to communicate with each other, such as through a local area network, a wireless local area network, and the like. The IoT devices may use another device, such as a gateway 510 or 528 to communicate with remote locations such as the cloud 500; the IoT devices may also use one or more servers 530 to facilitate communication with the cloud 500 or with the gateway 510. For example, the one or more servers 530 may operate as an intermediate network node to support a local edge cloud or fog implementation among a local area network. Further, the gateway 528 that is depicted may operate in a cloud-to-gateway-to-many edge devices configuration, such as with the various IoT devices 514, 520, 524 being constrained or dynamic to an assignment and use of resources in the cloud 500.

Other example groups of IoT devices may include remote weather stations 414, local information terminals 416, alarm systems 418, automated teller machines 420, alarm panels 422, or moving vehicles, such as emergency vehicles 424 or other vehicles 426, among many others. Each of these IoT devices may be in communication with other IoT devices, with servers 404, with another IoT fog device or system (not shown, but depicted in FIG. 3), or a combination therein. The groups of IoT devices may be deployed in various residential, commercial, and industrial settings (including in both private or public environments).

As can be seen from FIG. 4, a large number of IoT devices may be communicating through the cloud 400. This may allow different IoT devices to request or provide information to other devices autonomously. For example, a group of IoT devices (e.g., the traffic control group 406) may request a current weather forecast from a group of remote weather stations 414, which may provide the forecast without human intervention. Further, an emergency vehicle 424 may be alerted by an automated teller machine 420 that a burglary is in progress. As the emergency vehicle 424 proceeds towards the automated teller machine 420, it may access the traffic control group 406 to request clearance to the location, for example, by lights turning red to block cross traffic at an intersection in sufficient time for the emergency vehicle 424 to have unimpeded access to the intersection.

Clusters of IoT devices, such as the remote weather stations 414 or the traffic control group 406, may be equipped to communicate with other IoT devices as well as with the cloud 400. This may allow the IoT devices to form an ad-hoc network between the devices, allowing them to function as a single device, which may be termed a fog device or system (e.g., as described above with reference to FIG. 3).

Figure 5:
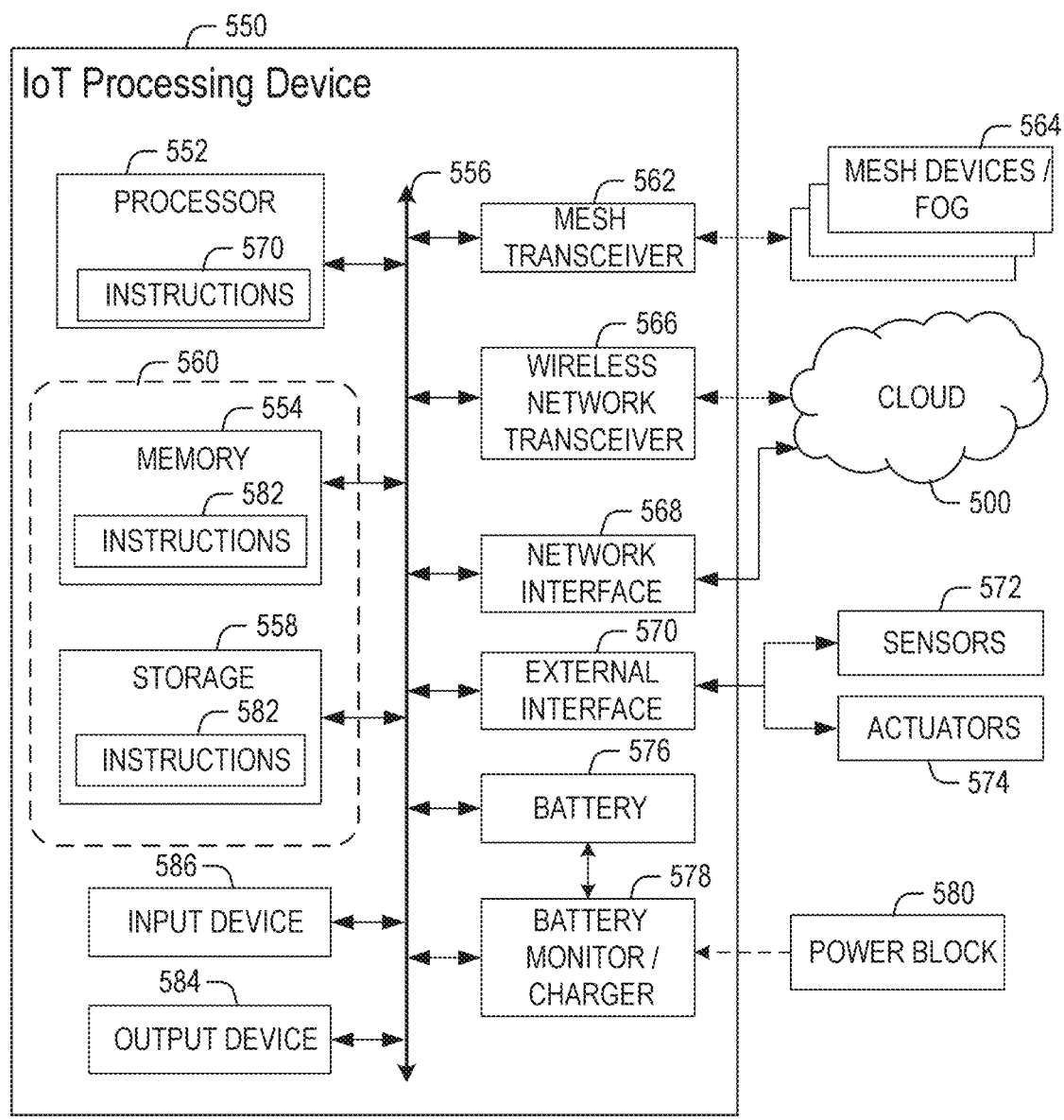

FIG. 5 is a block diagram of an example of components that may be present in an IoT device 550 for implementing the techniques described herein. The IoT device 550 may include any combinations of the components shown in the example or referenced in the disclosure above. The components may be implemented as ICs, portions thereof, discrete electronic devices, or other modules, logic, hardware, software, firmware, or a combination thereof adapted in the IoT device 550, or as components otherwise incorporated within a chassis of a larger system. Additionally, the block diagram of FIG. 5 is intended to depict a high-level view of components of the IoT device 550. However, some of the components shown may be omitted, additional components may be present, and different arrangement of the components shown may occur in other implementations.

The IoT device 550 may include a processor 552, which may be a microprocessor, a multi-core processor, a multi-threaded processor, an ultra-low voltage processor, an embedded processor, or other known processing element. The processor 552 may be a part of a system on a chip (SoC) in which the processor 552 and other components are formed into a single integrated circuit, or a single package, such as the Edison™ or Galileo™ SoC boards from Intel. As an example, the processor 552 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 552 may communicate with a system memory 554 over an interconnect 556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 558 may also couple to the processor 552 via the interconnect 556. In an example, the storage 558 may be implemented via a solid state disk drive (SSDD). Other devices that may be used for the storage 558 include flash memory cards, such as SD cards, microSD cards, xD picture cards, and the like, and USB flash drives. In low power implementations, the storage 558 may be on-die memory or registers associated with the processor 552. However, in some examples, the storage 558 may be implemented using a micro hard disk drive (HDD). Further, any number of new technologies may be used for the storage 558 in addition to, or instead of, the technologies described, such resistance change memories, phase change memories, holographic memories, or chemical memories, among others.

The components may communicate over the interconnect 556. The interconnect 556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 556 may be a proprietary bus, for example, used in a SoC based system. Other bus systems may be included, such as an I2C interface, an SPI interface, point to point interfaces, and a power bus, among others.

The interconnect 556 may couple the processor 552 to a mesh transceiver 562, for communications with other mesh devices 564. The mesh transceiver 562 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 564. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 562 may communicate using multiple standards or radios for communications at different range. For example, the IoT device 550 may communicate with close devices, e.g., within about 10 meters, using a local transceiver based on BLE, or another low power radio, to save power. More distant mesh devices 564, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 566 may be included to communicate with devices or services in the cloud 500 via local or wide area network protocols. The wireless network transceiver 566 may be a LPWA transceiver that follows the IEEE 802.15.4, or IEEE 802.15.4g standards, among others. The IoT device 550 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 562 and wireless network transceiver 566, as described herein. For example, the radio transceivers 562 and 566 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 562 and 566 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 566, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 568 may be included to provide a wired communication to the cloud 500 or to other devices, such as the mesh devices 564. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 568 may be included to allow connect to a second network, for example, a NIC 568 providing communications to the cloud over Ethernet, and a second NIC 568 providing communications to other devices over another type of network.

The interconnect 556 may couple the processor 552 to an external interface 570 that is used to connect external devices or subsystems. The external devices may include sensors 572, such as accelerometers, level sensors, flow sensors, optical light sensors, camera sensors, temperature sensors, a global positioning system (GPS) sensors, pressure sensors, barometric pressure sensors, and the like. The external interface 570 further may be used to connect the IoT device 550 to actuators 574, such as power switches, valve actuators, an audible sound generator, a visual warning device, and the like.

In some optional examples, various input/output (I/O) devices may be present within, or connected to, the IoT device 550. For example, a display or other output device 584 may be included to show information, such as sensor readings or actuator position. An input device 586, such as a touch screen or keypad may be included to accept input. An output device 584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 550.

A battery 576 may power the IoT device 550, although in examples in which the IoT device 550 is mounted in a fixed location, it may have a power supply coupled to an electrical grid. The battery 576 may be a lithium ion battery, or a metal-air battery, such as a zinc-air battery, an aluminum-air battery, a lithium-air battery, and the like.

A battery monitor/charger 578 may be included in the IoT device 550 to track the state of charge (SoCh) of the battery 576. The battery monitor/charger 578 may be used to monitor other parameters of the battery 576 to provide failure predictions, such as the state of health (SoH) and the state of function (SoF) of the battery 576. The battery monitor/charger 578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 578 may communicate the information on the battery 576 to the processor 552 over the interconnect 556. The battery monitor/charger 578 may also include an analog-to-digital (ADC) convertor that allows the processor 552 to directly monitor the voltage of the battery 576 or the current flow from the battery 576. The battery parameters may be used to determine actions that the IoT device 550 may perform, such as transmission frequency, mesh network operation, sensing frequency, and the like.

A power block 580, or other power supply coupled to a grid, may be coupled with the battery monitor/charger 578 to charge the battery 576. In some examples, the power block 580 may be replaced with a wireless power receiver to obtain the power wirelessly, for example, through a loop antenna in the IoT device 550. A wireless battery charging circuit, such as an LTC4020 chip from Linear Technologies of Milpitas, Calif., among others, may be included in the battery monitor/charger 578. The specific charging circuits chosen depend on the size of the battery 576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 558 may include instructions 582 in the form of software, firmware, or hardware commands to implement the techniques described herein. Although such instructions 582 are shown as code blocks included in the memory 554 and the storage 558, it may be understood that any of the code blocks may be replaced with hardwired circuits, for example, built into an application specific integrated circuit (ASIC).

In an example, the instructions 582 provided via the memory 554, the storage 558, or the processor 552 may be embodied as a non-transitory, machine readable medium 560 including code to direct the processor 552 to perform electronic operations in the IoT device 550. The processor 552 may access the non-transitory, machine readable medium 560 over the interconnect 556. For instance, the non-transitory, machine readable medium 560 may include storage units such as optical disks, flash drives, or any number of other hardware devices. The non-transitory, machine readable medium 560 may include instructions to direct the processor 552 to perform a specific sequence or flow of actions, for example, as described with respect to the flowchart(s) and diagram(s) of operations and functionality described throughout this disclosure.

Example Computing Architectures

Figure 6:
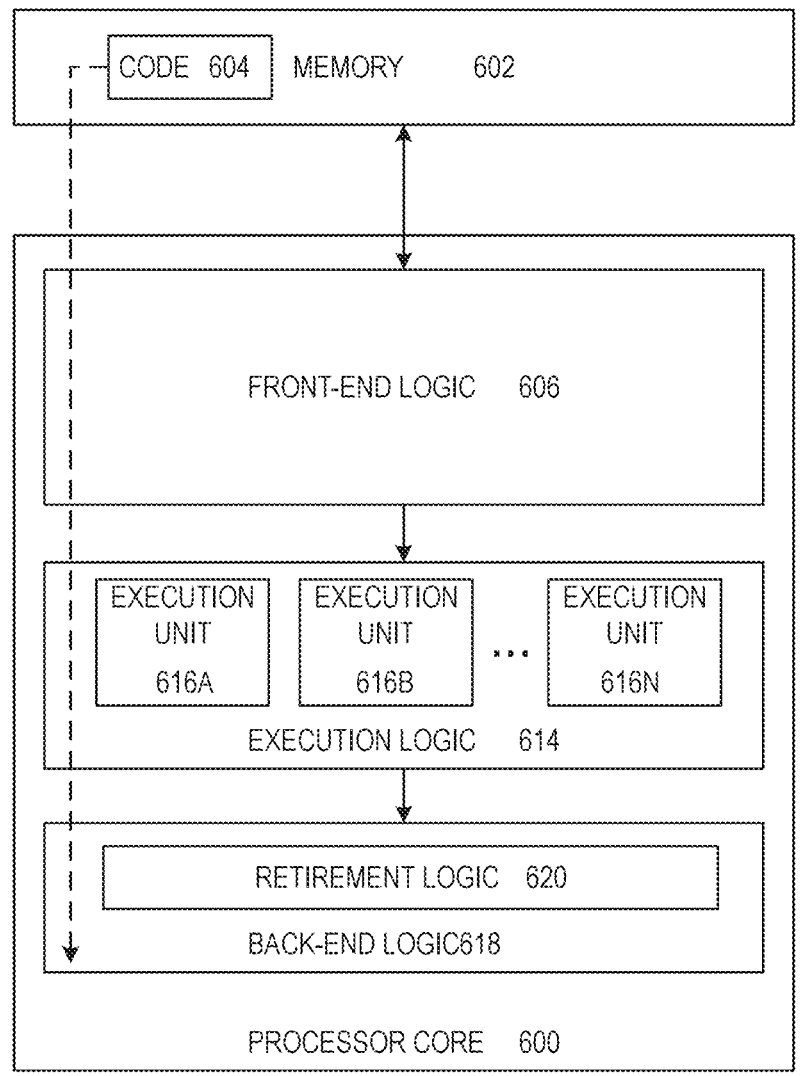
FIGS. 6 and 7 illustrate example computer architectures that can be used in accordance with certain embodiments.
Figure 7:
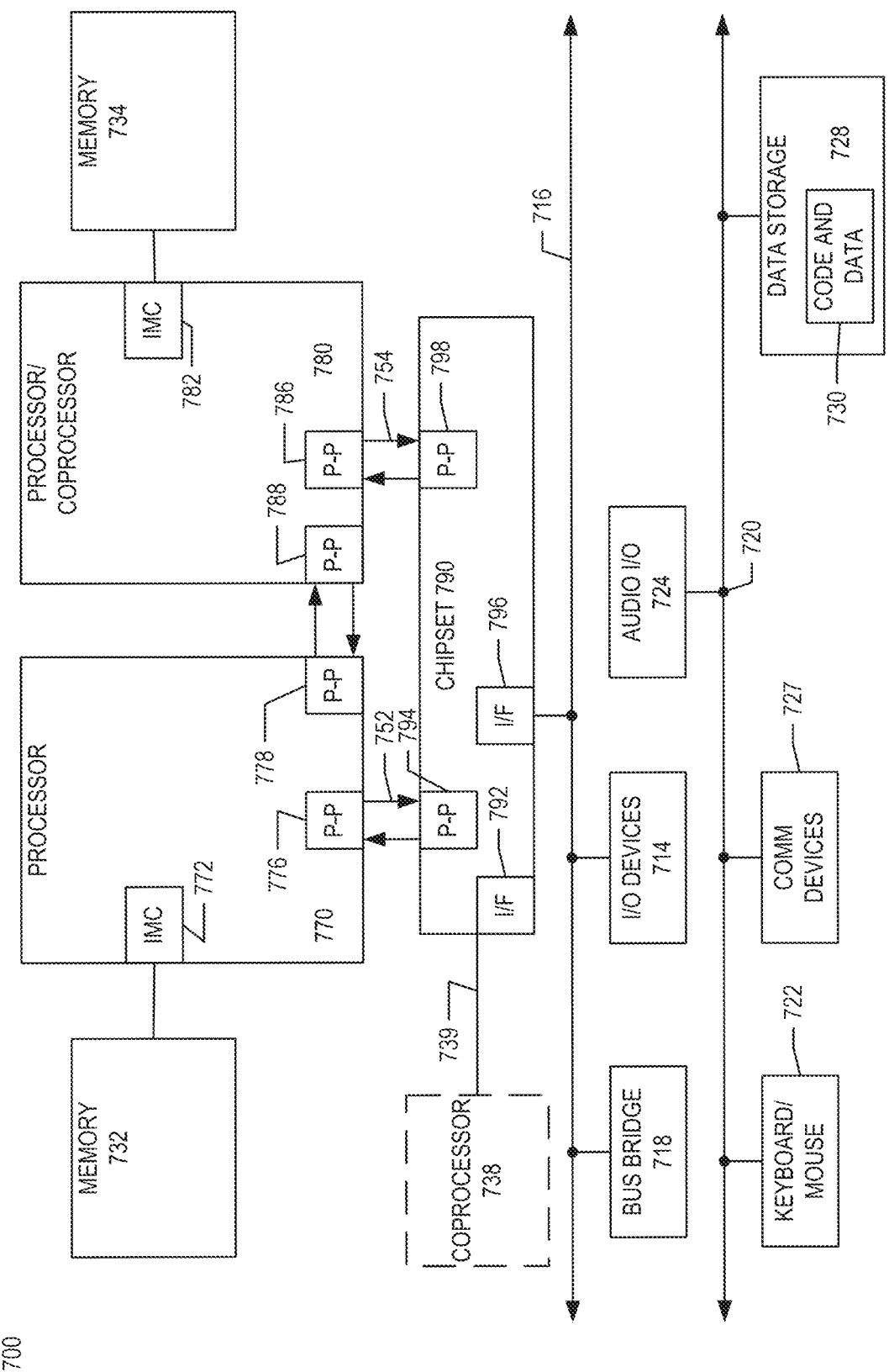

FIGS. 6 and 7 illustrate example computer processor architectures that can be used in accordance with embodiments disclosed herein. For example, in various embodiments, the computer architectures of FIGS. 6 and 7 may be used to implement the visual fog functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 6 illustrates a block diagram for an example embodiment of a processor 600. Processor 600 is an example of a type of hardware device that can be used in connection with the embodiments described throughout this disclosure. Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 600 can execute any type of instructions associated with algorithms, processes, or operations detailed herein. Generally, processor 600 can transform an element or an article (e.g., data) from one state or thing to another state or thing.

Code 604, which may be one or more instructions to be executed by processor 600, may be stored in memory 602, or may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 may also include register renaming logic and scheduling logic, which generally allocate resources and queue the operation corresponding to the instruction for execution.

Processor 600 can also include execution logic 614 having a set of execution units 616a, 616b, 616n, etc. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

FIG. 7 illustrates a block diagram for an example embodiment of a multiprocessor 700. As shown in FIG. 7, multiprocessor system 700 is a point-to-point interconnect system, and includes a first processor 770 and a second processor 780 coupled via a point-to-point interconnect 750. In some embodiments, each of processors 770 and 780 may be some version of processor 600 of FIG. 6.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 739. In one embodiment, the coprocessor 738 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of this disclosure is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

All or part of any component of FIG. 7 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Visual Fog Architecture

Figure 8:
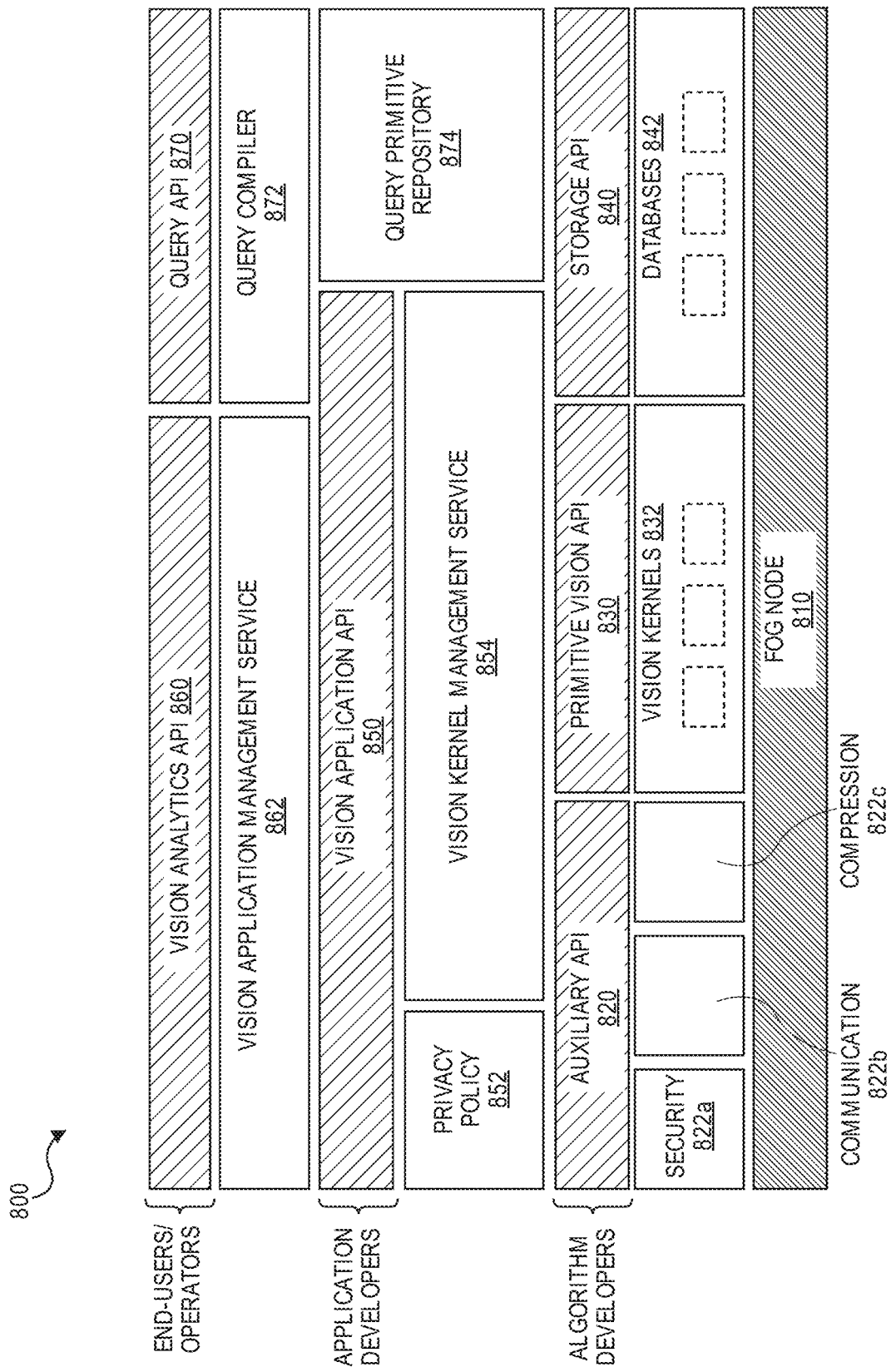
FIG. 8 illustrates an example embodiment of an architecture for visual fog nodes.

FIG. 8 illustrates an example embodiment of an architecture 800 for visual fog nodes. In some embodiments, for example, fog node architecture 800 may be used to implement the functionality of fog nodes 810 in a visual fog network or system (e.g., visual fog system 100 of FIG. 1). A fog node 810, for example, can include any node or component that ranges from the edge of a network to the cloud, inclusively.

In the illustrated embodiment, fog node 810 includes various application programming interfaces (APIs) that provide fundamental capabilities for fog node 810, such as auxiliary API 820, primitive vision API 830, and storage API 840. In some embodiments, for example, these APIs may be used or implemented by lower-level algorithm developers.

Auxiliary API 820 provides various fundamental functionality for fog node 810, such as security 822a, communication 822b, compression 822c (e.g., codecs), and so forth.

Primitive vision API 830 provides fundamental vision processing capabilities for fog node 810. For example, primitive vision API 830 provides access to a plurality of vision kernels 832 that can be used to perform primitive vision operations (e.g., person or object detection, facial recognition). Primitive vision API 830 may also provide access to various machine learning and/or neural network frameworks (e.g., Caffe, OpenCV, TensorFlow).

Storage API 840 provides storage capabilities for fog node 810. In some embodiments, for example, storage API 840 may include a variety of databases 842 for storing different types of visual data, such as graph databases, relational databases, array-based databases (e.g., TileDB), and so forth. In some embodiments, for example, the particular database used to store certain visual data may depend on the type of data, such as raw visual data or pixels, compressed visual data, visual metadata, and so forth.

Moreover, fog node 810 further includes a vision application API 850 that provides higher-level vision functionality, which may be used or implemented by developers of vision applications. For example, vision application API 850 may include a privacy policy 852 that defines the requisite privacy treatment for all data and devices associated with a visual fog network. Vision application API 850 may also include a vision kernel management service 854 that provides access to a variety of primitive vision operations or vision kernels. In some embodiments, for example, vision kernel management service 854 may retrieve vision kernels from a vision kernel repository. For example, if a particular vision application employs person detection functionality, vision kernel management service 854 may retrieve the appropriate vision kernel for performing person detection using the available hardware of the particular fog node 810.

Fog node 810 further includes a vision analytics API 860 and query API 870, which may be used by end-users or operators to perform visual analytics and visual queries. For example, vision analytics API 860 may perform inline (e.g. real-time) and/or offline processing of visual data, application launching, scheduling, resource monitoring, and so forth. Vision analytics API 860 may also include a vision application management service 862 that provides access to a variety of vision applications (e.g., people searching/tracking, object detection/tracking, and so forth). In some embodiments, for example, vision application management service 862 may retrieve vision applications from a vision application repository. In this manner, if an end-user wants to perform a people search, vision application management service 862 may retrieve an appropriate vision application for people searching. In some embodiments, for example, a people search vision application may use vision kernels that perform person detection followed by facial recognition. The end-user, however, can utilize the people search vision application without any knowledge of the underlying vision kernels or vision operations used to implement the application.

Moreover, query API 870 provides an interface that enables end-users to submit visual search requests or queries. In some embodiments, for example, query API 870 may support flexible visual queries in a variety of syntaxes, such as natural language, functional syntax (e.g., using logical operators), relational syntax, and so forth. In some embodiments, query API 870 may further include a query primitive repository 874 that contains the primitive operations that are supported for visual queries. Moreover, query API 870 may include a query compiler 872 for compiling the visual queries into visual processing dataflows that can be executed by visual fog nodes.

FIG. 9-12 illustrate example embodiments of visual fog architectures.

Figure 9:
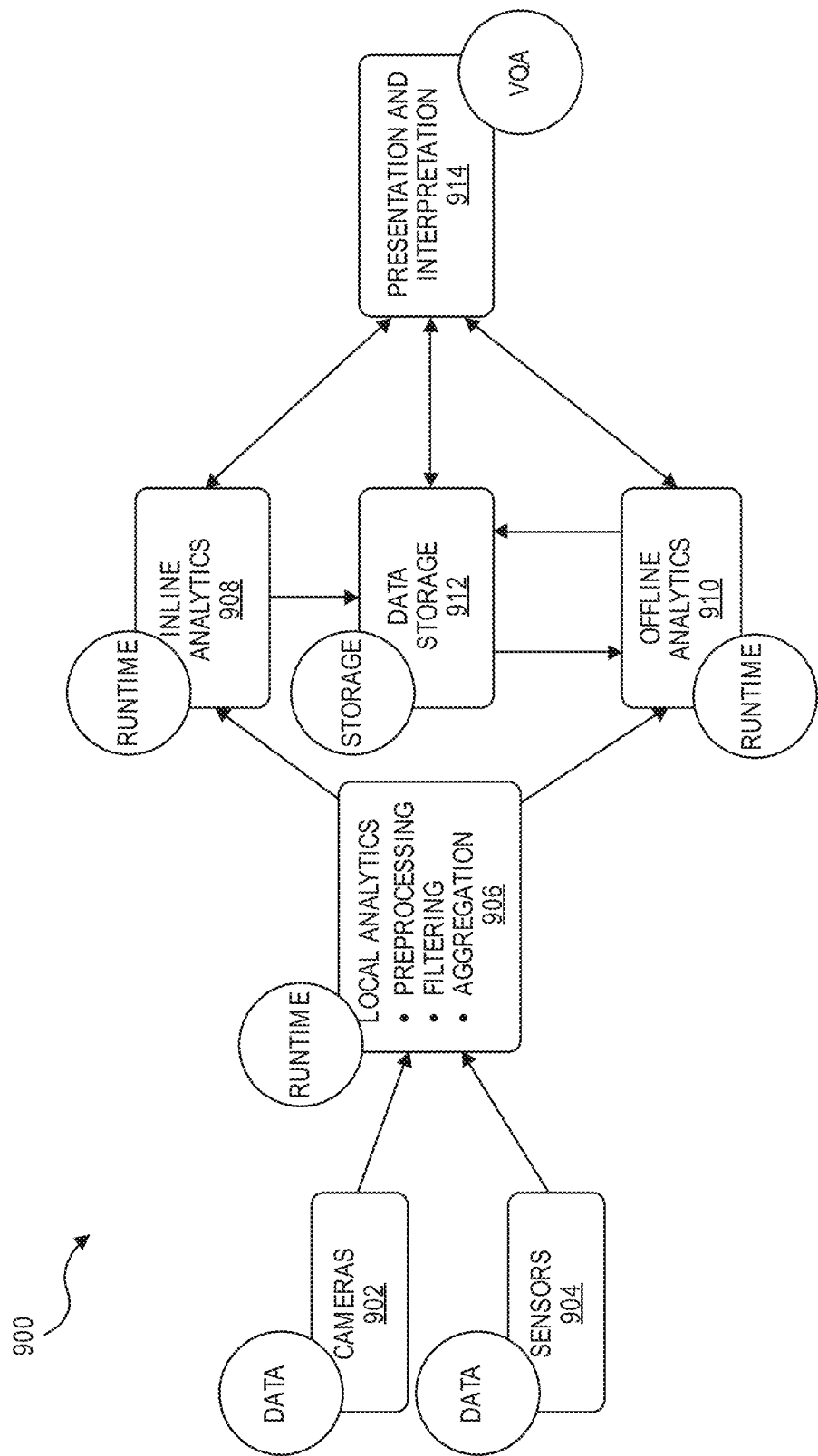
FIGS. 9, 10, 11, and 12A-B illustrate example embodiments of a visual fog architecture.

For example, FIG. 9 illustrates an example visual fog architecture 900 that includes cameras 902, sensors 904, local analytics framework 906, inline analytics framework 908, offline analytics framework 910, storage 912, and presentation/interpretation framework 914. In the illustrated embodiment, for example, cameras 902 and/or sensors 904 may generate visual data, such as images and/or video. The visual data may then be provided to local analytics framework 906, which may be used to perform preliminary processing and analytics at the network edge (e.g., near the cameras 902 or sensors 904 that captured the visual data). The partially processed visual data may then be provided to inline analytics framework 908 for further processing in real-time. In various embodiments, for example, inline analytics may be performed by and/or distributed across any combination of fog devices or resources (e.g., mobile devices, IoT devices, gateways, and/or the cloud). The resulting visual data and/or metadata from inline analytics framework 908 may then be stored in data storage 912. Moreover, a visual search query may be subsequently received by presentation/interpretation framework 914 (e.g., from an end-user). Accordingly, presentation/interpretation framework 914 may interact with data storage 912 and/or inline analytics framework 908 to determine whether a response to the query can be formulated based on the visual data and/or metadata that has already been processed or generated. If further processing needs to be performed to respond to the query, however, presentation/interpretation framework 914 may interact with offline analytics framework 910 to perform further offline processing of the visual data. In various embodiments, for example, offline analytics may be performed by and/or distributed across any combination of fog devices or resources (e.g., mobile devices, IoT devices, gateways, and/or the cloud). Accordingly, based on the information obtained either from data storage 912, inline analytics framework 908, and/or offline analytics framework 910, presentation/interpretation framework 914 may then respond to the visual query.

Figure 10:
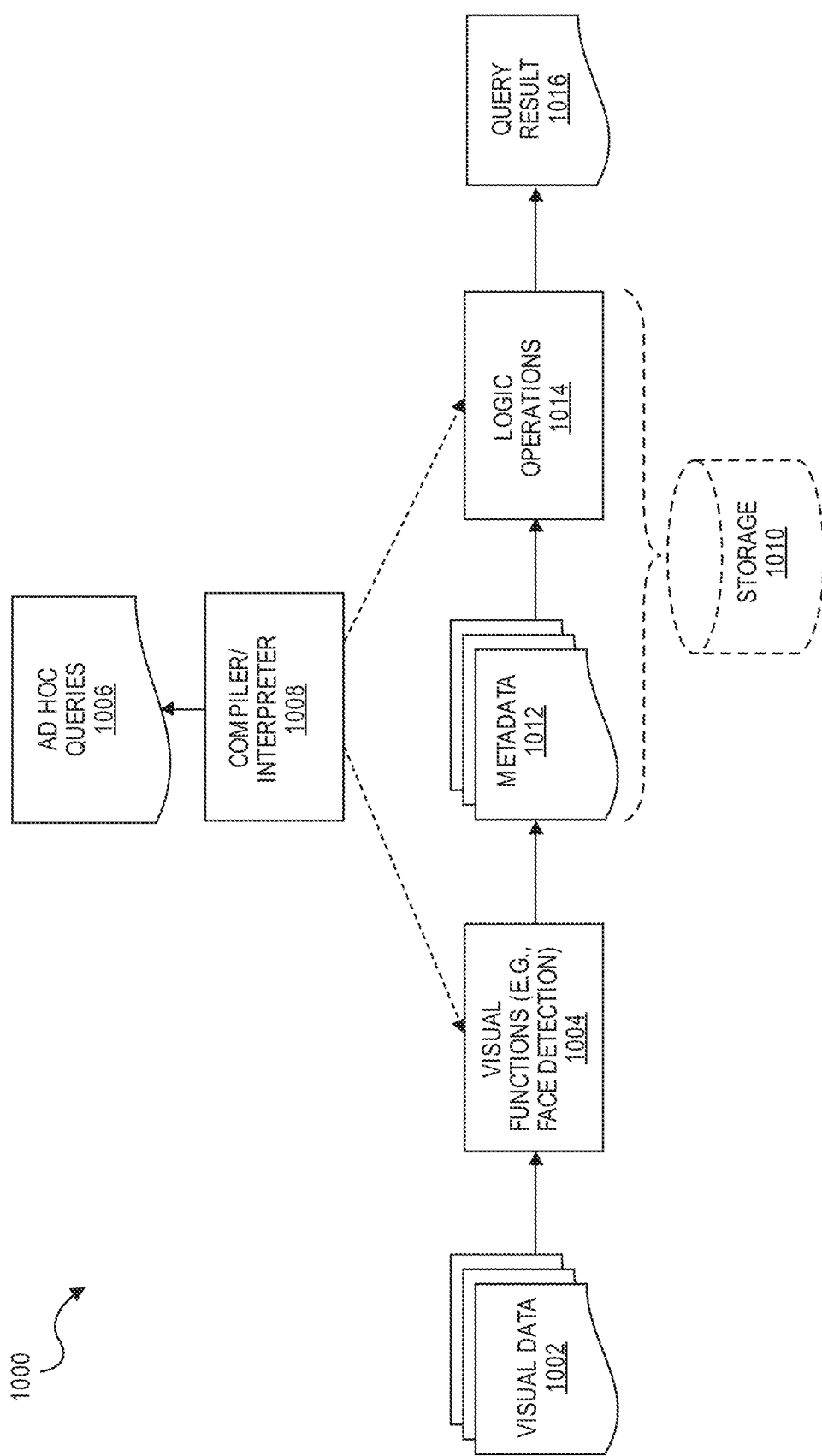

FIG. 10 illustrates an example visual processing pipeline 1000 associated with a visual fog architecture. In the illustrated example, visual data 1002 may first be captured by cameras and/or visual sensors, and the visual data 1002 may then be processed to perform certain visual functions 1004 (e.g., face detection) and/or other analytics, resulting in a set of visual metadata 1012 that may be stored in data storage 1010. Moreover, an end-user may subsequently submit an ad hoc search query 1006 associated with the visual data 1002, and a query compiler/interpreter 1008 may then compile the query into a visual processing dataflow that can be executed (e.g., using available fog nodes or resources) in order to respond to the query. In some cases, for example, it may be possible to formulate a query result 1016 based on the processing that has already been completed. For example, in some cases, the query result 1016 may be formulated by applying appropriate logic operations 1014 on the existing visual metadata 1012 that has already been generated. In other cases, however, further visual processing and/or functions 1004 may need to be performed on the visual data 1002 in order to formulate the query result 1016. In either case, the compiler/interpreter 1008 may generate a requisite vision processing dataflow for responding to the query, and the resulting vision processing dataflow may then be executed in order to formulate the query result 1016.

Figure 11:
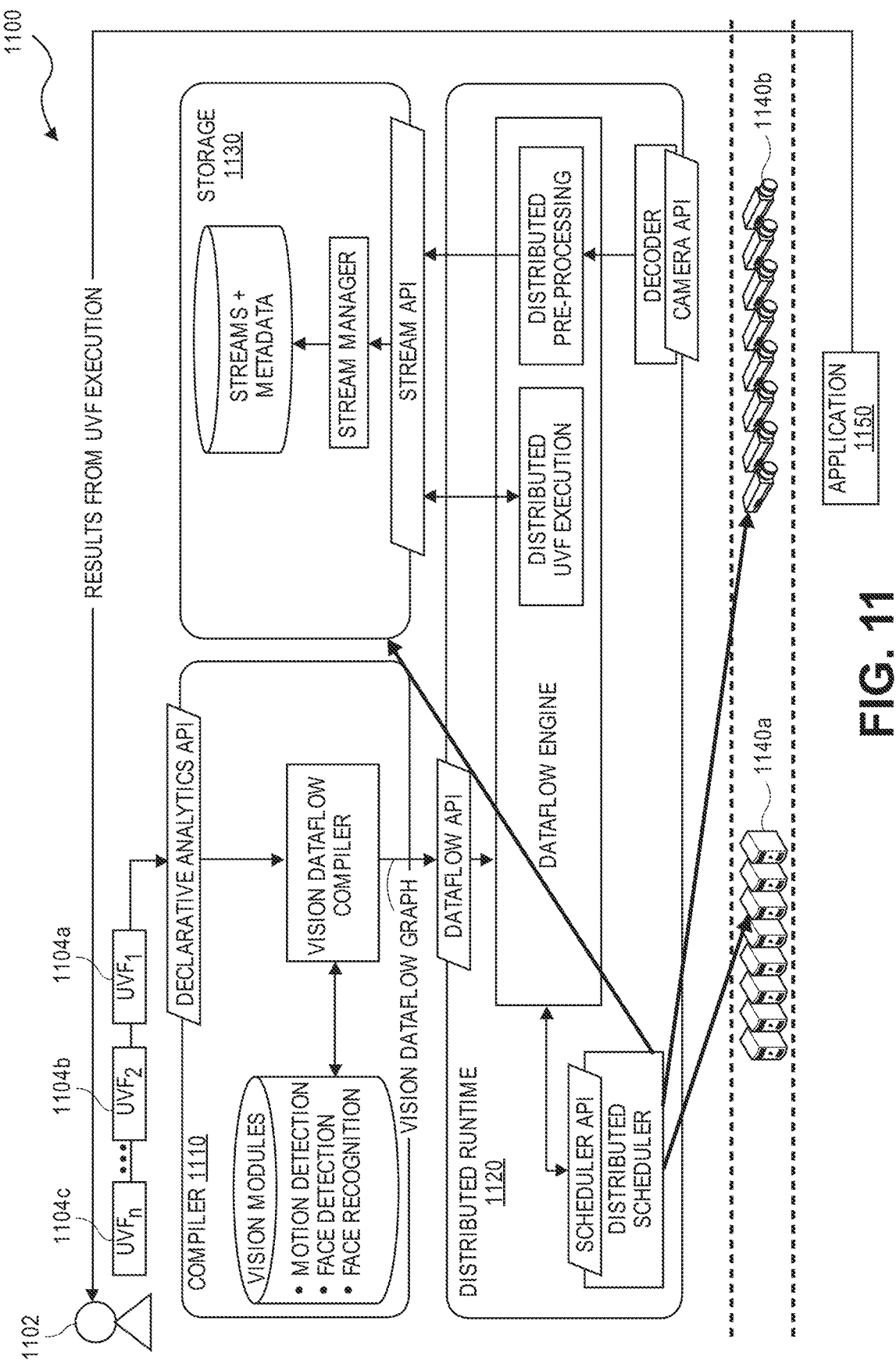

FIG. 11 illustrates another example visual fog architecture 1100. In the illustrated embodiment, visual data captured by cameras 1140b is provided to a distributed runtime environment 1120, which performs initial pre-processing on the visual data in real-time (e.g., when the visual data is first captured rather than in response to a query). The resulting visual data or metadata generated by the distributed runtime environment 1120 is then stored in data storage 1130.

Separately, visual search queries containing user-defined vision functions (UVFs) 1104a-c are received from end-users 1102 of visual fog 1100. A UVF 1104 received from an end-user 1102 is first processed by a compiler 1110 in order to generate a vision dataflow graph for executing the UVF. Accordingly, the vision dataflow graph is then executed by the distributed runtime environment 1120 in order to generate a result for the UVF 1104. In some embodiments, for example, the distributed runtime environment 1120 may determine the result using existing visual metadata that has already been generated (e.g., from the initial or real-time processing of the original visual data), and/or by performing further analysis on the visual data (e.g., by executing a particular vision application 1150). The result obtained from execution of the UVF 1104 may then be provided back to the requesting end-user 1102.

Further, in various embodiments, the distributed runtime environment 1120 may perform the described visual data processing (e.g., initial pre-processing and/or UVF processing) by scheduling or distributing vision workloads across the available fog devices or resources 1140 (e.g., cloud servers 1140a, cameras 1140b, mobile devices, IoT devices, gateways, and/or other fog/edge devices).

Figure 12A:
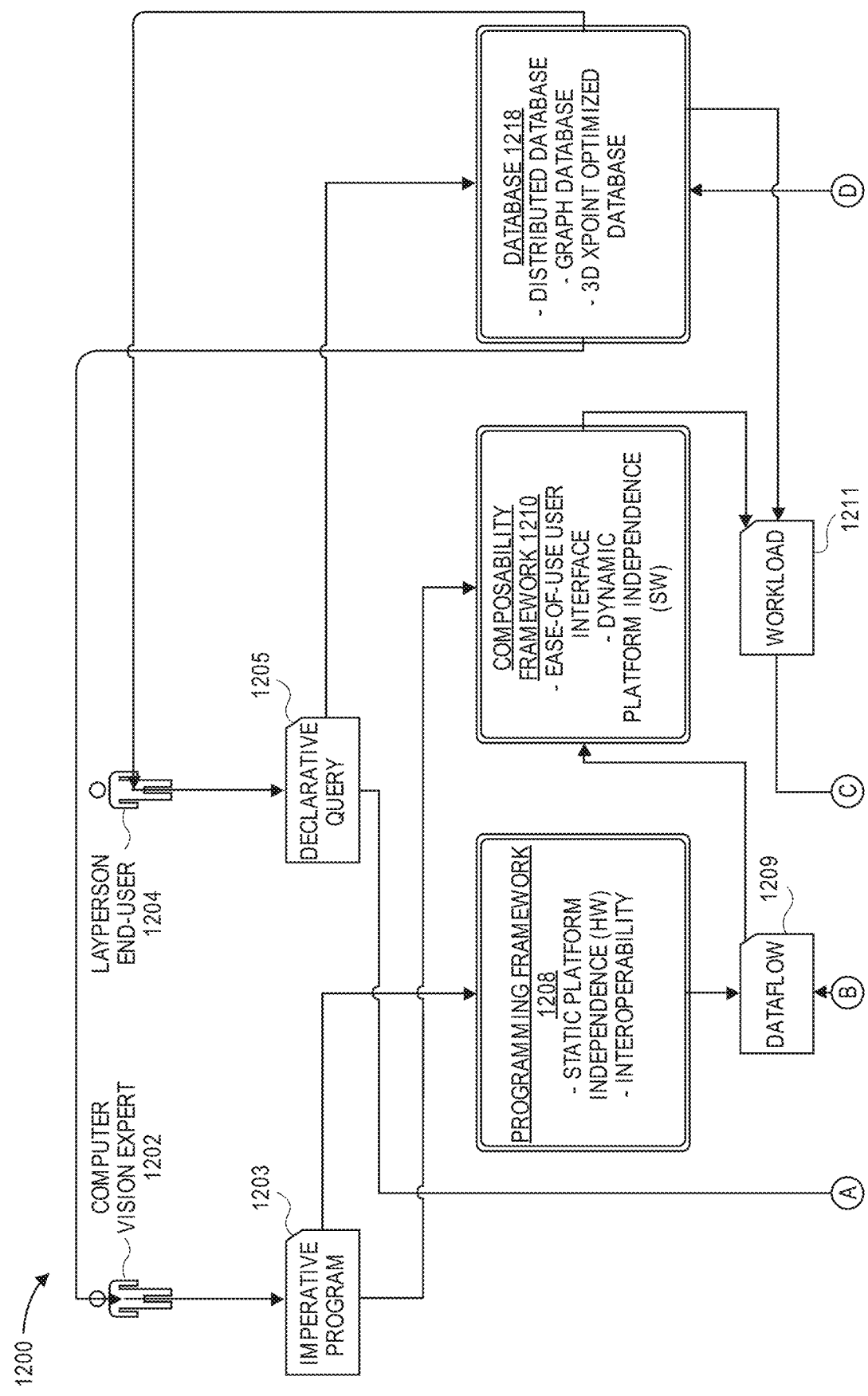
Figure 12B:
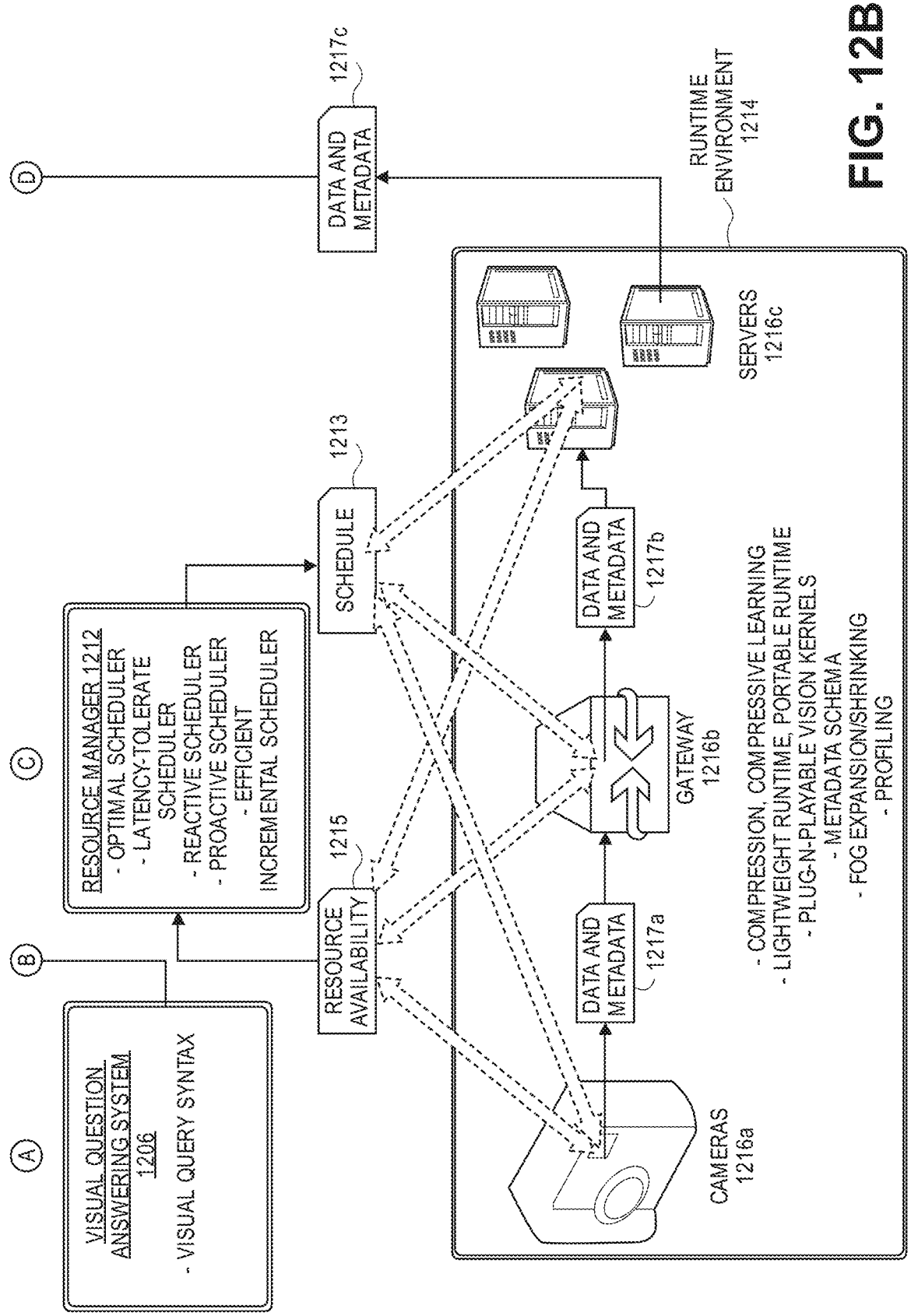

FIGS. 12A-B illustrate another example visual fog architecture 1200. In the illustrated embodiment, visual fog architecture 1200 includes a network of fog devices 1216, including cameras or visual sensors 1216a, gateways 1216b, and cloud servers 1216c. The cameras or visual sensors 1216a, for example, are used to capture visual data 1217. Moreover, a computer vision expert 1202 can develop an imperative vision program 1203 that leverages the captured visual data 1217. The vision program 1203, for example, may be implemented using programming and composability frameworks 1208 and 1210 to define vision processing dataflows 1209 and generate vision processing workloads 1211.

In the illustrated embodiment, for example, the vision program 1203 leverages a distributed runtime environment 1214 to process visual data 1217 captured in visual fog 1200. The distributed runtime environment 1214, for example, can perform visual data processing using the collection of available fog devices 1216 in visual fog 1200.

In some embodiments, for example, the distributed runtime environment 1214 may be used to perform initial pre-processing on captured visual data 1217 in real-time (e.g., when the visual data is first captured rather than in response to a query). The resulting visual data or metadata 1217 generated by the distributed runtime environment 1214 may then be stored in a database or data storage 1218.

Moreover, a layperson or end-user 1204 may subsequently submit a declarative query 1205 associated with visual data 1217 captured by visual fog 1200. The declarative query 1205 is processed by a visual question answering (VQA) system 1206, which uses a compiler or interpreter to generate a dataflow 1209 for responding to the query. In some cases, for example, it may be possible to respond to query 1205 using existing visual metadata 1217 that has already been generated (e.g., during the initial or real-time processing of the original visual data 1217 and/or during the processing associated with prior queries 1205). In other cases, however, further processing may need to be performed on the visual data 1217 in order to respond to the query 1205. In either case, an appropriate dataflow 1209 for responding to the query 1205 may be generated, and the resulting dataflow 1209 may be further partitioned into one or more underlying vision processing workloads 1211. Moreover, based on the resource availability 1215 of fog devices 1216 in the distributed runtime environment 1214, a schedule 1213 for distributing the workloads 1211 across the available fog devices 1216 may be generated. Accordingly, the respective workloads 1211 may then be distributed across the fog devices 1216 based on the generated schedule 1213, and each fog device 1216 may execute its respective workload(s) 1211. In this manner, the dataflow 1209 for responding to the query 1205 is executed by the various fog devices 1216 using a distributed approach. A response to the query 1205 may then be provided to the end-user 1204, and the resulting visual metadata 1217 may be stored in database 1218 for responding to subsequent queries.

Visual Question Answering (VQA)

Figure 13:
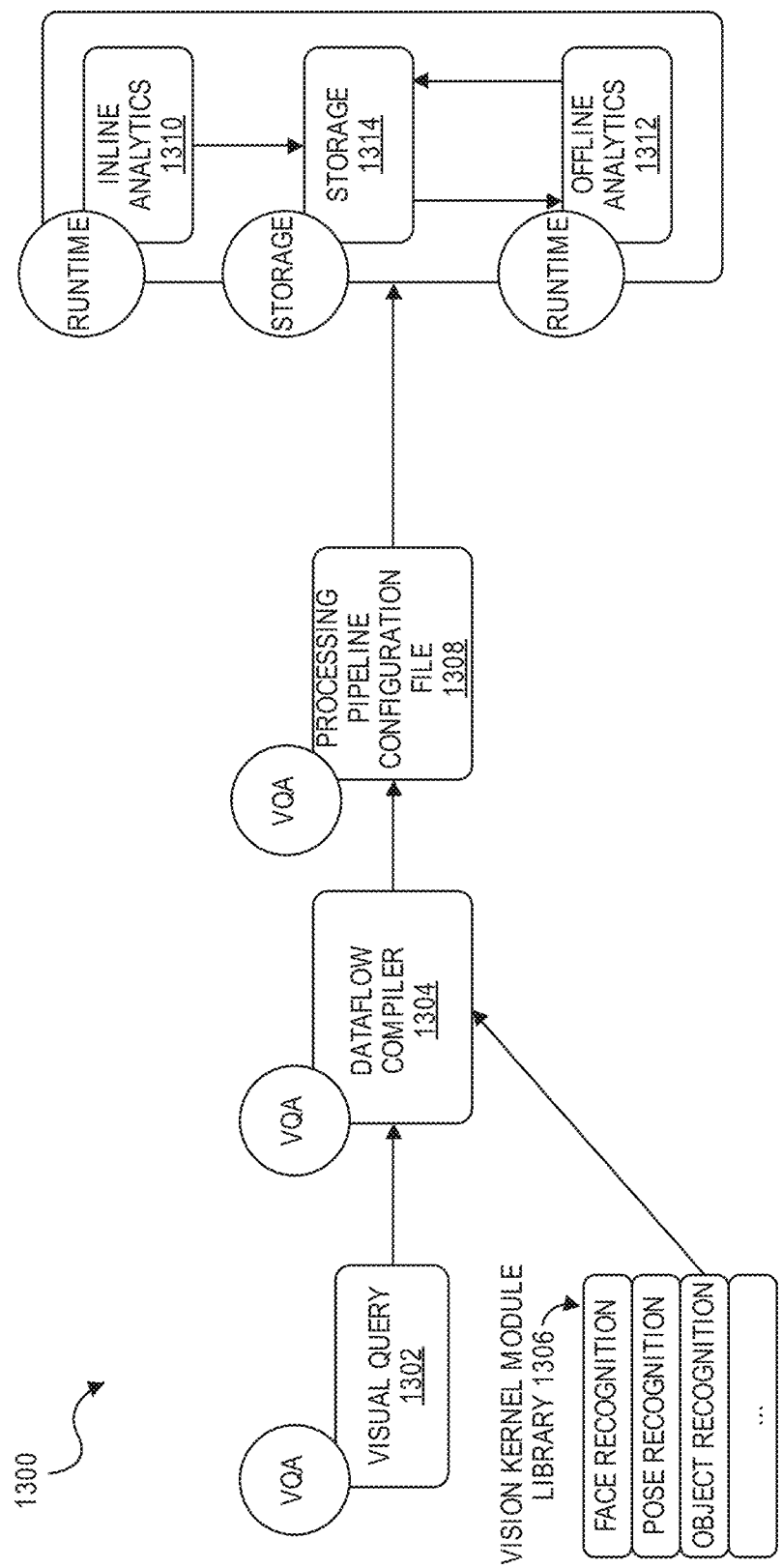
FIGS. 13 and 14 illustrate example embodiments associated with a visual question answering (VQA) framework.
Figure 14:
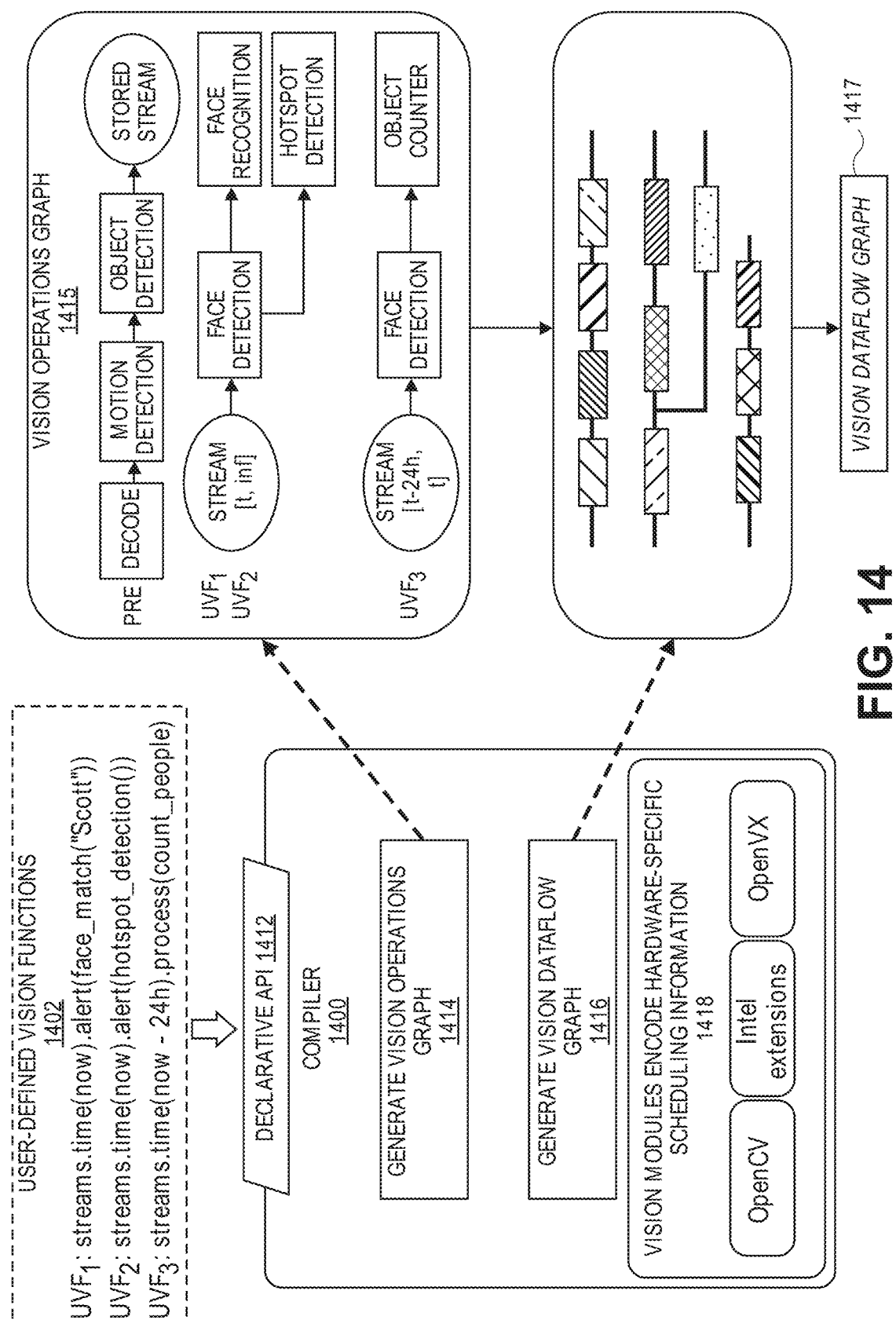

FIG. 13-14 illustrate example embodiments associated with a visual question answering (VQA) framework. In some embodiments, for example, a visual fog architecture may implement a VQA framework to provide a flexible and efficient interface for end-users to submit ad hoc visual search queries. In visual processing systems, for example, the ability to submit a query to search large data sets in an efficient manner (e.g., millions of images) and identify a subset of relevant images or related information is important. Existing visual processing solutions are implemented using rigid or inflexible approaches, however, and are unable to search visual data efficiently. Accordingly, the visual question answering (VQA) framework of FIGS. 13 and 14 can be used to alleviate the deficiencies of existing solutions.

In some embodiments, for example, a VQA framework may support flexible or ad hoc visual search queries using a variety of syntaxes, such as natural language, functional syntax (e.g., using logical operators), relational syntax, and so forth. Accordingly, when a visual search query is received from a user, the query may be compiled into a visual processing dataflow that can be distributed across and executed by the various fog nodes in a visual fog architecture. In this manner, end-users can perform complex searches on large sets of visual data without any knowledge of the underlying architecture or processing required to execute the searches.

Moreover, in some embodiments, users or developers may be capable of defining custom vision functions that can be used in visual search queries, referred to as user-defined vision functions (UVFs). As an example, a UVF could be defined for visually equivalency, or performing "equal" operations on visual data. Many ad hoc visual queries, for example, require information related to the same object or person to be identified or grouped together. Identifying the same object or person across different images or video streams, however, can be challenging. In some embodiments, for example, this task may require feature extraction to be performed across multiple cameras. The respective features extracted from each camera often differ, however, and not all cameras have the same field of view, and thus certain features may be successfully extracted from some cameras but not others. Accordingly, in some embodiments, a user may implement a UVF to define how visual equivalency or "equal" operations are to be performed on visual data. In some embodiments, for example, a UVF for visual equivalency may define objects as "equal" if their feature vectors are "close enough" to each other, meaning the feature vectors must be sufficiently similar but do not have to be an exact match. Further, if feature vectors from different cameras are missing certain features, only the partial features will be compared and the "close enough" definition will be scaled accordingly.

FIG. 13 illustrates an example embodiment of a visual question answering (VQA) pipeline 1300. In the illustrated example, a visual query 1302 is first received from an end-user, and a dataflow compiler 1304 is then used to compile the visual query 1302 into a visual processing pipeline or dataflow 1308. In some embodiments, for example, the dataflow compiler 1304 may use a library of vision kernel modules 1306 (e.g., face recognition, pose recognition, object recognition, and so forth) to generate the resulting visual processing dataflow 1308.

In some cases, for example, the visual processing dataflow 1308 may leverage existing visual metadata that has already been generated and stored on data storage 1314. For example, an inline analytics framework 1310 may be used to perform initial visual data processing in real-time (e.g., when visual data is first captured rather than in response to a query), and an offline analytics framework 1312 may be used to perform further visual data processing required for responding to search queries. Moreover, both the inline and offline analytics frameworks 1310, 1312 may store their resulting visual metadata on data storage 1314 for use in responding to subsequent visual search queries. Accordingly, in some cases, the visual processing dataflow 1308 for a particular query 1302 may leverage existing visual metadata that has already been generated and stored on data storage 1314. In other cases, however, further processing may be required to respond to the query 1302, and thus the visual processing dataflow 1308 may leverage the offline analytics framework 1312 to perform additional processing. In either case, the visual processing pipeline or dataflow 1308 generated by compiler 1304 is executed by the runtime environment in order to generate a response to the visual query 1302.

FIG. 14 illustrates an example embodiment of a visual question answering (VQA) compiler 1400. In some embodiments, for example, compiler 1400 may be used to compile VQA queries and/or user-defined vision functions (UVFs) 1402 into visual dataflow graphs 1417 that can be distributed across and executed by the various fog nodes in a visual fog architecture.

In the illustrated embodiment, for example, UVFs 1402 are provided to the compiler 1400 via a declarative API 1412. The compiler 1400 may then generate a graph of high-level vision operations 1415 that are required to execute the UVFs 1402, which may in turn be used to generate a vision dataflow graph 1417. In some embodiments, for example, the vision dataflow graph 1417 may be a directed acyclic graph (DAG) that represents the visual processing pipeline required to execute the particular UVFs 1402. Moreover, the compiler 1400 may use dataflow de-duplication to optimize the vision dataflow graph 1417, for example, by merging redundant portions of the dataflows of multiple UVFs 1402 to eliminate the redundancies.

In some embodiments, for example, compiler 1400 may generate the vision dataflow graph 1417 using information from the underlying vision modules 1418 (e.g., hardware-specific information required for scheduling workloads on heterogeneous hardware). The compiler 1400 may also generate a number of database API calls to obtain visual data and/or metadata required to execute the UVFs 1402. In various embodiments, these database API calls may either be part of, or separate from, the vision dataflow graph 1417. Moreover, in some embodiments, the compiler 1400 may generate different results depending on the available visual metadata.

In this manner, the resulting vision dataflow graph 1417 generated by compiler 1400 can subsequently be executed by the runtime environment in order to generate the results for responding to UVFs 1402.

Runtime

The visual fog paradigm envisions tens of thousands (or more) heterogeneous, camera-enabled edge devices distributed across the Internet and/or other large-scale networks, providing live sensing for a myriad of different visual processing applications, given task parallelism and data parallelism. The scale, computational demands, and bandwidth needed for visual computing pipelines necessitates intelligent offloading to distributed computing infrastructure, including the cloud, Internet gateway devices, and the edge devices themselves.

In some embodiments, for example, visual processing may be scheduled or distributed across available fog devices based on various criteria, including device connectivity, device resource capabilities, device resource availability, workload type, privacy constraints, and so forth. Privacy constraints, for example, can be used to inform which content should be permitted and which should be filtered. In some cases, filtered content may be represented as lowered pixel depth, blurry pixels, or missing content filled in by approximation and inference using neighboring non-filtered pixels. Further, machine learning can be leveraged to optimize scheduling decisions.

Workload deployment and/or migration can be implemented using a hot-pluggable runtime environment with universal plugin APIs. For example, conventional workload deployment/migration can be expensive, as it may require sending the runtime environment and toolchains to the assigned nodes. With hot-pluggable runtimes, however, workloads are hot-swappable (e.g., stop runtime, replace plugin, start runtime).

Moreover, a plugin or vision kernel repository can be used to facilitate workload deployment. For example, a cloud-based or distributed repository may be used to manage a collection of device and implementation abstractions for each supported vision capability. In this manner, the repository can distribute the appropriate plugins or vision kernels to fog nodes based on their respective workload assignments.

Incremental processing may be leveraged by a visual fog runtime to maintain the state of any prior processing that has already been performed on visual data, enabling the results of the prior processing to be leveraged for subsequent visual processing and queries. For example, the results of any processing performed on visual data may be represented as visual metadata, which may be stored for later use to avoid performing duplicative processing for subsequent visual queries. In this manner, when a visual query or UVF is received, the dataflow generated by a compiler may vary depending on the available metadata that has already been generated and can be reused.

Metadata pre-provisioning can be used to reduce vision query latency by pre-processing visual data to complete common or frequent types of processing in advance. In some embodiments, for example, a machine learning model may be used to optimize the types of pre-processing that is performed. For example, based on patterns of queries of the same type or that involve similar types of processing, machine learning may be used to model the relationships of diverse queries, while also taking other modalities into account (e.g., weather, traffic). For example, metadata can be pre-provisioned by pre-scheduling certain types of processing in advance based on the recent history of vision queries and UVFs. In this manner, patterns of common or similar vision workloads can trigger pre-processing on newly captured visual data for those types of workloads to reduce query latency.

Similarly, stream prioritization or prefetching can be used to perform low-latency visual data loading or fetching based on historical trends and/or workflows. For example, the vision processing history can be used to prioritize certain data streams and/or pre-fetch data from memory for a particular application to improve query latency. Compared to metadata pre-provisioning, which involves expedited processing that is performed in advance, stream prioritization involves obtaining or moving visual data to a location where it will likely be needed (e.g., from a camera to certain processing nodes).

Cached visual analytics can be used to optimize visual processing using cached workflows, similar to incremental processing. For example, based on cached information regarding particular visual streams that have already been obtained and processed, along with the type of processing or workloads performed on those streams, subsequent vision processing dataflows may omit certain processing steps that have previously been performed and whose results have been cached. For example, a visual analytics application involves a number of primitive vision operations. The volume of computation can be reduced, however, by caching visual analytics results and reusing them for subsequent operations when possible. For example, when executing a visual analytics application, cached visual metadata resulting from prior processing can be searched to avoid duplicative computation. In some embodiments, for example, cached visual analytics may be implemented as follows:

1. Each primitive vision operation is tagged or labeled using a cache tag;

2. For each instance or stream of visual data (e.g., each stored video), any corresponding visual metadata that has already been generated is stored in a metadata database or cache;

3. If there is a cache tag hit for a particular primitive vision operation with respect to a particular instance or stream of visual data, then the particular primitive vision operation can be omitted and instead the existing visual metadata can be used; and 4. If there is a cache tag miss, however, the particular primitive vision operation is executed and the resulting metadata is cached in the metadata database for subsequent use.

Tensor factorization can also be used for distributed neural network inferencing in order to address the overfitting problem. For example, representative weights of consecutive neural network layers can utilize tensor factorization to "smooth out" the model.

Figure 15:
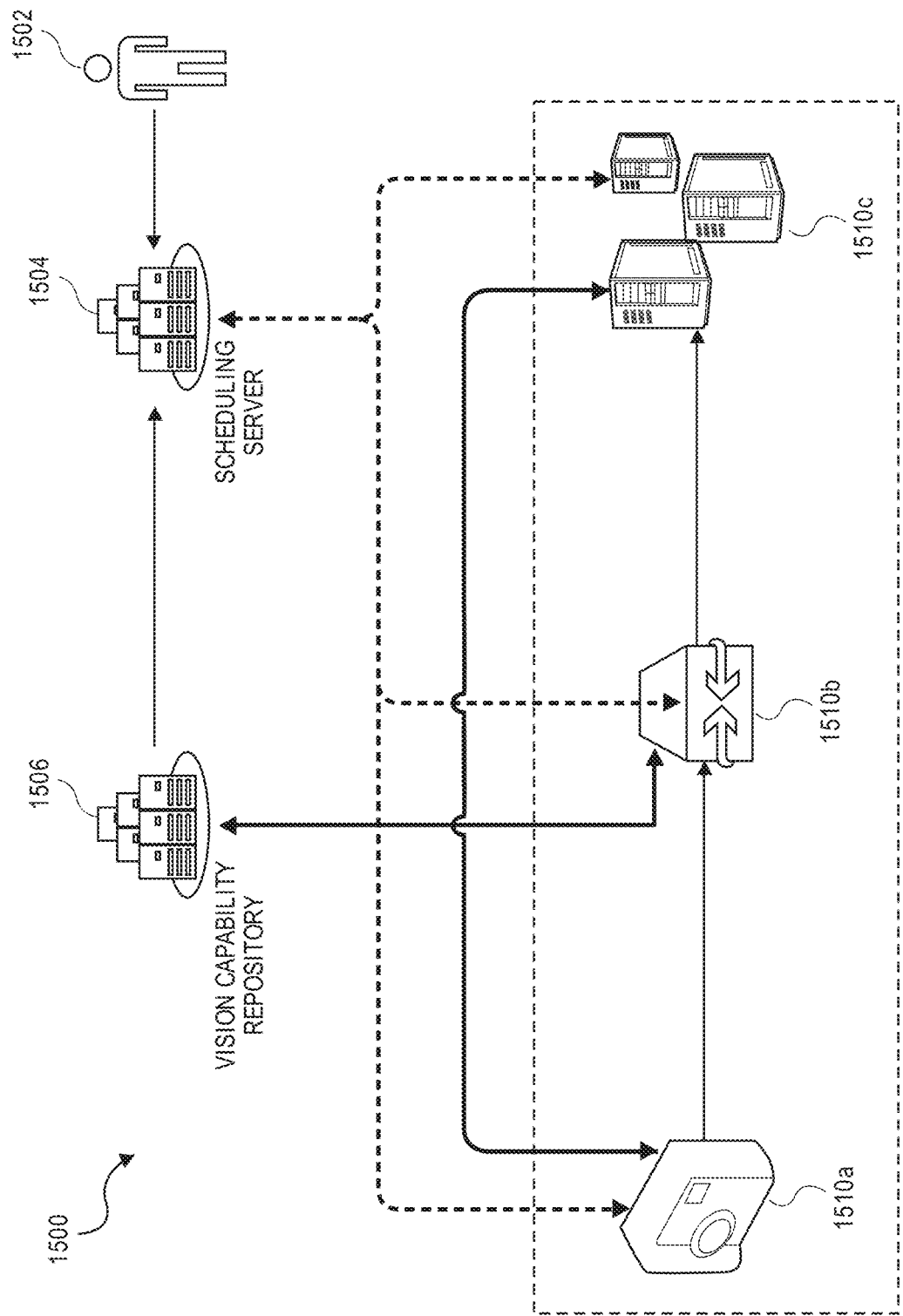
FIGS. 15 and 16 illustrate example embodiments of device-centric scheduling for visual fog computing.
Figure 16:
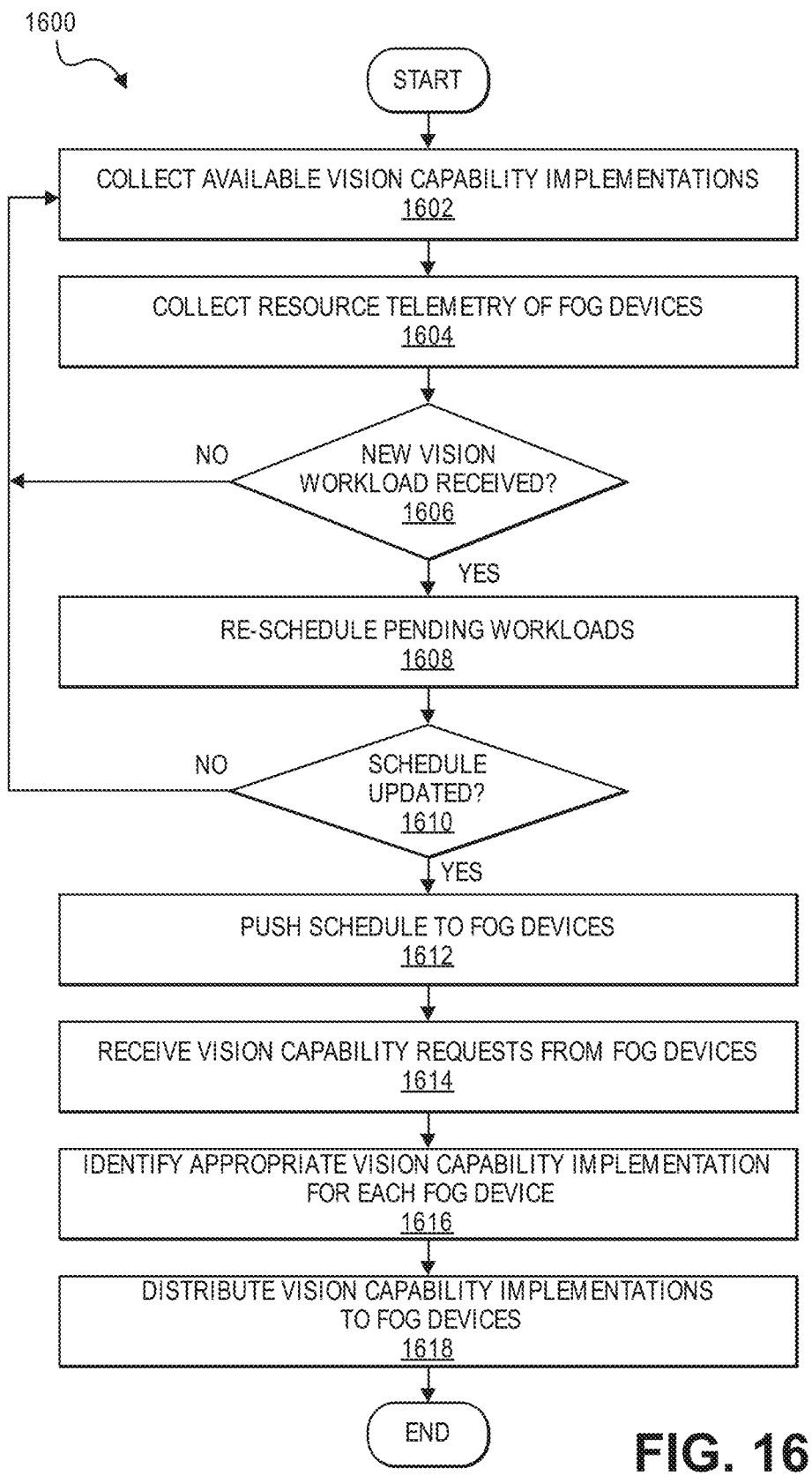

FIGS. 15 and 16 illustrate example embodiments of device-centric scheduling for visual fog computing. In some embodiments, for example, visual fog scheduling may depend on (1) device resource capacities, and (2) workload resource requirements. While the former remains constant and consistent, the latter can vary depending on a device's hardware specifications and software toolchains. For example, in some embodiments, there may be multiple implementations of a facial recognition capability that are respectively optimized for different types of hardware, such as CPUs, GPUs, FPGAs, ASICs, and so forth. In this manner, multiple implementations of a single vision capability can be leveraged to create an opportunity for further optimization in visual fog computing.

Accordingly, in order to address the heterogeneity of devices with different types of hardware and/or software, the illustrated embodiments implement device-centric scheduling using a vision capabilities repository. In some embodiments, for example, the vision capabilities repository may include multiple implementations of a particular vision capability that are optimized for different hardware and/or software environments. In this manner, vision workloads can be scheduled or distributed across fog devices based on their respective types of resources and capabilities, along with per-resource telemetry information that identifies resource availability.

The basic principle is to abstract capabilities (e.g., face detection, gesture recognition) from their underlying kernels/implementations (e.g., SIFT-based implementations, deep neural network implementations). This type of abstraction provides the flexibility to deploy an arbitrary vision capability on a per-device basis. For example, using resource-based scheduling, heterogeneous resource types of different fog devices can be considered as a whole in order to determine the optimal task-to-device mapping across the various fog devices, and also identify the corresponding vision capability implementations that each device should use for its assigned tasks. Moreover, resource telemetry can be used to monitor resource availability of fog devices on a per-resource basis (e.g., CPU, GPU, FPGA, ASIC, and so forth) to further facilitate intelligent scheduling decisions. Further, the vision capability repository hosts collections of implementations of different vision capabilities, and may also provide a request-response service that allows a device to request an available implementation of a particular vision capability.

In this manner, device-centric scheduling can be used to improve end-to-end (E2E) performance (e.g., latency and bandwidth efficiency) and scalability for visual fog computing.

FIG. 15 illustrates an example architecture 1500 for implementing device-centric scheduling in a visual computing system. In the illustrated embodiment, for example, visual computing architecture 1500 includes users 1502, scheduling server 1504, vision kernel repository 1506, and various types of fog devices 1510. A fog device 1510, for example, can include any device ranging from the edge of a network to the cloud, inclusively. In the illustrated embodiment, for example, fog devices 1510 include cameras 1510a, gateways 1510b, and cloud servers 1510c.

In some embodiments, users 1502 may submit search queries for visual data captured by cameras 1510a. Moreover, in order to respond to those queries efficiently, scheduling server 1504 may schedule or distribute vision processing workloads across the various fog devices 1510. In some embodiments, for example, scheduling server 1504 may perform intelligent scheduling decisions based on various criteria, such as the types of resources in the fog (e.g., the heterogeneous types of resources of the various fog devices 1510), resource telemetry information (e.g., the availability of fog resources on a per-resource-type basis), and the implementations of vision capabilities that are available in the vision capability repository 1506.

An example embodiment of the scheduling process, for example, is described below in connection with FIG. 16.

FIG. 16 illustrates a flowchart 1600 for an example embodiment of device-centric scheduling in a visual computing system. In some embodiments, for example, flowchart 1600 may be implemented using visual computing architecture 1500 of FIG. 15.

The flowchart may begin at block 1602 by collecting the available vision capability implementations. In some embodiments, for example, the scheduling server continuously synchronizes the collection of available implementations of vision capabilities from the vision capability repository.

The flowchart may then proceed to block 1604 to collect the resource telemetry of fog devices. In some embodiments, for example, the scheduling server may collect the resource availability of all fog devices on a per-resource-type basis. For example, the scheduling server may collect information regarding the resource availability of CPUs, GPUs, FPGAs, ASICs, and/or any other resource type across all fog devices.

In this manner, based on the available vision capability implementations collected at block 1602, and the resource telemetry information collected at block 1604, the scheduling server can subsequently schedule vision workloads based on the optimal task-to-device mapping in the visual fog paradigm.

For example, the flowchart may then proceed to block 1606 to determine whether a new vision workload has been received from a user. In some embodiments, for example, a user may submit a new visual query, which may require a new vision workload to be scheduled or distributed across the fog devices.

If it is determined at block 1606 that a new vision workload has NOT been received, the flowchart may then proceed back to block 1602 to continue synchronizing the available vision capability implementations and collecting resource telemetry information until a new vision workload is received.

If it is determined at block 1606 that a new vision workload has been received, the flowchart may then proceed to block 1608 to re-schedule all pending workloads. In some embodiments, for example, receiving a new vision workload for a user may trigger the scheduling server to re-schedule all pending workloads to ensure the collective workloads are distributed across the fog devices in the most efficient manner possible (e.g., based on the optimal task-to-device mapping).

In some embodiments, for example, scheduling may be performed based on various criteria, such as the types of fog resources that are available, telemetry information for those resources, and the vision capability implementations that are available for those fog resources.

In some embodiments, for example, a schedule that adheres to the constraints of multiple resource types can be determined using integer linear programming (ILP). Integer linear programming (ILP) is a mathematical optimization or feasibility technique for solving or optimizing a mathematical model represented by linear relationships. In particular, ILP can be used to optimize a linear objective function, subject to additional linear equality and linear inequality constraints. As an example, an ILP problem can be expressed as follows:

| minimize: | $c^T x$ | (objective term) |
|---|---|---|
| subject to: | $Ax \leq b$ | (inequality constraint) |
| | $Cx = d$ | (equality constraint) |
| and: | $x \in \{0, 1\}^K$ | (binary constraint). |

Moreover, this ILP model can be used to determine an optimal schedule f that satisfies a specified objective (e.g., total network utilization), while also adhering to other additional constraints (e.g., device resource constraints). In the above ILP model, for example, x presents the collection of possible schedules f, K is the length of x, the objective term presents a scheduling objective to be minimized (e.g., total network utilization), and the inequality/equality constraints present any additional constraints (e.g., device, resource, network, mapping, and/or privacy constraints). A device resource constraint, for example, can be presented as an inequality constraint of the ILP model. For example, in order to take into account constraints of multiple resource types, they can be expended into multiple inequalities in the form of $Ax \leq b$ in the ILP model above.

Accordingly, based on the scheduling decisions, the scheduling server assigns each fog device zero or more tasks. In some embodiments, for example, a task may be specified in a tuple of the form t=(p, r), where p denotes the vision capability and r denotes resource type (e.g., p=face detection, r=Movidius processor).

The flowchart may then proceed to block 1610 to determine if an updated workload schedule is available. For example, after a new vision workload is received and the pending workloads are re-scheduled, the scheduling server may have an updated or improved workload schedule that needs to be distributed to the fog devices. In some embodiments, however, the scheduling server may only update the workload schedule if the newly generated schedule is better or more efficient than the current workload schedule.

If it is determined at block 1610 that the workload schedule has NOT been updated, the flowchart may then proceed back to block 1602 to continue synchronizing the available vision capability implementations and collecting resource telemetry until the current workload schedule is eventually updated.

However, if it is determined at block 1610 that an updated workload schedule is available, the flowchart may then proceed to block 1612 to push the updated schedule to all fog devices.

The flowchart may then proceed to block 1614 to receive requests from fog devices for vision capability implementations. For example, each fog device may query the vision capability repository to request implementations of vision capabilities for the tasks assigned to the particular fog device. In some embodiments, for example, the request from a particular fog device may identify each of its assigned tasks t.

The flowchart may then proceed to block 1616 to identify the appropriate vision capability implementations for each fog device. In some embodiments, for example, the vision capability repository may be a dictionary of key-value pairs in the form of (task t, implementation i), where an implementation i can be distributed in various forms (e.g., a dynamic linking library in C/C++). Accordingly, based on the task(s) t specified in the request from a particular fog device, the vision capability repository identifies the corresponding implementation(s) i for that fog device. In some embodiments, for example, the vision capability repository identifies the optimal implementation of each vision capability requested by a fog device based on the available resources of that fog device.

The flowchart may then proceed to block 1618 to distribute the identified vision capability implementations to each fog device. In this manner, each fog device can then perform its assigned tasks using the appropriate vision capability implementations.

At this point, the flowchart may be complete. In some embodiments, however, the flowchart may restart and/or certain blocks may be repeated. For example, in some embodiments, the flowchart may restart at block 1602 to continue scheduling vision workloads.

Figure 17:
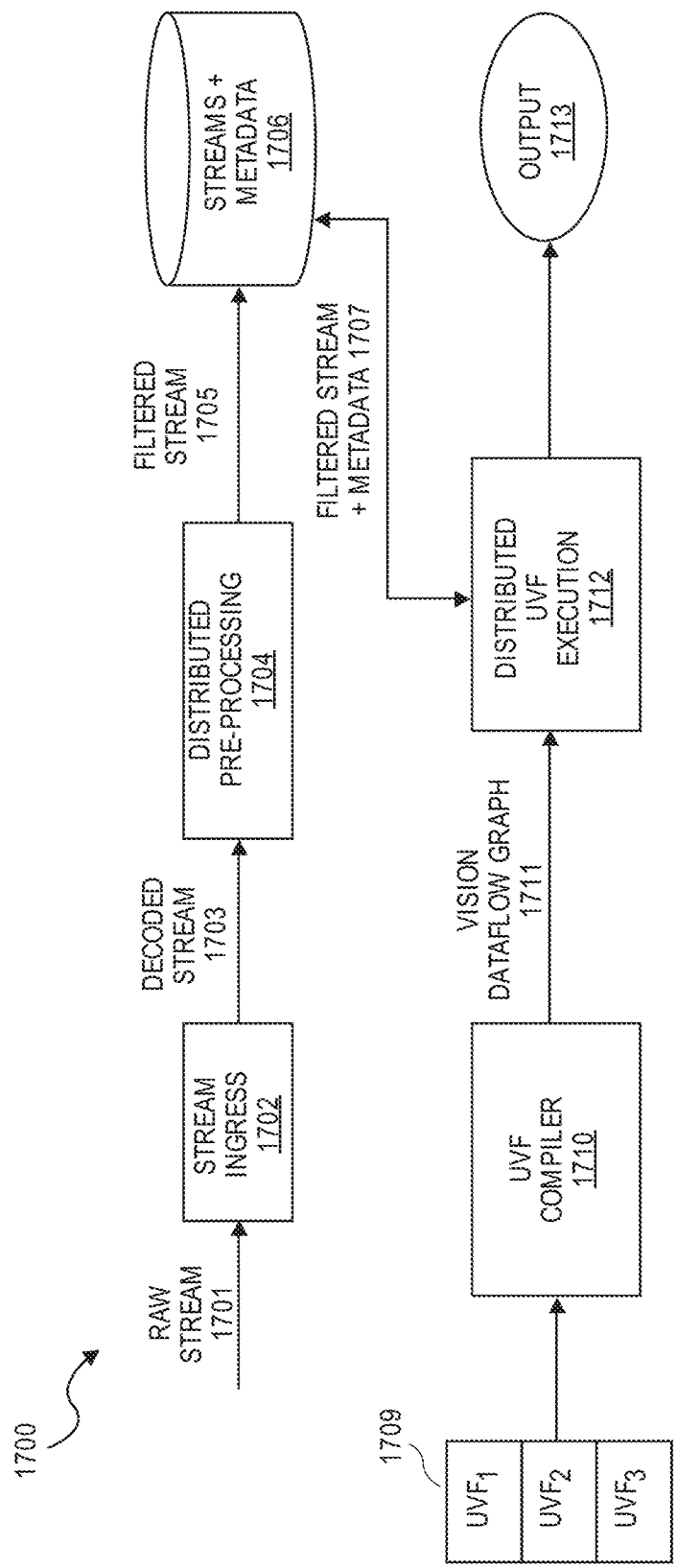
FIG. 17 illustrates an example embodiment of a runtime processing pipeline for a visual fog architecture.

FIG. 17 illustrates an example embodiment of a runtime processing pipeline 1700 for a visual fog architecture. In the illustrated embodiment, for example, a raw stream of visual data 1701 (e.g., video or images) captured by cameras or visual sensors in a visual fog architecture is provided as input to a stream ingress framework 1702. The stream ingress framework 1702 decodes the raw stream of visual data 1701, and a decoded stream 1703 is then provided as input to a distributed pre-processing framework 1704. The distributed pre-processing framework 1704 then performs some preliminary processing using certain fog resources at the network edge (e.g., near the cameras or sensors that captured the visual data), such as data pre-processing, filtering, and/or aggregation. The resulting filtered stream 1705 may then be stored in data storage 1706 for subsequent use in responding to visual search queries and/or user-defined vision functions (UVFs) 1709 from end-users.

For example, end-users may subsequently submit visual search queries and/or user-defined vision functions (UVFs) 1709 associated with the visual data captured by the visual fog system. Accordingly, the UVFs 1709 are provided to a UVF compiler 1710, which compiles the UVFs 1709 into a vision dataflow graph 1711 that can be used to execute the UVFs. For example, the vision dataflow graph 1711 is provided to a distributed UVF execution framework 1712, which distributes or schedules workloads associated with the vision dataflow graph 1711 across the available fog nodes in the visual fog architecture.

After the workloads finish executing, the distributed UVF execution framework 1712 generates an output 1713 resulting from execution of the UVFs 1709. For example, the output 1713 may include, or may be derived from, a filtered stream of visual data and/or metadata 1707 generated by execution of the UVFs 1709. Moreover, in some embodiments, the resulting stream of visual data and/or metadata 1707 may then be stored in data storage 1706 for responding to subsequent visual search queries or UVFs.

Storage

As the volume of visual data generated in the real-world continues to grow, it is becoming increasingly common for visual data to be processed automatically by computers rather than manually reviewed by humans. Due to the increasing volume of visual data, however, data access has become a bottleneck in visual data processing, as existing visual data storage approaches suffer from various deficiencies.

To illustrate, image classification is a common visual data operation that uses a neural network to identify the contents of an image. For example, in machine learning, a convolutional neural network (CNN) is a type of feed-forward artificial neural network where the input is generally assumed to be an image. CNNs are commonly used for image classification, where the goal is to determine the contents of an image with some level of confidence. For example, a CNN is first trained for a specific classification task using a set of images whose object classes or features have been labeled, and the CNN can then be used to determine the probability of whether other images contain the respective object classes.

Visual data (e.g., images, video) must first be loaded from a storage system before it can be processed by a CNN. In the past, the data access latency has typically been less than the CNN vision processing latency, allowing the data access to be performed during the CNN processing. However, as hardware and software optimizations continue to improve the performance of CNN vision processing algorithms, the data access latency of existing solutions has become the bottleneck. Moreover, existing solutions typically store visual data in its original format rather than a format designed to aid with visual data processing, which further hinders performance.

Existing solutions are also unable to efficiently search visual data. For example, given a large data set (e.g., millions of images), the ability to efficiently identify a subset of relevant images using a query is important. The output of a CNN used for image classification typically includes a vector of values corresponding to the probability of various objects existing in an image. However, existing solutions typically use this information for the task at hand and then discard it, requiring the processing to be repeated for subsequent use. For example, a CNN used to process an image with a dog and a cat may provide a probability for both, but if the goal was to find images with dogs, the information about cats is typically lost or discarded, thus preventing future use. In this manner, a subsequent search for images that contain cats would typically require the CNN to be run again on each image.

Figure 18:
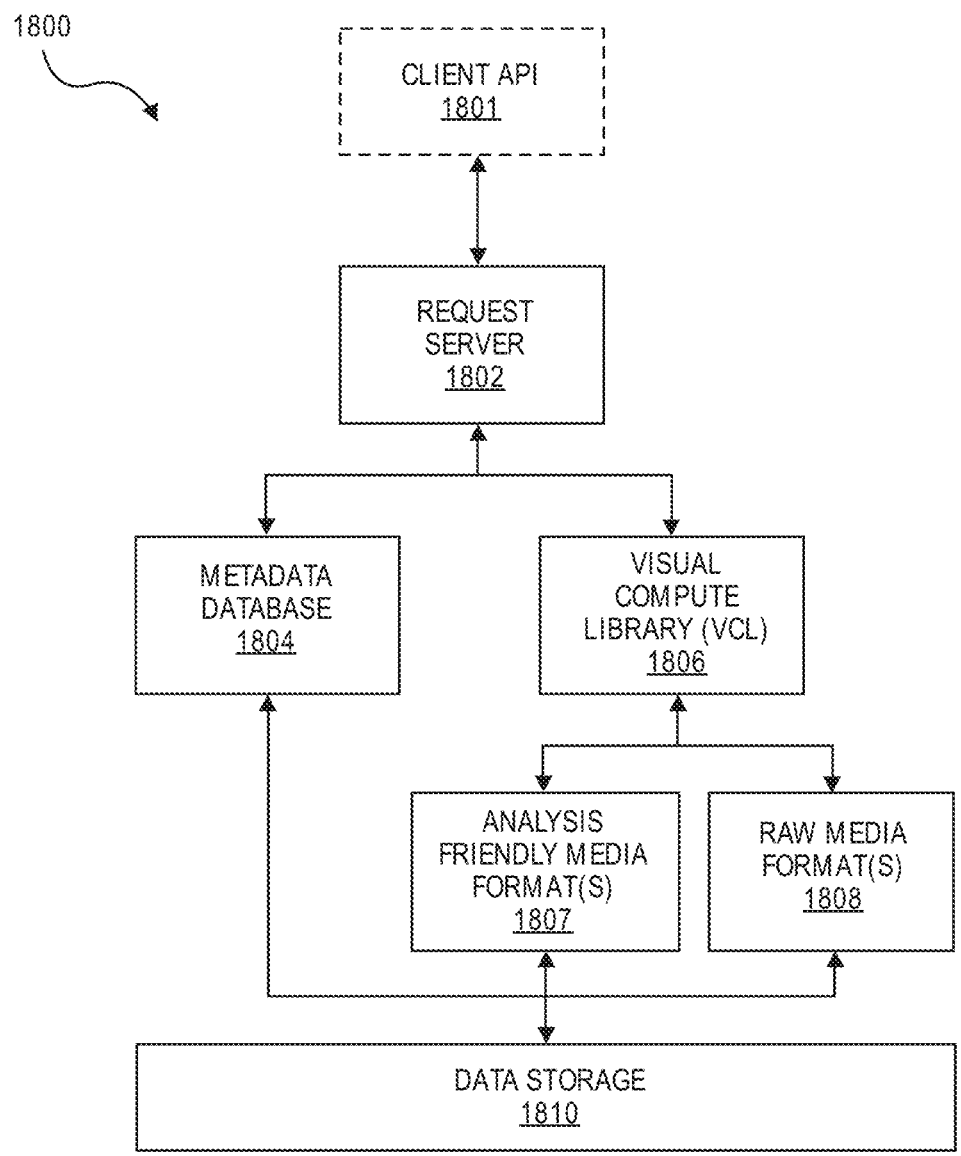
FIG. 18 illustrates an example embodiment of a visual data storage architecture.

Accordingly, FIG. 18 illustrates an example embodiment of a visual data storage architecture 1800 designed to provide efficient access to visual data and eliminate the deficiencies of existing storage solutions used for visual data processing. In particular, storage architecture 1800 provides efficient metadata storage for searching visual data, as well as analysis-friendly formats for storing visual data.

In the illustrated embodiment, for example, storage architecture 1800 includes a request server 1802 for receiving visual search queries from a client API 1801, a metadata database 1804, a visual compute library 1806, and a persistent data storage 1810, as explained further below.

In some embodiments, for example, storage architecture 1800 may provide a unified API 1801 for visual data access (e.g., for both visual data and metadata). For example, visual data is commonly stored directly as files or in various types of databases (e.g., key-value, relational, and/or graph databases). Visual metadata is typically stored in databases, for example, while images and videos are typically stored as files. Moreover, different types of file systems and databases provide API functions in various programming and/or query languages in order to enable users to access and store data. Accordingly, in some embodiments, visual storage architecture 1800 may be implemented with a unified API (e.g., JSON-based) that supports multi-modal queries for retrieving any type of visual data from any storage source. In some embodiments, for example, the unified API could be used to retrieve and/or combine visual metadata and the original visual data from different storage locations. The unified API may also allow certain types of processing to be performed on visual data before it is returned to the requesting user. Further, the unified API may allow users to explicitly recognize visual entities such as images, feature vectors, and videos, and may simplify access to those visual entities based on their relationship with each other and with other entities associated with a particular vision application.

Moreover, in some embodiments, a multi-tier lazy data storage approach may be used to store visual data more efficiently (e.g., using long- or short-term storage in different portions of the distributed edge-to-cloud network). For example, multiple storage tiers may be used to store visual data in different locations and for varying amounts of time based on the type or importance of the visual data. In some embodiments, for example, video cameras may store all video captured within the past day, gateways may store video with motion activities within the past week, and the cloud may store video associated with certain significant events within the past year.

Similarly, intelligent placement and aging of visual data across the storage tiers may further improve the data storage efficiency (e.g., determining where to store the visual data within the distributed edge-to-cloud system, when the data should be moved from hot to warm to cold storage, and so forth). For example, visual data and metadata can be distinguished and segregated based on data access patterns. Moreover, analysis friendly storage formats can be used to enable data to be read faster when needed for vision processing. These various data formats may be used to form the hot, warm, and cold tiers of data that can be mapped to various heterogeneous memory and storage technologies, based on the intended use and lifetime of the data. For example, storage tiers can be used to represent hot, cold, and optionally warm data. Hot data is accessed frequently; warm data is accessed occasionally; and cold data is accessed rarely (if ever). Accordingly, cold data may be stored on slower hardware since low access latency for retrieval of the data is less important. In this manner, intelligent decisions can be used to determine when and which portions of visual data should remain in the hot tiers and when it should be migrated to colder tiers, and which storage format should be used. For example, regions of interest may remain in hot storage in the analysis friendly format much longer than the entire image/video.

Figure 19:
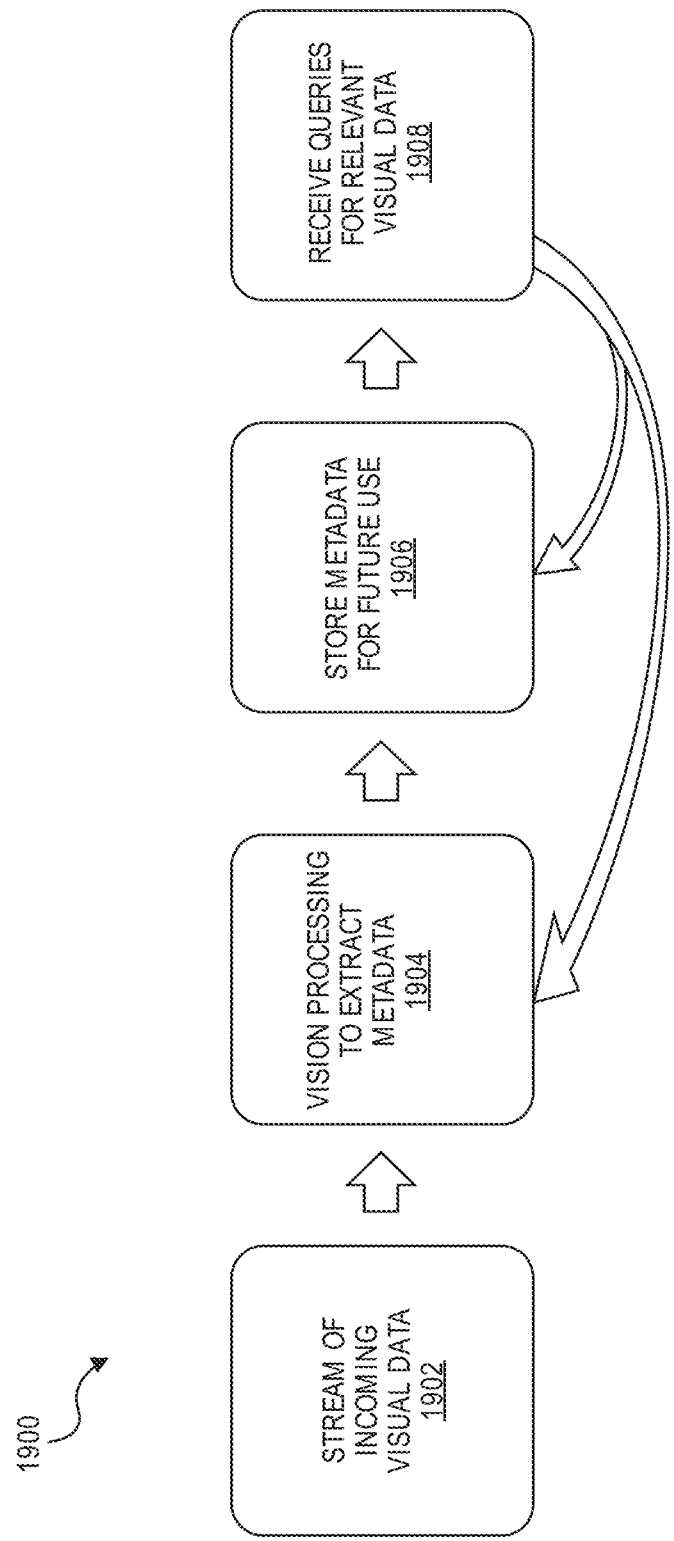
FIG. 19 illustrates an example of a vision processing pipeline that leverages metadata for searching visual data.

Metadata database 1804 is used to store metadata in a manner that facilitates efficient searches of visual data. For example, when performing image classification using a CNN, the resulting image-object relationships or probabilities can be stored as metadata, and the metadata can be used for subsequent searches of the images, thus eliminating the need to repeatedly process the images for each search. For example, FIG. 19 illustrates an example of a vision processing pipeline 1900 that leverages metadata for searching visual data. In the illustrated example, a stream of incoming visual data is received from a network or file system at block 1902, vision processing is performed on the visual data to derive metadata (e.g., using a CNN) at block 1904, the metadata is stored at block 1906, search queries for relevant visual data are received at block 1908, and the search queries are then satisfied using either the metadata obtained at block 1906 or additional vision processing performed at block 1904.

Figure 20:
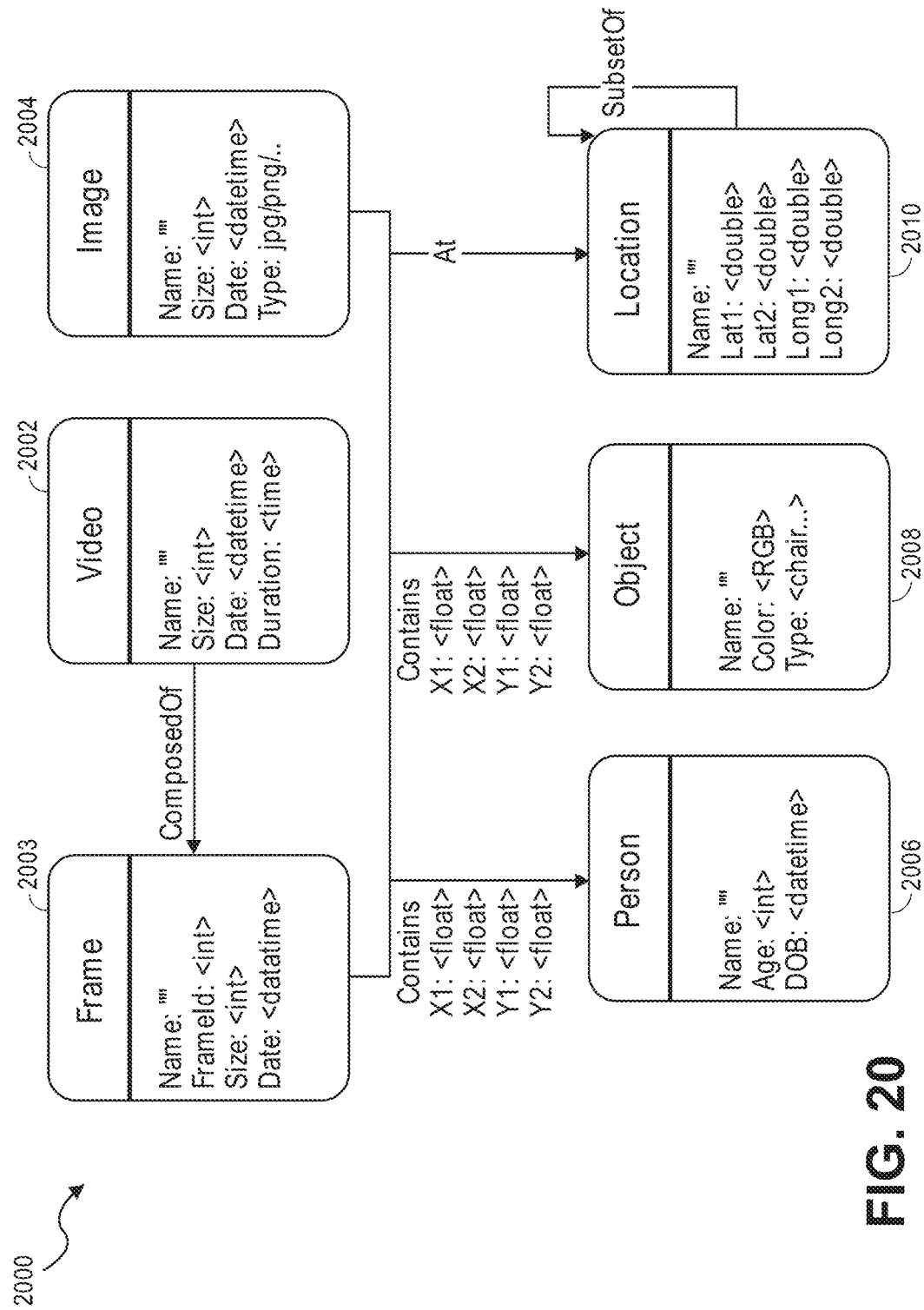
FIGS. 20 and 21 illustrate examples of representing visual metadata using a property graph.
Figure 21:
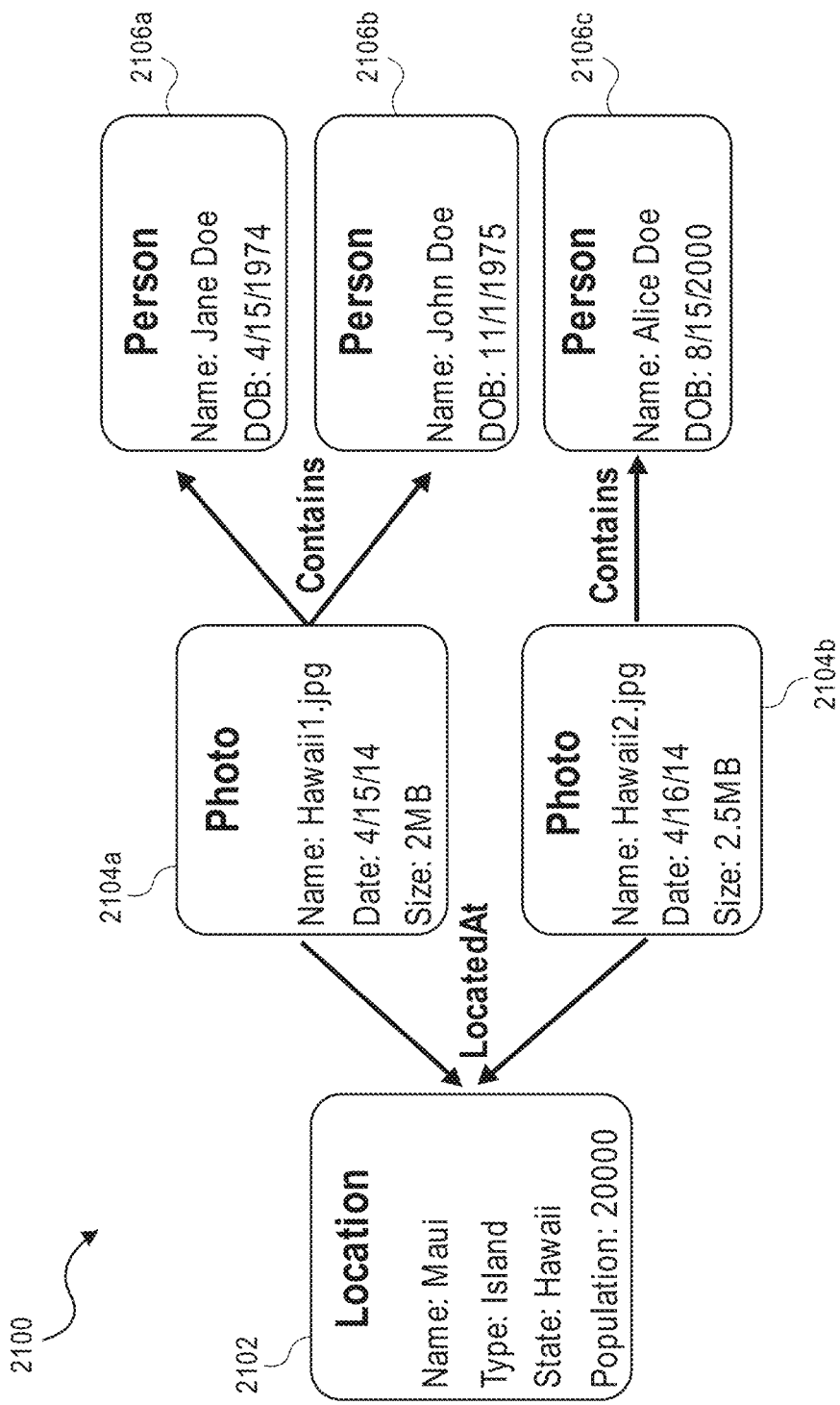

In some embodiments, storage architecture 1800 may store visual metadata as a property graph to identify relationships between visual data, such as images that contain the same object or person, images taken in the same location, and so forth. For example, FIGS. 20 and 21 illustrate examples of representing visual metadata using a property graph. In this manner, visual metadata can be easily searched to identify these relationships, thus enabling flexible search queries such as "find all images taken at location Y that contain person A."

Moreover, in some embodiments, metadata database 1804 of storage architecture 1800 may be implemented as a persistent memory graph database (PMGD) to enable visual metadata to be searched more efficiently. For example, using persistent memory (PM) technology, a graph database containing the visual metadata can be stored both in-memory and persistently. In this manner, a persistent memory graph database (PMGD) can be designed to leverage a memory hierarchy with data structures and transactional semantics that work with the PM caching architecture, reduce write requests (addressing PM's lower write bandwidth compared to DRAM), and reduce the number of flushes and memory commits. This approach enables a graph database of visual metadata to be searched efficiently to identify relevant visual data.

Further, feature vector storage optimizations may be used to achieve fast searching of visual metadata. For example, feature vectors can be generated by various vision algorithms to identify regions or features of interest in visual data (e.g., faces, people, objects), and they are typically represented as vectors of n-dimensional floating-point values. Finding the nearest neighbor for a given feature vector is a common operation that is computationally expensive, especially at the cloud scale due to billions of potential feature vectors (e.g., a feature vector for each interesting region of each image or video frame). Accordingly, in some embodiments, feature vectors may be represented and stored as visual metadata using an efficient format. For example, visual metadata may be stored using an analysis-friendly array format that indicates where the feature vectors reside, and an index may be built on interesting dimensions within the metadata storage to narrow the search space.

Storage architecture 1800 also includes a separate data storage 1810 for storing the visual data itself, such as images or videos. Segregating the metadata and visual data in this manner enables each type of data to be mapped to the most suitable hardware in a heterogeneous system, thus providing flexibility for the request server 1802 to identify the most efficient way to handle a visual data request.

Moreover, storage architecture 1800 is also capable of storing visual data on data storage 1810 using an analytic image format designed to aid in visual processing. In the illustrated embodiment, for example, visual compute library (VCL) 1806 of storage architecture 1800 is designed to handle processing on analytic image formats 1807 in addition to traditional formats 1808. For example, visual compute library 1806 can implement an analytic image format 1807 using an array-based data management system such as TileDB, as described further with respect to FIG. 22. The analytic image format 1807 provides fast access to image data and regions of interest within an image. Moreover, since the analytic image format 1807 stores image data as an array, the analytic image format 1807 enables visual compute library 1806 to perform computations directly on the array of image data. Visual compute library 1806 can also convert images between the analytic image format 1807 and traditional image formats 1808 (e.g., JPEG and PNG). Similarly, videos may be stored using a machine-friendly video format designed to facilitate machine-based analysis. For example, videos are typically encoded, compressed, and stored under the assumption that they will be consumed by humans. That assumption is often leveraged for video encoding by eliminating information that human eyes and brains cannot process. Videos intended for machine-based processing, however, may benefit from alternative storage methods designed to speed up the time required to retrieve full images or regions of interest within a video or video frame, and even enhance the accuracy of machine-learning video processing mechanisms.

Figure 22:
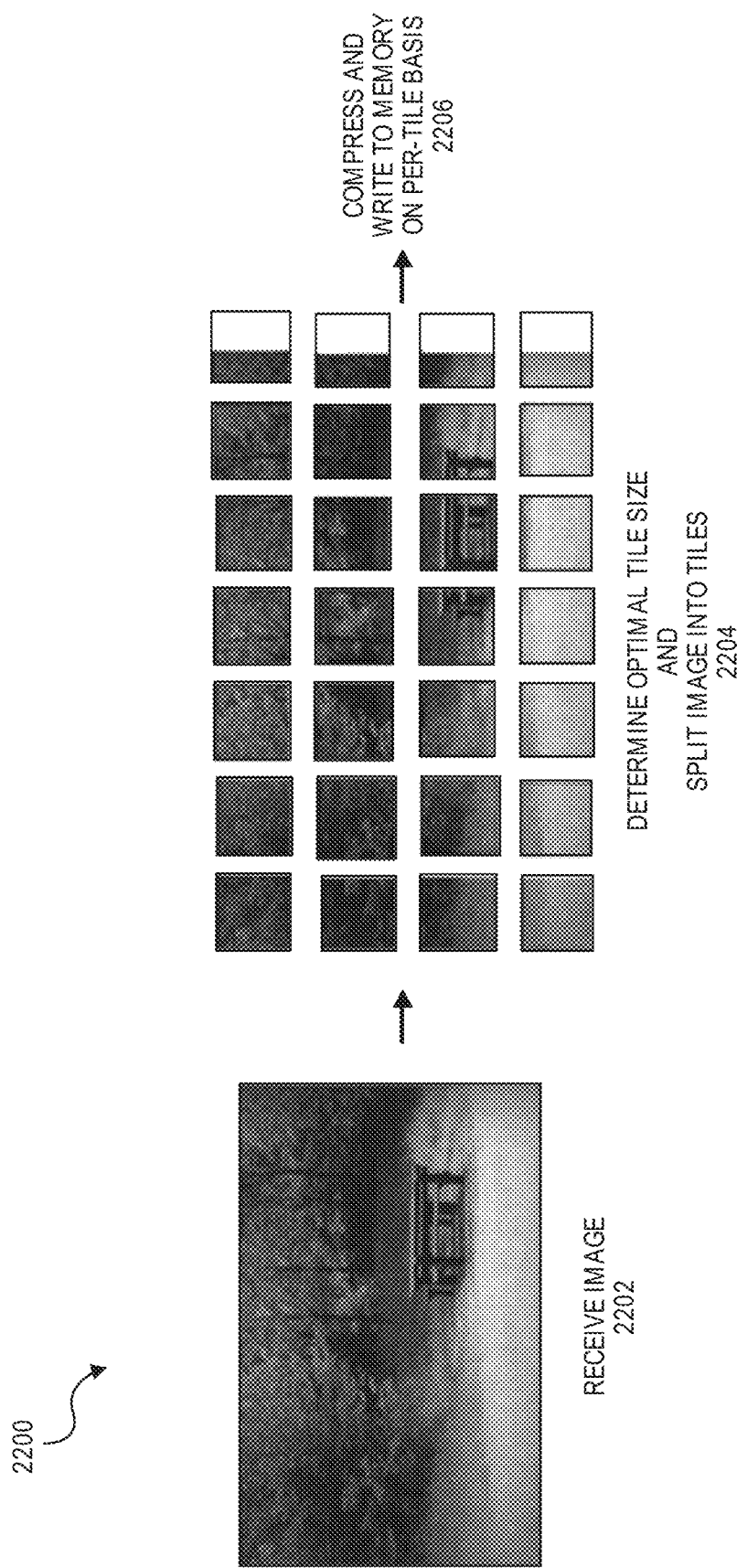
FIG. 22 illustrates an example embodiment of an analytic image format designed to aid in visual data processing.

FIG. 22 illustrates an example embodiment of an analytic image format 2200 designed to aid in visual data processing. In some embodiments, for example, storage architecture 1800 may use analytic image format 2200 to store images in a format that facilitates visual data processing and analysis.

Deep learning neural networks, such as CNNs, are frequently used for image processing, including object/edge detection, segmentation, and classification, among other examples. Images are typically read from disk during both training and inferencing, for example, using background threads to pre-fetch images from disk and overlap the disk fetch and decode times with the other compute threads. However, compute cycles may still be wasted reading the images from disk and decompressing/decoding the images to prepare them for processing, thus reducing the overall throughput (e.g., images/second) of an image processing system.

Moreover, traditional lossy image formats (e.g., JPEG) are designed to compress image data by discarding high-frequency information that is not perceptible by humans. While the discarded information may be meaningless to humans, however, it can improve the accuracy and performance of deep learning neural networks used for image processing.

For example, images can be compressed either in a lossless or lossy manner. Lossless image compression preserves all the information in the image, while lossy compression takes advantage of visual perception and statistical properties to achieve better compression rates, but results in some data being lost. The JPEG compression algorithm is a commonly used lossy algorithm that is often used for images on the web. The JPEG algorithm is based on discrete cosine transforms (DCT), and discards high-frequency details that are not perceptible to the human eye, which results in much smaller image file sizes. However, in cases where exact image reproduction is required, or when the image will be edited multiple times, lossless compression is preferred. For example, PNG is an image file format that supports lossless compression using a bitmap image. With PNG, images are transformed using a filter type on a per-line basis, and then compressed using the DEFLATE algorithm. There are numerous other image formats with similar technologies behind them that are suitable for different applications and use cases. While a traditional lossless image format (e.g., PNG) could be used to retain all image data for image processing purposes, that comes at the cost of a lower compression rate.

Further, images stored using traditional formats (e.g., JPEG and PNG) must be converted into an internal array format before any processing can begin. For example, before any operations can be performed on images stored using traditional formats, the entire image file must be read from disk and decoded into an internal array format. In analytics, however, operations such as resizing and cropping are often performed before any sort of learning or understanding happens, thus rendering traditional image formats inefficient for image processing and analytics.

Accordingly, traditional image formats (e.g., JPEG and PNG) are designed for human consumption, and performing operations on them is often time-consuming and inefficient. Moreover, lossy image formats (e.g., JPEG) discard information that may be useful in machine learning, and thus are not well-suited for image processing. Moreover, while existing database management systems could be used to store images, they are not designed for image data and thus do not store image data efficiently.

The analytic image format 2200 of FIG. 22 is designed to aid in image processing and alleviate the deficiencies of existing image formats. For example, image format 2200 is implemented using an array-based data storage format that is lossless and eliminates the expensive decoding process that is required for processing traditional image formats. In some embodiments, for example, analytic image format 2200 could be implemented using an array-based data storage manager such as TileDB. TileDB is a data management system designed for efficiently managing large volumes of scientific data represented using arrays. While TileDB is not specific to images, it is designed to provide fast access to array-based data. Accordingly, in some embodiments, image format 2200 can be implemented using TileDB to achieve the performance boost of TileDB for image processing purposes.

In some embodiments, for example, analytic image format 2200 can be implemented by defining how the pixel data of an image is stored and accessed in an array-based format (e.g., using an array-based data storage manager such as TileDB). In this manner, image format 2200 enables efficiency in processing large images, which reduces the overall time for image analytics. As visual understanding algorithms get faster and the hardware to perform the algorithms gets better, the time to retrieve and process the images is becoming more and more significant. However, by using analytic image format 2200, storage and retrieval of images does not become a bottleneck in the visual processing pipeline.

For example, analytic image format 2200 allows an image to be stored as a lossless compressed array of pixel values. Accordingly, when image data is needed for processing, the image data does not need to be decoded before being processed, as required for traditional image formats. This improves the speed at which data is retrieved and made usable, yet still provides some level of compression. While this approach requires images to be written to the analytic image format 2200 prior to training or inference, the additional write overhead is minimal.

Moreover, because TileDB outperforms many array database managers for both sparse and dense data access, it is an ideal choice for implementing analytic image format 2200. In other embodiments, however, analytic image format 2200 can be implemented using any other type of array-based data manager or data format. The use of a fast, enhanced array storage system such as TileDB enables image format 2200 to eliminate slow reads of images from disk, and remove the in-loop conversion of traditional image formats to arrays.

Image format 2200 is also beneficial in applications where subarray accesses are common, such as accessing regions of interest in an image. For example, an array data manager such as TileDB can be used to improve the speed of common operations that are needed for image analytics, such as resize and crop, by enabling fast subarray accesses.

FIG. 22 illustrates the process of converting an image into an analytic image format 2200 using an array-based data manager such as TileDB. In the illustrated example, the original image is first received 2202 and is then divided into a plurality of tiles 2204 using an optimal tile size, and the tiles are then compressed and written to memory on a per-tile basis 2206 using an array-based storage format.

In some embodiments, the optimal tile size for analytic operations can be dynamically determined for each image. For example, in order to determine the optimal tile size for a particular image, a random portion of the image may be selected and then processed using different tile sizes and compression algorithms in order to determine the ideal tile size and compression for that image. Moreover, since image processing operations are often postponed until the data is actually needed, there is a period of time available to carry out the experimentation without impacting performance.

An image that does not fit perfectly into tiles of the selected tile size will have partially empty tiles that are padded with empty characters, as depicted in FIG. 22. In this manner, the original size of the image may be stored as metadata (e.g., height, width, and number of channels), and when the image is subsequently read from storage, the metadata can be checked to determine the actual dimensions of the image to avoid reading the empty characters or padding.

For high-resolution images, image format 2200 improves the speed of common operations such as reading and writing, as well as the speed of operations used in image analytics, such as cropping and resizing. For example, storing images using image format 2200 improves read performance, as the images are compressed but not encoded, and thus do not need to be decoded when they are read from the file system. In addition, image format 2200 enables fast access to subarrays of image pixels, making cropping a simple matter of reading a particular subarray rather than reading the entire image and then cropping it to the appropriate size.

Figure 23:
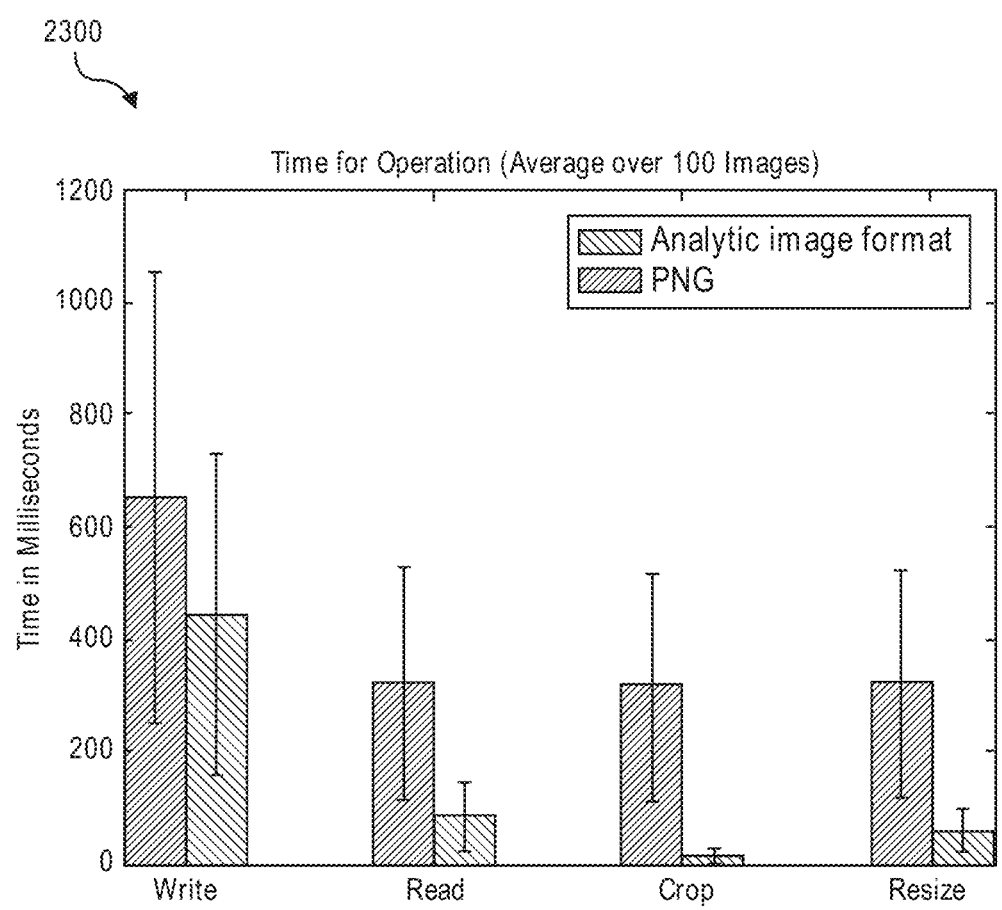
FIG. 23 illustrates a performance graph for various image formats.

For example, FIG. 23 illustrates a graph 2300 comparing the performance of analytic image format 2200 from FIG. 22 with the PNG image format, which is a traditional lossless image format. As shown by FIG. 23, the analytic image format provides better performance than PNG for writes, reads, crops, and resizes. The largest improvement is seen in cropping, as the analytic image format allows only the pertinent information to be read from the file, rather than reading the entire image file and then cropping to the desired size. Accordingly, the performance improvement for common data access and analytic operations demonstrates that analytic image format 2200 is highly beneficial for image processing purposes.

Figure 50:
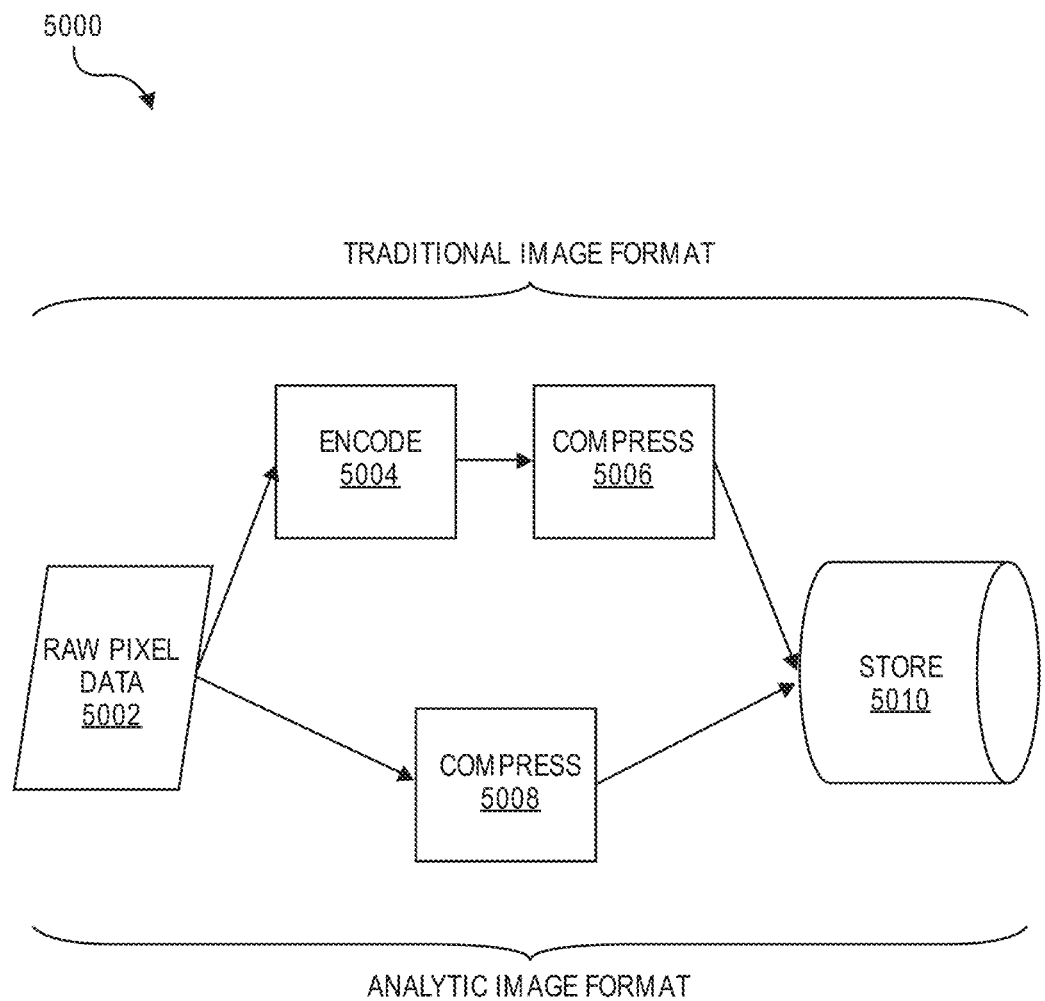
FIGS. 50, 51, and 52 illustrate example embodiments for processing traditional and analytic image formats.

FIG. 50 illustrates an example write processing flow 5000 for traditional and analytic image formats. In the illustrated processing flow 5000, for example, raw pixel data 5002 can be written to disk 5010 using either a traditional image format or an analytic image format. The top path of processing flow 5000 illustrates the flow for writing traditional image formats (e.g., PNG), while the bottom path illustrates the flow for writing analytic image formats.

With respect to traditional image formats, for example, raw pixel data 5002 is encoded 5004, compressed 5006, and then stored 5010. With respect to analytic image formats, however, raw pixel data 5002 is compressed 5008 and then stored 5010, but the encoding step is omitted. While the resulting analytic image format may result in a larger file size on disk, the latency of data access operations (e.g., writes) and other image operations may be reduced.

Moreover, the read processing flow for traditional and analytic image formats may be implemented as the reverse of the write processing flow 5000. For example, with respect to traditional image formats, the encoded/compressed data is read from disk, decompressed, and then decoded into the original image. With respect to analytic image formats, the compressed data is read from disk and then decompressed into the original image, but the decoding step is omitted since the encoding step was omitted during the write processing flow 5000.

TABLE 1 illustrates an example analytic image format schema. In some embodiments, for example, the analytic image format schema of TABLE 1 could be implemented using an array-based database manager (e.g., TileDB) to store images as dense arrays.

TABLE 1

Example analytic image format

| PARAMETER | TYPE | EXAMPLE VALUE |
|---|---|---|
| cell order | fixed | row major |
| tile order | fixed | row major |
| number of dimensions | fixed | 2 |
| dimension names | fixed | "height", "width" |
| number of attributes | fixed | 1 |
| compression | fixed | LZ4 |
| array height | variable | 3534 |
| array width | variable | 5299 |
| domain | variable | [0, 3533, 0, 5298] |
| tile height | variable | 589 |
| tile width | variable | 757 |

The schema of TABLE 1 specifies parameters about the array that can be used to arrange the image data. Moreover, some parameters of the analytic image format are fixed, while others are determined on a per-image basis. For example, images have only two dimensions, a height and a width, thus fixing the number of dimensions as well as the names of the dimensions. The number of attributes is set to one, which means each cell holds the blue, green, and red (BGR) values for the corresponding pixel. All three values are generally read together, as a pixel is defined by all three values. In other embodiments, however, the color values may be stored separately. The intra-tile and array-level tile ordering is fixed to be row major. Row major order means that data is written and read from left to right in rows within a tile, and tiles are written and read in the same manner. This information allows the array database to efficiently perform subarray reads.

The dimensions and domain of the array depend on the resolution of the original image and therefore are calculated dynamically on a per-image basis. Since images often do not have an evenly divisible number of pixels in one or both dimensions, this occasionally results in the dimensions of an array not matching the original resolution of the image. This is reflected in TABLE 1, where the array height is one pixel larger than the image height. To make up the difference between an image dimension and an array domain, the image is padded with empty characters. An example of this can be seen in FIG. 22, where the white space within certain tiles corresponds to empty characters. In the actual array, the size of the array domain is increased by a single pixel when needed. The original size of the image (height, width, and number of channels) is stored as metadata by default. When an image in the analytic format is read, the metadata is read first in order to determine the dimensions of the image, thus avoiding reading the empty characters.

Tile extents depend on the array dimensions and are calculated once the array dimensions are known. All tiles have the same height and width. The optimal number of tiles may vary based on image content and resolution, and thus in some embodiments, the optimal number of tiles may be determined on a per-image basis. For example, in order to determine the best tile size, a portion of the image may be randomly selected and tested using different tile sizes and compression algorithms to determine the best combination for that image. Since all operations are postponed until the data is actually needed, there is a period of time to carry out the experimentation that does not affect the performance. In other embodiments, however, a predefined minimum number of tiles per dimension (e.g., 4 tiles per dimension) may be used as a basis to determine tile height and width.

The compression algorithm used to compress the analytic image data has a fixed default (e.g., the LZ4 compression algorithm), but other compression algorithms can be set manually.

Figure 51:
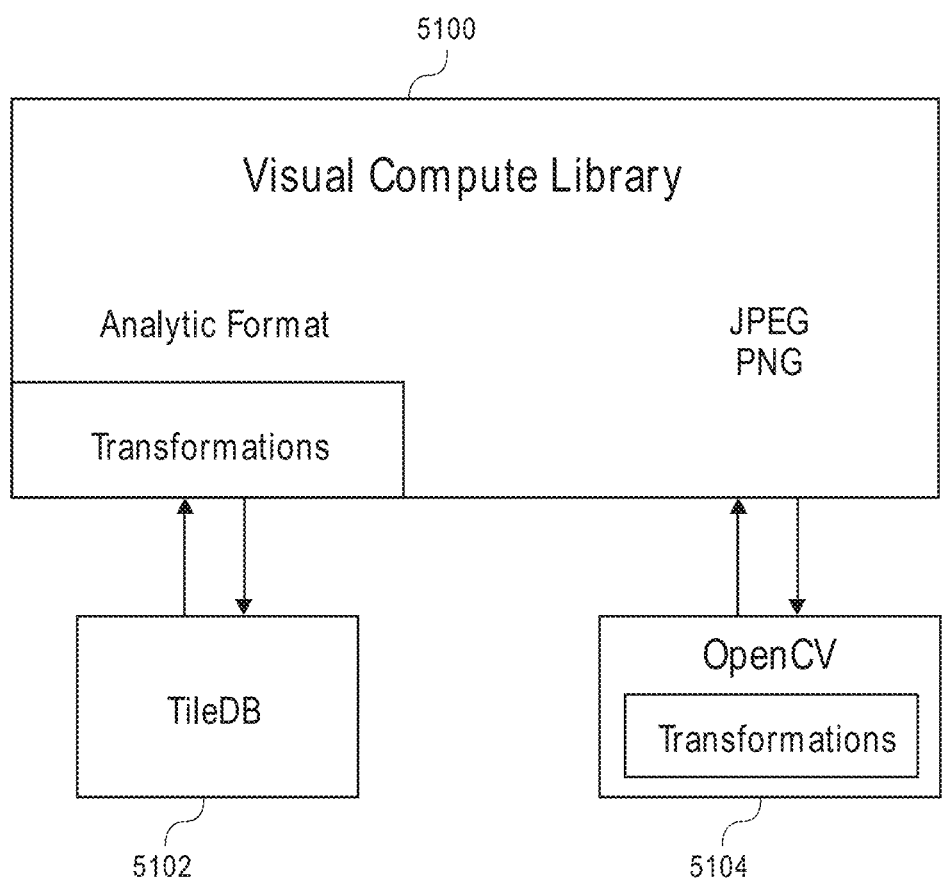

FIG. 51 illustrates an example embodiment of a visual compute library (VCL) 5100 for traditional and analytic image formats. For example, VCL 5100 provides an interface through which a user can interact with the analytic image format as well as traditional image formats.

When a user creates an analytic image using VCL 5100, the analytic image schema is automatically set using the parameters described above in TABLE 1. VCL 5100 then creates a layer of abstraction with function calls of TileDB 5102 (e.g., the array-database manager used in the illustrated embodiment) combined with specialized transformation operations to provide an interface to the analytic image. VCL 5100 also extends the abstraction layer to OpenCV 5104, providing support for PNG and JPEG image formats. VCL 5100 uses OpenCV 5104 to perform both I/O and transformation operations on images that are stored in either PNG or JPEG format. For images stored in the analytic format, VCL 5100 handles the transformation operations and uses TileDB 5102 for I/O operations.

To initially store an image in the analytic format, the raw pixel data of an image is passed to VCL 5100 in some manner (e.g., as a path to a PNG or JPEG file stored on disk, an OpenCV matrix, a buffer of encoded pixel data, a buffer of raw pixel data, and so forth). This data is converted to a raw pixel buffer in order to write to the analytic format. Since the TileDB array schema for images has already been set at this point (e.g., using the parameters of TABLE 1), the TileDB functions can be used to write the data to disk.

Figure 52:
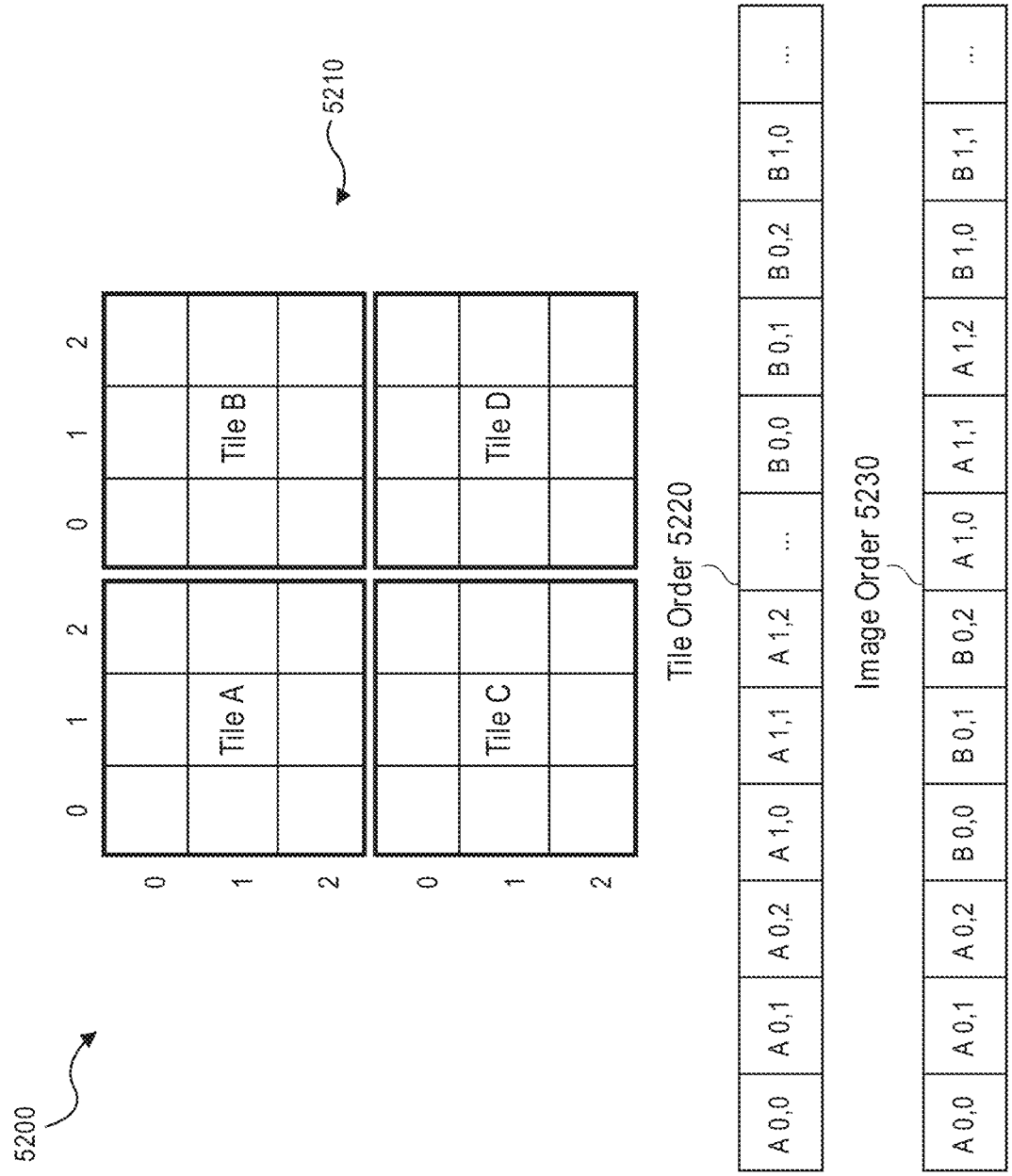

Reading an image in the analytic format requires the metadata to be read first to determine the original image resolution. This ensures that only image data is read and that empty characters are ignored. The raw analytic-format or TileDB data is read into a buffer, keeping the data in the order in which it was written, which is referred to as "tile order" (e.g., as illustrated in FIG. 52). This is because if the data never needs to be returned to the user (e.g., if the user just wants to manipulate it and write it out again), it is faster to use the tile order buffer. In cases where the data is to be returned to the user, however, the buffer is re-ordered into image order, which results in a buffer that has each row of the image sequentially (e.g., as illustrated in FIG. 52). Image order, for example, is typically expected by other programs such as OpenCV 5104.

Crop, another frequently used operation in image processing, is used to retrieve a region of interest within an image for processing. Rather than reading the entire image and then selecting a sub-region (as is required for traditional image formats), the analytic or TileDB crop function uses the crop parameters to specify a subarray of the analytic image data. The subarray is then the only portion of the image that is read.

Resize, another frequently used operation in image processing, is used to resize the dimensions of an image (e.g., to either a smaller or larger size). The TileDB resize occurs after the image has been read, but while the data is still in tile order. VCL 5100 implements a version of resize for TileDB that uses a bilinear interpolation, following the OpenCV default. For example, in a linear interpolation, a new value is calculated based on two points; bilinear interpolation does this in two different directions and then takes a linear interpolation of the results. These points are identified by (row, column) in the original image. Given the data is in tile order, it is necessary to identify which tile each point is part of in order to locate the value of that point in the buffer. The resulting resized image buffer is in image order, although other approaches may be used to keep it in tile order.

Compression/Compressive Learning

The performance of large-scale visual processing systems can be improved using efficient compression algorithms and techniques for storing and processing visual data. The compression approaches of existing visual processing solutions, however, suffer from various deficiencies. For example, existing solutions require visual data to be fully decompressed before any processing can be performed (e.g., using deep learning neural networks). Moreover, existing solutions typically compress and store images individually, thus failing to leverage the potential compressive benefits of collections of similar or related images with redundant visual data.

Accordingly, this disclosure presents various embodiments for compressing and processing visual data more efficiently. In some embodiments, for example, neural networks can be designed to operate on compressed visual data directly, thus eliminating the need to decompress visual data before it can be processed. Moreover, context-aware compression techniques can be used to compress visual data and/or visual metadata more efficiently. For example, context-aware compression can be used to compress distinct instances of redundant visual data more efficiently, such as a group of images taken close in time, at the same location, and/or of the same object. Similarly, context-aware compression can be used to compress visual metadata more efficiently (e.g., using a context-aware lossless compression codec). In some embodiments, for example, visual metadata could be compressed by pre-training a convolutional neural network (CNN) to classify visual metadata, replacing long strings of visual metadata with shorter symbols (e.g., predefined human codes), performing multi-scale de-duplication on the visual metadata, and finally compressing the resulting visual metadata using a compression algorithm (e.g., the LZ77 lossless compression algorithm or another similar alternative).

FIGS. 24A-C and FIG. 89 illustrate example embodiments of a multi-domain cascade convolutional neural network (CNN). In distributed visual analytics systems, for example, image and video is often compressed before transmission (e.g., from the pixel domain to a compressed domain), and subsequently decompressed after transmission (e.g., back to the pixel domain) before any processing can be performed, such as deep learning using neural networks. As an example, image and video captured by edge devices may be compressed and transmitted to the cloud, and then decompressed by the cloud before any further processing begins.

This approach suffers from various disadvantages. First, extra computation is required to fully decompress the visual data before it can be processed, thus significantly increasing the total processing time (e.g., by up to 100% in some cases). For example, before processing can be performed, the visual data must be fully decompressed back to the pixel domain using hardware or software decoding. Accordingly, given that not all processors include built-in video decompression accelerators, decompression may incur an additional cost for video analytics.

Next, extra bandwidth is required to transmit the decompressed data between separate processing components (e.g., between a decompression engine and an analysis engine), thus significantly increasing bandwidth usage (e.g., by up to 20 times in some cases).

Moreover, the requirement to fully decompress visual data prior to processing precludes the ability to leverage a fully distributed neural network in the edge-to-cloud sense. For example, the use of distributed analytics to process visual data exclusively in the pixel domain requires the visual data to be analyzed at multiple scales.

Further, relying on the cloud to perform processing on visual data captured by edge devices often results in wasted transmission bandwidth, as many images or videos transmitted from the edge to the cloud may not contain any objects or features of interest. In many cases, for example, it could be possible to perform object detection and classification closer to the network edge (e.g., near the sensors that capture the visual data) using lower complexity analytics algorithms, potentially saving the transmission cost of insignificant or unimportant data.

Figure 24C:
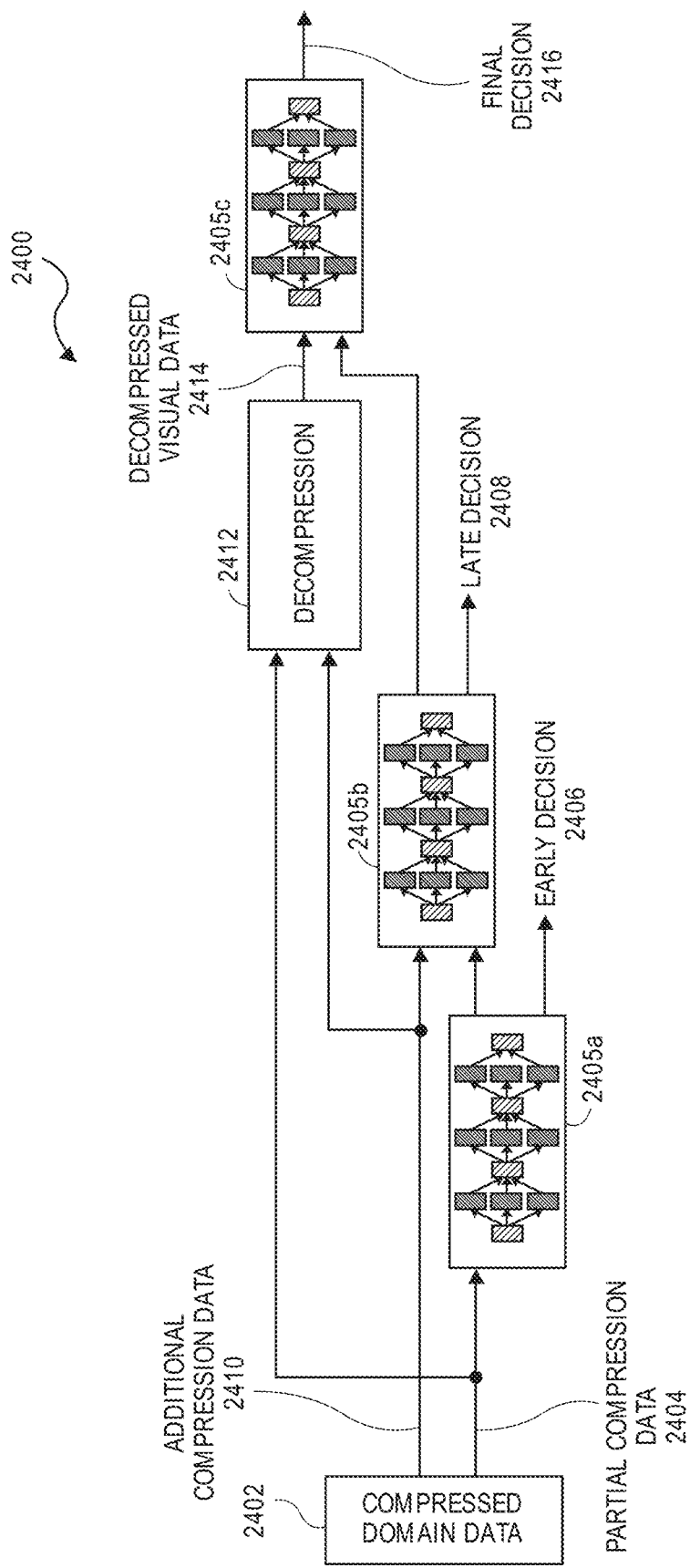

Accordingly, FIGS. 24A-C illustrate an example embodiment of a multi-domain cascade CNN 2400 that can be used to process visual data in the compressed and pixel domains, thus eliminating the requirement to decompress visual data before it can be processed. In this manner, multi-domain cascade CNN 2400 can be used to perform distributed visual analytics in a visual fog system using compressed domain data as input.

In some embodiments, for example, multi-domain cascade CNN 2400 may be a cascaded CNN that includes multiple decision stages. For example, in a first or early decision stage, a subset of the compressed domain visual data or features may be used (e.g., motion vectors) to attempt to generate an early decision. If the visual data cannot be detected or classified in the early stage, additional compressed domain data (e.g., motion prediction residuals) may be provided as input to a subsequent or late decision stage. Finally, for improved accuracy and/or in the event the late decision stage is unsuccessful, the visual data may be fully decompressed and a final decision stage may be performed using the decompressed visual data.

In the illustrated embodiment, for example, CNN 2400 includes an early decision stage (illustrated in FIG. 24A), a late decision stage (illustrated in FIG. 24B), and a final decision stage (illustrated in FIG. 24C). Moreover, CNN 2400 is designed to process compressed visual data 2402 as input (e.g., video sequence data compressed with a motion-compensated predictive coding scheme such as H.264).

In some embodiments, for example, compressed visual data 2402 provided as input to CNN 2400 may first be partially decoded to separate and extract different syntax elements (e.g., motion vectors, macroblock (MB) coding modes, quantized prediction residuals), thus producing a subset of partial compression data 2404.

As shown in FIG. 24A, in the early decision stage, the partial compression data 2404 (e.g., motion vectors) is provided as input to a first stage CNN 2405a to attempt to identify an early decision 2406. In some embodiments, the CNN processing may then terminate if an early decision can be made. For example, in some embodiments, the early decision stage may be performed by a fog or edge node near the sensor that captured the visual data. Accordingly, if an early decision can be made, it may be unnecessary to transmit additional visual data to another node (e.g., in the cloud) for a subsequent processing stage, thus saving bandwidth and/or resources (e.g., energy) that would otherwise be required for the later stage. For example, assuming the goal is to detect moving pedestrians using traffic cameras, if there is no motion detected, there likely are no moving objects. Accordingly, an early decision can be made, and any further transmission or processing of the visual data can be aborted. In other embodiments, however, the subsequent CNN processing stages of CNN 2400 may still be performed even if an early decision can be made. Moreover, the complexity of the first stage CNN 2405a may vary based on different use cases, resource availability, and so forth.

If the early decision stage is unable to detect or classify the partial compression data 2404 using the first stage CNN 2405a, CNN 2400 may proceed to a late decision stage, as shown in FIG. 24B. In the late decision stage of FIG. 24B, for example, additional compression data 2410 (e.g., motion prediction residuals) is evaluated using a second stage CNN 2405b to attempt to determine a late decision 2408.

Finally, for improved accuracy and/or in the event the late decision stage is unsuccessful (e.g., the late decision stage is unable to detect or classify the additional compression data 2410 using the second stage CNN 2405b), CNN 2400 may proceed to a final decision stage, as shown in FIG. 24C. In the final decision stage of FIG. 24C, for example, the compressed visual data 2402 may be fully decompressed using a decompression engine 2412, and the decompressed visual data 2414 (e.g., pixel domain data) may then be evaluated using a final stage CNN 2405c to determine a final decision 2416.

Accordingly, the collective stages of multi-domain cascade CNN 2400 are depicted in FIG. 24C, where an early stage is used to generate an early decision based on an initial subset of compressed domain data, and later stages are used to generate re-fined or final decisions based on additional compressed domain data and eventually pixel domain data.

The described embodiments of multi-domain cascade CNN 2400 provide numerous advantages. First, visual data (e.g., images or video) does not need to be fully decompressed before its contents can be analyzed using deep learning neural networks, thus reducing memory usage and computation typically required for decoding or decompressing the visual data. Next, the cascading approach of CNN 2400 avoids the need to transmit certain compressed data to the cloud, such as when an early decision can be reached by an edge or fog node, thus improving bandwidth usage. Finally, a large portion of the overall analysis often occurs in the early decision stage, which typically involves a simplified CNN or machine learning model, thus reducing the overall computational complexity.

Figure 89:
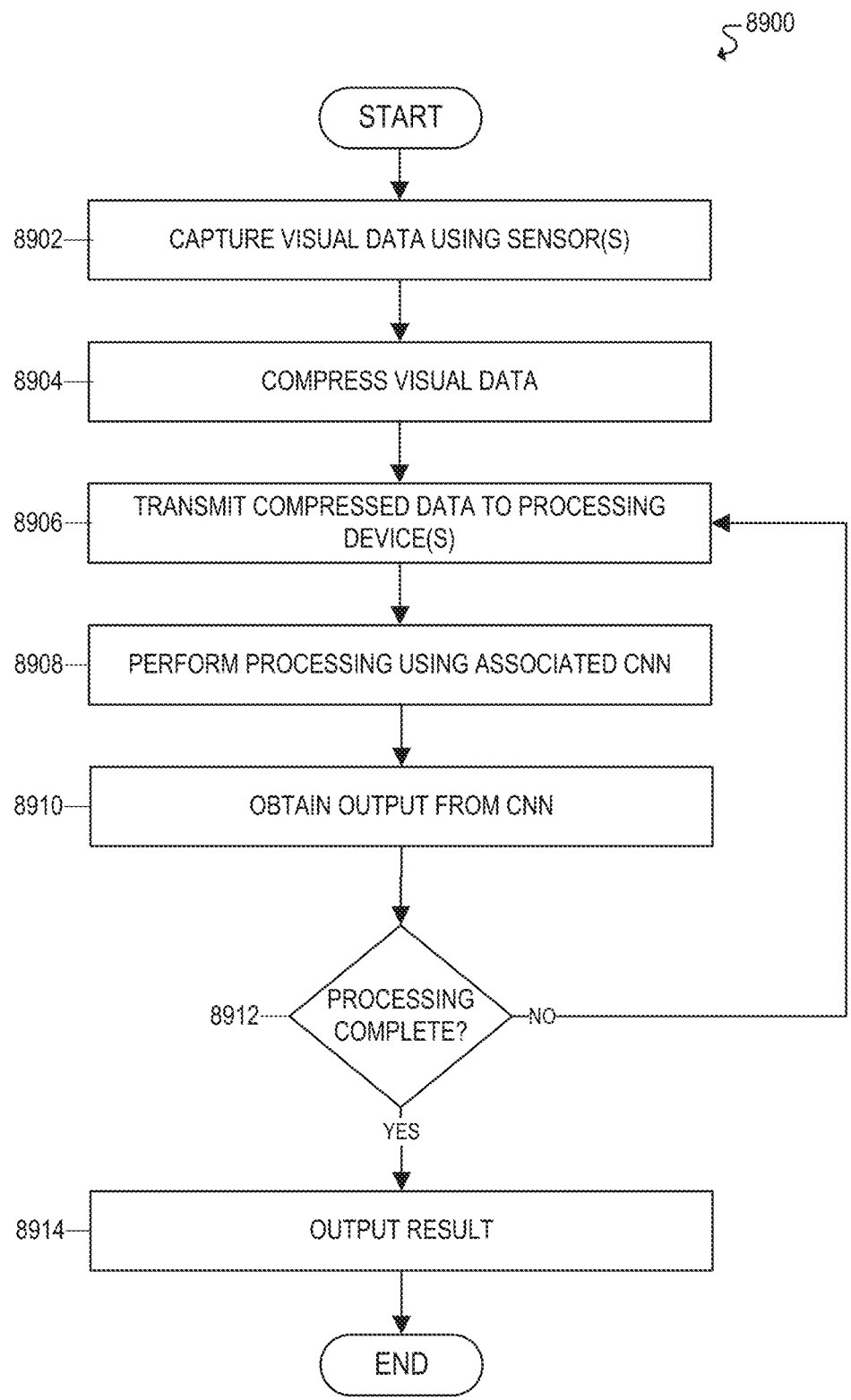
FIG. 89 illustrates a flowchart for an example embodiment of a multi-domain cascade CNN.

FIG. 89 illustrates a flowchart 8900 for an example embodiment of a multi-domain cascade convolutional neural network (CNN). In various embodiments, for example, flowchart 8900 may be implemented using the visual computing architecture and functionality described throughout this disclosure.

In the illustrated example, the cascaded CNN is designed to process visual data captured by edge devices (e.g., sensors and/or cameras) in multiple stages using a different CNN at each stage. For example, the early stages may use CNNs primarily designed to process compressed-domain data, while the later stages may use CNNs primarily designed to process pixel-domain data.

Moreover, in some embodiments, the respective stages may be performed by different processing devices deployed between the network edge (e.g., near the source of the visual data) and the cloud. For example, when visual data is captured, compressed, and transmitted from the edge to the cloud, the respective nodes and/or processing devices along the path of traversal may perform certain processing stage (s). In some embodiments, for example, processing devices near the network edge may perform early processing stages using CNNs that primarily operate on compressed-domain data, while processing devices in and/or near the cloud may perform later processing stages using CNNs that primarily operate on pixel-domain data. Moreover, processing devices in the fog (e.g., between the edge and the cloud) may perform processing stages in the middle using CNNs that operate on compressed-domain data, pixel-domain data, and/or a combination of both.

In this manner, visual data can be processed in a distributed manner as it traverses the respective devices and nodes along the path from the edge to the cloud, without having to decompress the visual data at each hop.

For example, given that edge devices (e.g., devices at or near the source of the visual data) are typically resource-constrained devices, they may be designed to perform limited initial processing (e.g., using lower-complexity algorithms) directly on the compressed visual data.

In some embodiments, for example, these "early-stage" devices may use CNNs that are trained to process certain types of compressed-domain features, such as motion vectors, prediction residuals, transform coefficients, quantization parameters, macroblock (MB) modes, and so forth. Motion vectors, for example, are used to represent motion that occurs between compressed video frames that contain similar content, while prediction residuals are used to represent the difference or residual between similar video frames (e.g., after applying a motion vector). Transform coefficients are the coefficients of the particular type of transform used to compress the data, such as a discrete cosine transform (DCT), integer transform, continuous wavelet transform (CWT), fast fourier transform (FFT), and so forth. Quantization parameters serve to reduce the precision of certain portions or blocks of visual data based on importance (e.g., low-frequency blocks such as backgrounds may be represented with less precision without impacting human perception). Macroblock (MB) modes refer to the types of transforms (e.g., DCT, integer, CWT, FFT) and parameters that are used to compress different blocks of visual data.

Accordingly, the CNNs used by the "early-stage" devices may be trained to analyze certain types of compressed-domain features, such as any of those discussed above. In this manner, these "early-stage" devices can perform some level of initial processing without having to decompress the visual data (e.g., using certain features of the compressed data). Moreover, in some embodiments, certain types of metadata that may be included in the compressed bitstream may also be used in the "early-stage" analysis. Further, in some embodiments, if an edge device that originally captured the visual data has sufficient processing capabilities (e.g., a smart-camera), that device may perform some initial processing on the raw visual data before it is compressed for transmission. Moreover, when the visual data is subsequently compressed and transmitted to other devices for subsequent CNN processing stages, metadata generated from the initial processing may be included as part of the compressed visual data.

Moreover, if these "early-stage" devices are able to sufficiently interpret the visual data based on the initial processing, subsequent transmission and/or processing of the visual data may be avoided. For example, with respect to a surveillance application, if an early-stage device is able to conclude that there is no movement within the captured visual data, the device may conclude that no further processing is necessary. However, if the early-stage device either detects movement or is unable to reliably determine whether there is any movement, the early-stage device may send some or all of the compressed data to the next processing device or node in the network, which may perform a subsequent stage of processing using a different CNN.

In this manner, after a particular device completes an associated processing stage, the device may forward certain data along for further processing, or the device may terminate the processing altogether, depending on whether the device was able to definitively reach a decision and/or interpret the visual data. For example, if the device is unable to definitively reach a decision, the device may forward some certain visual data to the next device or node, such as some or all of the compressed data, certain decompressed data, and/or any relevant metadata that was generated during the current or preceding processing stages. In some cases, for example, even when a device is unable to definitively interpret the visual data, the device may be able to draw certain conclusions and/or derive certain information associated with the visual data, which it may represent as visual metadata. Accordingly, if helpful, this visual metadata may also be forwarded to the processing devices used to perform subsequent stages.

In this manner, the CNNs associated with subsequent stages may be designed to process additional features associated with the visual data (e.g., additional types of compressed-domain data, visual metadata generated during preceding stages, and eventually raw uncompressed visual data) using algorithms that are progressively more complex as the visual data flows through more sophisticated processing nodes in or near the cloud. Eventually, if the processing performed in preceding stages is inconclusive or incomplete when the visual data reaches a device in or near the cloud (e.g., a cloud-based server), the device may fully decompress the visual data in order to process the raw visual data using a more sophisticated, computationally-intensive CNN.

In the example illustrated by FIG. 89, flowchart 8900 implements an example embodiment of a cascaded CNN. The flowchart begins at block 8902 by capturing visual data using one or more sensors, such as cameras and/or other types of vision sensors, which may be deployed at or near the "edge" of a network.

The flowchart then proceeds to block 8904, where the visual data is compressed by a first device. For example, the first device may be one of a plurality of devices in a distributed computing network, such as a sensor that captured the visual data and/or another edge device near that sensor. Moreover, the first device may compress the visual data using any suitable compression technique(s) (e.g., H.264).

The flowchart then proceeds to block 8906, where the compressed data is transmitted from the first device to, and subsequently received by, another device in the network (e.g., a nearby edge device such as an edge gateway).

The flowchart then proceeds to block 8908, where the received data is processed using an associated CNN. For example, each device that receives some form of the compressed visual data may perform a particular stage of processing on the compressed data. Moreover, each stage of processing may be performed using a different convolutional neural network (CNN) trained to analyze different types of visual data (e.g., compressed visual data, raw visual data, and/or some combination of both).

For example, certain devices at or near the network edge, and/or in the fog, may use CNNs that are designed to operate on compressed data directly, such as by analyzing certain types of compressed data features (e.g., motion vectors, prediction residuals, transform coefficients, quantization parameters, and/or macroblock coding modes). In some embodiments, for example, the CNNs used by different edge devices may be respectively designed to operate on different types of compressed data features. Moreover, in some embodiments, the different types of compressed data features may be respectively generated and/or provided by different sources (e.g., sensors or other devices).

As another example, certain devices in the fog (e.g., somewhere between the edge and cloud) may use CNNs that are designed to operate on compressed data, uncompressed data, and/or some combination of both, depending on their processing capabilities. Finally, certain devices in or near the cloud may use CNNs that are designed to operate on partially decompressed data and/or fully decompressed visual data.

Accordingly, when a particular device receives the compressed visual data, the device may perform a current stage of processing using the current CNN associated with that device.

The flowchart then proceeds to block 8910, where an output is obtained from the CNN for the current processing stage. In some cases, for example, the output from the CNN may indicate certain information associated with the visual data, such as the likelihood of the visual data containing certain features, objects, actions, movements, characteristics, scenarios, conditions, and so forth.

The flowchart then proceeds to block 8912 to determine if the processing associated with the visual data is complete (e.g., based on the output from the CNN(s) used in the current and/or preceding processing stages).

For example, if the CNN in the current processing stage was unable to sufficiently interpret the visual data for purposes of deriving requisite information and/or reaching certain processing decision(s), the processing associated with the visual data may be incomplete. Accordingly, the flowchart proceeds back to block 8906, where the compressed data is transmitted to other processing device(s) in the network to perform additional stages of processing using different CNNs.

The flowchart repeats in this manner as the compressed visual data is transmitted across the respective processing devices from the edge to the cloud, until it is eventually determined at block 8912 that the processing is complete.

For example, if the CNN in the current processing stage was able to sufficiently interpret the visual data for purposes of deriving requisite information and/or reaching certain processing decision(s), the processing associated with the visual data may be complete, and the flowchart may proceed to block 8914 to output a result associated with the visual data. For example, the result may indicate the particular information and/or decisions that were derived based on the processing associated with the visual data.

At this point, the flowchart may be complete. In some embodiments, however, the flowchart may restart and/or certain blocks may be repeated. For example, in some embodiments, the flowchart may restart at block 8902 to continue capturing and processing visual data.

FIGS. 25-31 illustrate the use of butterfly operations to implement a multi-domain convolutional neural network (CNN) that is capable of processing both raw and compressed visual data.

As discussed above, many visual analytics systems require visual data to be fully decompressed before any visual processing can be performed (e.g., using deep learning neural networks), which is an approach that suffers from various inefficiencies, including higher processing latency, additional transmission bandwidth, and so forth. Accordingly, this disclosure presents various embodiments of a deep learning neural network that is capable of analyzing compressed visual data directly. In particular, the described embodiments present a multi-domain CNN that uses butterfly operations to enable visual data processing in either the pixel domain or the compressed domain.

Figure 25A:
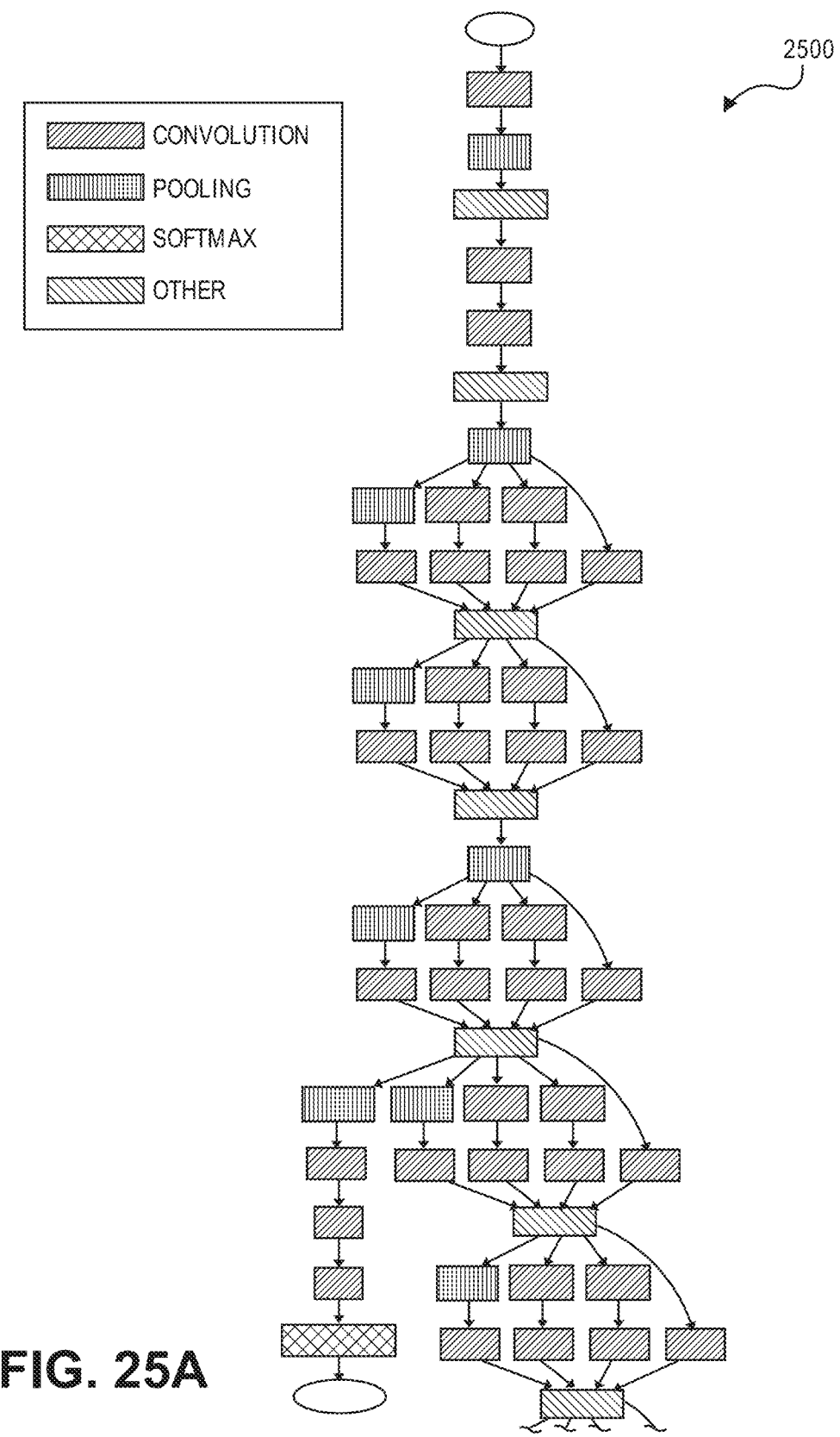
FIGS. 25A-B, 26, 27, 28, 29, 30 and 31A-B illustrate the use of butterfly operations for a multi-domain convolutional neural network (CNN).
Figure 25B:
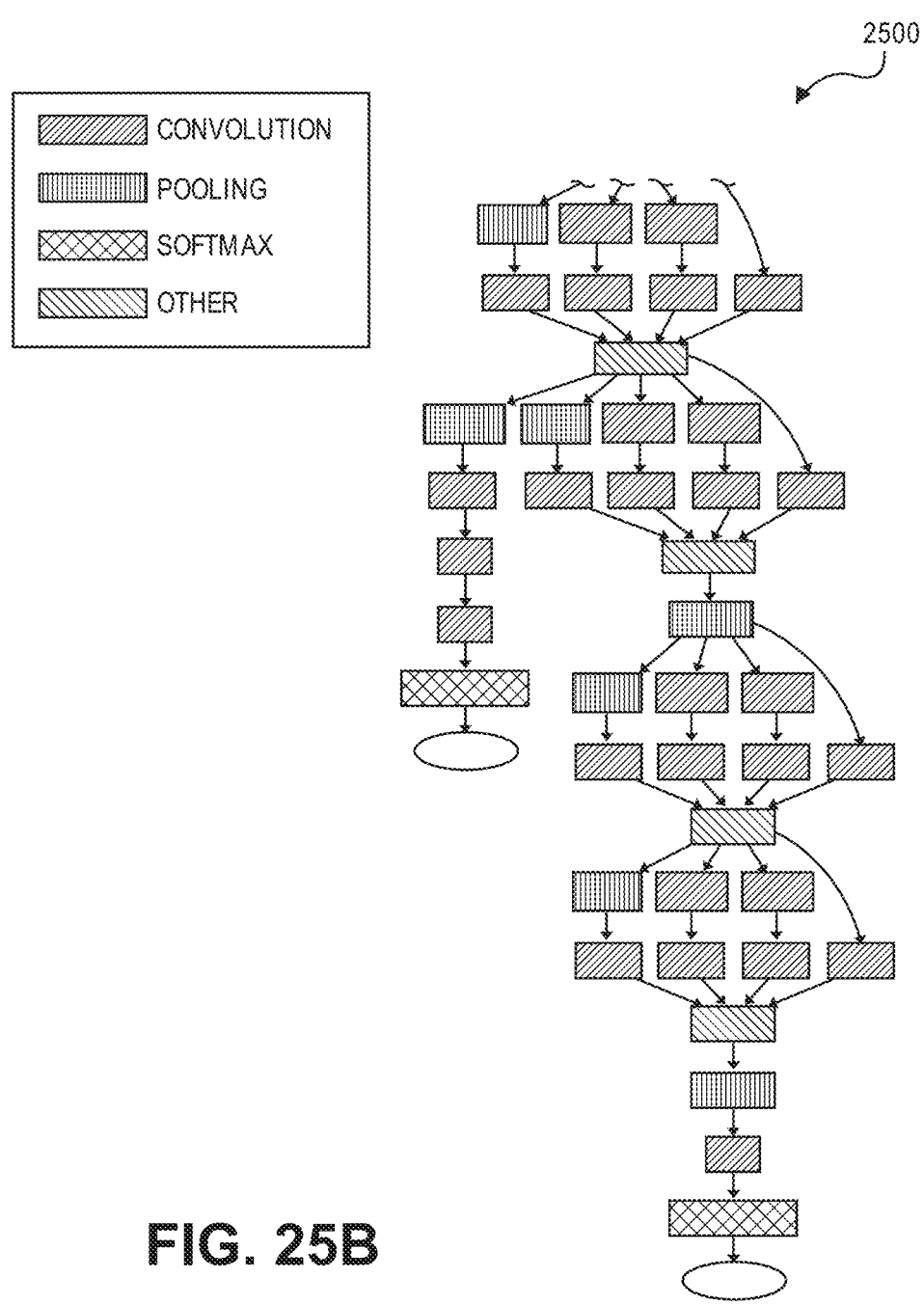
Figure 26:
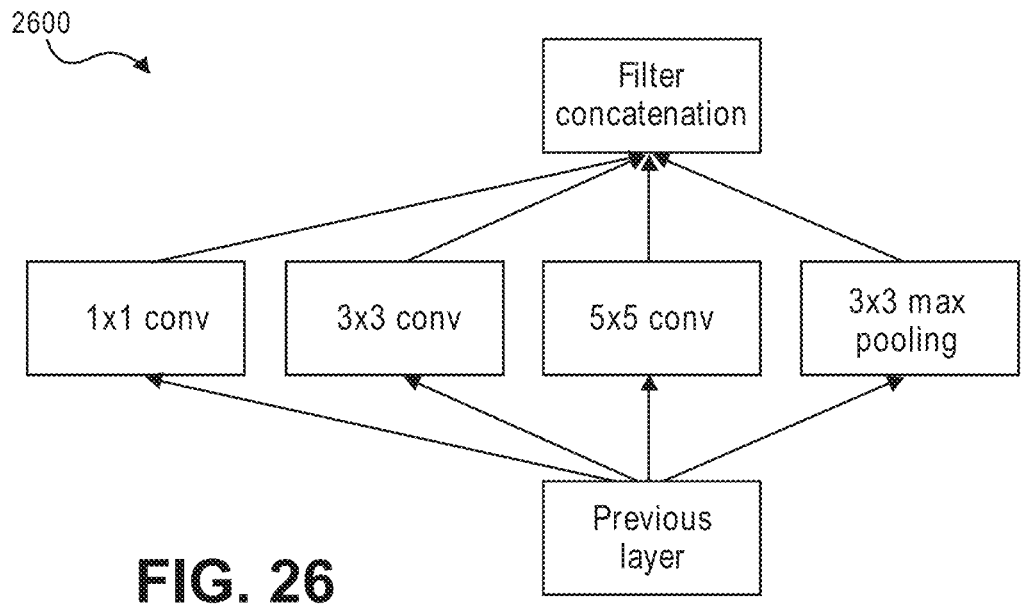
Figure 27:
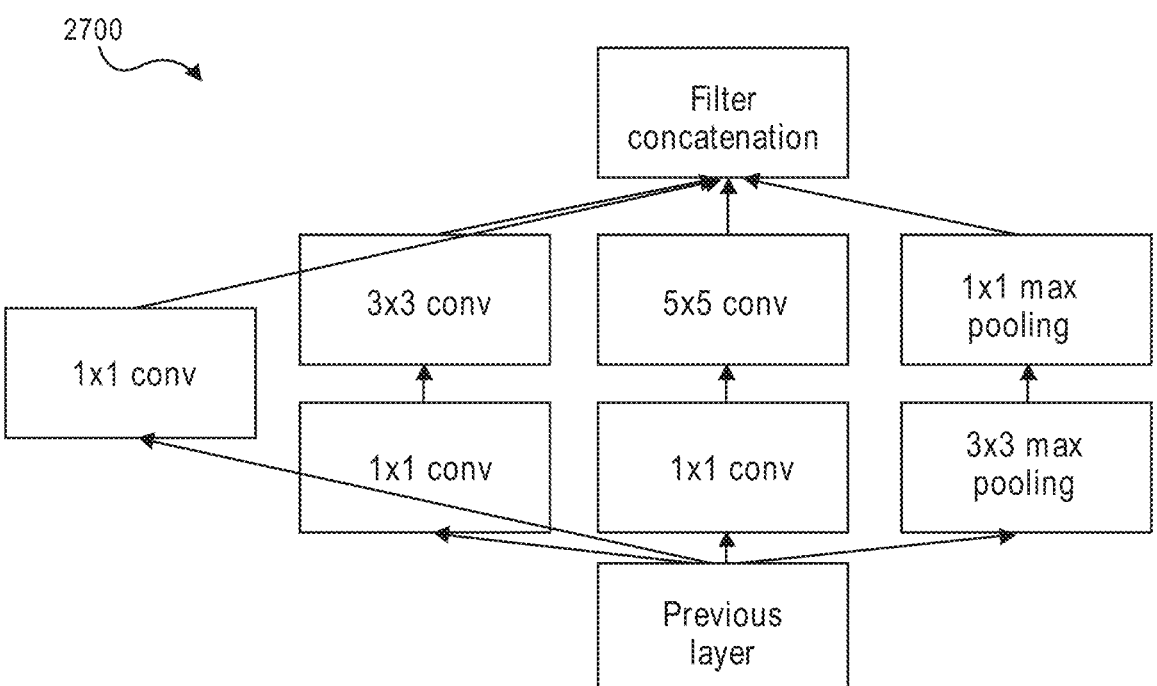

To illustrate, existing deep learning CNNs (e.g., inception or ResNet CNN models) typically repeat an inner module multiple times, and the inner module aggregates the results from multiple convolution layers and/or the original input at the end (analogous to a bottleneck). For example, FIGS. 25A-B illustrate a traditional 27-layer inception model CNN 2500, and FIGS. 26 and 27 illustrate example inner modules 2600 and 2700 for an inception model CNN. In particular, FIG. 26 illustrates an inner module 2600 implemented without dimension reduction, while FIG. 27 illustrates an inner module 2700 implemented with dimension reduction. These CNN implementations are designed to process visual data in the pixel domain (e.g., raw or uncompressed visual data).

Figure 28:
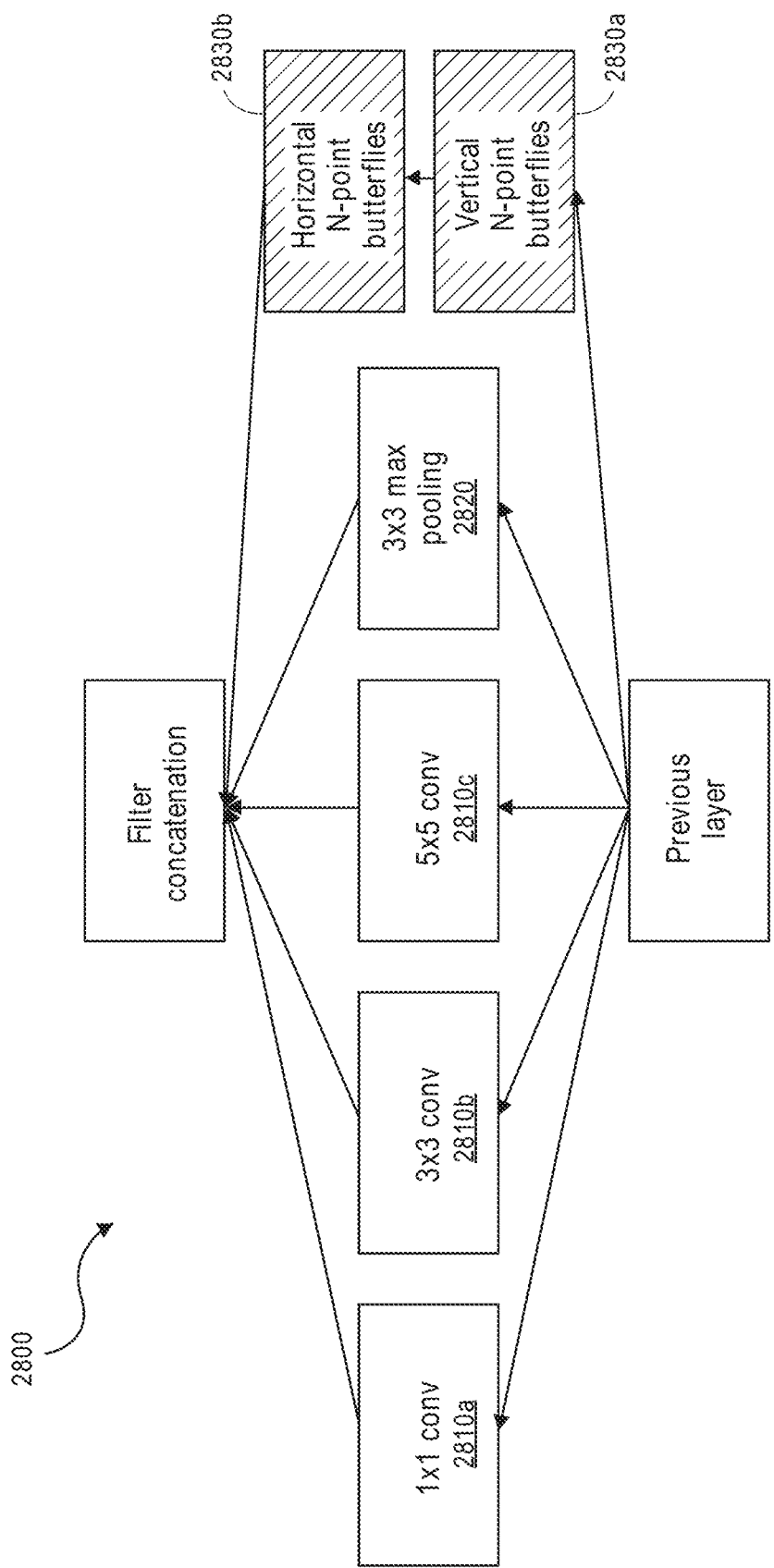
Figure 29:
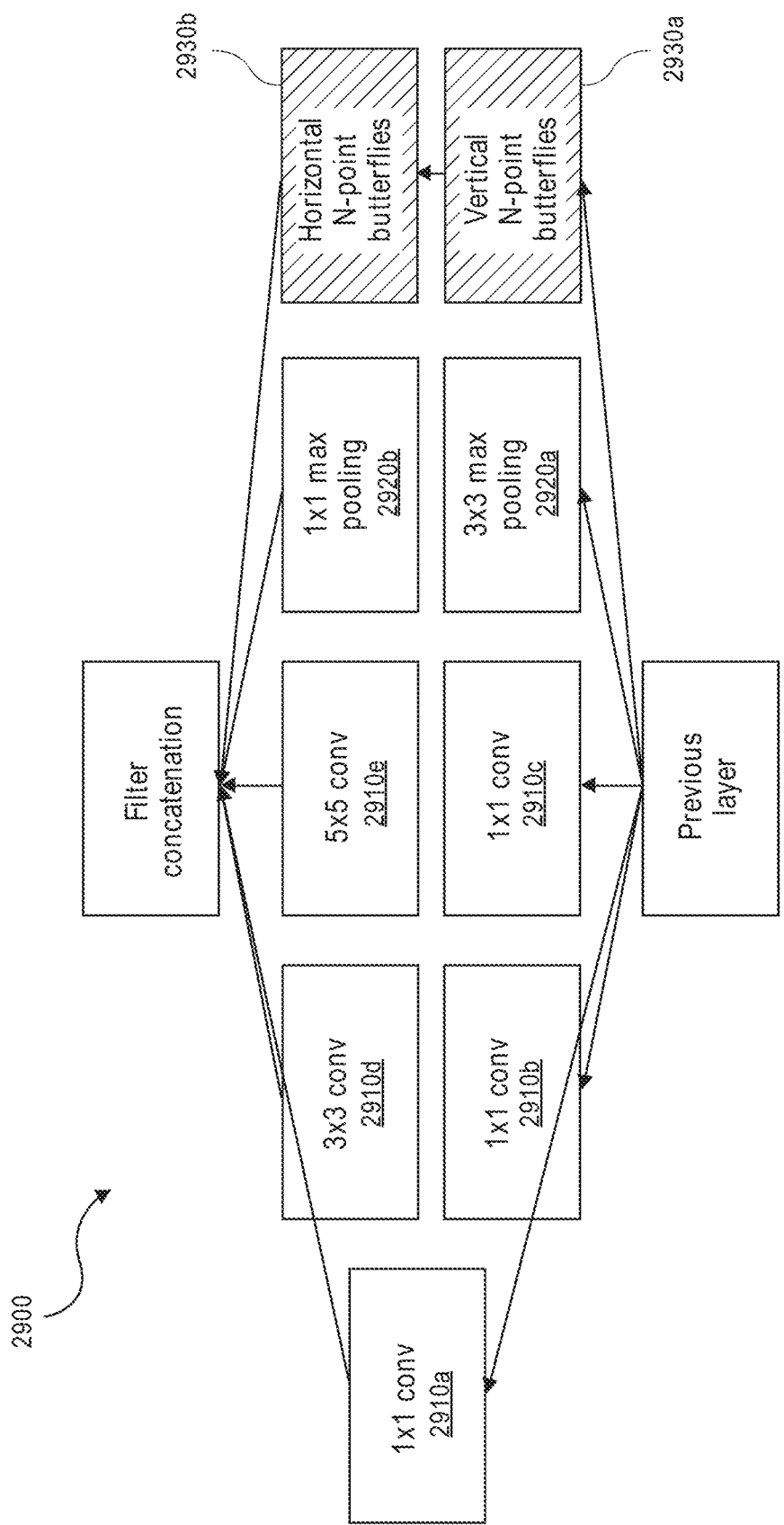

FIGS. 28 and 29, however, illustrate example CNN inner modules 2800 and 2900 that use butterfly operations to enable multi-domain visual data processing in either the pixel domain or the compressed domain. Butterfly operations, for example, are partial inverse transforms that can be used when transforming compressed domain data (e.g., DCT domain data) back to the pixel domain. Accordingly, by incorporating butterfly layers into a CNN, the CNN can be provided with compressed visual data as its original input, and as the compressed data is processed by the successive CNN layers, the compressed data is at least partially inversely transformed using the butterfly layers in the CNN.

FIG. 28 illustrates an inner CNN module 2800 implemented without dimension reduction, while FIG. 29 illustrates an inner CNN module 2900 implemented with dimension reduction. Moreover, as shown in these examples, additional butterfly layers or filters are added in parallel to the regular convolution layers. In some embodiments, for example, 2×2 and/or 4×4 butterfly operations can be added in parallel to the regular convolution and pooling layers. For example, in some embodiments, the butterfly operations could be implemented similar to the example butterfly operation illustrated in FIGS. 31A-B.

With respect to inner module 2800 of FIG. 28, for example, butterfly layers 2830a,b are added in parallel to convolution layers 2810a-c and pooling layer 2820, and the butterfly layers 2830 include vertical N-point butterfly operations 2830a and horizontal N-point butterfly operations 2830b. For example, in some embodiments, the butterfly operations may be performed on both vertical and horizontal data elements within the visual data. Similarly, with respect to inner module 2900 of FIG. 29, butterfly layers 2930a,b are added in parallel to convolution layers 2910a-e and pooling layers 2920a-b, and the butterfly layers 2930 include vertical N-point butterfly operations 2930a and horizontal N-point butterfly operations 2930b.

Note that this approach, however, does not require multiple butterfly layers to be stacked within a single inner module, as the CNN does not have to perform a complete inverse DCT. For example, the goal of multiple convolution layers is to extract/transform the input data to a feature space where the fully connected layers can easily separate different clusters. Accordingly, the butterfly layers do not have to perform a complete inverse DCT, and instead, they can simply be designed to aid in extracting and transforming the input data into the feature space. In this manner, a complete or entire stack of organized butterfly layers does not need to be included in the CNN.

Moreover, the weights of each butterfly can be adjusted during the training phase, and thus the decision of whether to use the butterfly layers and/or how much to rely on them will be adjusted automatically.

Figure 30:
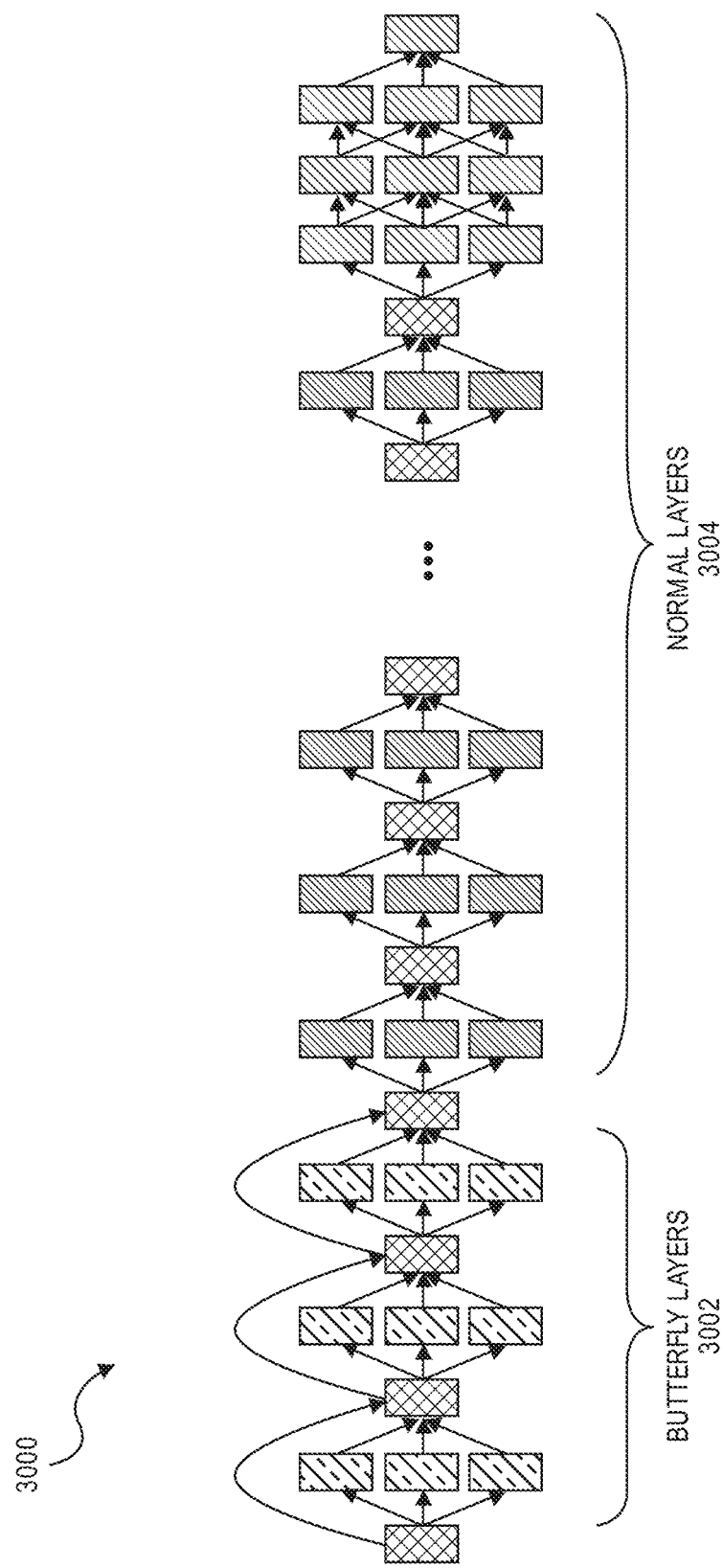
Figure 31:
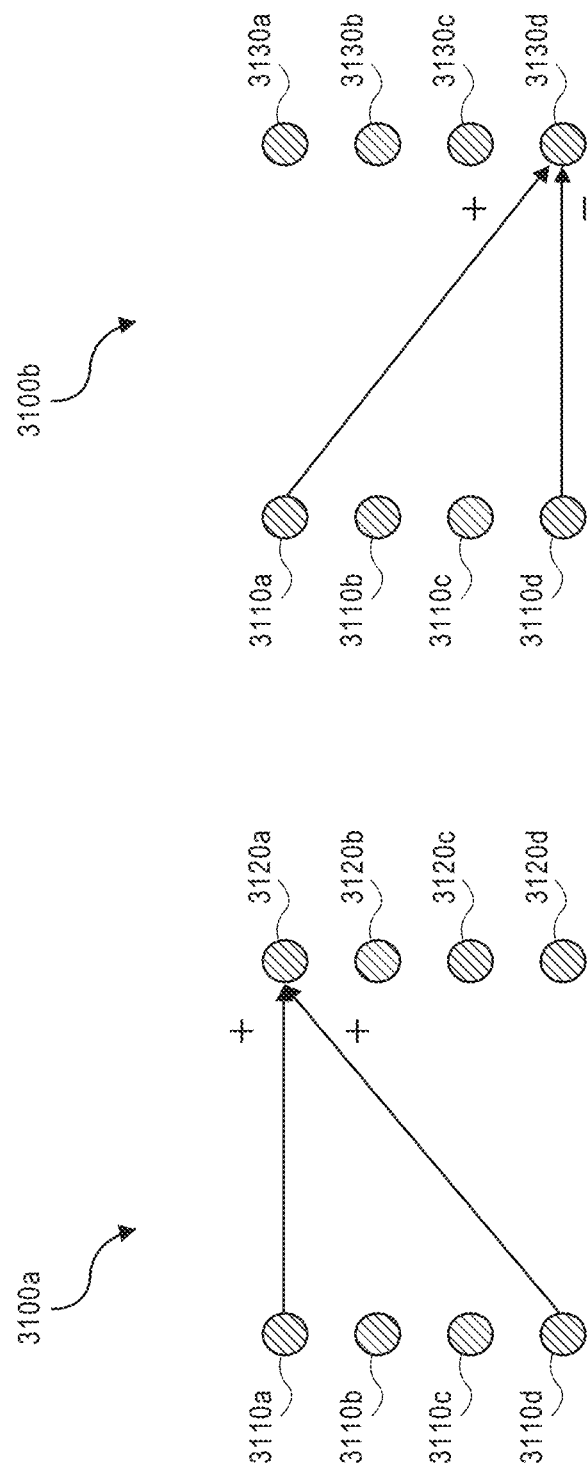

FIG. 30 illustrates an alternative embodiment of a multi-domain CNN 3000 with butterfly layers 3002 and normal layers 3004 arranged sequentially rather than in parallel.

FIGS. 31A-B illustrate an example of a one-dimensional (1D) N-point butterfly operation. In particular, the illustrated example is a 4-point butterfly operation, meaning the butterfly operation is performed over a distance of four data points 3110a-d. In other embodiments, however, butterfly operations may be implemented over any number of data points. Moreover, in some embodiments, data points 3110a-d may represent compressed pixel data, such as DCT coefficients.

In some embodiments, for example, butterfly operations may be successively performed on a collection of one-dimensional (1D) elements from the visual data, such as horizontal or vertical data elements within the visual data. For example, each butterfly operation may generate two outputs or channels using separate addition and subtraction operations (e.g., by computing the sum of two points over a large distance and the difference of two points over a large distance). For example, the $1^{st}$ and $4^{th}$ points of the input may be added together to compute their sum ($1^{st}$ point+$4^{th}$ point), and also subtracted to compute their difference ($1^{st}$ point-$4^{th}$ point). Additional butterfly operations may be successively performed over the input in this manner using a rolling window. For example, in the next butterfly operation, the sum and difference may be computed using the $2^{nd}$ and $5^{th}$ points, and the process may repeat in this manner until all elements in the input have been processed.

In FIGS. 31A-B, for example, the addition and subtraction operations for a butterfly operation are shown. In particular, FIG. 31A illustrates the addition operation, and FIG. 31B illustrates the subtraction operation. In FIG. 31A, for example, the $1^{st}$ point (3110a) and the $4^{th}$ point (3110d) are added together to compute a new point (3120a) that represents their sum. Similarly, in FIG. 31B, the $4^{th}$ point (3110d) is subtracted from the $1^{st}$ point (3110a) to compute a new point (3130d) that represents their difference.

Accordingly, butterfly operations can be incorporated into a CNN in this manner in order to enable processing of visual data in both the pixel domain and compressed domain (e.g., DCT domain), thus eliminating the requirement of fully decompressing visual data before analyzing its contents using a deep learning neural network. For example, rather than explicitly performing an inverse DCT transform to fully decompress visual data before processing it using a CNN, the CNN can instead be implemented using butterfly layers to inherently incorporate decompression functionality into the CNN, thus enabling the CNN to be provided with compressed data as input.

Figure 32:
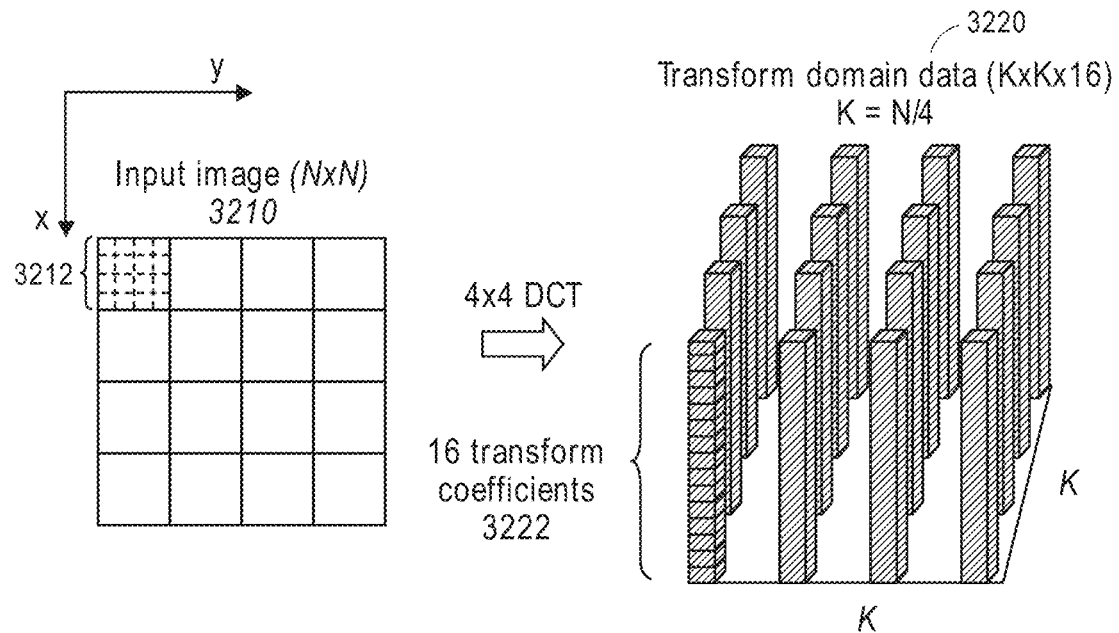
FIGS. 32 and 33 illustrate an example embodiment of a three-dimensional (3D) CNN for processing compressed visual data.
Figure 33:
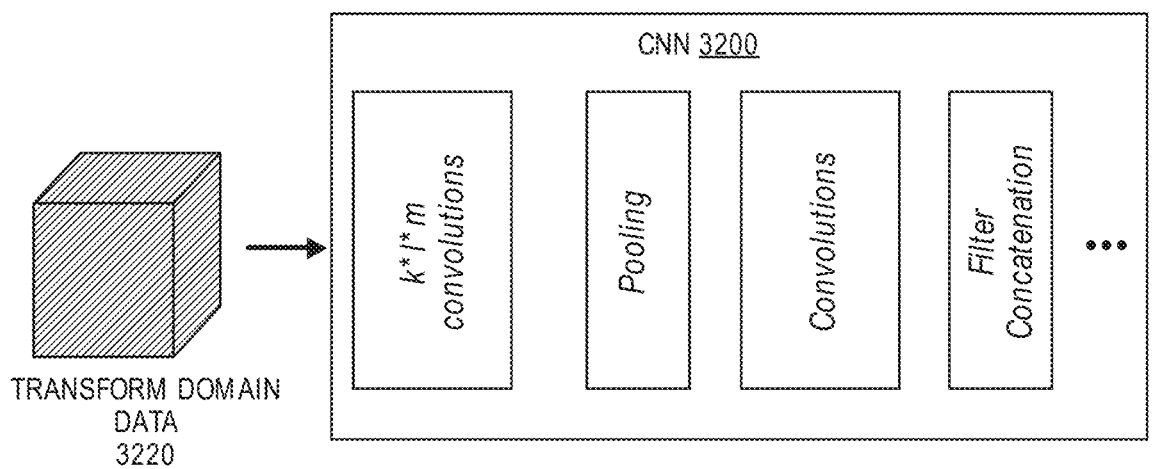

FIGS. 32 and 33 illustrate an example embodiment of a three-dimensional (3D) CNN 3200 that is capable of processing compressed visual data. In some embodiments, for example, 3D CNN 3200 could be used in the implementation of, or in conjunction with, the compression-based CNN embodiments described throughout this disclosure (e.g., the CNNs of FIGS. 24 and 28-31).

Figure 34:
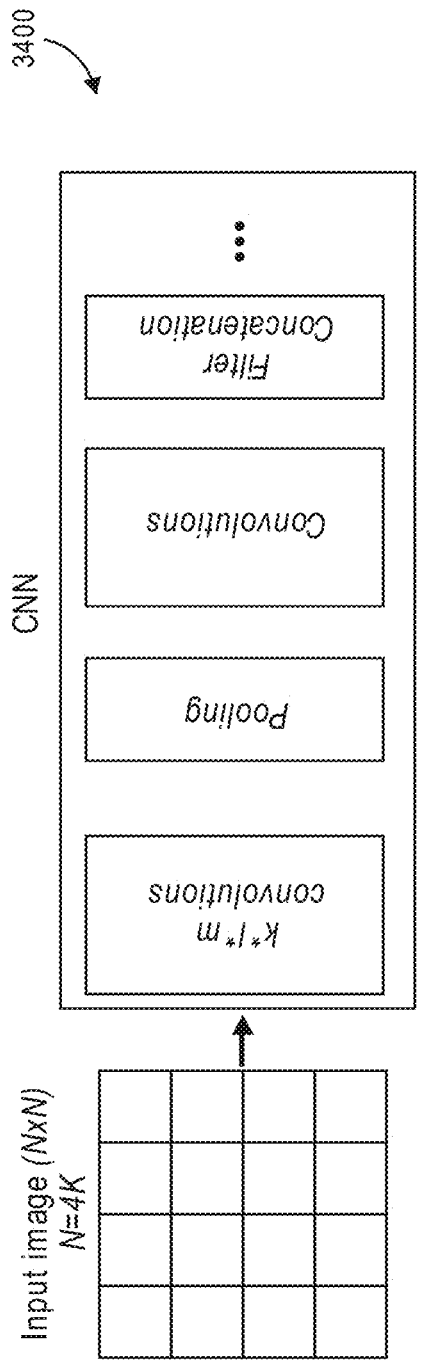
FIG. 34 illustrates an example of a pixel-domain CNN.
Figure 35:
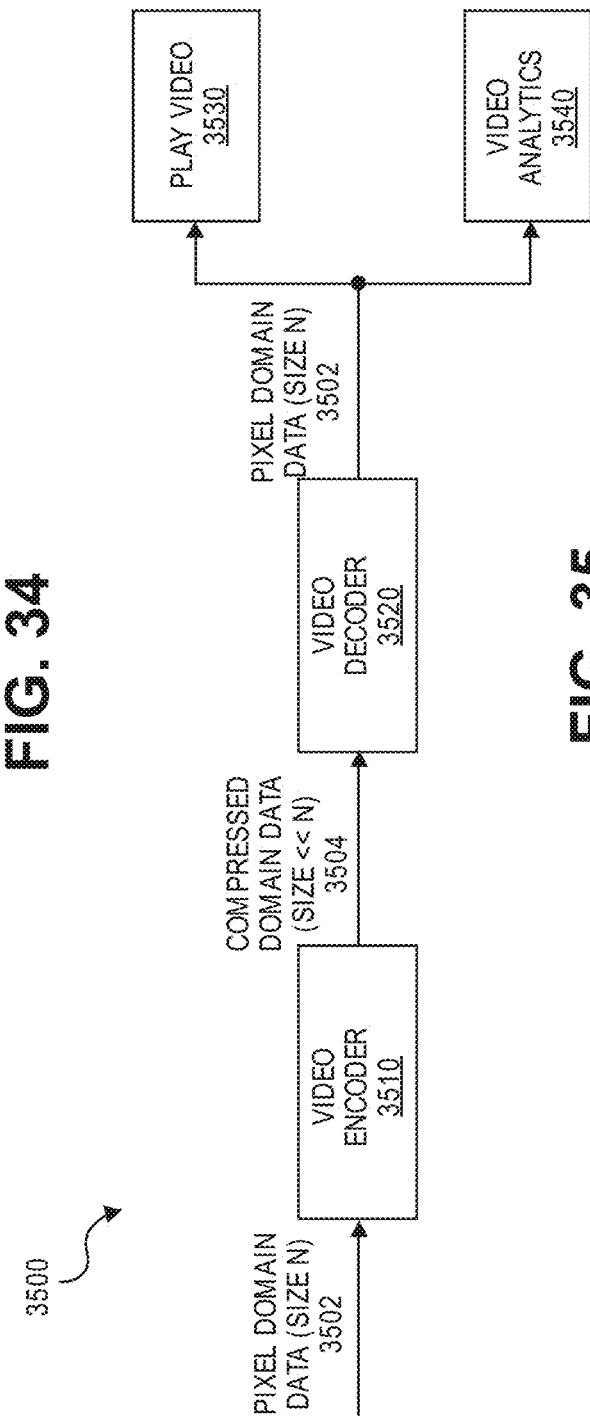
FIG. 35 illustrates an example of a pixel-domain visual analytics pipeline.

Many visual analytics systems require visual data to be decompressed before any processing can be performed, such as processing by a deep learning neural network. To illustrate, FIG. 34 illustrates an example of a pixel-domain CNN 3400, and FIG. 35 illustrates an example of an associated pixel-domain visual analytics pipeline 3500. In the illustrated example, pixel-domain CNN 3400 performs object detection and classification for visual analytics using data in the pixel or image domain (e.g., using decompressed visual data). For example, the convolutional kernels in the early layers of the CNN implement two-dimensional (2D) convolutions on the image data, and multiple layers of convolutions, pooling, and rectified linear unit (ReLU) operations are repeated in order to successively extract combinations of features from the earlier layers. Moreover, because CNN 3400 operates on pixel-domain data, compressed visual data must be fully decompressed before it can be processed by CNN 3400. For example, as shown by visual analytics pipeline 3500 of FIG. 35, the original pixel domain data 3502 is first compressed by a video encoder 3510 (e.g., prior to transmission over a network), and the compressed data 3504 is subsequently decompressed by a video decoder 3520 before performing video analytics 3540 (e.g., using a CNN).

In the illustrated embodiment of FIGS. 32 and 33, however, 3D CNN 3200 processes compressed visual data directly using a 3D format designed to improve processing efficiency. For example, the compressed image is already transformed into the DCT domain, and thus the DCT transform coefficients can be reshaped into a 3D format in order to separate the DCT transform coefficients into different channels. In this manner, the reshaped DCT transform data is arranged in a manner that provides better correlation between the spatial and transform domain coefficients. The reshaped DCT transform data can then be processed directly by a CNN (e.g., using 3D convolutions to perform feature extraction), which ultimately enables the CNN to be used faster. For example, by eliminating the decompression step required by existing approaches, processing efficiency is improved, particularly for computing environments that do not include built-in hardware video decompression accelerators.

In some embodiments, for example, 3D CNN 3200 may be designed to operate directly on compressed visual data (e.g., video frames) represented in the DCT domain using a 3D matrix. For example, in some embodiments, the DCT block indices may be represented by the x and y dimensions of the 3D matrix, while the DCT transform magnitude vectors may be organized along the z dimension. In this manner, the convolutional kernels in the first layer of the new CNN architecture can be implemented using 3D filters designed to better capture the spatial and frequency domain correlations and features of the compressed data, thus improving the performance of the CNN operation in the DCT domain.

The majority of common video and image encoding schemes use discrete cosine transforms (DCT) to convert spatial pixel intensities to frequency domain representations. The illustrated embodiment is based on the observation that once image data is split into 4×4 pixel blocks and passed through a transform such as DCT, the transformed data has different correlation properties than the original data. For example, with respect to a DCT transform, the DC coefficients of adjacent blocks are often strongly correlated, while the corresponding higher frequency AC coefficients of adjacent blocks may be similarly correlated.

Accordingly, FIG. 32 illustrates an approach for transforming a 2D image into a 3D matrix of DCT data, the latter of which is arranged in a manner that allows the DCT data to be processed more efficiently by a CNN. In the illustrated example, an input image of size N×N (reference numeral 3210) is first broken up into 4×4 pixel blocks (example reference numeral 3212), and each 4×4 pixel block is passed through a DCT transform. The resulting DCT transform domain data (reference numeral 3220) is then stored in a 3D matrix, where the x and y dimensions correspond to the spatial block indices and the z dimension contains vectors of DCT coefficients (reference numeral 3222), which include 16 coefficients per vector. Accordingly, the resulting transform domain data (reference label 3220) has dimensions of size K×K×16, where K=N/4. In other embodiments, the size of DCT may vary, e.g., 8×8, 16×16. Further, in some embodiments, an integer transform or other spatial-domain to frequency-domain transform (e.g., DWT) may be used instead of DCT.

Next, as shown in FIG. 33, the transform domain data represented using the 3D matrix (reference label 3220) is input into the CNN (reference label 3200), which includes a first layer of 3D convolutional kernels that use 3D filters. This layer extracts both spatially correlated features in the x-y plane along with any specific signatures in the frequency axis (z dimension), which can be used as input to succeeding layers.

The illustrated embodiment provides numerous advantages, including the ability to directly process compressed visual data in an efficient manner, thus eliminating the need to decompress the data before analyzing its contents (e.g., using a deep learning neural network). In this manner, the overall computational complexity of visual analytics can be reduced. Moreover, because compressed or DCT domain data is quantized and thus represented using a more compact form than the original visual data (e.g., video frame), the overall CNN complexity may be further reduced compared to a conventional pixel-domain CNN. For example, with respect to visual data (e.g., images or video) compressed in certain compression formats such as JPEG or M-JPEG, the DCT coefficients are quantized, and typically the highest frequency components may be zeroed out by the quantization. Thus, the total volume of non-zero data processed by the CNN is reduced compared to the original image data. Accordingly, based on the data volume reduction of the compressed data (e.g., due to DCT coefficient quantization), the CNN complexity may be further reduced, and the training speed of convergence may improve.

Figure 90:
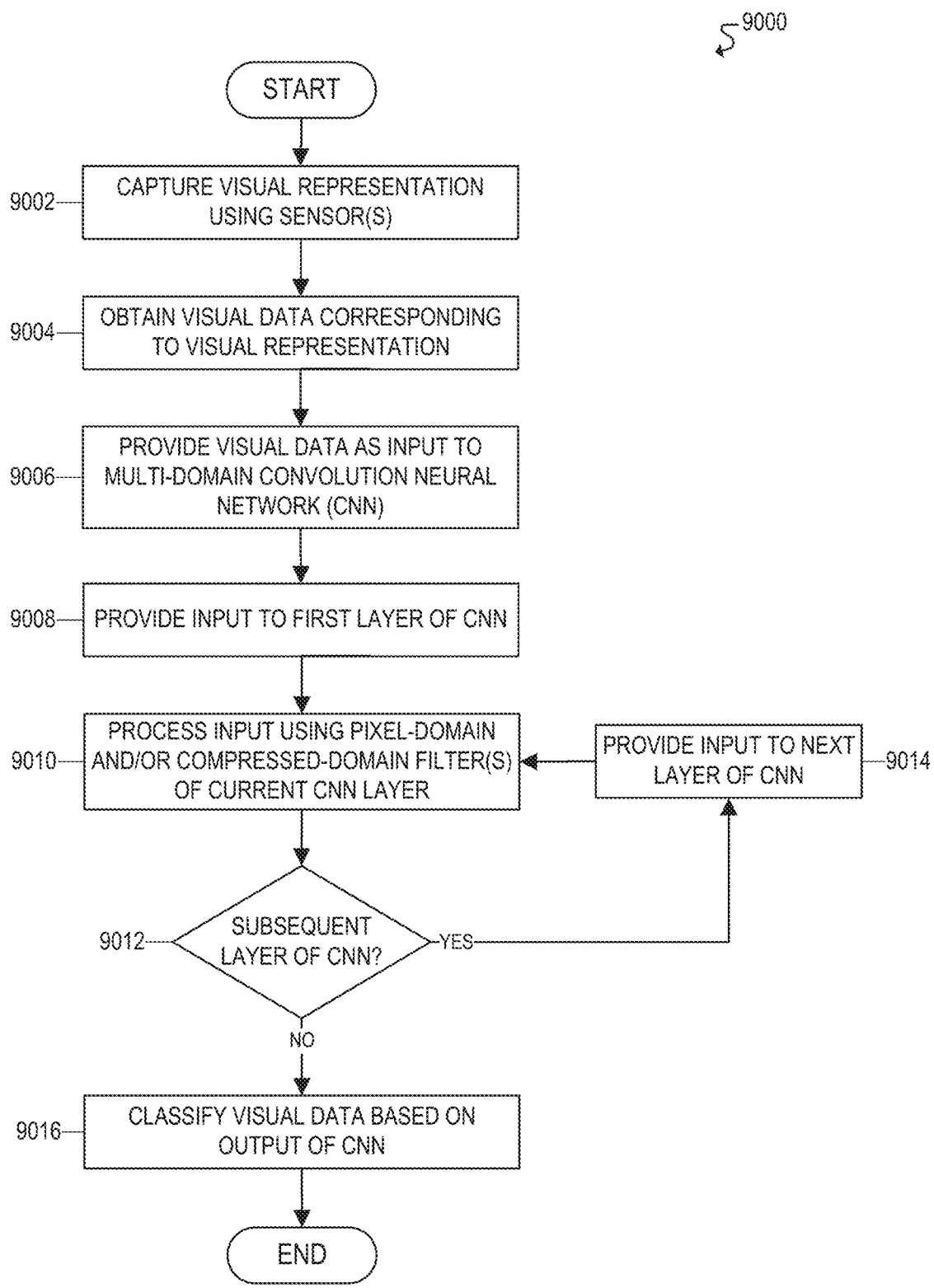
FIG. 90 illustrates a flowchart for an example embodiment of a multi-domain CNN.

FIG. 90 illustrates a flowchart 9000 for an example embodiment of a multi-domain convolutional neural network (CNN). In various embodiments, for example, flowchart 9000 may be implemented using the visual computing architecture and functionality described throughout this disclosure.

A typical CNN is designed to operate on uncompressed or raw visual data, thus requiring the visual data to be fully decompressed before any processing can be performed. For example, the CNN may have multiple layers, and each layer may have one or more filters that are typically designed to process uncompressed or "pixel-domain" visual data (e.g., convolution and pooling filters). In the illustrated example, however, the multi-domain CNN is capable of processing both uncompressed and compressed visual data. For example, the multi-domain CNN includes additional filters designed to process compressed visual data, which may be added in parallel to the existing pixel-domain filters of certain layers. In some embodiments, for example, the additional "compressed-domain" filters may be implemented using butterfly filters or 3D convolution filters (e.g., as described above in connection with FIGS. 25-35). Further, during training, the CNN can be trained to rely on the respective pixel-domain filters or compressed-domain filters, as appropriate, depending on whether the input is uncompressed or compressed. For example, as with typical CNNs, the weights of each compressed-domain filter can be adjusted during the training phase, and the decision of whether to use these compressed-domain filters and/or how much to rely on them will be adjusted automatically. In this manner, the CNN is capable of processing visual data in either the pixel domain or the compressed domain.

In some embodiments, for example, the compressed-domain filters may be implemented using butterfly filters (e.g., as described in connection with FIGS. 25-31). These butterfly filters may be added in parallel to the existing pixel-domain CNN filters (e.g., convolution and pooling filters) or sequentially (e.g., using one or more butterfly layers that precede the typical CNN layers). In this manner, the butterfly filters will perform partial inverse transforms on the visual data, thus helping to transform the visual data (when compressed) into a feature space that can be processed by the CNN.

Alternatively, or additionally, the compressed-domain filters may be implemented using 3D convolution filters designed to operate on compressed data (e.g., as described in connection with FIGS. 32-35). For example, two-dimensional (2D) compressed visual data may be transformed into a three-dimensional (3D) representation in order to group related transform coefficients into the same channel. In this manner, a 3D convolution can then be performed on the transformed 3D compressed data, thus enabling the related transform coefficients to be processed together.

In the example illustrated by FIG. 90, flowchart 9000 implements an example embodiment of the described multi-domain CNN. The flowchart begins at block 9002, where a visual representation is captured using one or more sensors, such as cameras and/or other types of vision sensors. The flowchart then proceeds to block 9004, where visual data corresponding to the visual representation is obtained. In some embodiments, for example, the visual data may be obtained by or from a device near the sensors and/or over a network. Moreover, the visual data may be either uncompressed or compressed.

The flowchart then proceeds to block 9006, where the visual data is provided as input to a multi-domain CNN, and then to block 9008, where the input is provided to a first layer of the CNN.

The flowchart then proceeds to block 9010, where the input is processed using pixel-domain and/or compressed-domain filter(s) of the current CNN layer. The pixel-domain filters, for example, may be typical CNN filters, such as convolution and pooling filters. The compressed-domain filters, however, may be filters designed to process compressed visual data, such as butterfly filters, 3D convolution filters, or a mixture of butterfly filters, 3D convolution filters, and regular 2D convolution filters. For example, the compressed-domain filters may be used to process noncontiguous elements of the visual data that are typically correlated when the visual data is compressed. Moreover, the CNN can be trained to rely on processing associated with the pixel-domain filters when the visual data is uncompressed, and further trained to rely on processing associated with the compressed-domain filters when the visual data is compressed.

In some embodiments, for example, the compressed-domain filters may be butterfly filters, which may each be used to perform a partial inverse transform associated with the visual data. For example, a butterfly filter may compute a sum and a difference for a plurality of pairs of elements within the visual data. Each pair of elements, for example, may be positioned at locations within the visual data that are a particular distance apart (e.g., horizontally or vertically).

Alternatively, or additionally, the compressed-domain filters may be 3D convolution filters. A 3D convolution filter, for example, may be used to perform processing associated with three-dimensional (3D) visual data that is generated based on a three-dimensional (3D) transformation of the visual data. For example, the 3D visual data may be generated by performing a 3D transformation on the visual data, and the resulting 3D visual data may then be provided as input to the 3D convolution filter.

In some embodiments, for example, the 3D transformation rearranges the visual data into three dimensions such that there is a correlation among one or more adjacent elements within a particular dimension when the visual data used for the 3D transformation is compressed. For example, when the visual data is compressed, the 3D transformation may group related or correlated transform coefficients (e.g., DCT coefficients) into the same channel, thus allowing those coefficients to be processed together.

In some embodiments, for example, the 3D visual data may be generated by first partitioning the visual data into multiple blocks, where each block includes a plurality of elements of the visual data. For example, when the visual data is compressed, the elements may correspond to transform coefficients (e.g., DCT coefficients). The blocks may then be arranged along a first dimension and a second dimension within the 3D visual data, while the elements associated with each block may be arranged along a third dimension of the 3D visual data. In this manner, when the visual data used for the transformation is compressed, the resulting 3D visual data contains related or correlated transform coefficients (e.g., DCT coefficients) in the same channel, thus allowing those coefficients to be processed together.

The flowchart then proceeds to block 9012 to determine whether there is a subsequent layer in the CNN. If the answer at block 9012 is YES, the flowchart proceeds to block 9014 to provide input to the next layer of the CNN. In some embodiments, for example, the output of the current layer of the CNN may be provided as input to the next layer of the CNN. If the answer at block 9012 is NO, the CNN processing is complete, and the flowchart then proceeds to block 9016 to classify the visual data based on the output of the CNN.

At this point, the flowchart may be complete. In some embodiments, however, the flowchart may restart and/or certain blocks may be repeated. For example, in some embodiments, the flowchart may restart at block 9002 to continue capturing and processing visual data.

Figure 36:
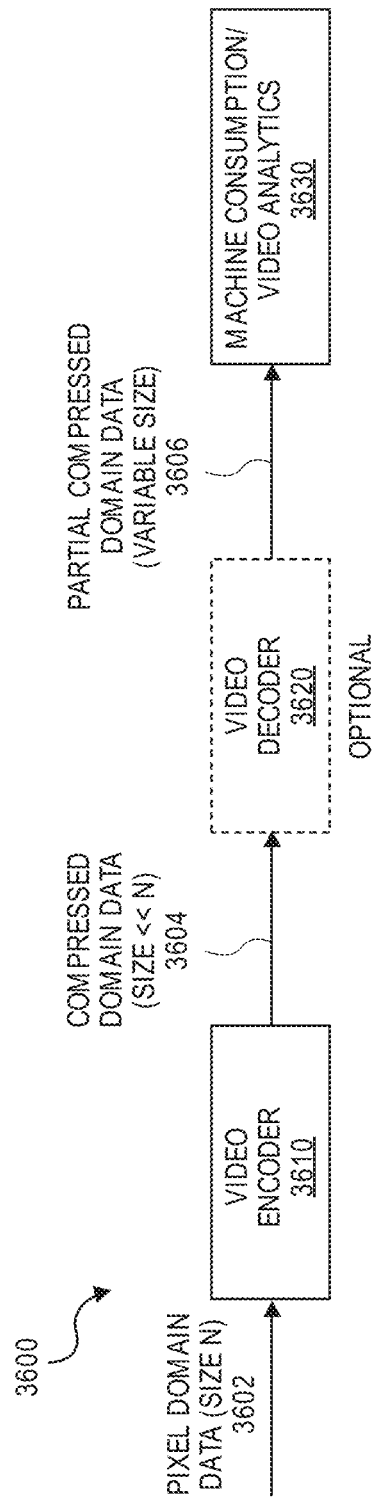
FIGS. 36 and 37 illustrate example embodiments of compressed-domain visual analytics pipelines.
Figure 37:
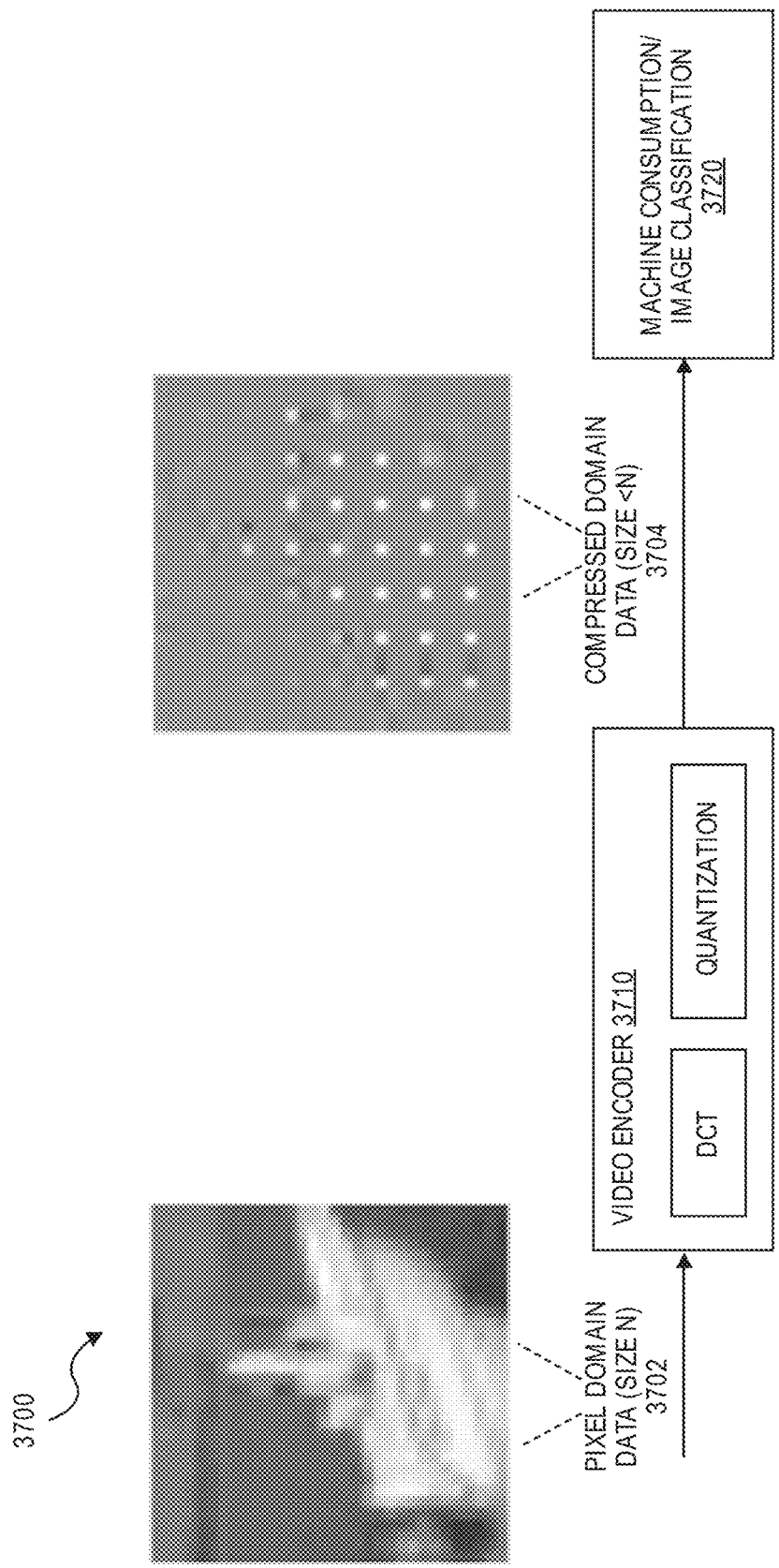

FIGS. 36 and 37 illustrate example embodiments of visual analytics pipelines 3600 and 3700 that perform visual analytics on compressed visual data (e.g., using the compression-based CNN embodiments described throughout this disclosure). As shown by these FIGURES, the decoding or decompression step in the visual analytics pipeline is optional and/or may be omitted entirely. For example, as shown by visual analytics pipeline 3600 of FIG. 36, the original pixel domain data 3602 is first compressed by a video encoder 3610 (e.g., prior to transmission over a network), and the compressed data 3604 may optionally be partially decompressed by a video decoder 3620 before performing visual analytics 3630 on the fully or partially compressed data 3606. Similarly, as shown by visual analytics pipeline 3700 of FIG. 37, the original pixel domain data 3702 is first compressed by a video encoder 3710 (e.g., prior to transmission over a network), and visual analytics (e.g., image classification) 3720 is then directly performed on the compressed data 3704.

Figure 38:
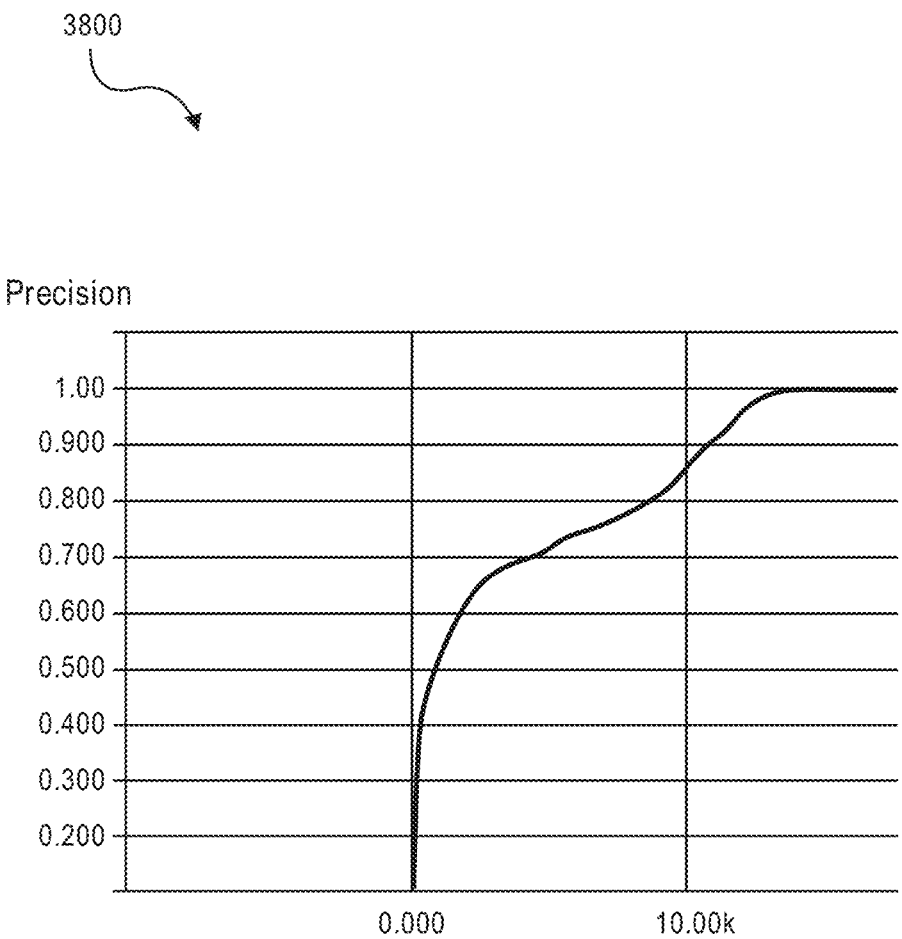
FIG. 38 illustrates a performance graph showing the precision of a CNN trained using compressed visual data.

FIG. 38 illustrates a performance graph 3800 showing the precision of a CNN trained using compressed visual data (e.g., 4×4 transform DCT inputs), such as the compression-based CNNs described throughout this disclosure.

Figure 39:
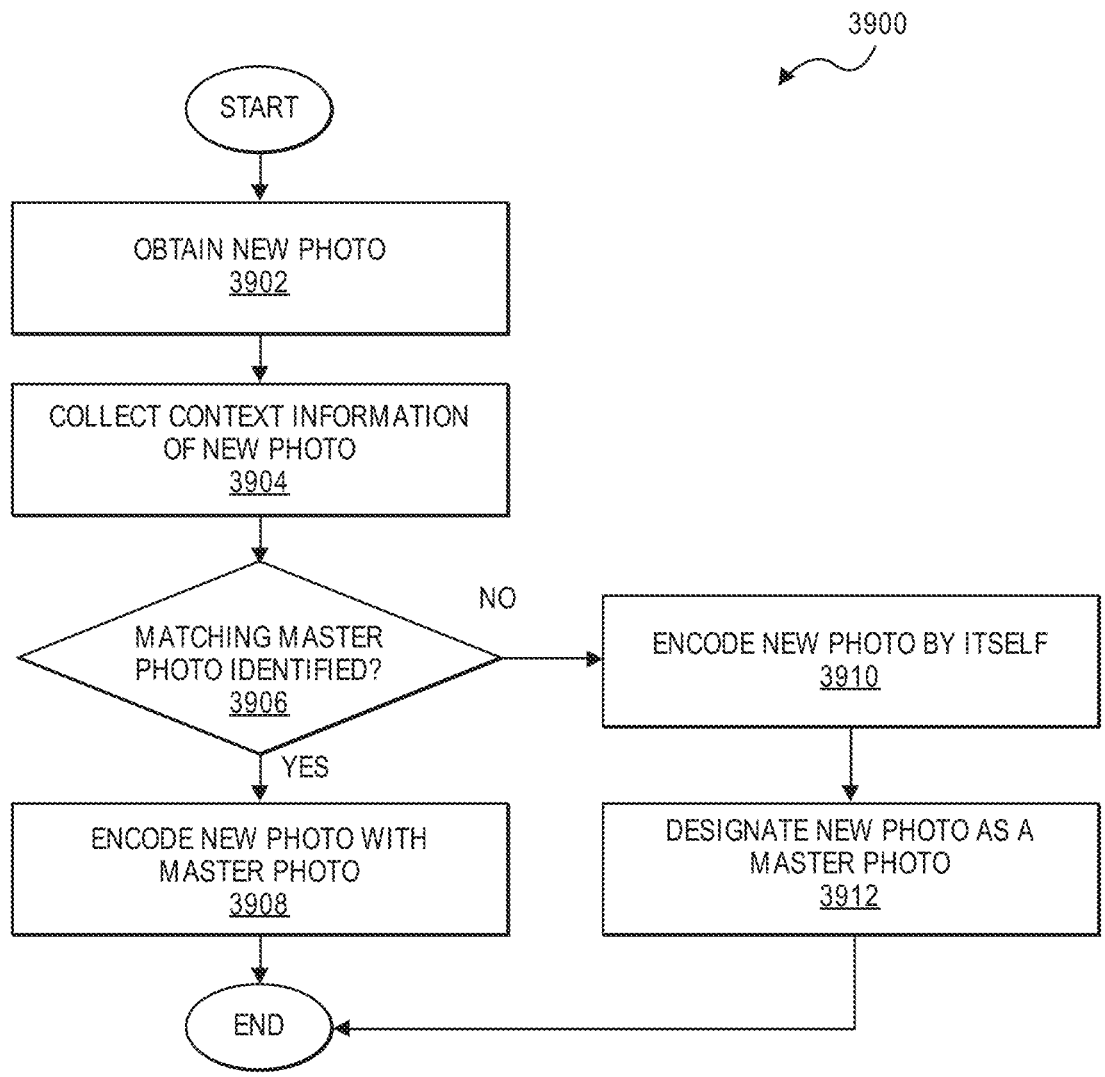
FIG. 39 illustrates a flowchart for an example embodiment of context-aware image compression.

FIG. 39 illustrates a flowchart 3900 for an example embodiment of context-aware image compression. In some embodiments, flowchart 3900 may be implemented using the embodiments and functionality described throughout this disclosure.

Today, many people rely on the cloud for storing or backing up their photos. Typically, photos are stored as individually compressed files or units. In the current computing era, however, that approach is often inefficient. For example, people increasingly use their mobile devices to take photos, and each new generation of mobile devices are updated with cameras that support more and more megapixels, which results in larger volumes of photos that require more storage space. Moreover, people often capture multiple photos of the same object or scene during a single occasion, which often results in a close temporal correlation among those photos, along with substantial redundancy. Accordingly, due to the redundancy across similar photos, individually compressing and storing each photo can be an inefficient approach. For example, traditionally, each photo is compressed and saved independently using a particular image compression format, such as JPEG. By compressing each photo individually, however, current approaches fail to leverage the inter-picture correlations between groups of similar photos, and thus more storage space is required to store the photos. For example, two photos that are nearly identical would still require double the storage of a single photo.

Accordingly, in the illustrated embodiment, groups of similar or related photos are compressed and stored more efficiently. For example, context information associated with photos is extracted and used to identify similar or related photos, and similar photos are then compressed jointly as a group. The contextual information, for example, could be used to identify a group of pictures from a single user that were taken very close in time and/or at the same location. As another example, the contextual information could be used to identify a group of pictures taken by different users but at the same location. Accordingly, the identified group of similar photos may be compressed using video coding in order to leverage the inter-photo correlations and ultimately compress the photos more efficiently. In this manner, compressing related or correlated images using video compression rather than standard image compression can significantly reduce the storage space required for the photos (e.g., 2-5 times less storage space in some cases). Accordingly, this approach can be used to save or reduce storage in the cloud.

The flowchart may begin at block 3902 by first obtaining a new photo. In some cases, for example, the new photo could be captured by the camera of a mobile device. In other cases, however, any type of device or camera may be used to capture the photo.

The flowchart may then proceed to block 3904 to collect context information associated with the new photo. For example, when a photo is newly captured (e.g., by a mobile device), corresponding context information associated with the photo is collected, such as a timestamp, GPS coordinates, device orientation and motion states, and so forth.

The flowchart may then proceed to block 3906 to determine if a matching master photo can be identified for the new photo. In some embodiments, for example, the context information of the new photo is compared to the context information of other previously captured master photos to determine whether the new photo is closely correlated to any of the existing master photos. For example, if the photo is taken in the same location, within a certain amount of time, and with little phone movement compared to a master photo, it is likely that the new photo is highly correlated with the master photo. Further, in some embodiments, image processing techniques (e.g., feature extraction/matching) can then be applied to confirm the photo correlation. In some embodiments, for example, a scale-invariant feature transform (SIFT) may be used to determine whether a pair of photos are sufficiently correlated or matching (e.g., by detecting, extracting, and/or comparing image features). Further, in some embodiments, image data itself may be treated as context information that can be used to identify similar or correlated photos, such as image pixels, image structures, extracted image features, and so forth.

If a matching master photo is identified at block 3906, the flowchart may then proceed to block 3908 to encode the new photo with the matching master photo. In some embodiments, for example, a video codec (e.g., H.264) may be used to compress the new photo as an inter-frame associated with the master photo. For example, video codecs typically provide inter-frame encoding, which effectively utilizes the temporal correlation between similar images to improve the coding efficiency.

In some embodiments, a master photo may include any photo that is compressed without reference to other parent or related images, while a slave photo may include any photo that is compressed with reference to a master or parent image (e.g., using inter-frame mode of a video codec). Accordingly, a slave photo must efficiently record or correlate relevant information of its master photo, so that when the slave photo needs to be decoded for display of the entire image, the associated master photo can be quickly identified.

If a matching master photo is NOT identified at block 3906, the flowchart may then proceed to block 3910 to encode the new photo by itself. For example, when the new photo does not match any of the existing master photos, the new photo is encoded without referencing any other photos, and the flowchart may then proceed to block 3912 to designate the new photo as a master photo, allowing it to potentially be compressed with other subsequently captured photos.

At this point, the flowchart may be complete. In some embodiments, however, the flowchart may restart and/or certain blocks may be repeated. For example, in some embodiments, the flowchart may restart at block 3902 to continue obtaining and compressing newly captured photos.

Figure 64:
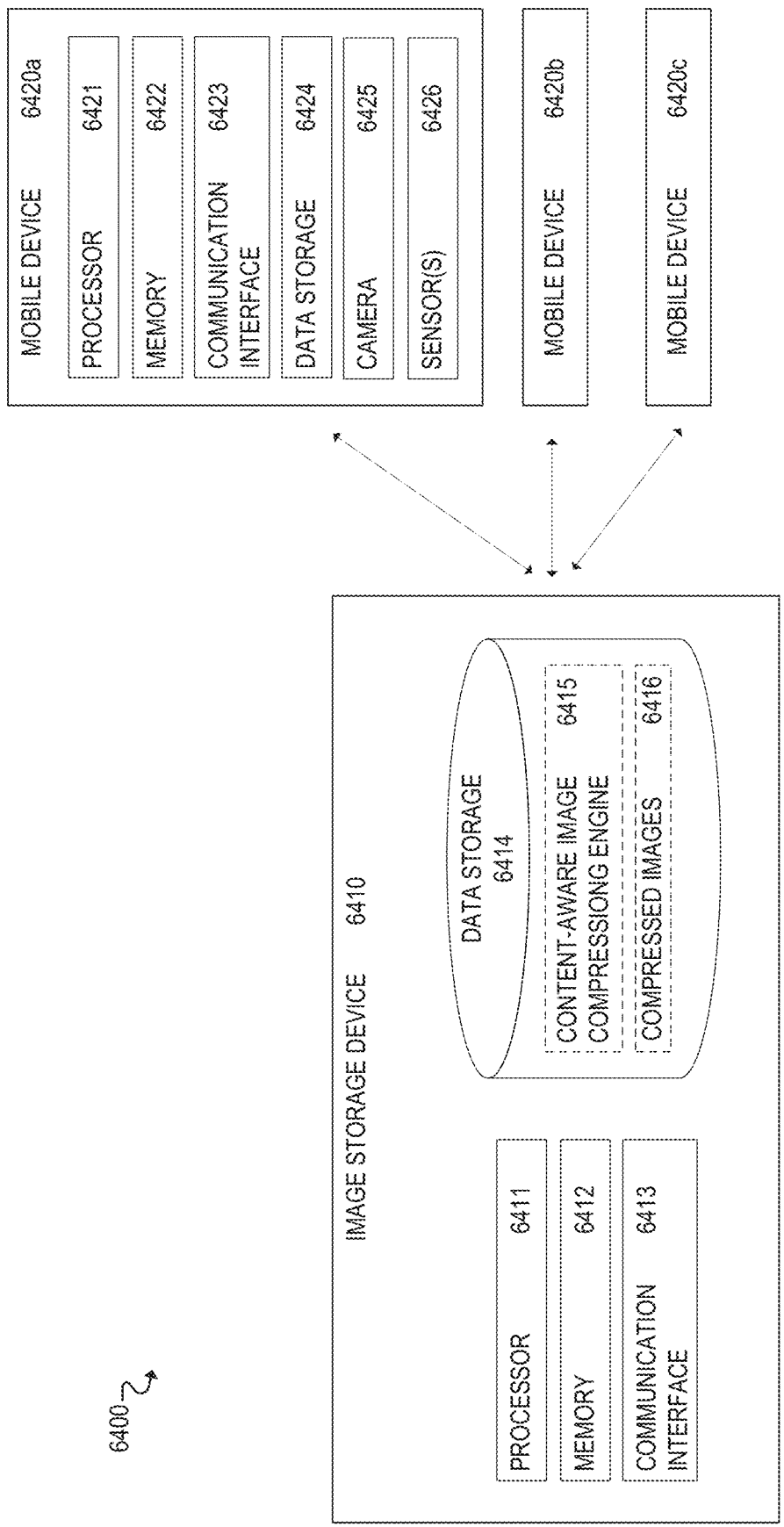
FIG. 64 illustrates an example embodiment of an image storage system that leverages context-aware image compression.

FIG. 64 illustrates an example embodiment of an image storage system 6400 that leverages context-aware image compression. In some embodiments, for example, image storage system 6400 may be used to implement the context-aware image compression functionality from flowchart 3900 of FIG. 39.

In the illustrated embodiment, image storage system 6400 includes an image storage device 6410 and a plurality of mobile devices 6420a-c, as described further below.

Image storage device 6410 includes at least one processor 6411, memory element 6412, communication interface 6413, and data storage 6414. Data storage 6414 contains a context-aware image compression engine 6415 and a plurality of compressed images 6416. Context-aware image compression engine 6415 includes logic and/or instructions that can be executed by processor 6411 in order to perform context-aware image compression, which enables compressed images 6416 to be compressed and stored more efficiently.

Mobile devices 6420a-c each include at least one processor 6421, memory element 6422, communication interface 6423, data storage 6424, camera 6425, and sensor(s) 6426. For simplicity, the underlying components of mobile devices 6420a-c are only illustrated for mobile device 6420a.

The respective components of image storage system 6400 may be used to implement context-aware image compression functionality (e.g., as described further in connection with FIGS. 39 and/or 56). In particular, image storage system 6400 provides efficient storage of images by compressing groups of similar or related images together based on context information associated with the images.

In some embodiments, for example, image storage system 6400 may include a data storage 6414 containing a plurality of compressed images 6416 captured by a mobile device 6420 associated with a particular user. The compressed images 6416 may include both master and slave images. In some embodiments, for example, a master image may be an image compressed without reference to any other images (e.g., compressed by itself and/or in isolation), while a slave image may be an image compressed with reference to at least one master image. The compressed images 6416 may also include associated context information. In general, context information associated with a particular image can include any type of information associated with the context in which the image was captured, such as time, location, device identity, device orientation or direction, device movement, and so forth. In some embodiments, for example, certain context information may be collected by one or more sensors 6426 of a mobile device 6420, such as a GPS receiver, gyroscope, accelerometer, compass, and so forth.

Accordingly, when a mobile device 6420 captures a new image using its associated camera 6425, the mobile device 6420 may provide the uncompressed image and its associated context information to image storage device 6410 (e.g., via communication interface 6423). In this manner, the context information can be leveraged to identify any previously captured images 6416 that may be similar to the newly captured image. In particular, by identifying correlations based on the context information, it can be determined whether the newly captured uncompressed image is associated with a corresponding compressed master image 6416 stored on image storage device 6410. For example, the newly captured image may be determined to be associated with a compressed master image 6416 if it was captured within a certain amount of time, at the same or similar location, by the same mobile device, at a similar device orientation or direction, and/or with little or no device movement.

Further, in some embodiments, image feature matching techniques (e.g., a SIFT algorithm) can then be applied to confirm the image correlation. For example, image feature matching can be used to identify a correlation between features of the newly captured image and the contextually-similar master image 6416.

If it is determined that the newly captured uncompressed image is associated with a corresponding compressed master image 6416, then the uncompressed image may be compressed with reference to the corresponding master image. In some embodiments, for example, the uncompressed image may be compressed with reference to the corresponding master image using inter-frame encoding. Inter-frame encoding effectively leverages the redundancy between similar images to improve the coding efficiency (e.g., as described further below in connection with FIG. 65). In some embodiments, for example, a video codec that uses inter-frame encoding (e.g., H.264) may be used to perform the compression. The resulting compressed image may then be designated as a slave image since it was compressed with reference to a master image.

If it is determined that the newly captured uncompressed image is not associated with any compressed master images 6416, then the uncompressed image may be compressed without reference to any other images. In some embodiments, for example, the uncompressed image may be compressed using intra-frame encoding. Intra-frame coding leverages spatial redundancy (e.g., correlations among pixels within a single frame or image) to improve the coding efficiency. The resulting compressed image may then be designated as a master image since it was compressed without reference to any other images. In this manner, the resulting compressed image may subsequently be used as a master image to compress subsequently captured images that are determined to be similar.

Accordingly, after compressing the newly captured image (e.g., either with or without reference to a corresponding master image), the resulting compressed image may then be stored on image storage device 6410.

The example embodiment of context-aware image compression illustrated and described in connection with FIG. 64 is merely illustrative of many possible embodiments. In various embodiments, for example, the compression approach described above may be performed periodically to compress batches of recently captured images together rather than compressing each image sequentially as it is captured. In addition, in some embodiments, certain images may be compressed with reference to multiple master images, and/or certain images may serve as both master and slave images (e.g., an image that is compressed with reference to a master image but is also used to compress another slave image). Moreover, in various embodiments, the underlying components and functionality of image storage system 6400, image storage device 6410, and/or mobile devices 6420 may be combined, separated, and/or distributed across any number of devices or components. In various embodiments, for example, image storage device 6410 may either be implemented in the cloud (e.g., as a cloud-based data storage server), implemented in the network edge (e.g., within each mobile device 6420 and/or as a standalone edge storage device), and/or distributed across both the cloud and the network edge. For example, in some embodiments, the compression and/or storage functionality of image storage device 6410 may be implemented by and/or integrated within each mobile device 6420.

Figure 65:
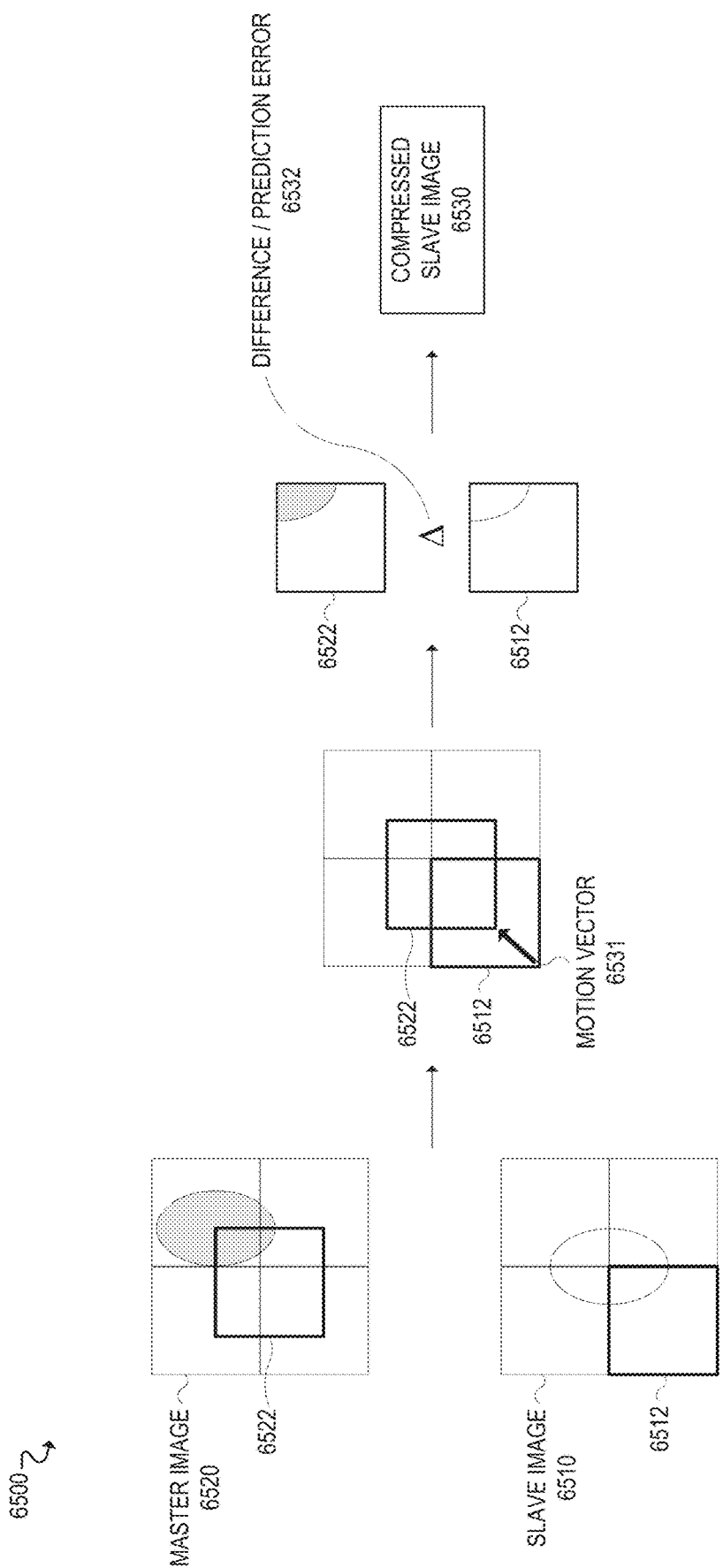
FIG. 65 illustrates an example of inter-frame encoding for context-aware image compression.

FIG. 65 illustrates an example 6500 of inter-frame encoding for context-aware image compression. In the illustrated example, a slave image 6510 is compressed as an inter-frame with reference to a master image 6520 in order to produce a compressed slave image 6530.

In the illustrated example, the slave image 6510 is first divided into multiple blocks, which may be referred to as macroblocks, and each macroblock is then compressed using inter-frame encoding. For simplicity, the illustrated example only depicts the inter-frame encoding process for a single macroblock 6512 of slave image 6510, but the remaining macroblocks of slave image 6510 may be encoded in a similar manner.

Rather than encoding the raw pixel values of slave macroblock 6512, the inter-frame encoding process for slave macroblock 6512 begins by identifying a master image 6520 that contains a similar matching macroblock 6522. In some embodiments, for example, a matching master macroblock 6522 in a corresponding master image 6520 may be identified using context information and/or feature matching algorithms, as described further throughout this disclosure.

The slave macroblock 6512 and corresponding matching master macroblock 6522, however, may be in different positions within their respective image frames 6510, 6520. Accordingly, motion estimation may be performed to identify the relative movement and/or positions of the slave macroblock 6512 and the corresponding matching master macroblock 6522. In some embodiments, for example, a motion vector 6531 may be generated that points to the position of matching master macroblock 6522 in the master image 6520. For example, the motion vector 6531 may start at the position of the slave macroblock 6512 and may end at the corresponding position of the master macroblock 6522.

Further, while the slave macroblock 6512 and the matching master macroblock 6522 may be similar, it is unlikely that they are an exact match. Accordingly, the differences between the slave macroblock 6512 and the matching master macroblock 6522 are computed in order to produce a prediction error 6532.

The slave macroblock 6512 can then be encoded into a compressed format, which may include a reference to the corresponding master image 6520, the motion vector 6531, and the prediction error 6532. The remaining macroblocks of the slave image 6510 may be encoded in a similar manner to produce a compressed slave image 6530.

In this manner, the compressed slave image 6530 can be subsequently decoded to re-produce the original slave image 6510. For example, for each encoded macroblock in the compressed slave image 6530, a master image 6520 can be identified based on the associated master image reference, a corresponding macroblock 6522 in the master image 6520 can be identified based on the associated motion vector 6531, and the raw pixels of the slave macroblock 6512 can then be recovered from the master macroblock 6522 based on the associated prediction error 6532.

The illustrated example of FIG. 65 is merely illustrative of a variety of possible implementations of inter-frame encoding for context-aware image compression. In various embodiments, for example, inter-frame encoding may be performed by dividing a slave image into any number of underlying macroblocks, or alternatively, inter-frame encoding may be performed on a slave image as a whole, among other possible variations.

Privacy/Security

In distributed visual processing systems, it is important to implement effective privacy and security policies to protect sensitive visual data of underlying users or subjects (e.g., images or video with people's faces). Accordingly, in some embodiments, the visual fog architecture described throughout this disclosure may be implemented using a variety of privacy and security safeguards.

In some embodiments, for example, privacy-preserving distributed visual processing may be used in order to schedule or distribute vision workloads across available fog nodes in an efficient manner, while also adhering to any applicable privacy and/or security constraints.

Similarly, a multi-tiered storage approach may be used to store visual data in different locations and/or for different durations of time, depending on the particular level of sensitivity of the data. For example, the cloud may be used for long term storage of less sensitive or high-level visual data or metadata, while edge devices (e.g., on premise gateways) may be used for storage of highly sensitive visual data.

Moreover, certain vision operations may be implemented using privacy-preserving approaches. For example, for some vision applications (e.g., automated demographics identification), feature extraction and recognition may be implemented using cameras and sensors that capture top-down views rather than intrusive frontal views.

As another example, gateway cloud authentication may be used to securely authenticate gateways and/or other fog devices to the cloud using JSON web tokens.

As another example, wallets or distributed keys, along with MESH or GOSSIP based communication protocol, can be used to provide improved and more secure key management solutions.

Stream multiplexing may be used in application layer routing for streaming media, for example, by multiplexing visual sensors over multiple channels and introducing entropy to make channel prediction more difficult. For example, additional security can be provided by introducing entropy and other noise (e.g., chaff signals) designed to complicate channel prediction, thus thwarting efforts of malicious actors to pick up on video feeds.

As another example, a self-sovereign blockchain can be used to provide multi-tenant device identification. For example, the blockchain can be used to handle the orchestration and acceptance of device identities across multiple visual fog networks (e.g., even for legacy systems), thus allowing devices to assert their identity without relying on third party or centralized services. A self-sovereign blockchain can similarly be used for other purposes, such as managing a collection of distributed computing algorithms.

As another example, blockchain lifecycle management (e.g., managing the instantiation and lifecycle of blockchains) can be used to provide an additional level of security on blockchains used in a visual fog architecture. For example, blockchain lifecycle management can be used to ensure that a particular blockchain is implemented correctly and behaves as expected.

As another example, stakeholder management can be used to provide a set of protocols and frameworks to allow self-interests to be asserted, while arbitrating against conflicts in an equitable way.

Figure 40A:
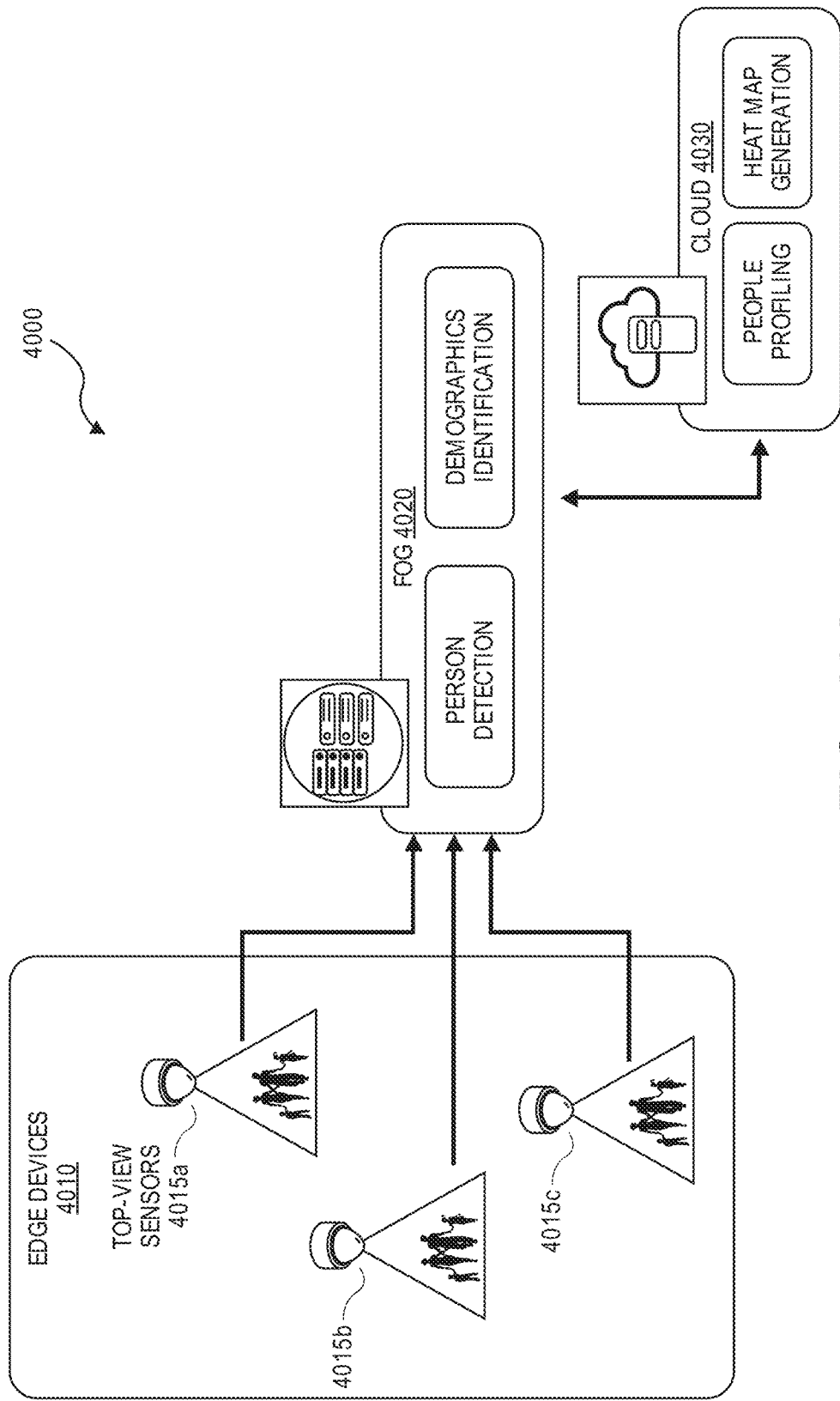
FIGS. 40A-C illustrate an example embodiment of a privacy-preserving demographic identification system.
Figure 40B:
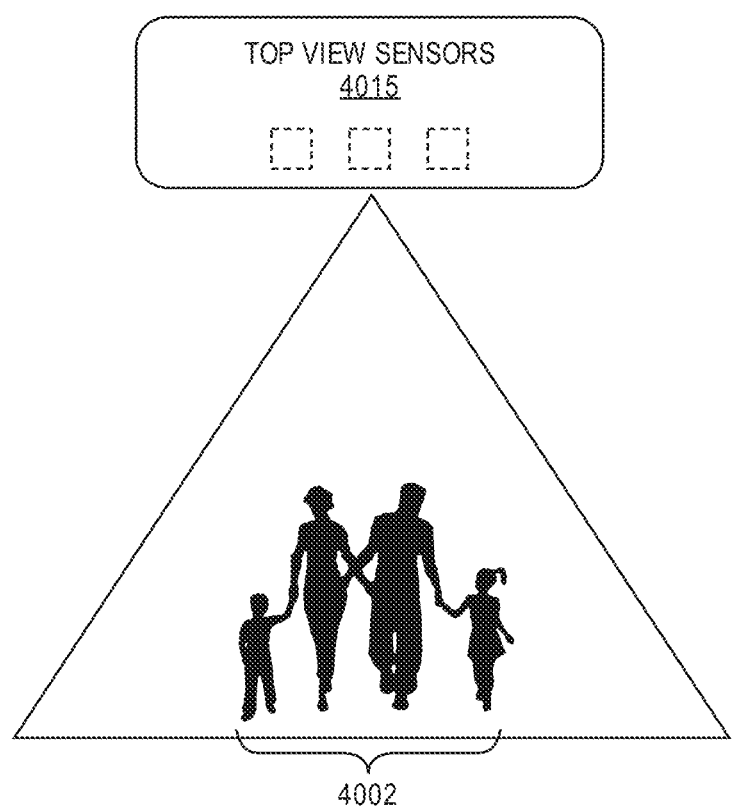
Figure 40C:
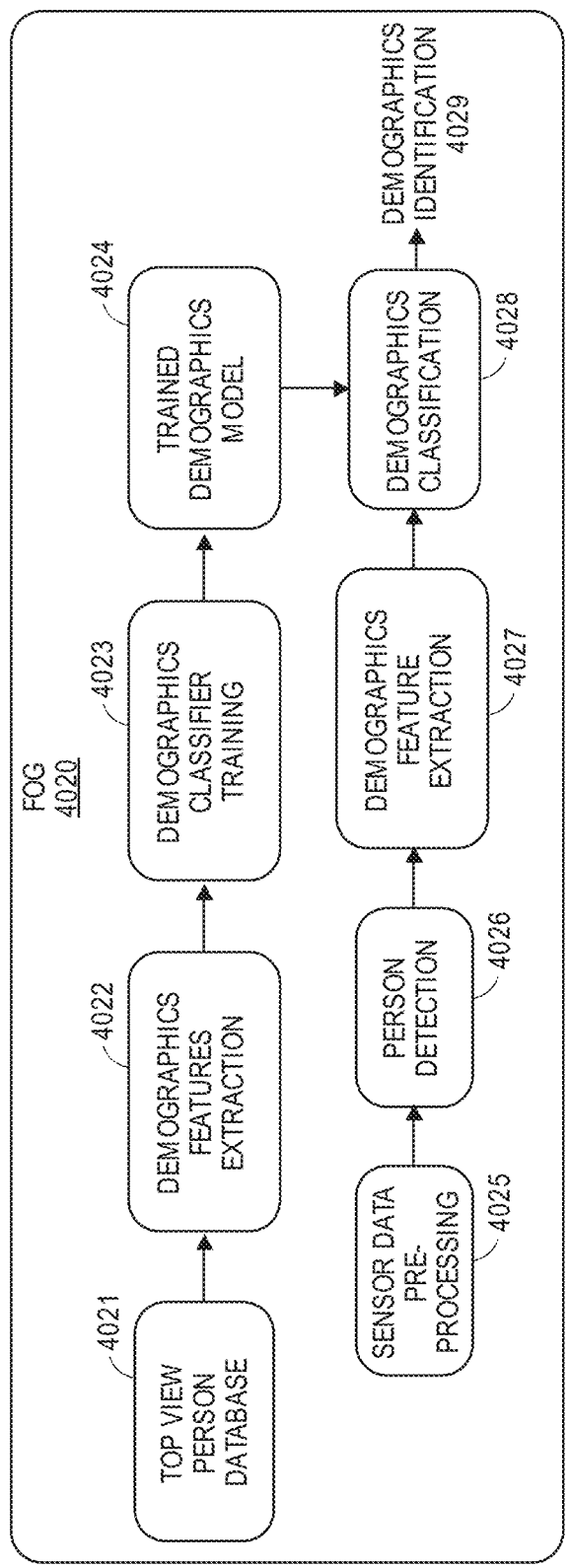

FIGS. 40A-C illustrate an example embodiment of a privacy-preserving demographic identification system 4000. Identifying human demographic attributes (e.g., age, gender, race, and so forth) can be leveraged for a variety of use cases and applications. Example use cases include human-computer interaction, surveillance, business and consumer analytics, and so forth. In retail and healthcare segments, for example, defining a target audience and developing customer profiles has become a critical factor for successful brand strategy development.

In some embodiments, for example, computer vision and/or facial recognition technology may be used to identify human demographics. For example, demographics could be identified based on frontal and/or side facial features extracted using computer vision facial recognition technology. The use of frontal facial recognition technology in public, however, may implicate potential privacy concerns. Moreover, demographic identification is crucial across different domains and should not be limited to only frontal-based sensors and recognition techniques, particularly in the Internet-of-Things (IoT) era, which is projected to have over 20 billion connected devices by year 2020. Further, when limited to frontal-based vision sensors, it may be challenging to develop a demographics identification system that overcomes the person occlusion problem, while also providing wide processing viewing angles.

Accordingly, in the illustrated embodiment of FIGS. 40A-C, privacy-preserving demographic identification system 4000 uses one or more top-view sensors 4015 to identify human demographics. In some embodiments, for example, either a single sensor 4015 or multiple sensors 4015 may be used to capture top-down views of humans, rather than conventional frontal views. Moreover, human demographics may then be identified based on features extracted from the top-down views captured by the sensors 4015. In this manner, the use of top-view sensors 4015 enables human demographics to be automatically identified while preserving privacy, providing wider sensor viewing angles, and reducing susceptibility to occlusion.

FIG. 40A illustrates a high-level implementation of demographic identification system 4000. In the illustrated embodiment, edge devices 4010 include multiple sets of top-view sensors 4015*a-c* that are used for sensing humans. For example, each set of top-view sensors 4015*a-c* may include one or more sensors that are capable of capturing information about their surrounding environment. The information captured by top-view sensors 4015*a-c* is then processed in the fog 4020 to detect humans and identify their demographics. The contextual information extracted by the fog 4020 (e.g., human demographics) may then be transmitted to the cloud 4030 for further analytics, such as people profiling or generating heat maps. Alternatively, or additionally, certain contextual information may be withheld or obfuscated due to users' privacy policies, or if contributed, it may be encrypted to prevent unauthorized disclosures. Function currying may also be used, where the analytics algorithm is distributed and applied at the edge or endpoint and where an analytics result (that aggregates multiple results) is output by the curry function.

FIG. 40B illustrates an example of a set of top-view sensor(s) 4015 associated with demographic identification system 4000 of FIG. 40A. As shown in the illustrated example, top-view sensors 4015 include a collection of one or more sensors positioned above an area that is accessible to humans 4002. In some embodiments, for example, top-view sensors 4015 could be mounted to the ceiling of a retail store near the entrance. Moreover, top-view sensors 4015 can include any type and/or combination of sensor(s), such as a vision camera, infrared camera, light detection and ranging (LiDAR) sensor, and so forth. In this manner, top-view sensors 4015 can be used to capture top-view representations of humans 4002 that pass below the sensors. Moreover, as described further with respect to FIG. 40C, the top-view representations captured by top-view sensors 4015 can then be processed further to identify the demographics of humans 4002 captured by the sensors.

FIG. 40C illustrates an example of the demographics identification process performed by the fog 4020 in demographic identification system 4000 of FIG. 40A. In the illustrated example, the demographics identification process involves (i) training a demographics classification model, and (ii) identifying demographic information using the trained demographics classification model with top-view sensor data as input.

The process of training the demographics classification model is illustrated by blocks 4021-4024. At block 4021, a training database of top-view human data must first be obtained or generated. In some embodiments, for example, the training database may include data captured by top-view sensors 4015, such as camera images, infrared images, point clouds, and so forth. At block 4022, features that are typically representative of human demographics are then selected/trained from the database using feature extraction methodologies, such as principal component analysis (PCA), discrete cosine transforms (DCT), machine learning (e.g., deep learning using a neural network), and so forth. At block 4023, the selected/trained features are then provided as input to a process used to train a demographics classification model. At block 4024, the trained demographics model is then saved in the fog 4020 for subsequent use during the demographics identification process, as described further below.

The process of identifying human demographics is illustrated by blocks 4025-4029. At block 4025, sensor data is captured by edge devices 4010 using one or more top-view sensor(s) 4015, such as a vision camera, infrared camera, LiDAR sensor, and so forth. The raw sensor data (e.g., RGB images, thermal images, point clouds) is then transmitted from the edge 4010 to the fog 4020 in order to perform data pre-processing in the fog 4020 (e.g., on-premises), such as data transformations, de-noising, and so forth. At block 4026, person detection is then performed on the pre-processed input stream. In some embodiments, for example, the pre-processed input stream is analyzed to determine if a person is captured in the underlying visual data. As an example, pre-processed image data from a top-view camera may be analyzed to determine if the image contains a person, and if so, the portion of the image that contains the person may be extracted. At block 4027, features that are typically representative of human demographics are then selected or extracted from the detected person using feature extraction/ machine learning techniques. At block 4028, the extracted features from block 4027 and the pre-trained demographics model from block 4024 are then used by a demographics classifier to classify the demographic attributes of the detected person. At block 4029, demographic information associated with the detected person is then identified based on the output of the demographics classifier. Privacy requirements may cause 4029 demographics information to be separated from 4021 data that associates person data with demographics data. A user-controlled privacy mechanism may authorize the association or linking of person data with demographic data. The original image used to derive person data and demographic data may be hidden from further access so as to prevent subsequent re-derivation of privacy sensitive content/context.

The described embodiments of top-view demographics identification provide numerous advantages. As an example, the described embodiments enable demographic information to be accurately identified based on top-down views of humans captured using a single- or multi-sensor approach. Compared to a frontal view approach, for example, a top-down or aerial perspective provides a wider angle of view for processing, reduces the problem of blocking or occlusion of people captured by the sensors, and preserves depth information associated with people and features captured and processed by the system. In addition, the described embodiments are less privacy-intrusive, as they only capture top views of people rather than other more intrusive views, such as frontal views. The described embodiments also identify demographic information based on permanent or lasting anthropometry features rather than features that may change or vary. Moreover, unlike motion-based detection approaches, the described embodiments are operable using only static views or images and do not require continuous image sequences or videos. Further, the described embodiments can be leveraged for a variety of use cases and applications, including retail, digital surveillance, smart buildings, and/or any other applications involving human sensing, person identification, person re-identification (e.g., detecting/tracking/re-identifying people across multiple monitored areas), and so forth.

Figure 53:
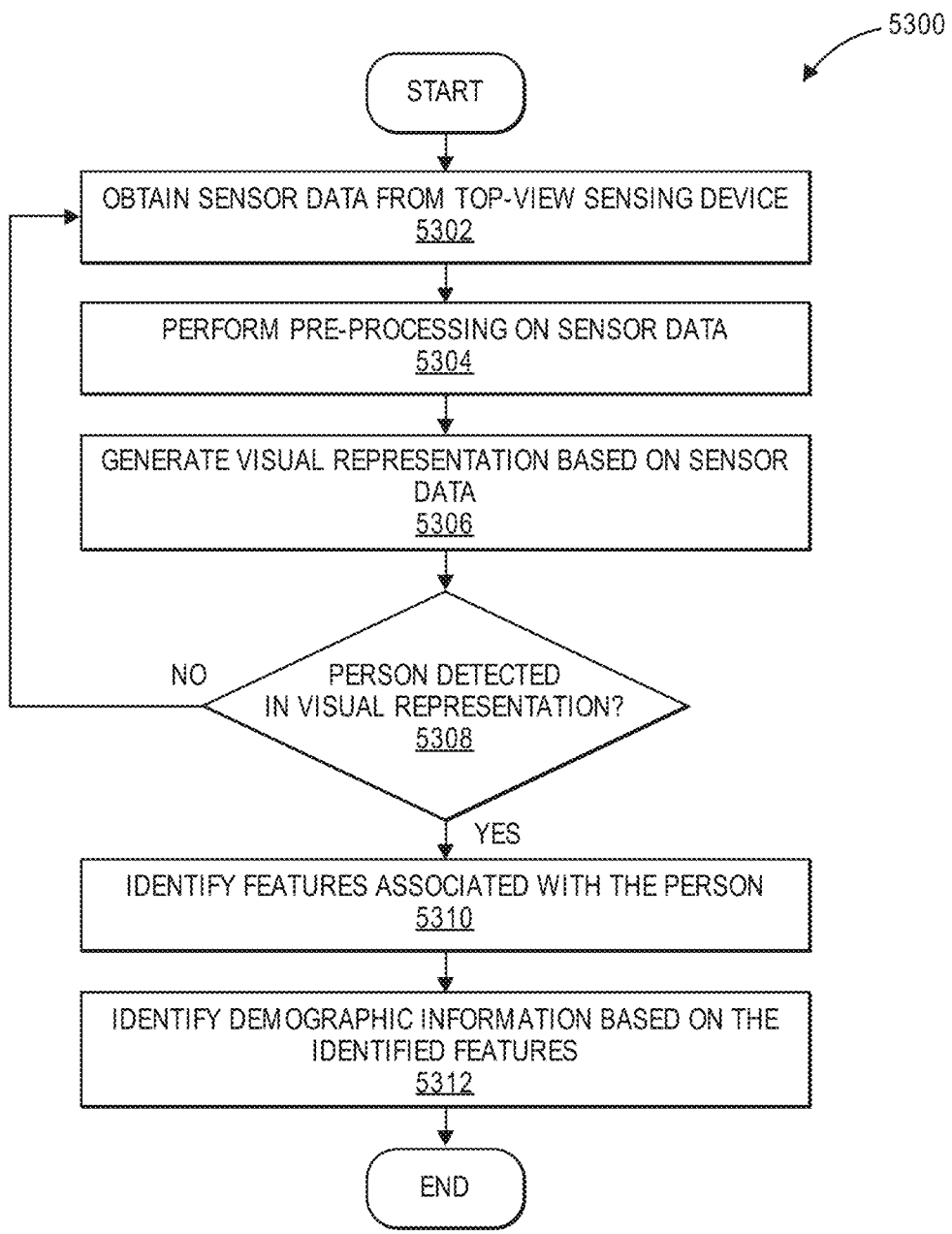
FIG. 53 illustrates a flowchart for an example embodiment of privacy-preserving demographics identification.

FIG. 53 illustrates a flowchart 5300 for an example embodiment of privacy-preserving demographics identification. In some embodiments, for example, flowchart 5300 may be implemented by demographics identification system 4000 of FIGS. 40A-C.

The flowchart may begin at block 5302 by obtaining sensor data from a top-view sensing device. A top-view sensing device, for example, may be used to capture sensor data associated with the environment below the top-view sensing device (e.g., from a top-down perspective). In some embodiments, the top-view sensing device may include a plurality of sensors, including a camera, infrared sensor, heat sensor, laser-based sensor (e.g., LiDAR), and so forth.

The flowchart may then proceed to block 5304 to perform preprocessing on the sensor data, such as data transformations, filtering, noise reduction, and so forth. In some embodiments, for example, the raw sensor data may be transmitted to and/or obtained by a processor that is used to perform the preprocessing. For example, the preprocessing may be performed by an edge processing device at or near the network edge (e.g., near the top-view sensing device), such as an on-premise edge gateway.

The flowchart may then proceed to block 5306 to generate a visual representation of the environment below the top-view sensing device. The visual representation, for example, may be generated using the sensor data captured by the top-view sensing device (e.g., camera images, infrared images, point clouds, and so forth). In some embodiments, for example, the visual representation may be a three-dimensional (3D) representation or mapping of the environment from a top-down perspective. Moreover, in some embodiments, the visual representation may be generated at or near the network edge (e.g., near the top-view sensing device). For example, in some embodiments, an edge processing device (e.g., an on-premise edge gateway) may be used to generate the visual representation.

The flowchart may then proceed to block 5308 to determine whether a person is detected in visual representation.

For example, if a person was located under the top-view sensing device when the sensor data was captured, then the visual representation generated using the sensor data may include a representation of the person from a top-view perspective. Accordingly, the visual representation may be analyzed (e.g., using image processing techniques) to determine whether it contains a person. In some embodiments, for example, the person detection may be performed at or near the network edge (e.g., near the top-view sensing device) by an edge processing device (e.g., an on-premise edge gateway).

If it is determined at block 5308 that a person is NOT detected in the visual representation, the flowchart may proceed back to block 5302 to continue obtaining and processing sensor data until a person is detected.

If it is determined at block 5308 that a person is detected in the visual representation, however, the top-view representation of the person may be extracted from the visual representation, and the flowchart may then proceed to block 5310 to identify one or more features associated with the person. In some embodiments, for example, the top-view representation of the person may be analyzed to identify or extract anthropometric features associated with the person (e.g., features or measurements associated with the size and proportions of the person). For example, in some embodiments, the anthropometric features may be identified by performing feature extraction using an image processing technique, such as a discrete cosine transform (DCT), principal component analysis (PCA), machine learning technique, and so forth. Moreover, in some embodiments, the feature identification or extraction may be performed at or near the network edge (e.g., near the top-view sensing device) by an edge processing device (e.g., an on-premise edge gateway).

The flowchart may then proceed to block 5312 to identify demographic information associated with the person (e.g., age, gender, race) based on the identified features. In some embodiments, for example, a machine learning model may be trained to recognize demographic information based on human anthropometric features. In this manner, the machine learning model can be used to classify the identified features of the person to recognize the associated demographic information.

In some embodiments, the demographics identification may be performed at or near the network edge (e.g., near the top-view sensing device) by an edge processing device (e.g., an on-premise edge gateway). Moreover, in some embodiments, the edge processing device may transmit the demographics information (e.g., using a communication interface) to a cloud processing device to perform further analytics, such as generating a heat map or a people profile.

At this point, the flowchart may be complete. In some embodiments, however, the flowchart may restart and/or certain blocks may be repeated. For example, in some embodiments, the flowchart may restart at block 5302 to continue obtaining and processing sensor data from a top-view sensing device.

Figure 41:
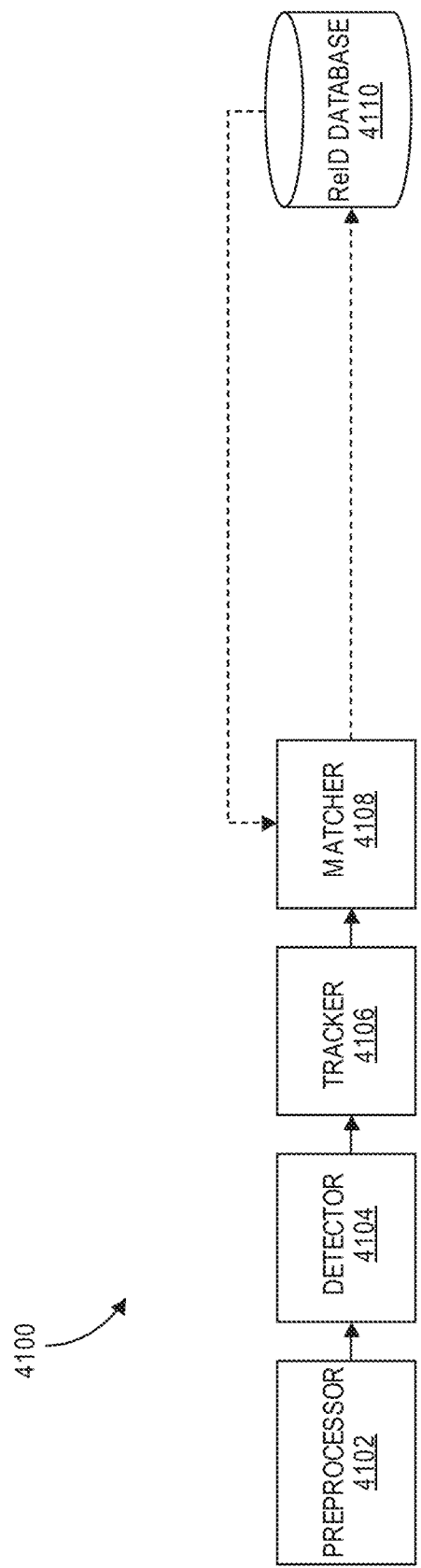
FIGS. 41, 42, and 43 illustrate an example embodiment of privacy-preserving distributed visual data processing.
Figure 42:
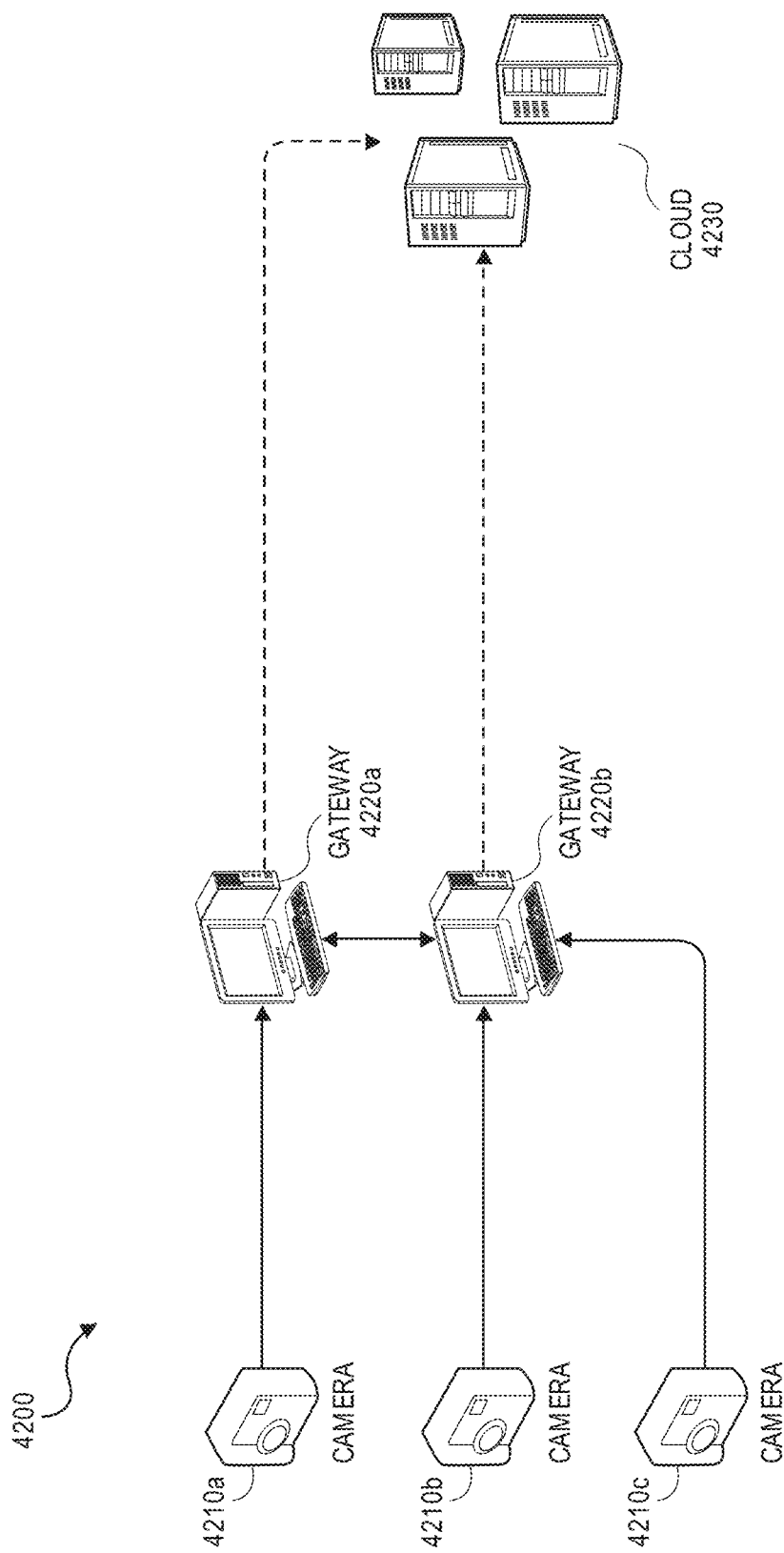
Figure 43:
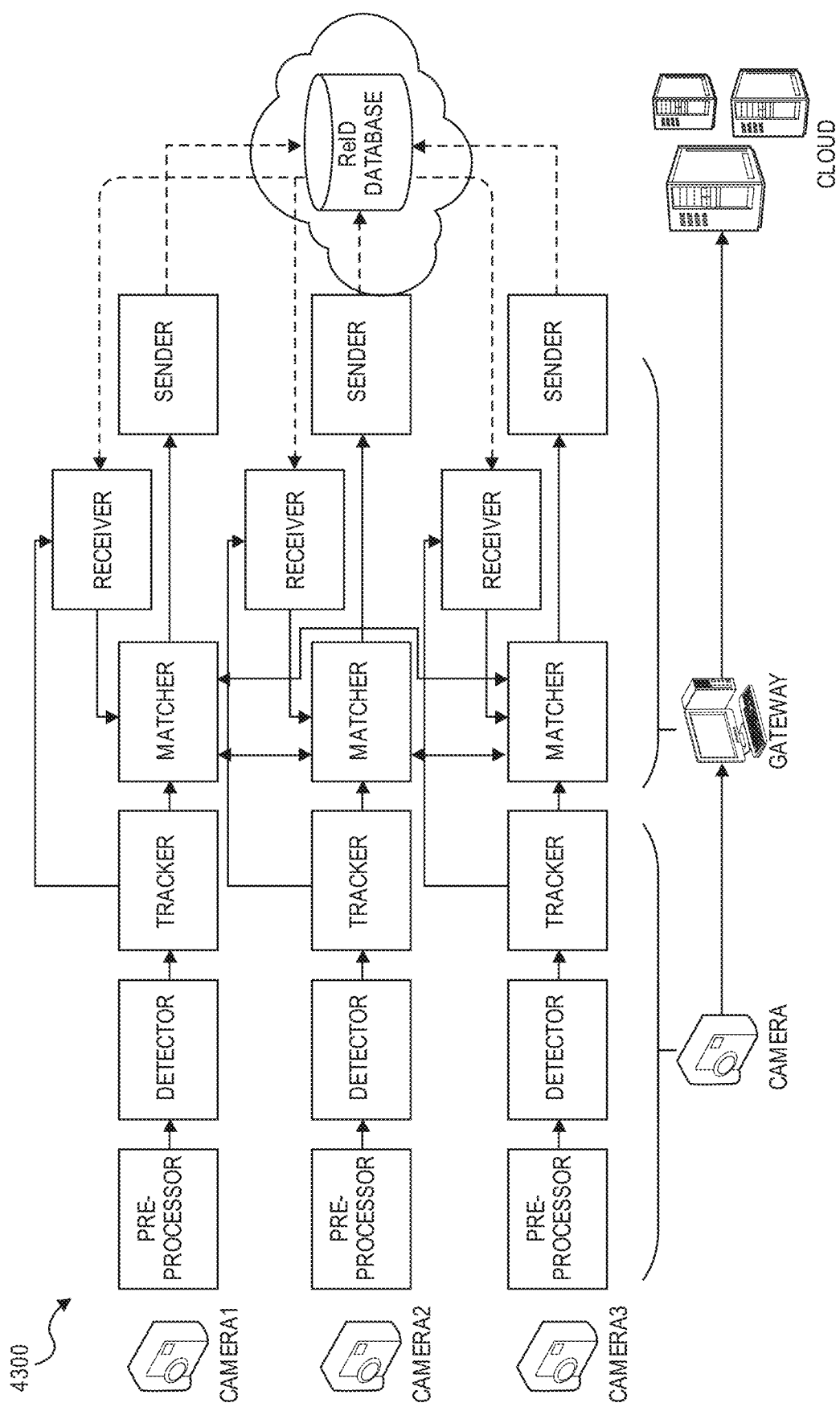

FIGS. 41-43 illustrate an example embodiment of privacy-preserving distributed visual data processing.

In visual computing, multi-target multi-camera tracking (MTMCT) and target re-identification (ReID) are some of the most common workloads across different use cases. MTMCT involves tracking multiple objects across multiple views or cameras, while ReID involves re-identifying an object (e.g., by extracting robust features) even after the object undergoes significant changes in appearance. For example, in retail, MTMCT is often used to track shoppers within a store, while ReID may be used to extract and summarize robust features of shoppers so they can later be re-identified (e.g., using MTMCT) in different circumstances, such as when a shopper has a significant change in appearance or visits a different store.

Currently, there are no coherent end-to-end (E2E) solutions for performing MTMCT and ReID that are scalable to large-scale visual computing systems (e.g., with tens of thousands of camera streams or more). In particular, bandwidth limitations render it challenging to deploy such a system in a conventional cloud computing paradigm where cameras send continuous video streams to the cloud for processing. For example, due to the large volume of video data generated by such systems, it is not feasible to funnel all of that data to the cloud for processing. On the other hand, it is unlikely that edge devices near the source of the video data are capable of processing a complete visual processing workload in real time.

Moreover, privacy is also a challenge in scaling out such a system, as sending visual data to the cloud for processing may implicate privacy concerns. For example, in order to preserve customer privacy, many retailers will not allow any video or images to be transmitted out of their stores, or they may surrender original images of customers and retain only uncorrelated demographics or person data. In some cases, customer consent may be required before a store is authorized to link specific customer data with its associated demographics.

Accordingly, FIGS. 41-43 illustrate an embodiment that solves the problem of scaling out visual computing systems with MTMCT and ReID capabilities in a privacy-preserving manner. The illustrated embodiment presents an edge-to-edge (E2E) architecture for performing MTMCT and ReID across edge devices, gateways, and the cloud. The architecture is scalable and privacy-preserving, and can be easily generalized to many vertical applications or use cases, such as shopper insights in retail, people searching in digital security and surveillance, player tracking and replays in sports, and so forth.

In some embodiments, for example, vision workloads may be scheduled and executed across visual fog nodes based on specified privacy constraints. As an example, privacy constraints for an MTMCT and/or ReID workload may require tasks that output pictures with faces to remain on-premises (e.g., neither the tasks nor their output are assigned or transmitted beyond the premise or to the cloud), be anonymized (e.g., face-blurred), and/or be deployed only on devices with enhanced link security.

In some embodiments, for example, rather than funneling every bit of visual data to the cloud for processing, intelligent decisions can be made regarding how visual data and workloads are processed and distributed across a visual computing system. Based on the privacy requirements of a particular visual application, for example, a privacy boundary can be defined within the end-to-end paradigm of a visual computing system in order to achieve performance efficiency while also preserving privacy.

In some embodiments, for example, job partitioning can be used to partition a visual analytics workload into a directed acrylic graph (DAG) with vertices that represent primitive visual operations and edges that represent their dependencies. In this manner, the graph can be used to represent the various tasks and associated dependencies for a particular workload. Moreover, a privacy policy can be defined separately for each dependency. Similarly, a device connectivity graph can be used to represent the various devices and their connectivity in the edge-to-cloud paradigm, and a privacy level agreement (PLA) can be established for each edge of connectivity in the graph. In this manner, the edge-to-cloud architecture can be implemented to include a coherent management interface that performs end-to-end workload distribution without compromising privacy. For example, using the job partitioning approach described above, workload distribution effectively becomes a mapping problem of assigning the tasks of a workload onto devices in the edge-to-cloud paradigm. In some embodiments, for example, a global scheduler can be used to determine an optimal mapping between tasks and devices in order to maximize performance while preserving privacy constraints.

In some cases, a PLA may be similar to an SLA agreement that considers users' privacy profiles and a willingness on behalf of the store to provide privacy preserving functionality. Visual Fog devices, sensors, and gateways may further implement a PLA policy using hardened mechanisms wherein a trusted execution environment (TEE) such as Intel SGX or ARM TrustZone establishes a tamper-resistant environment that enforces the PLA policy.

FIG. 41 illustrates an example visual workload graph 4100 for performing MTMCT and ReID. Example workload 4100 includes a plurality of tasks, including preprocessing 4102, detection 4104, tracking 4106, matching 4108, and database access 4110. Further, the dependencies between these various tasks are represented by the solid and dotted lines in the illustrated example. Moreover, the solid lines represent unrestricted access or transmission of the original visual data, while the dotted lines represent restricted or privacy-preserving access or transmission (e.g., transmitting only visual metadata, such as feature vectors). In this manner, a privacy policy can be defined for the workload, for example, by specifying whether each task has unrestricted access or restricted access to the original visual data.

FIG. 42 illustrates an example of an edge-to-cloud device connectivity graph 4200. In the illustrated example, graph 4200 illustrates the connectivity between various devices of a 3-tier edge-to-cloud network, which includes cameras 4210a-c, gateways 4220a-b, and the cloud 4230. In particular, the device connectivity is illustrated for both edge-to-cloud communications (e.g., camera to gateway to cloud) as well as peer-to-peer communications (e.g., gateway-to-gateway). Moreover, the connectivity between the respective devices is represented using solid and dotted lines. For example, the solid lines represent high-security connectivity links, while the dotted lines represent limited-security connectivity links. In this manner, a privacy policy or privacy level agreement (PLA) can be defined for an edge-to-cloud paradigm, for example, by specifying the requisite security for each edge of connectivity in the graph.

FIG. 43 illustrates a privacy-preserving workload deployment 4300. In particular, workload deployment 4300 illustrates an example deployment of the workload 4100 of FIG. 41 on edge-to-cloud network 4200 of FIG. 42.

In the illustrated example, privacy is treated as an explicit constraint when performing task-to-device mapping to deploy the workload. In some embodiments, for example, workloads can be represented in linear forms to enable the mapping problem to be solved efficiently using state of the art integer linear programming (ILP) solvers.

In some embodiments, for example, when scheduling a particular workload on an edge-to-cloud network, the workload and the edge-to-cloud network may each be represented using a graph, such as a directed acyclic graph (DAG). For example, the workload and its underlying tasks may be represented by a workload or task dependency graph $G_T=$ $(V_T, E_T)$, where each vertex $v \in V_T$ represents a task, and each edge $(u, v) \in E_T$ represents a dependency between task u and task v. Similarly, the edge-to-cloud network may be represented by a network or device connectivity graph $G_D=(V_D, E_D)$, where each vertex $v \in V_D$ represents a device in the network, and each edge $(u, v) \in E_D$ represents the connectivity from device u to device v.

Moreover, the privacy policy (PP) for each task dependency in the workload graph may be defined using a PP function p: $E_T \rightarrow \mathbb{N}$, such that the smaller the number ($\mathbb{N}$), the more vulnerable the data transmission. Similarly, the privacy level agreement (PLA) for each connectivity link in the device connectivity graph may be defined using a PLA function s: $E_D \rightarrow \mathbb{N}$, such that the smaller the number ($\mathbb{N}$), the more secure the link.

In this manner, based on the privacy policy (PP) and privacy level agreement (PLA) functions, a privacy constraint (PC) can be defined as $s(d) \leq p(e)$, $\forall e \in E_T$, $d \in f(e)$, where f: $E_T \rightarrow x_{i=0}^k E_D$ is the mapping function from a particular workload to the edge-to-cloud paradigm. Essentially, f maps an edge in a workload graph to a path in an edge-to-cloud connectivity graph. For example, in the context of visual fog computing, f is a scheduling function that determines the particular fog devices that the tasks of a workload should be assigned to, along with the particular network connectivity links between pairs of fog devices that should be used for the data transmissions. Accordingly, the above privacy constraint (PC) requires the privacy level agreement (PLA) of a particular connectivity link to be capable of accommodating the privacy policy (PP) of a particular data transmission sent over that connectivity link. For example, in some embodiments, a data transmission of PP level 1 (unrestricted access) can only map to a link of PLA level 1 (high security), while a data transmission of PP level 2 (privacy-preserving) can map to connectivity links of PLA level 1 (high security) and PLA level 2 (limited security).

Moreover, in some embodiments, a visual fog schedule that adheres to the above privacy constraint (PC) can be determined using integer linear programming (ILP). Integer linear programming (ILP) is a mathematical optimization or feasibility technique for solving or optimizing a mathematical model represented by linear relationships. In particular, ILP can be used to optimize a linear objective function, subject to additional linear equality and linear inequality constraints. In some cases, for example, an ILP problem can be expressed as follows:

| minimize: | $c^T x$ | (objective term) |
|---|---|---|
| subject to: | $Ax \leq b$ | (inequality constraint) |
|  | $Cx = d$ | (equality constraint) |
| and: | $x \in \{0, 1\}^K$ | (binary constraint). |

Moreover, this ILP model can be used to determine an optimal schedule f that satisfies a specified objective (e.g., total network utilization), while also adhering to other additional constraints, such as a privacy constraint and any other device, network, or mapping constraints. For example, when using the example ILP model above to perform visual fog scheduling, x presents the collection of possible schedules f, K is the length of x, the objective term presents a scheduling objective to be minimized (e.g., total network utilization), and the inequality/equality constraints present any additional constraints, such as device, network, mapping, and/or privacy constraints. The above privacy constraint (PC), for example, can be presented as an inequality constraint of the ILP problem.

Figure 54:
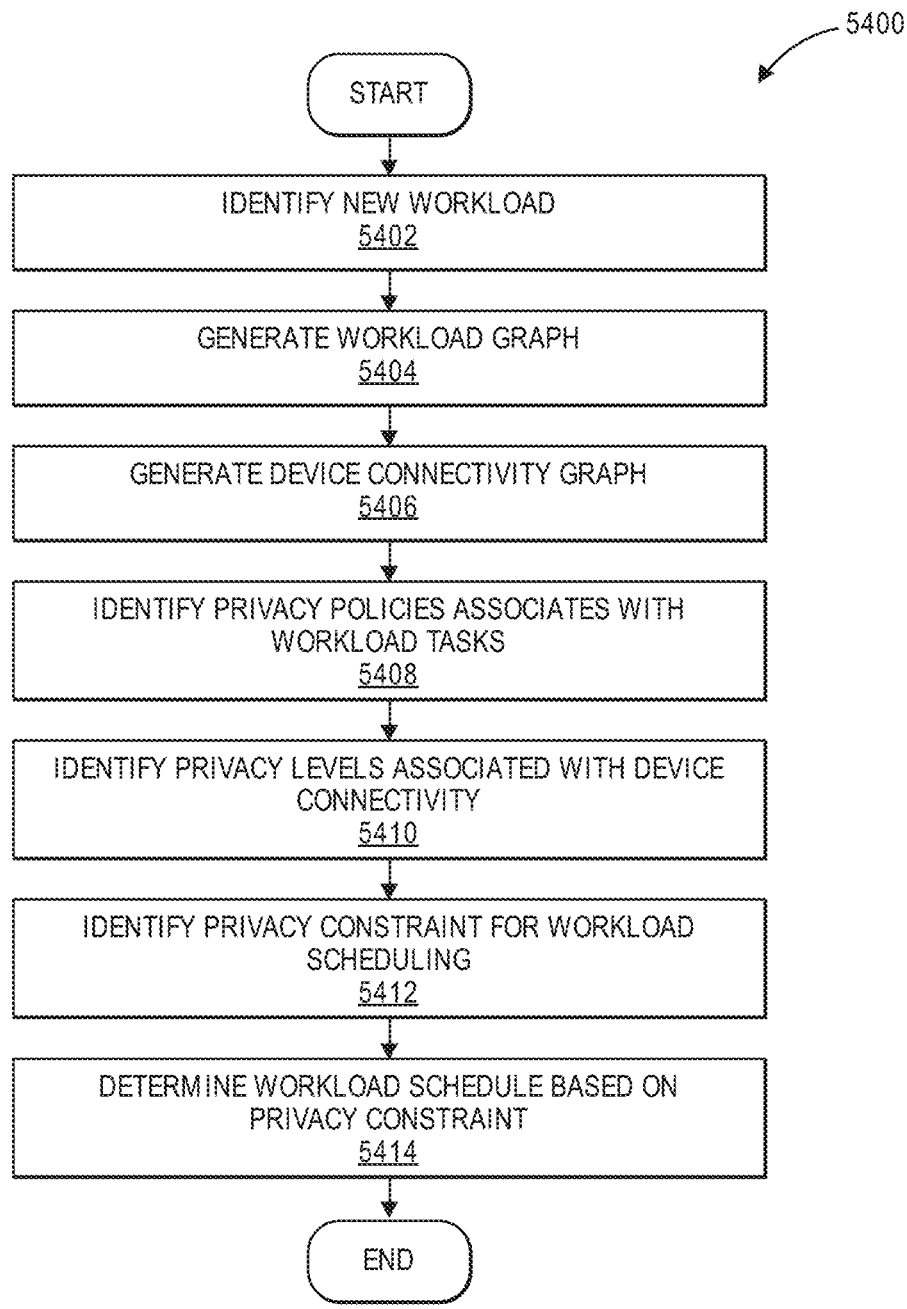
FIG. 54 illustrates a flowchart for an example embodiment of privacy-preserving distributed visual processing.

FIG. 54 illustrates a flowchart 5400 for an example embodiment of privacy-preserving distributed visual processing. In some embodiments, for example, flowchart 5400 may be implemented using the visual computing embodiments described throughout this disclosure (e.g., the privacy-preserving distributed visual processing techniques of FIGS. 41-43 and/or the visual computing architecture described throughout this disclosure).

The flowchart may begin at block 5402 by identifying a new workload. In some embodiments, for example, the new workload may include a plurality of tasks associated with processing sensor data captured by one or more sensors. For example, in some embodiments, the sensor data may be visual data captured by one or more vision-based sensors (e.g., a camera, infrared sensor, and/or laser-based sensor).

The flowchart may then proceed to block 5404 to generate a workload graph based on the workload. In some embodiments, for example, the workload graph may include information associated with the underlying tasks of the workload, along with the task dependencies among those tasks.

The flowchart may then proceed to block 5406 to generate or identify a device connectivity graph. In some embodiments, for example, the device connectivity graph may include device connectivity information associated with a plurality of processing devices, such as edge, cloud, and/or intermediary network processing devices. The device connectivity information, for example, may include information associated with the device connectivity links among the plurality of processing devices.

The flowchart may then proceed to block 5408 to identify a privacy policy associated with the workload and/or its underlying tasks. In some embodiments, for example, the privacy policy may comprise privacy requirements associated with the task dependencies among the workload tasks.

The flowchart may then proceed to block 5410 to identify privacy level information associated with the plurality of processing devices. In some embodiments, for example, the privacy level information may include privacy levels provided by the device connectivity links among the plurality of processing devices. Moreover, in some embodiments, the privacy level information may be specified by a privacy level agreement.

The flowchart may then proceed to block 5412 to identify a privacy constraint for workload scheduling based on the privacy policy and the privacy level information. In some embodiments, for example, the privacy constraint may require the privacy level of a particular connectivity link to be capable of accommodating the privacy policy of any task dependency mapped to that connectivity link for data transmission.

The flowchart may then proceed to block 5414 to determine a workload schedule. The workload schedule, for example, may include a mapping of the workload onto the plurality of processing devices. Moreover, in some embodiments, the workload schedule may be determined based on the privacy constraint, the workload graph, and the device connectivity graph. For example, in some embodiments, the workload schedule may be determined by solving an integer linear programming model based on the privacy constraint, the workload graph, and the device connectivity graph (e.g., as described in connection with FIGS. 41-43). In this manner, a resulting workload schedule is determined in a manner that adheres to the privacy constraint. In some cases, the privacy constraint may require disassociation of the sensed or inferred content (such as demographic data, user data, or other context) from the workload graph, device connectivity graph, workload schedule, and/or other component of the sensor network operation. Furthermore, the workload schedule may employ curry functions wherein a privacy constraint may direct the scheduling function to perform an analytics function locally (avoiding distribution of potentially privacy sensitive data to an aggregation and analytics node that may be under the control of an untrusted party). Moreover, in some embodiments, a machine learning model may be used to optimize privacy-constrained workload scheduling.

In some embodiments, the resulting workload schedule may then be distributed to the plurality of processing devices (e.g., via a communication interface) in order to execute the workload.

At this point, the flowchart may be complete. In some embodiments, however, the flowchart may restart and/or certain blocks may be repeated. For example, in some embodiments, the flowchart may restart at block 5402 to continue scheduling new workloads.

Figure 44:
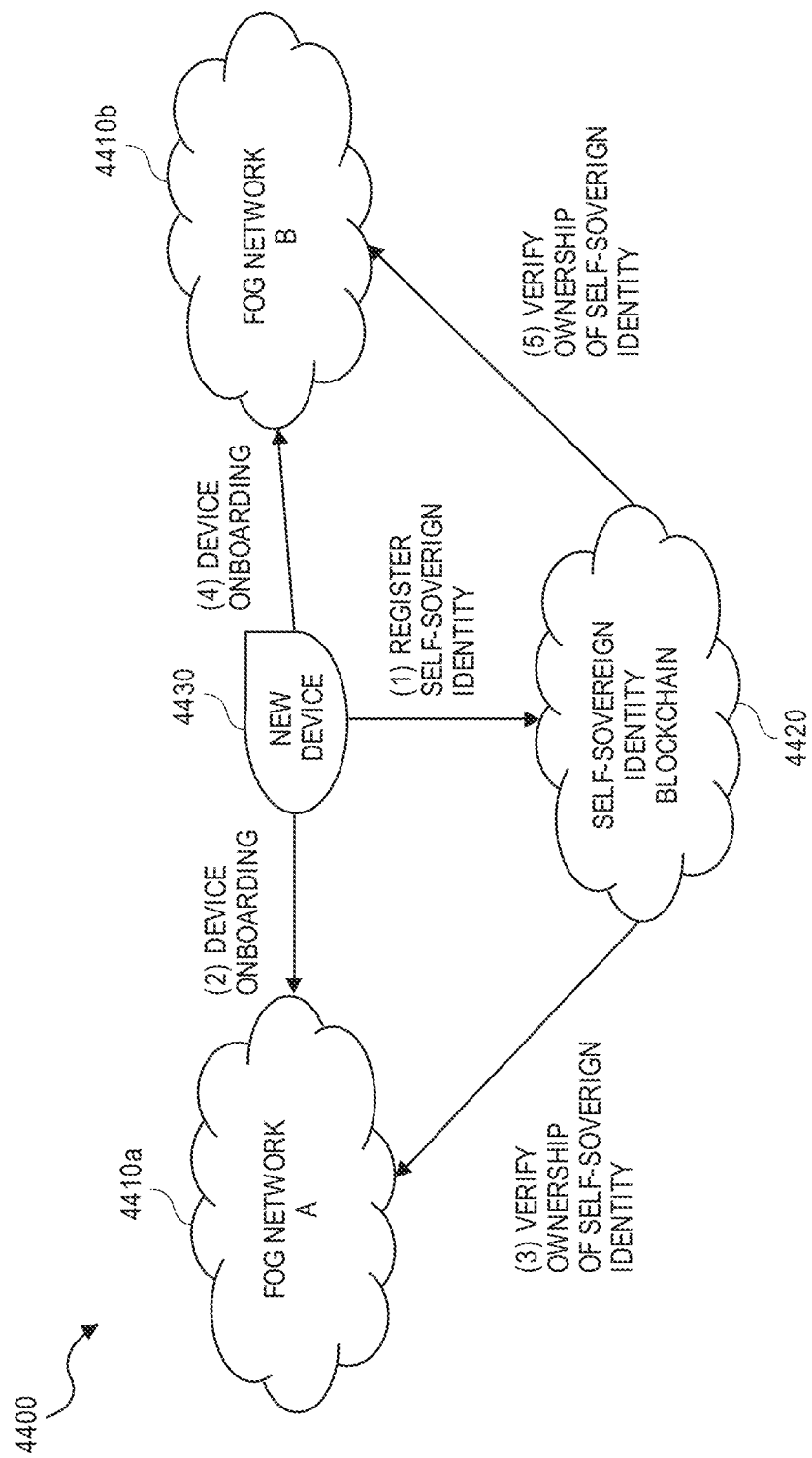
FIGS. 44, 45, and 46 illustrate example embodiments of self-sovereign device identification for distributed computing networks.
Figure 45:
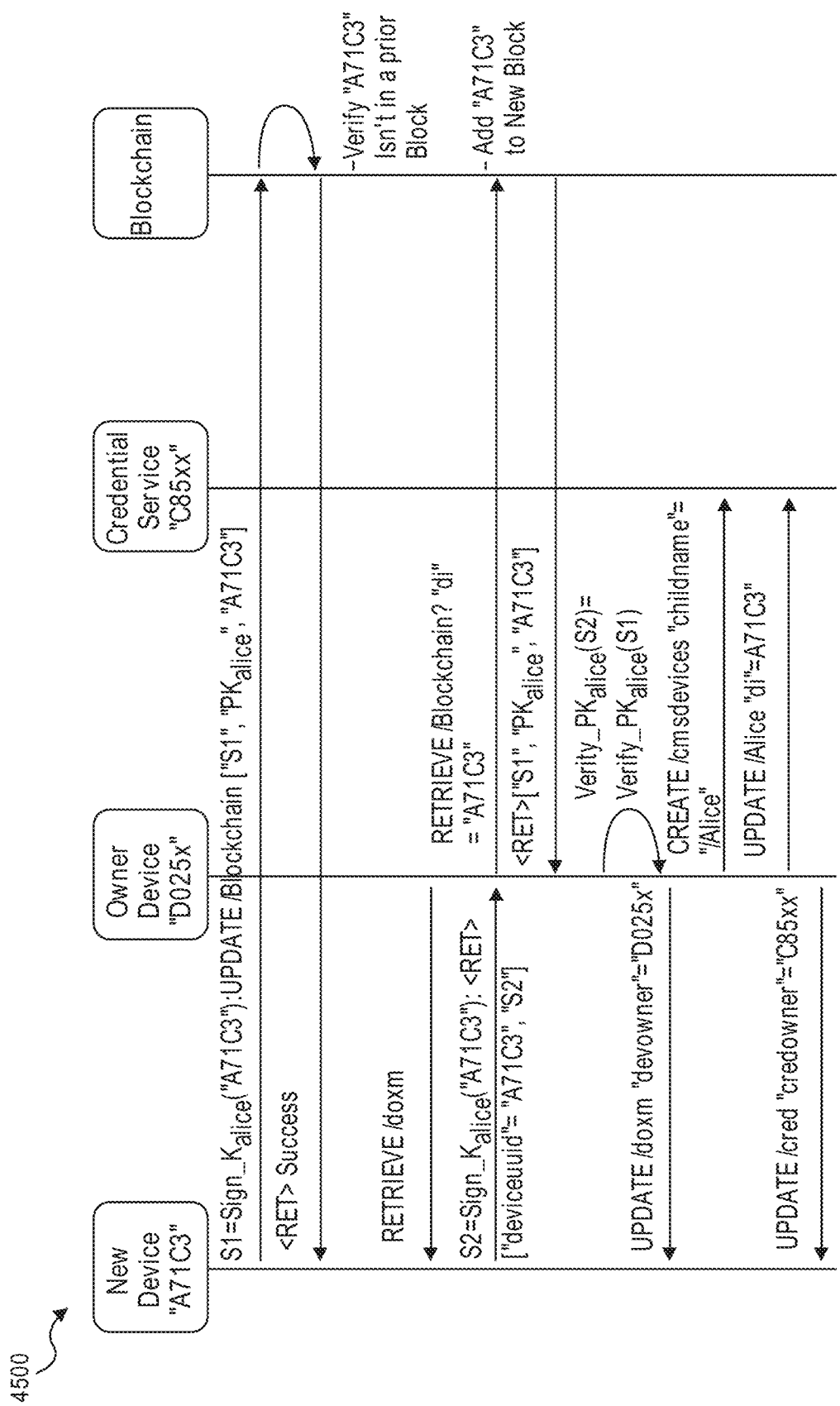
Figure 46:
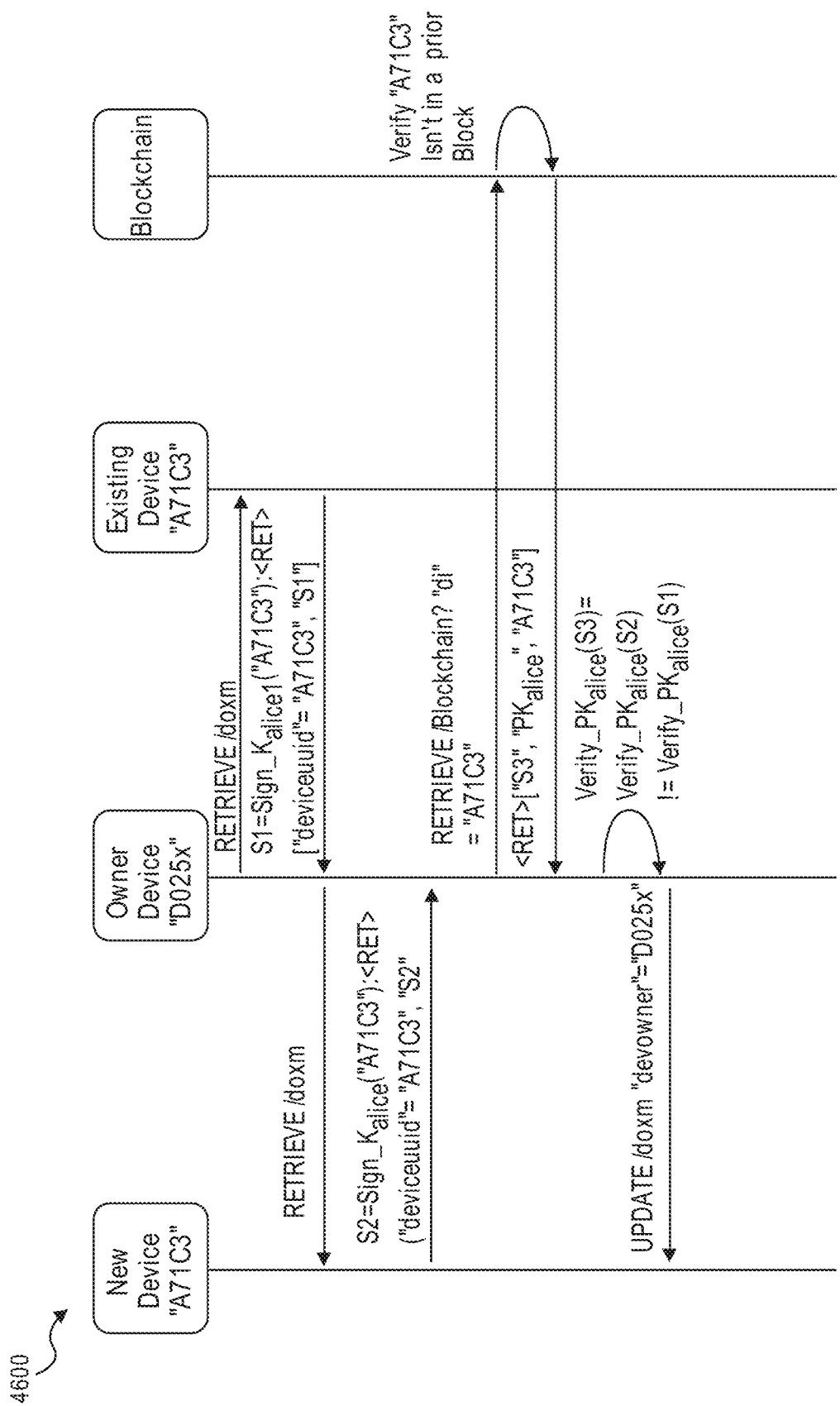

FIGS. 44-46 illustrate example embodiments of self-sovereign device identification for distributed computing networks. In some embodiments, for example, a fog node (e.g., IoT sensor, actuator, camera, controller, gateway, and/or any other type of fog node) may be a "multi-tenant" node that is capable of participating in multiple different distributed computing networks (e.g., visual fog networks). In some embodiments, multi-tenant processing may involve use of a tenant isolation technology, such as a Trusted Execution Environment (TEE) (e.g., Intel SGX or ARM TrustZone). Additionally, tenant isolation may be achieved using operating system-imposed resource restrictions, namespace restrictions, and/or process access controls, otherwise known as "containers." Tenant isolation may further be achieved using virtualization, where a first VM isolates a first tenant from a second tenant of a second VM.

Further, certain networks may require a new fog node to be "onboarded" or "commissioned" before the fog node is allowed to access each network (e.g., using the onboarding/commissioning protocols of the Open Connectivity Foundation (OCF) and/or Intel's Secure Device Onboard (SDO) technology). Many visual computing solutions, however, may assume that ownership of a node is singular, meaning each node has only one owner. Accordingly, ownership disputes may arise from a multi-tenant fog node's participation in multiple fog networks. The true or original owner of a multi-tenant fog node, however, has an interest in avoiding these ownership disputes. Accordingly, many visual computing solutions are unsuitable for multi-tenant fog nodes, which may participate in multiple fog networks while also abiding by each network's onboarding or commissioning protocols (e.g., as defined by OCF or Intel SDO).

Accordingly, in the illustrated embodiments, a multi-tenant fog node can use a self-sovereign device identity in order to allow the node owner to retain an assertion of ownership even when the fog node participates in, or roams to, other fog networks. In some embodiments, for example, a self-sovereign identity blockchain may be used to register the identities of fog nodes or devices. A blockchain, for example, may be a dynamic list of records or blocks that are linked and/or secured using cryptographic approaches. In some embodiments, for example, each block in a blockchain may include a hash pointer linking to a previous block, a timestamp, transaction data, and so forth. Accordingly, in some embodiments, a blockchain can be used as a distributed ledger for recording transactions in an efficient, verifiable, and/or permanent manner. In visual computing, for example, before adding a device identifier for a new fog node, a blockchain may optionally be used to verify that the identifier has not been previously asserted by another node. Further, the public key used to verify the device identity of the fog node may also be contributed to the blockchain, allowing the device to later prove it is the rightful owner of its identity.

FIG. 44 illustrates an example embodiment of a distributed computing architecture 4400 with multi-tenant device identification. In the illustrated embodiment, architecture 4400 includes fog networks A and B 4410a-b, self-sovereign identity blockchain 4420, and new fog device 4430, as described further below.

A new fog device 4430 that is seeking to be used in multiple fog networks 4410, but is not exclusive to any particular fog network, may not have sufficient resources or capabilities to create and maintain virtual sandbox environments for each of the fog networks. Moreover, each fog network 4410 may have a large set of its own local fog devices that are exclusive to that network and do not roam into other fog networks. Accordingly, reusing device identifiers may not pose a significant problem of duplicative identifiers until a new device 4430 with a conflicting identity roams into a particular fog network.

There is often a cost associated with changing the identity of a device, however, as credentials, access tokens, and application logic may be linked to the device identity. Moreover, the respective owners of devices with conflicting identifies have a self-interest in resolving the conflict (e.g., to avoid ownership disputes), but without bearing the cost. For example, the conflicting devices may respectively view each other as "foreign," and thus each device may want the other "foreign" device to bear the cost of an identity change. Accordingly, to resolve the opposing self-interests of devices with conflicting identities, a blockchain 4420 may be used to provide a fair algorithm for giving preference to a device for its use of an identity. In some embodiments, for example, the device that first registered a particular identity with the blockchain 4420 is given preference in the event of a conflict.

FIG. 45 illustrates an example call flow 4500 for performing name registration of a self-sovereign device identity. In some embodiments, for example, registration of a self-sovereign device identity may be performed before onboarding a new fog device onto a visual fog network. For example, prior to being on-boarded onto a visual fog network, a fog device may register its choice of device identity with a blockchain.

Moreover, the blockchain may have a policy for preventing duplicative identity registrations, for example, by first checking for duplicates and only allowing registration if no duplicates exist. For example, duplicative identity detection may be performed by blockchain processing nodes as a requirement for vetting transaction blocks used for identity registration. In the illustrated call flow 4500, for example, each node performs the following steps:

(1) receive transaction request from new device: $TX_{n+1}=\{S1, \text{"A71C3"}\}$, where $S1=\text{Sign\_K}_{alice}(\text{"A71C3"})$;

(2) compute hash $H1=\text{SHA256}(\text{"A71C3"})$;

(3) search hash tree of transaction attributes, where $B_{x\text{-}poss}=\text{Search}(\text{TxTree}, H1)$;

(4) IF $B_{x\text{-}poss}=\text{"H1"}$ THEN return ERROR_DUP_FOUND;

(5) ELSE IF $B_{x\text{-}poss}=\text{" "}$ THEN add $TX_{n+1}$ to the current block where $\text{CurrentBlock}=[TX_{n+1}, TX_n, T_{n-1}, \ldots, TX_{n-m}]$;

(6) compute new current block hash $BH=\text{SHA256}([TX_{n+1}, TX_n, TX_{n-1}, \ldots, TX_{n-m}])$;

(7) write BH to the blockchain at $B_{curr\text{-}pos}$ (current position); and (8) insert the tuple (H1, BH, $B_{x\text{-}poss}$) into TxTree.

In some embodiments, however, a less restrictive policy may be used, such as a policy that does not check for duplicates during identity or name registration, and instead relies on dispute resolution to resolve duplicative identities. For example, at the time a device is on-boarded onto a new fog network, the blockchain can be consulted to determine if the identifier has previously been used, and if so, conflict resolution can be performed. The advantages of a less restrictive policy include improved performance and the ability to support mass registration workloads, among other examples.

FIG. 46 illustrates an example call flow 4600 for conflict resolution of self-sovereign device identities. In some circumstances, for example, it may be unnecessary to verify that a new device identifier is globally unique at the time of registration, and instead, conflicting identities may be addressed when a new device is on-boarded onto a local fog network and an existing device already has the same identity. For example, privacy goals may be achieved by using non-global identifiers and by switching identifiers when interactions involve an entity from a foreign network. Achieving privacy goals may result in more frequent device ID collisions that are resolved dynamically (rather than a strategy that involves manufacturers supplying globally unique IDs that subsequently may be used to cross-correlate a diverse set of transactions occurring on multiple networks and involving multiple owners and users).

Figure 47:
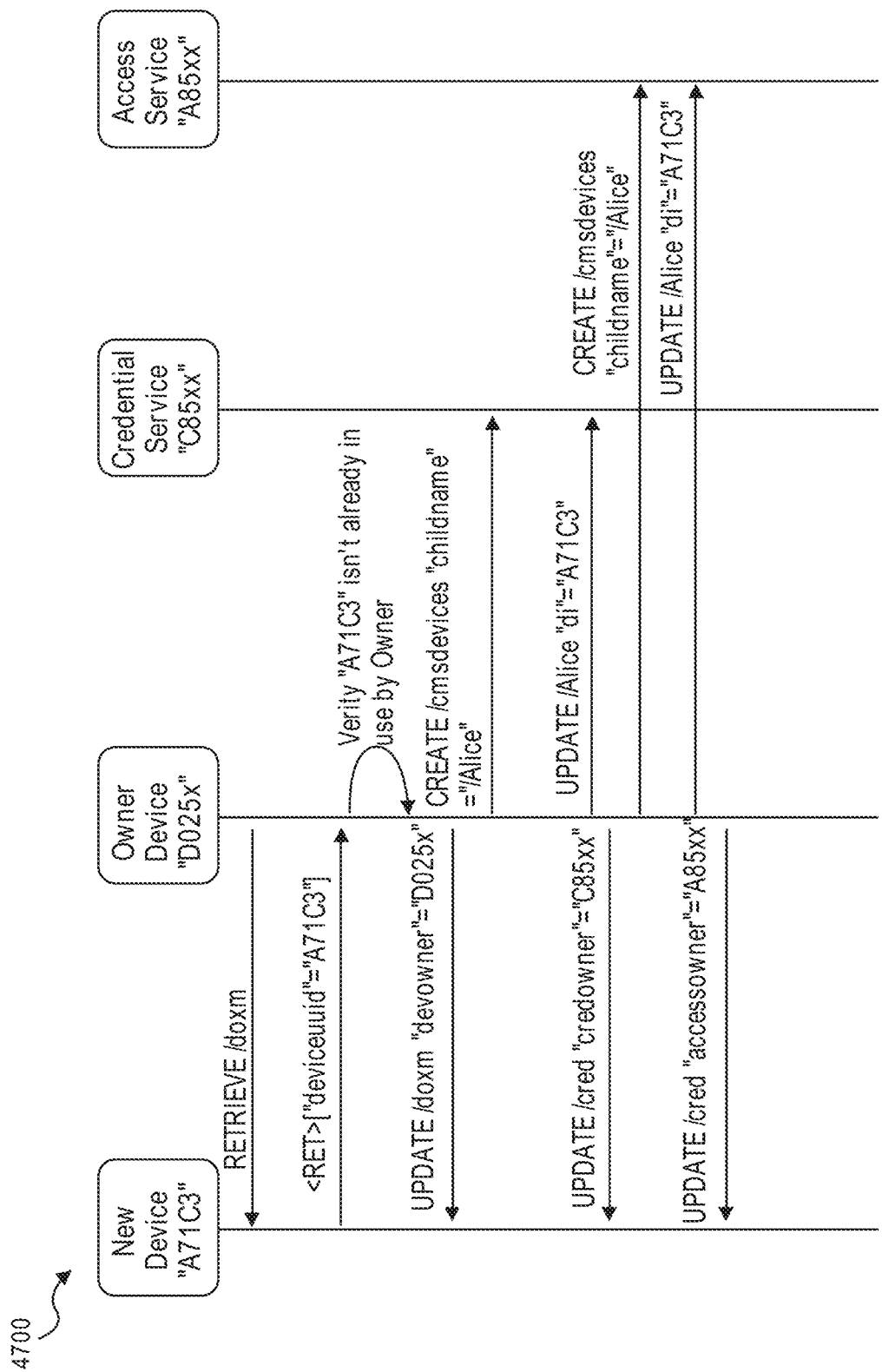
FIG. 47 illustrates an example of device onboarding/commissioning in a visual fog network without conflict resolution.

Accordingly, in some embodiments, conflicting device identities on a particular fog network may be resolved using conflict resolution call flow 4600. In the illustrated call flow 4600, for example, a blockchain is used to resolve conflicts based on identity registration priority (e.g., the first device that registered a duplicative identity with the blockchain receives preference). Accordingly, this approach does not require device identifiers to be globally unique, but in the event multiple devices on the same fog network have the same identity, it requires one of the devices to select a different identifier when interacting with that particular network. Moreover, the dispute over which device should pay the cost of changing its identity is resolved using the blockchain. By way of comparison, FIG. 47 illustrates an example of device onboarding or commissioning in a visual fog network without employing conflict resolution.

In this manner, based on the illustrated embodiments of FIGS. 44-46, device identity assertion can be performed at any time during manufacturing of a device, such as a system-on-a-chip (SoC) or any other type of computing chip, circuit, or device. Moreover, rather than an assertion of device "ownership," device identity assertion involves an assertion of identity ownership, where the device is the owner of the identity. Accordingly, any appropriate entity within the supply chain of a particular device (e.g., an original design manufacturer (ODM), original equipment manufacturer (OEM), distributor, retailer, value-added reseller (VAR), installer, or end customer) may assert the identity of a device based on the sophistication and capability of the particular entity.

Figure 48:
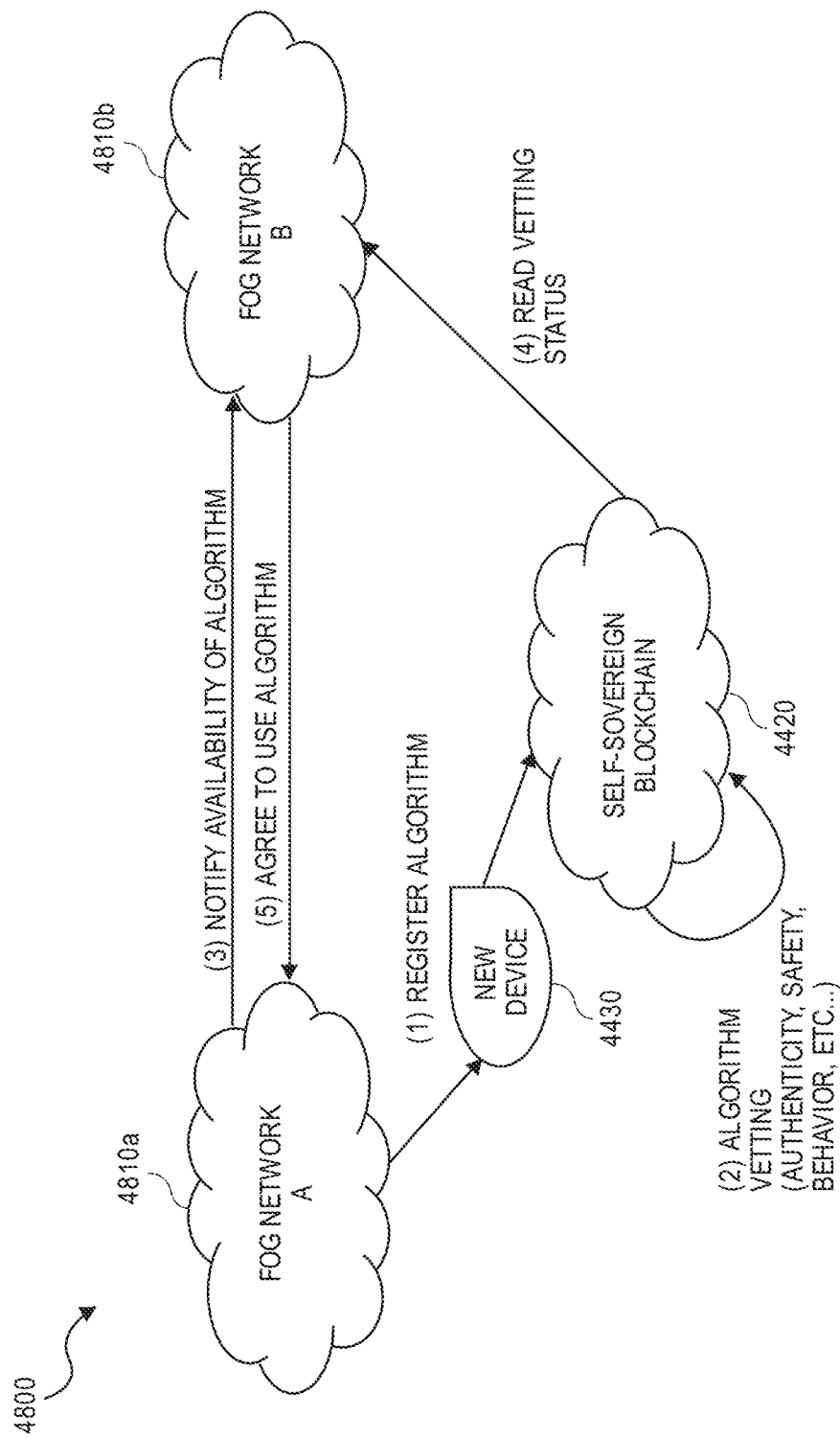
FIGS. 48 and 49 illustrate example embodiments of algorithm identification for distributed computing using a self-sovereign blockchain.
Figure 49:
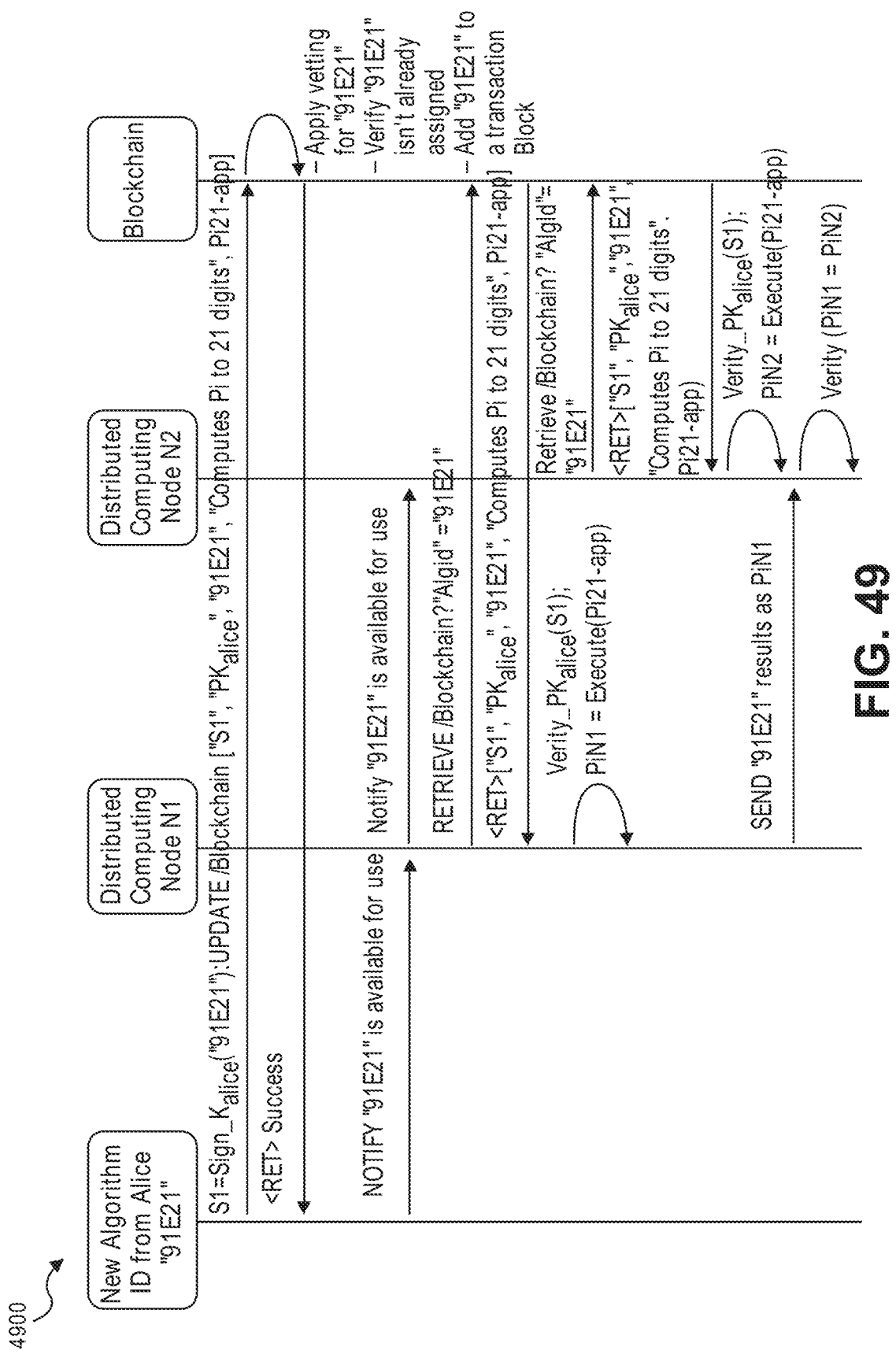

FIGS. 48 and 49 illustrate example embodiments of algorithm identification for distributed computing using a self-sovereign blockchain.

Distributed computing interoperability depends on agreement among participating nodes regarding the particular algorithms used to process information at each node. In some cases, for example, algorithm agreement among nodes may depend on a central authority that manages a registry or database of algorithm identifiers. In this manner, distributed nodes must rely on the registry for selection of the appropriate algorithms, otherwise interoperability is not achieved.

This dependence on central authorities can lead to service disruptions, however, such as when a registry goes offline, a registry is slow to publish new algorithm identifiers (e.g., thus slowing the pace at which new algorithms can be deployed), a central authority becomes the target of politicizations (e.g., registration requests are held in ransom for processing fees, political favors, and/or other forms of manipulation that are not tied to the economics of the distributed computing application), and so forth. For example, these approaches are often highly centralized and may involve international or governmental institutions, which may be prone to politicizations and/or government regulation (e.g., net neutrality). Moreover, since agreement on which algorithms to use is fundamental to distributed computing, a centralized approach for managing algorithm identifiers can create an artificial bottleneck or choking point, and entities seeking to impose regulation or control can effectively leverage the centralized design to restrict or prevent interoperability among distributed computing nodes.

Accordingly, in the illustrated embodiments of FIGS. 48 and 49, a blockchain is used to register a collection of distributed computing algorithms (e.g., using self-sovereign algorithm identifiers). In some embodiments, for example, the blockchain may process an algorithm registration request as a blockchain transaction, where the registrant selects a unique algorithm identifier and specifies the algorithm function. In various embodiments, the algorithm function may be specified in human-readable form (e.g., as a natural language explanation or pseudocode), machine-readable form, and/or machine-executable form. Moreover, as a condition or prerequisite to accepting the algorithm registration, the particular algorithm may be subjected to various levels of "certification" by blockchain processing nodes. In this manner, an algorithm may be accepted with progressive levels of assurance without altering the registered algorithm identifier.

Accordingly, the described embodiments allow anyone that discovers a useful distributed computing algorithm to make that algorithm known and available to a large community. Blockchain networks, for example, are presumed to be large in number and open to large communities of users. In this manner, members of the community can build distributed computing systems without being hindered by bureaucratic roadblocks and oversight. As a result, the time between algorithm development and practical deployment can be minimized.

FIG. 48 illustrates an example embodiment of a distributed computing architecture 4800 with self-sovereign algorithm identification. In the illustrated embodiment, architecture 4800 includes fog networks A and B 4810a-b, along with a self-sovereign blockchain 4820 for registering and identifying distributed computing algorithms 4430. In some embodiments, for example, architecture 4800 could be used to register and/or identify algorithms used for visual fog computing.

As an example, if a useful distributed computing algorithm 4430 is invented, discovered, and/or improved upon in a first fog network (e.g., fog network A 4810a), the first fog network may register the new algorithm in a self-sovereign blockchain 4420 used for algorithm identification. The blockchain processing nodes of the blockchain 4420 may then progressively vet the algorithm in order to provide progressively stronger assurances regarding its legitimacy (e.g., based on the computational properties and outcome of the algorithm). Moreover, a second fog network (e.g., fog network B 4810b) may subsequently be notified of the availability of the new algorithm, and may determine whether the new algorithm has been adequately vetted (e.g., by consulting the vetting status of the algorithm in the blockchain 4420). If the second fog network is satisfied with the vetting of the new algorithm, the second fog network may agree to use the algorithm. For example, in some embodiments, after the algorithm has been adequately vetted, the first fog network and second fog network may agree to begin using the new algorithm.

In some embodiments, the algorithm registration and vetting process may involve: (1) registration of a self-sovereign algorithm identifier (SSAI); (2) peer-review of a human-readable description of the algorithm; (3) machine analysis of a machine-readable representation of the algorithm (e.g., analysis by a logic processor to identify safe behavioral properties); and (4) execution of a machine-executable implementation of the algorithm (e.g., execution in a sandbox environment used to analyze expected behavior). Moreover, once a certain threshold (e.g., a majority) of blockchain processing nodes or evaluators achieve similar vetting results, the algorithm identity and its vetting criteria/results are recorded in a block of the blockchain 4420.

FIG. 49 illustrates an example call flow 4900 for registering a distributed computing algorithm using a self-sovereign blockchain. In some embodiments, for example, an algorithm may be registered using a self-sovereign blockchain to facilitate use of the algorithm across one or more distributed or fog computing environments. In some cases, for example, a distributed computing environment may be referred to as Functions-as-a-Service (FaaS) or "serverless" functions where the compute environment performs particular function(s), and where the function name is registered with a blockchain and disambiguated from other functions such that all computing nodes agree regarding the function name and semantics. Moreover, in some embodiments, the blockchain may leverage various levels of vetting to ensure the algorithm behaves as expected, and verify that the algorithm identifier is not already in use.

In the illustrated call flow 4900, for example, each blockchain processing node performs the following steps:

(1) receive transaction request from new device: $TX_{n+1} = \{S1, \text{"91E21"}\}$, where $S1 = \text{Sign\_K}_{alice}(\text{"91E21"}$, "Human-readable-description", "Machine-readable-description", "Machine-executable-implementation");

(2) optional algorithm vetting (e.g., peer-review of a human-readable algorithm description, logical analysis of a machine-readable algorithm description/representation, sandbox execution of a machine-executable algorithm form);

(3) compute hash H1=SHA256("91E21");

(4) search hash tree of transaction attributes, where $B_{x-poss}$=Search(TxTree, H1);

(5) IF $B_{x-poss}$="H1" THEN return ERROR_DUP_FOUND;

(6) ELSE IF $B_{x-poss}$=" " THEN add $TX_{n+1}$ to the current block, where CurrentBlock=[$TX_{n+1}$, $TX_n$, $TX_{n-1}$, . . . , $TX_{n-m}$];

(7) compute new current block hash BH=SHA256 ([$TX_{n+1}$, $TX_n$, $TX_{n-1}$, . . . , $TX_{n-m}$]);

(8) write BH to the blockchain at $B_{curr-pos}$ (current position); and (9) insert the tuple (H1, BH, $B_{x-poss}$) into TxTree.

Once the vetting process completes, the blockchain contains a vetted and registered instance of the algorithm and its associated identifier. In this manner, distributed computing nodes may then begin using the algorithm (e.g., based on the algorithm identifier and optionally its machine-readable and/or machine-executable forms).

Figure 91:
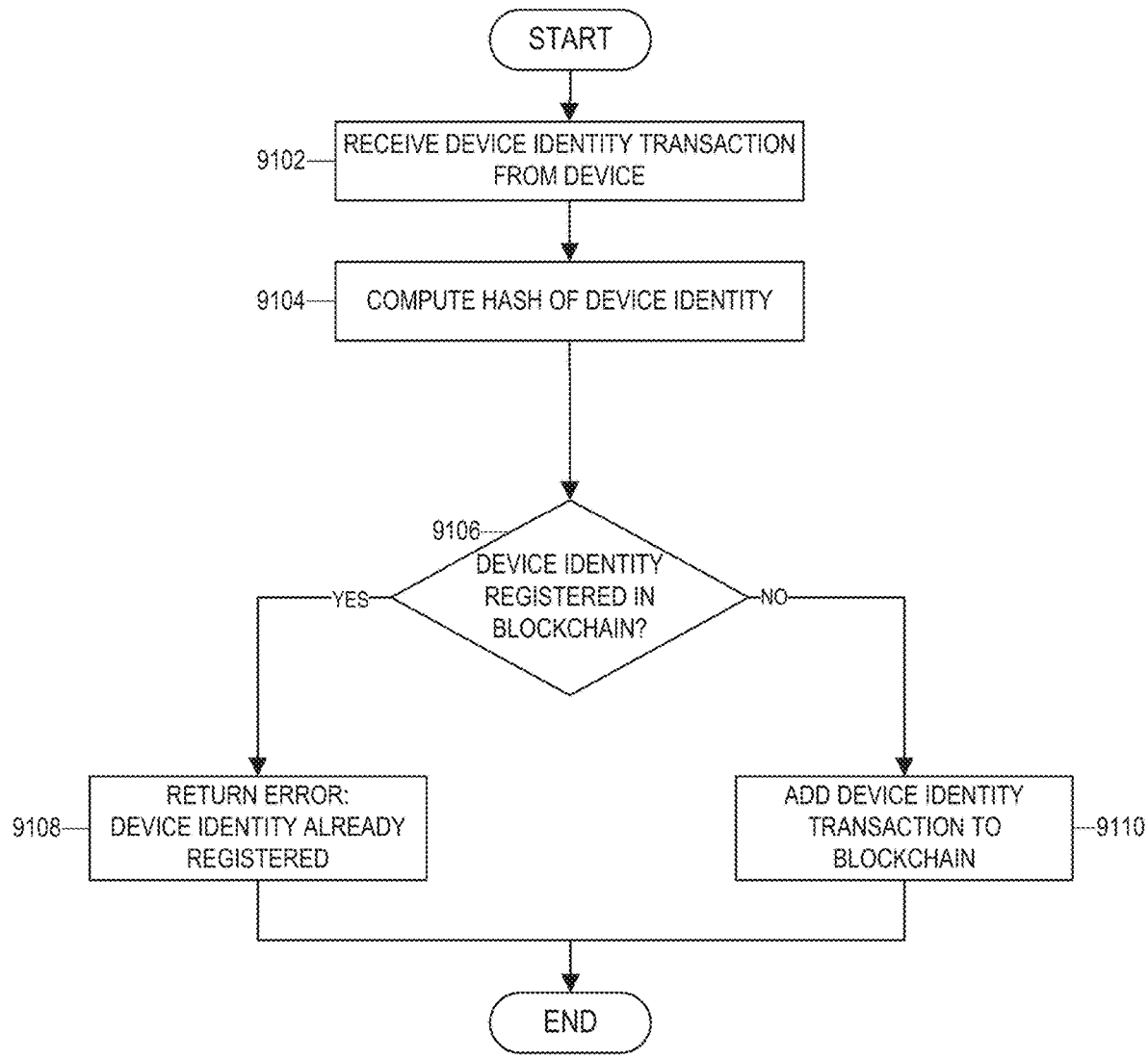
FIG. 91 illustrates a flowchart for an example embodiment of a blockchain for managing self-sovereign device identities.

FIG. 91 illustrates a flowchart 9100 for an example embodiment of a device identity blockchain. In various embodiments, for example, flowchart 9100 may be implemented using the visual computing architecture and functionality described throughout this disclosure.

In some embodiments, for example, a device identity blockchain may be used to manage self-sovereign device identities for a collection of devices that are capable of participating in and/or communicating over multiple networks (e.g., IoT devices capable of participating in multiple IoT networks, cameras/sensors capable of participating in multiple visual fog networks, and/or any other type of device capable of participating in multiple distributed computing networks). Moreover, in some embodiments, the device identity blockchain may be managed by one or more blockchain processing devices. For example, in some cases, a collection of blockchain processing devices may collectively manage a device identity blockchain in a distributed manner.

Accordingly, a particular device can register its associated device identity with the device identity blockchain before the device joins one or more distributed computing networks. In this manner, when the device subsequently attempts to onboard onto particular network(s), the network(s) can query the device identity blockchain to verify that the device is the true owner of its asserted device identity.

For example, when a new device attempts to onboard onto a particular network, the blockchain processing device(s) may receive an identity lookup request from the network, which may request the blockchain devices to lookup or search for a transaction in the device identity blockchain that is associated with the device identity asserted by the new device. The corresponding device identity transaction may then be transmitted back to the network, thus allowing the network to verify that the device identity asserted by the new device is actually owned by or registered to that device. As the device attempts to onboard onto other networks, a similar process may be followed so that those networks can similarly confirm that the new device is the true owner of its asserted identity.

The flowchart begins at block 9102, where a device identity transaction is received from a first device. In some embodiments, for example, the device identity transaction may contain and/or indicate a device identity, a digital signature, and/or a public key associated with the first device.

The flowchart then proceeds to block 9104, where a hash of the device identity is computed (e.g., using Secure Hash Algorithm 2 (SHA-2) or any other suitable hash algorithm).

The flowchart then proceeds to block 9106 to determine, based on the computed hash, whether the device identity is already registered in the device identity blockchain. In some embodiments, for example, a hash tree associated with the device identity blockchain may be searched to determine whether the blockchain contains an existing transaction associated with the hash.

If the answer at block 9106 is YES, the flowchart then proceeds to block 9108, where an error is returned/transmitted to the first device to indicate that the device identity is already registered.

If the answer at block 9106 is NO, the flowchart then proceeds to block 9110, where the device identity transaction is added to the device identity blockchain. In some embodiments, for example, the device identity transaction may be added to a current block of recent transactions associated with the device identity blockchain. Once the current block is complete, the current block may then be hashed and written to the device identity blockchain. In this manner, once the device identity transaction has been added to the blockchain, an error will be returned if other devices subsequently attempt to register the same device identity.

At this point, the flowchart may be complete. In some embodiments, however, the flowchart may restart and/or certain blocks may be repeated. For example, in some embodiments, the flowchart may restart at block 9102 to continue processing device identity transactions.

Figure 92:
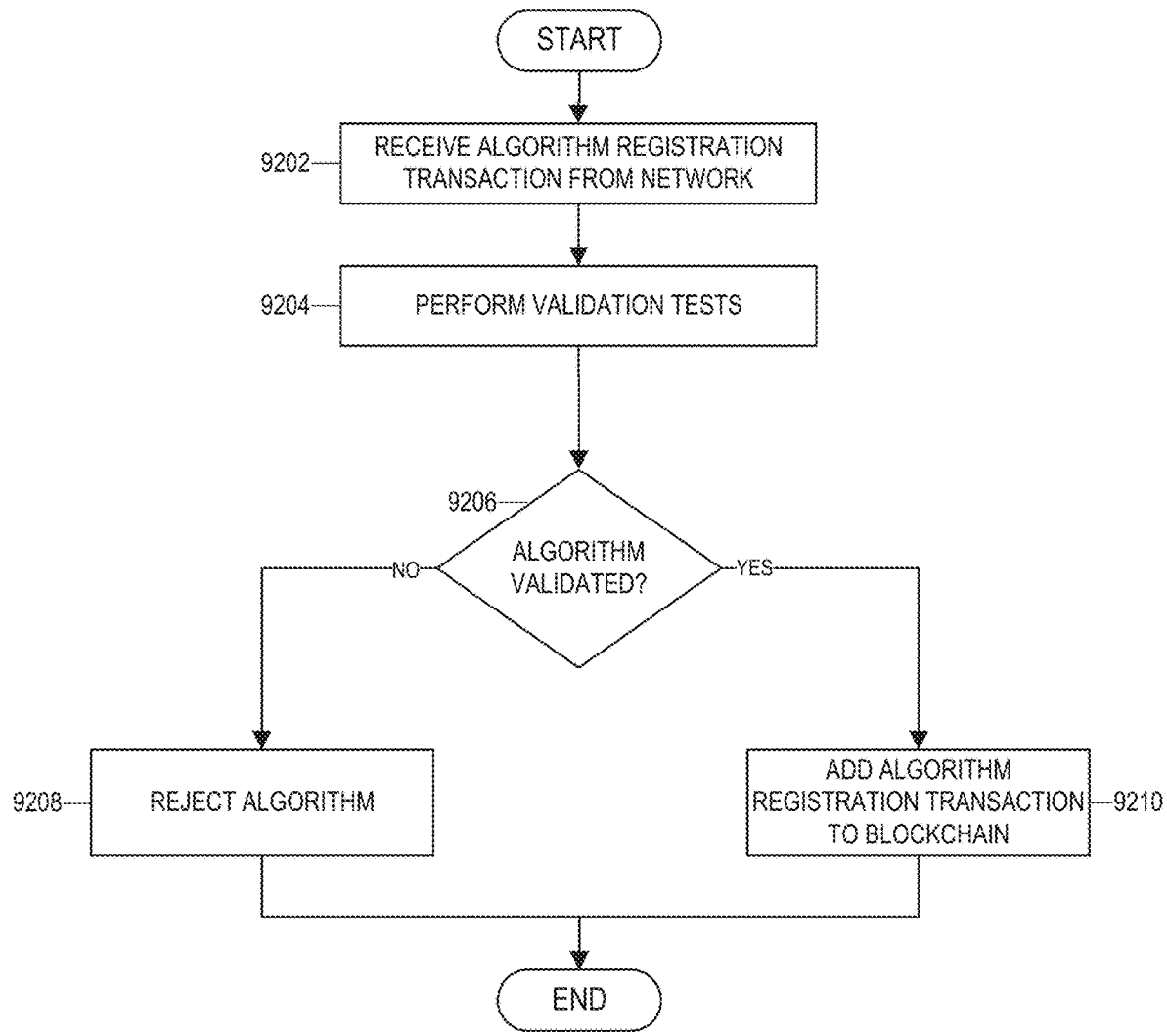
FIG. 92 illustrates a flowchart for an example embodiment of a blockchain for managing distributed computing algorithms.

FIG. 92 illustrates a flowchart 9200 for an example embodiment of a blockchain for managing distributed computing algorithms. In various embodiments, for example, flowchart 9200 may be implemented using the visual computing architecture and functionality described throughout this disclosure.

In some embodiments, for example, an algorithm blockchain may be used to manage the algorithms used by processing devices of distributed computing network(s) (e.g., algorithms used by IoT devices on IoT network(s), algorithms used by cameras/sensors and/or other processing devices on visual fog network(s), and/or algorithms used by any other type of device for any type of distributed computing network). Moreover, in some embodiments, the algorithm blockchain may be managed by one or more blockchain processing devices. For example, in some cases, a collection of blockchain processing devices may collectively manage an algorithm blockchain in a distributed manner.

In this manner, as new algorithms are developed for devices of distributed computing network(s), the algorithms can be submitted to the algorithm blockchain, vetted, and then added to the blockchain after the appropriate vetting is complete. In this manner, once a new algorithm is added to the blockchain, that algorithm can then be used by devices of certain distributed computing network(s).

For example, a first network may submit a new algorithm to the blockchain processing device(s), and the new algorithm may subsequently be added to the algorithm blockchain after the appropriate vetting and/or validation is performed). A second network may then be notified that the new algorithm is available, and the second network may then query the algorithm blockchain to verify that the new algorithm is available and has been properly validated or vetted.

For example, after the second network is notified of the availability of the new algorithm, the blockchain processing device(s) may receive an algorithm lookup request from the second network (e.g., which specifies the algorithm identifier). The blockchain processing device(s) may then search the algorithm blockchain to identify the algorithm registration transaction associated with the algorithm identifier, and the corresponding algorithm registration transaction may then be transmitted to the second network. If the second network determines that the new algorithm has been properly vetted (e.g., based on the validation information contained in the algorithm registration transaction), the underlying devices in the second network may then begin to use the new algorithm.

The flowchart begins at block 9202, where an algorithm registration transaction is received from a particular network (and/or from a device associated with that network). The algorithm registration transaction, for example, may contain an algorithm identifier, a description of an algorithm, and/or a representation of the algorithm (e.g., a machine-readable and/or machine-executable representation of the algorithm).

The flowchart then proceeds to block 9204, where certain tests are performed in order to validate the algorithm. For example, the representation of the algorithm may be analyzed to identify one or more behavioral properties (e.g., to identify behavior that is either deemed safe or otherwise unsafe/insecure/malicious). The representation of the algorithm may also be executed (e.g., in a sandbox) and its execution may be monitored and/or analyzed. In some cases, these validation tests may be collectively performed by the blockchain processing devices.

Once the blockchain devices have finished vetting the algorithm, the flowchart then proceeds to block 9206 to determine whether the algorithm has been validated. If the answer at block 9206 is NO, the flowchart then proceeds to block 9208, where the algorithm is rejected. If the answer at block 9206 is YES, the flowchart then proceeds to block 9210, where the algorithm registration transaction is added to the algorithm blockchain. One or more networks may then be notified of the availability of the algorithm, and devices on those networks may begin to use the algorithm.

At this point, the flowchart may be complete. In some embodiments, however, the flowchart may restart and/or certain blocks may be repeated. For example, in some embodiments, the flowchart may restart at block 9202 to continue processing algorithm registration transactions.

Applications

The visual fog architecture and embodiments described throughout this disclosure can be used for a variety of large-scale visual computing applications and use cases, such as digital security and surveillance, business automation and analytics (e.g., retail and enterprise), transportation (e.g., traffic monitoring, navigation, parking, infrastructure planning, security or amber alerts), education, video broadcasting and playback, artificial intelligence, and so forth.

As an example, the described embodiments could be used to implement wearable cameras for first responders that are capable of automatically detecting events or emergency situations and performing certain responsive measures, such as notifying the appropriate personnel, triggering recording of the event by related or nearby cameras, and so forth.

As another example, the described embodiments could be used to implement a digital surveillance and security (DSS) system with people search or facial recognition capabilities across visual data streams from multiple different cameras, sensors, and/or locations.

As another example, the described embodiments could be used to implement a digital surveillance and security (DSS) system with license plate identification and fraud detection capabilities (e.g., identifying a car with a license plate that does not match the corresponding vehicle record, identifying multiple cars with same license plate, and so forth).

As another example, the described embodiments could be used to provide customer insights and analytics (e.g., for retail shoppers), such as an intra-store shopper trip summary (e.g., a list of products or departments interacted with by a shopper), an inter-store shopper trip summary (e.g., identifying repeat customers by differentiating between new and returning customers as they enter a store with a single or multiple locations), and so forth.

Similarly, the described embodiments could be used to provide visualization of customer or shopper insights and analytics (e.g., visualizing a graph representation of visual metadata for human consumption).

As another example, the described embodiments could be used to perform automated demographics identification in a privacy-preserving manner (e.g., using top-view cameras or sensors for demographic mapping of gender, age, race, and so forth).

As another example, the described embodiments could be used to perform heat mapping in retail stores or other brick-and-mortar environments to generate a representation of the crowd (e.g., using top-view sensors or cameras and/or multi-modal crowd emotion heat mapping). In some embodiments, for example, heat mapping could be leveraged for optimization of store layouts, among other examples.

As another example, the described embodiments could be used to implement multi-modal real-time customer reviews. For example, customer reviews and/or customer satisfaction information could be collected and analyzed in real-time using multi-sensory data, which can be translated into quantitative customer-to-customer reviews for any products or in-store activities of a particular store or brick-and-mortar environment.

Similarly, the described embodiments could be used to implement multi-modal retailer-shopper double review, which may focus on collection and analysis of both product reviews from customers and customer reviews from retailers.

As another example, the described embodiments could be used for automated customer satisfaction analysis. For example, visual data could be used to measure customer satisfaction at check-out based on non-verbal communication or body language. In this manner, customer satisfaction can be automatically inferred without requiring manual customer feedback (e.g., via a button or survey).

As another example, the described embodiments could be used to monitor the effectiveness of employee-customer interactions. For example, visual data could be used to measure and track the effectiveness of communication between customers and salespeople with respect to finding desired products or items. In some embodiments, for example, visual data could be used to track users within a store, identify customer-employee contact and interactions, and monitor the employee and/or customer responses.

As another example, the described embodiments could be used to provide dynamic ambience environments by identifying contextual information (e.g., relationships or actions) within a group of people. For example, visual data could be used to identify individuals and their associated contextual information to determine whether they are part of the same group (e.g., based on physical proximity and/or corresponding movement), and if so, to identify various parameters or characteristics of the group (e.g., a family shopping together in a store).

As another example, the described embodiments could be used to implement double auction real-time bidding (RTB). In some embodiments, for example, visual data could be used to implement multi-shopper, multi-bidder real-time bidding (RTB) for brick-and-mortar retailers.

As another example, the described embodiments could be used to monitor and detect changes to store layouts based on visual data and/or sensors.

As another example, the described embodiments could be used for robotic inventory tracking and logistics (e.g., using stationary and/or moving cameras to track inventory of retail stores, warehouses, offices, and so forth).

As another example, the described embodiments could be used for robotic equipment inspection (e.g., using computer vision technology to inspect the safety and/or health of equipment in a factory, plant, warehouse, store, office, and so forth).

As another example, the described embodiments could be used to provide automated tipping recommendations, for example, based on multi-sensory inputs and/or visual data reflective of factors that typically impact customer tipping behavior.

As another example, the described embodiments could be used for workplace automation, such as workplace quality control, employee monitoring, and so forth. In some embodiments, for example, visual data could be used to analyze employee emotions in order to improve productivity.

As another example, the described embodiments could be used for education and/or automated learning (e.g., using visual data to analyze student behavior in the classroom or at home in order to provide further assistance when appropriate).

As another example, the described embodiments could be used for video playback, such as user-centric video rendering, focused replays, and so forth. For example, user-centric video rendering could be used to perform focused rendering on 360-degree video by analyzing what the user is focusing on, and performing no or low-resolution processing on portions of the video that are outside the focus area of the user (e.g., for virtual-reality (VR) and/or augmented-reality (AR) applications). As another example, focused video replays could be used to automatically focus the rendering of a video replay on an area of interest, such as the portion of a sports replay where most players are located.

As another example, the described embodiments could be used to train artificial intelligence systems. In some embodiments, for example, visual data could be used to automatically generate ground truth information that can be used to train artificial intelligence or machine learning models, such as deep learning neural networks.

As another example, the described embodiments could be used to implement a ubiquitous visual computing witness, as described further below in connection with FIGS. 55-61.

These examples are merely illustrative of the limitless universe of visual applications and use cases that can be implemented using the visual fog architecture described throughout this disclosure.

Ubiquitous Visual Computing Witness

Figure 55:
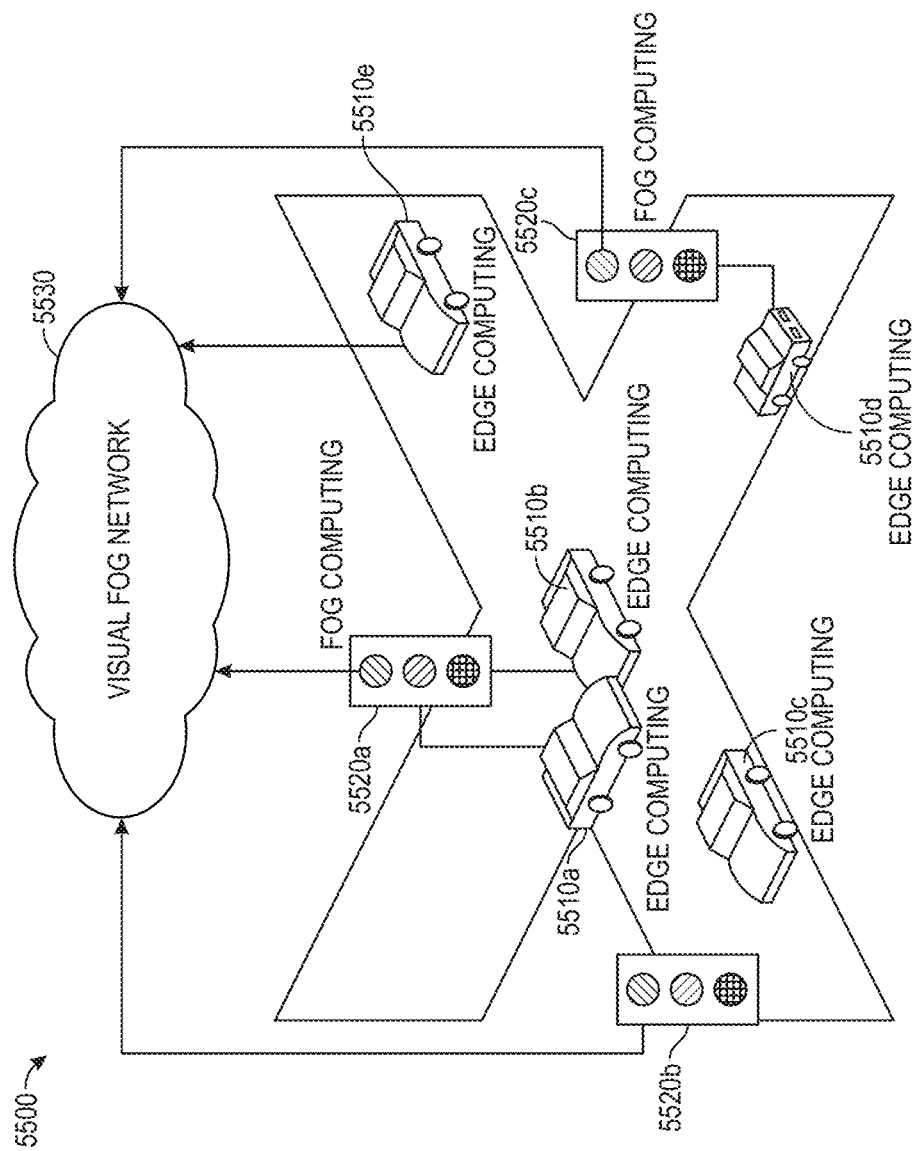
FIG. 55 illustrates an example use case for an automotive ubiquitous witness.
Figure 56:
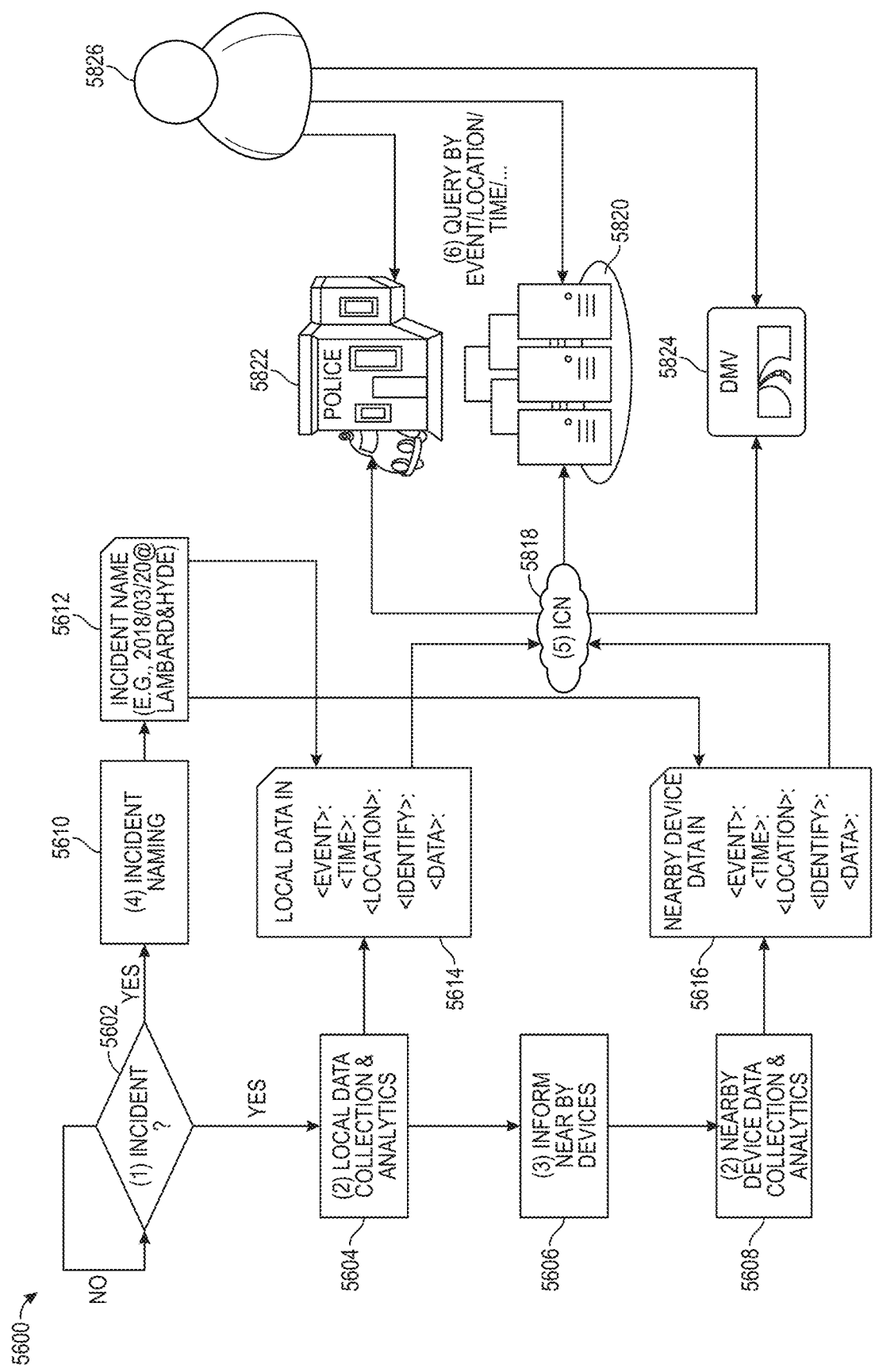
FIG. 56 illustrates an example dataflow for a ubiquitous witness.

FIGS. 55-56 illustrate an example embodiment of a ubiquitous visual computing witness. A ubiquitous witness addresses the problem of collecting evidence for events, incidents, or anomalies of interest in a timely, accurate, and comprehensive manner. For example, the police department is a government agency devoted to law enforcement and public safety, which often requires them to conduct investigations into criminal activity, automobile accidents (e.g., to identify the cause), and so forth. Similarly, a neighborhood watch is an organized group of people devoted to monitoring and preventing crime and vandalism within a neighborhood. These types of functions often require evidence to be collected from various sources, including eye witnesses, physical environments, electronic sources (e.g., surveillance systems), and so forth. The major issues in the aforementioned use cases lie in the fact that often times the most important evidence is sourced from $3^{rd}$ parties. In a neighborhood watch, for example, a neighbor's camera may capture a much clearer view of an incident in or around a nearby house. In automobile incident investigations, evidence may need to be collected and combined from multiple sources, such as nearby cars, roadside infrastructure or roadside units (RSUs) (e.g., lamp posts, signage, traffic lights), and so forth. Thus, comprehensive data aggregation and timeliness are both crucial to the fact-gathering process.

Existing approaches for evidence gathering suffer from various drawbacks. For example, there are no automated solutions for evidence gathering. Moreover, for electronic devices that continuously generate and/or stream data (e.g., sensors, cameras), the data retention policies can be rather short due to resource constraints. For example, data may only be retained for a couple of hours for vehicle dashboard/surveillance cameras due to limited storage capacity on an SD card. Further, manual approaches to evidence gathering often face various challenges. In particular, ownership of the data can present problems, especially in the absence of a shared authority that brokers access to the data.

Accordingly, this disclosure describes various embodiments of a ubiquitous visual computing witness. In particular, this disclosure proposes a novel new application of a ubiquitous witness implemented using an infrastructure of visual fog computing and visual fog networking for various example use cases. Further, the described ubiquitous witness addresses the challenges associated with data retention and data aggregation in connection with evidence gathering. In particular, the ubiquitous witness provides real-time data collection using visual fog computing. For example, when an interesting event (e.g., anomalous, unusual, rare) occurs, a snapshot of local data is locked (e.g., securely stored) by the subject device that detected the event, thus preventing the data from being overwritten. Further, the subject that detected the event notifies other relevant subjects (e.g., nearby subjects in many cases) in real time to lock their respective counterpart data snapshots. Further, the data retention problem can be addressed using quality of service (QoS) designations to prioritize which data to store versus expire (e.g., visual data versus other forms of data). Further, with visual fog computing, the data may be preprocessed to save bandwidth for the next step of data aggregation. In particular, the ubiquitous witness provides automated data aggregation using visual fog networking. For example, once data has been retained and optionally preprocessed by the various subject devices, the collection of data and metadata distributed across the respective subject devices is aggregated using visual fog networking and/or information-centric networking (ICN), thus allowing the respective data snapshots to be associated together and properly stored by the devices or nodes in the visual fog paradigm.

In this manner, the ubiquitous witness provides various advantages in connection with evidence gathering. For example, the central or key evidence associated with an incident is unimpeded by data retention policies, as the relevant subject devices are notified in real time to collect and lock their respective data snapshots. As another example, information-centric networking (ICN) and/or event-based data routing can be leveraged to provide a more efficient approach for collecting, aggregating, and/or routing data. In some embodiments, for example, relevant data can be routed by location, time, triggering event, source, destination (e.g., the responsible authorities), and/or any salient attributes describing key features of the event or incident.

FIG. 55 illustrates an example use case 5500 for an automotive ubiquitous witness. The illustrated use case 5500 includes edge devices 5510a-e, fog devices 5520a-c, and a communication network 5530. In the illustrated example, edge devices 5510a-e are cars with onboard sensors and/or cameras for collecting data during operation, while fog devices 5520a-c are traffic lights or other roadside units (RSUs) with sensors and/or cameras for local or nearby data collection. Moreover, communication network 5530 may include visual fog and/or information-centric networking capabilities, which may be used to facilitate real-time collection and aggregation of data from both cars 5510 and RSUs 5520 using event-based data management and storage techniques. In this manner, a ubiquitous automotive witness may be implemented using a combination of visual fog computing (VFC) and visual fog networking or information-centric networking (ICN), as described further below in connection with FIG. 56.

FIG. 56 illustrates an example dataflow 5600 for a ubiquitous witness. In some embodiments, for example, dataflow 5600 may be performed in connection with the example automotive use case illustrated in FIG. 55.

The illustrated dataflow begins at block 5602 by determining whether an incident has been detected. In various embodiments, for example, an incident may be detected by processing sensor data using any suitable approach, such as identifying unexpected or outstanding changes in sensor data (e.g., data from internal sensors of vehicles and/or other types of equipment), performing event detection and recognition using computer-vision and/or machine learning techniques, and so forth.

Once an incident has been detected, that will trigger local data collection by the detecting device (block 5604) along with nearby data collection by any surrounding devices (block 5608), and the incident will also be given a name (block 5610).

For example, at block 5604, the detecting device performs local data collection, which may involve performing local analytics in order to acquire and/or generate data and/or metadata associated with the incident. The metadata, for example, may include or otherwise identify regions of interest (ROIs), geolocation names (e.g., addresses, cities, states, zip codes, landmarks, countries), tagging or labels on the scene of the incident derived using computer vision techniques (e.g., image classification or segmentation), weather, and/or any other contextual or circumstantial information associated with the incident, among other examples. Further, the relevant data may be designated with a high-priority QoS in order to ensure that the data is retained.

At block 5606, mechanisms are then employed to inform nearby devices of the incident, which enables those devices to lock down their data as well as perform any other actions that may be appropriate in the particular circumstances and/or use case. For example, in the context of a neighborhood watch, ZigBee and/or LTE may be used to notify nearby devices of an incident for data collection purposes, while LTE and/or dedicated short-range communications (DSRC) may be used in the context of automobile incidents. Regardless of the underlying wireless communication infrastructure, an alert message is routed from the device that detected the incident to its neighbors in order to trigger the process of locking down the relevant data of the nearby or neighboring devices (block 5608).

At block 5610, the incident is then given a "name" for identification, routing, and/or networking purposes. In some embodiments, for example, the incident name may be derived using an arbitrary combination of information associated with the incident, such as location, time, event, type of incident, priority/importance/fatalities, image/video captured of the event, and so forth. In this manner, the concatenation of this descriptive information can serve as the event name 5612 for purposes of requesting the underlying event data within an information-centric network (ICN), as described further below.

At block 5818, for example, an information-centric network (ICN) may be used to request, route, and aggregate the relevant data (e.g., local device data 5614 and/or nearby device data 5616) based on the incident name (e.g., the attributes associated with the data). In this manner, the network can then route or be queried for data associated with a particular incident of interest. For example, evidence of theft in a neighborhood watch may be requested and subsequently directed to a nearby police station 5822, while evidence of automobile speeding may be requested and subsequently directed to the department of motor vehicles (DMV) 5824 and/or an insurance company.

Moreover, the data associated with an incident may also be stored by certain network resources 5820 in order to satisfy subsequent queries relating to the incident. For example, at block 5826, users may query for evidence associated with an incident using the various attributes in the incident name. For example, a user might only know the approximate time and place of an incident for purposes of querying the network, and thus the network can disseminate the query to the relevant data stores, and those with relevant data can then reply.

In this manner, a ubiquitous witness can be implemented by leveraging visual fog computing to perform data processing and/or pre-processing at edge and/or fog nodes, followed by using visual fog networking and/or information-centric networking (ICN) to associate and/or aggregate the collection of evidence for an incident (e.g., data and metadata from various sources), timely route the evidence to the appropriate destination(s), and/or store the evidence in the appropriate data stores. Further, in some embodiments, a ubiquitous witness may be implemented within a network topology that leverages "converged node" routers, as described further below in connection with FIGS. 62-63.

FIGS. 57-60 illustrate examples of anomaly detection and event reconstruction for a ubiquitous visual computing witness. With respect to the automotive industry, for example, vehicles currently come equipped with an array of sensors designed to sense and record a multitude of data (e.g., speed, direction, fuel levels). These sensors are often present internally within a vehicle as well as mounted externally on the vehicle. Externally mounted sensors, for example, may include visual/audio sensors such as cameras that are used for recording or capturing the road, lane boundaries, surrounding vehicles or obstacles, and so forth. Moreover, with respect to the ongoing development of connected and autonomous vehicles, the range and functionality of such sensors is only going to increase. Similarly, the number of sensors deployed to instrument the roadside infrastructure is also going to increase dramatically. An important use case for this enormous volume of collected data is anomaly detection, such as the detection of an unusual event or incident involving vehicles, people, and/or infrastructure. For example, proximate sensory data can be assimilated in order to reconstruct the sequence of events leading up to the anomaly in a multi-dimensional manner. Further, when the anomaly is a vehicular accident involving damage to a person or property, this type of reconstruction can also be used to determine the primary responsible parties for purposes of restitution and insurance, particular in the absence of traditional eye witnesses.

Currently, however, the data generated by the various sensors in vehicles and roadside infrastructure is often isolated, as it is often stored in separate vendor- or application-specific clouds. There are various reasons for this, including but not limited to the following: (1) sensors within a single vehicle may be deployed by different manufacturers and their respective data may be routed to vendor-owned clouds; (2) obtaining data from nearby vehicles is often difficult, as the vehicles may be manufactured by different vendors that have different ways of capturing and storing information, including potentially different proprietary formats for sensory data; and (3) the entities involved may or may not be available or traceable in the first place.

Accordingly, with respect to existing solutions, sensor fusion exists strictly within each individual vehicle and is strictly siloed by each sensor vendor. Thus, sensor fusion can only be leveraged to aggregate image data collected from the field of view of each vehicle in isolation. Moreover, while existing video aggregation solutions can collect streams from multiple cameras (e.g., infrastructure-based solutions such as video surveillance or augmented reality), those solutions are ineffective when the sensors are owned by multiple different manufacturers, their "black box" data is generally proprietary, and there is very little cross-organization access or coordination. Accordingly, video aggregation and stitching using cameras in roadside infrastructure is typically limited to specific functions (e.g., traffic management services, awareness of road conditions, and/or surveillance). These respective approaches fall short in addressing anomaly detection in a globally distributed fashion, on the fly (e.g., in real time), and from multiple parties, particularly with respect to the fusion of data from both static and mobile entities.

Accordingly, this disclosure presents a solution for multi-dimensional anomaly event reconstruction for smart automated systems, such as autonomous vehicles and smart cities. In particular, the described embodiments enable multi-dimensional reconstruction of detected anomalies, where the multi-dimensional aspect refers to the ability to recreate an event from many different perspectives using multi-modal sensory information from multiple sources. These sources can include sensors, cameras, and/or other audio/visual elements, which may reside in multiple vehicles, roadside infrastructure, and/or the "black box" of information required by regulation for each vehicle. The objective is to solicit enough reconstruction data to recreate the event (which occurred at a particular point in time and space) in multiple dimensions (from different vantage points), while simultaneously scoping the solicitation within a bounded region of relevance.

Anomaly detection and event reconstruction is a multi-stage process that begins when a potential anomaly is detected. In some embodiments, for example, an anomaly may be detected by analyzing sensor data from one or more sources using any suitable processing techniques (e.g., computer vision, machine learning, artificial neural networks). The detection and identification of the anomaly (e.g., time, location and/or type of anomaly) may then serve as inputs to the event reconstruction process. In some embodiments, for example, the event reconstruction process may involve (1) digital witness identification, (2) data gathering, and (3) multi-dimensional event reconstruction, as described below.

1. Digital Witness Identification.

Once the anomaly is detected, the first stage of the response is identifying the parties involved, including those involved directly in the anomaly and those that are digital witnesses to the anomaly, both of which may possess data needed to reconstruct the anomaly.

2. Data Gathering.

The second stage involves data gathering from the relevant parties that have been identified. The data gathering stage can be implemented using any suitable approach and/or technology, including a cloud-based solution that uses IP-based routing, and/or an edge-based solution that leverages information-centric networking (ICN) or ICN-based routing, among other examples. Further, in some embodiments, a network topology implemented with "converged node" routers may be leveraged to facilitate the data gathering process, as described further below in connection with FIGS. 62-63.

3. Multi-Dimensional Event Reconstruction.

The third stage then uses the gathered data to perform multi-dimensional event reconstruction. In some embodiments, for example, three-dimensional (3D) event reconstruction may be used to recreate the event from a variety of different types of sensory data (e.g., image, audio, video), using different media-appropriate processing algorithms to assimilate all the sensory information in a time-synchronized fashion.

Accordingly, this disclosure presents a novel solution for general anomaly detection and event reconstruction, which can be leveraged for a variety of use cases, including connected and autonomous vehicles that live within a smart transportation infrastructure. In this manner, the sensing capabilities of multiple vehicles and the surrounding infrastructure can be leveraged for anomaly detection and event reconstruction purposes.

Figure 57:
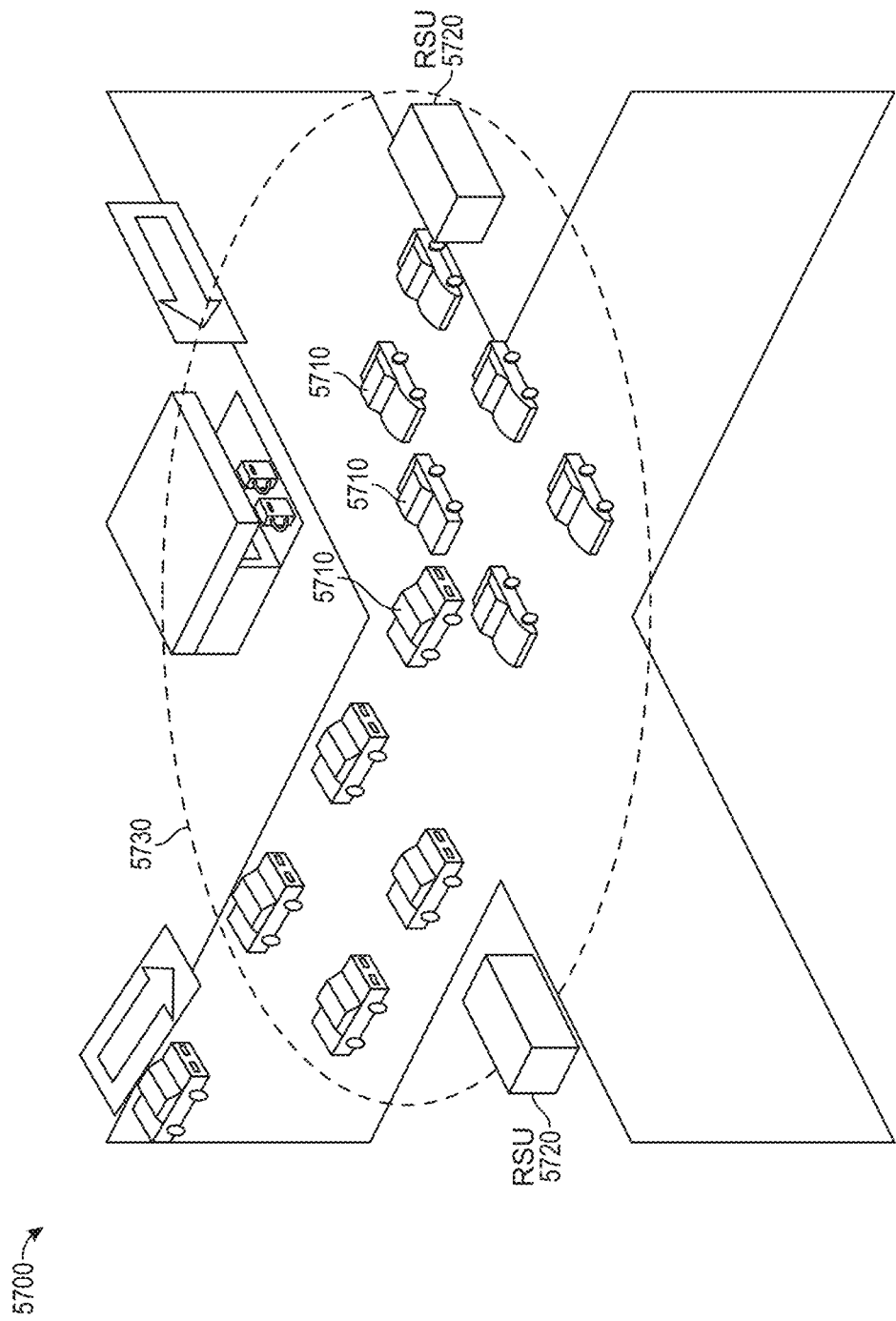
FIG. 57 illustrates an example use case for automotive anomaly detection and reconstruction.

FIG. 57 illustrates an example use case 5700 for automotive anomaly detection and event reconstruction. The illustrated use case 5700 includes a plurality of cars 5710 driving on a road, along with multiple roadside units (RSUs) 5720 on the side of the road (e.g., traffic lights, lampposts, road signs, and/or other roadside infrastructure). The cars 5710 and RSUs 5720 are each equipped with a collection of sensors and/or cameras for capturing data associated with their respective operating environments, along with communication interface(s) to facilitate communication with each other and/or other networks.

Moreover, the illustrated example portrays a snapshot in time and space of an automotive anomaly that involves a collision between two vehicles. The collision may be detected and recorded as an anomalous incident (e.g., with details of time and location) by any of the vehicles involved in the collision (either directly involved or indirectly involved as witnesses) and/or the roadside infrastructure or RSUs. In various embodiments, for example, an anomaly may be detected by processing sensor data using any suitable approach, such as identifying unexpected or outstanding changes in sensor data (e.g., data from internal sensors of vehicles and/or other types of equipment), performing event detection and recognition using computer-vision and/or machine learning techniques, and so forth.

Figure 58:
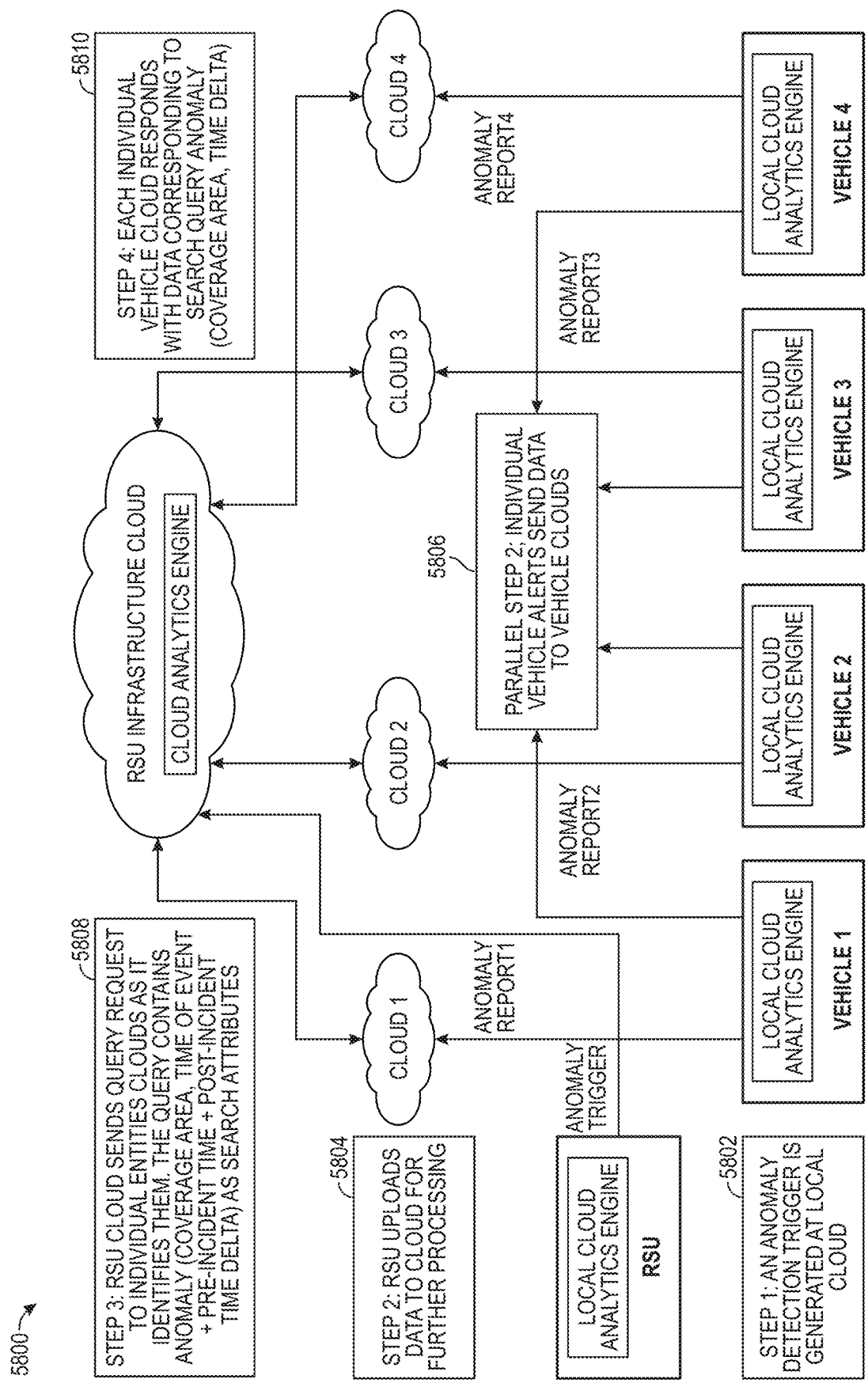
FIG. 58 illustrates an example process flow for IP-based anomaly detection and reconstruction.
Figure 59:
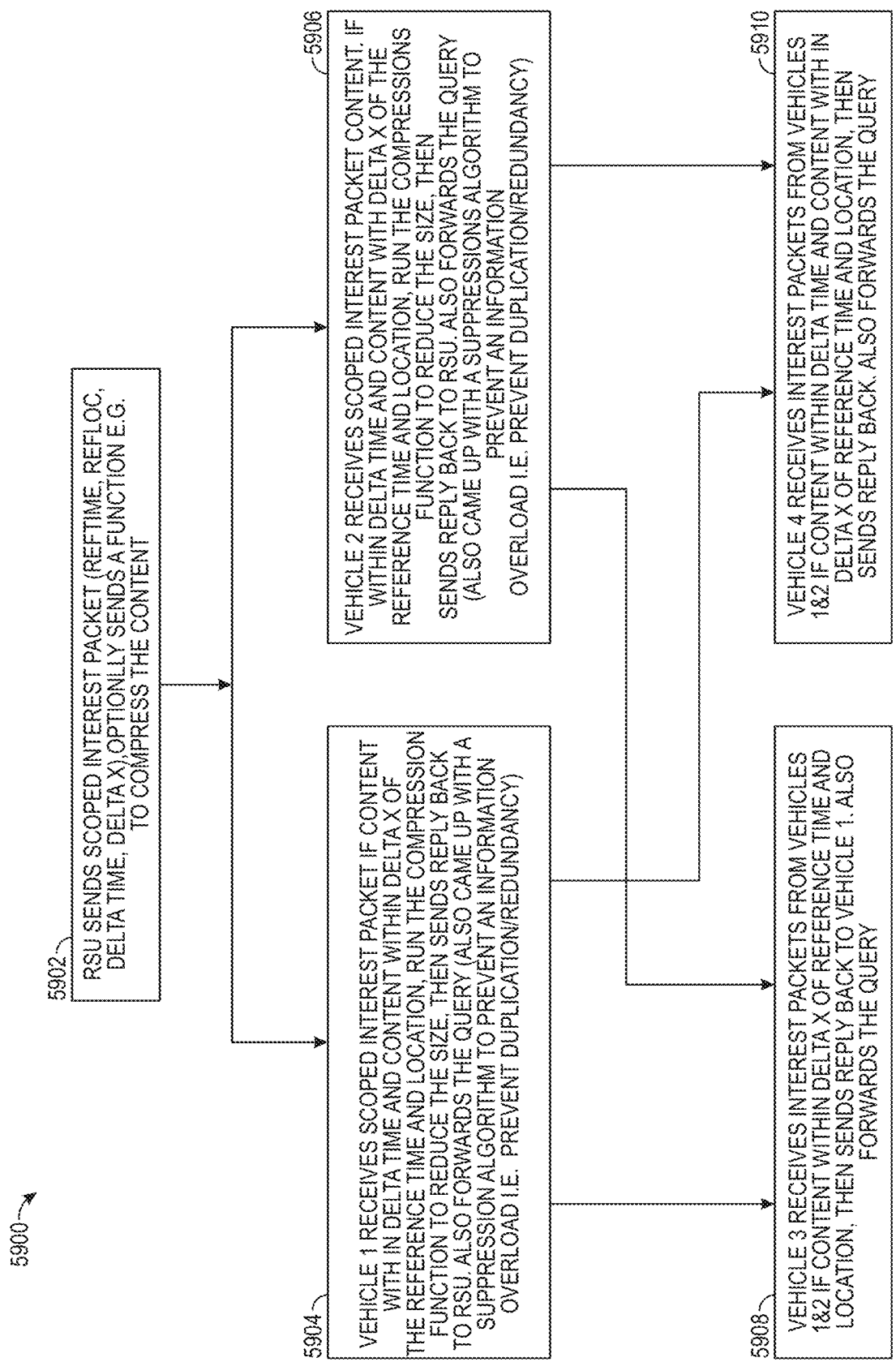
FIG. 59 illustrates an example process flow for ICN-based anomaly detection and reconstruction.
Figure 60:
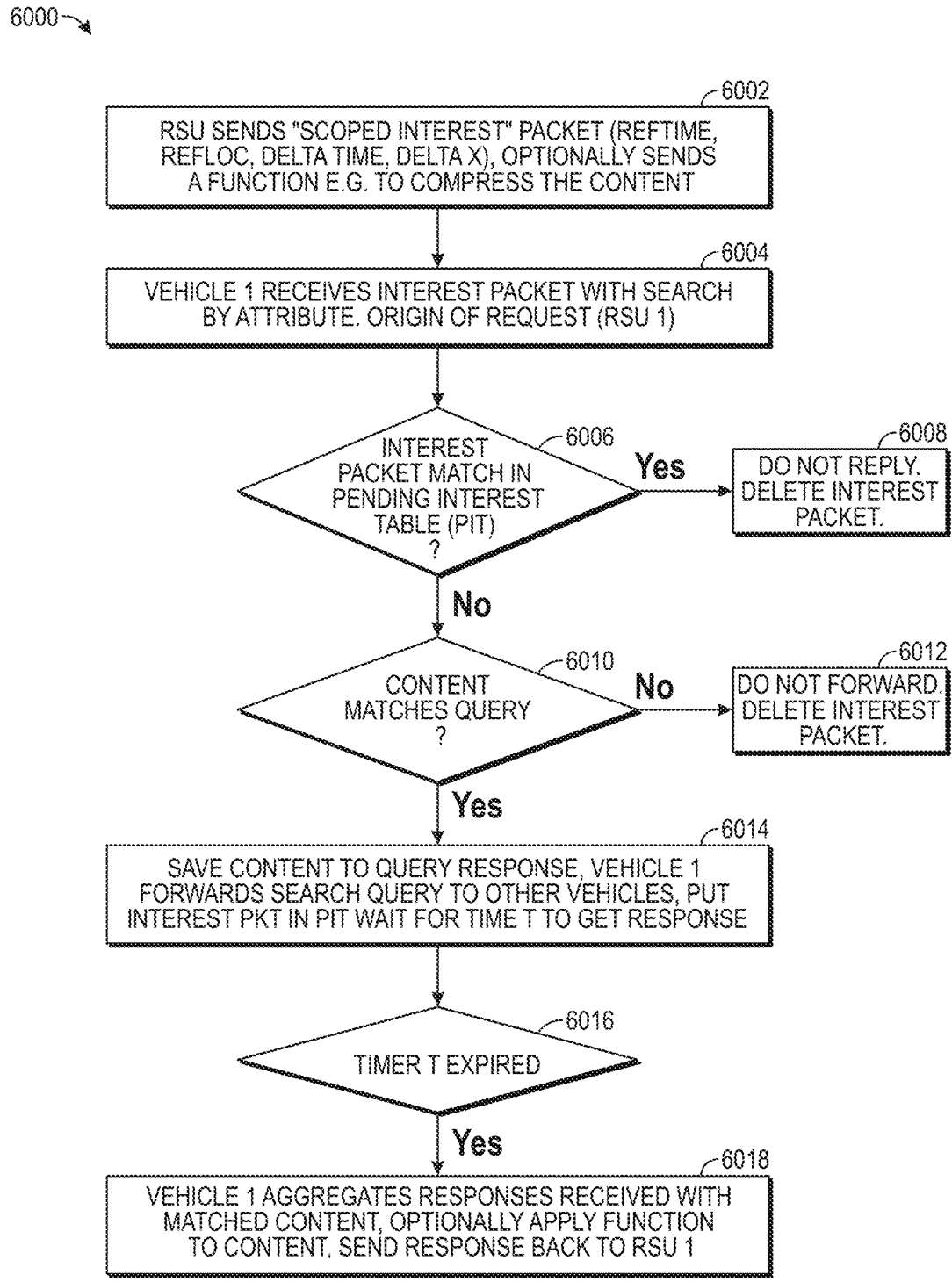
FIG. 60 illustrates an example process flow of an individual node for ICN-based anomaly detection and reconstruction.

Once an anomaly has been detected, the exact sequence of events leading up to the collision and slightly beyond can then be reconstructed, as described further below. For example, FIGS. 58-60 present various solutions for anomaly detection and reconstruction using both Internet Protocol (IP) networks and Information-Centric Networks (ICN).

With respect to IP-based embodiments, for example, the event reconstruction process begins by identifying all entities that may have useful data for the reconstruction process. In many cases, for example, it can be assumed that potentially relevant entities are those that reside within a region of interest referred to as the "anomaly coverage area" 5730 during a particular time window in which the anomaly occurred. The process of identifying these entities or "witnesses" can be triggered in multiple ways, including by vehicle(s) involved in the incident and/or nearby roadside infrastructure.

In some embodiments, for example, the process of identifying relevant entities or "witnesses" may be triggered by a vehicle that detects an anomaly, such as a vehicle directly involved in an incident or a nearby vehicle that merely witnesses the incident. As noted above, for example, many vehicles come equipped with sensors, cameras, and some level of automation, and the scope and sophistication of that technology is continuously increasing due to the ongoing development of connected and autonomous vehicles. Accordingly, a vehicle may leverage those various technologies to detect an anomalous incident or event (e.g., based on a sudden shock, air bag deployment, shock of the impact with another vehicle, unusual audio or video, and so forth). On detection of the anomalous event, the vehicle system triggers an alert and generates an automatic push request to send all sensor logs (including camera video streams) within a time window that extends pre- and post-incident to the vehicle's cloud systems (e.g., clouds of the vehicle manufacturer, insurer, municipal authorities, and so forth). The cloud, upon receipt of data associated with the anomalous event, may then employ an analytics engine to perform a search of the visual/sensory data using timestamp information to find license plates and other identifying information of the surrounding vehicles and/or infrastructure. The license plate information may then be mapped to the corresponding vehicle owners using a vehicle database (e.g., a publicly available database maintained by the Department of Motor Vehicles (DMV) in the U.S. or the equivalent in other countries). The cloud engine then sends out a request for information to the identified vehicles and their owners to reconstruct the event using an application server. Alternatively, the vehicles involved in the incident can process their own logs within their own local analytics engine even before the upload, and then through the local analytics engine, identify other vehicles and witnesses that were within the anomaly coverage area 5730.

Alternatively, the process of identifying relevant entities or "witnesses" may be triggered by roadside infrastructure located within the anomaly coverage area 5730. For example, roadside infrastructure may include various types of roadside units (RSUs) with edge and fog computing capabilities (e.g., storage, processing, communication/routing, sensors/cameras), such as traffic lights, street lights, lampposts, road signs, and so forth. In this manner, roadside infrastructure within the anomaly coverage area 5730 may detect, witness, or otherwise be alerted to an anomalous incident, and thus may trigger an alert or response to the incident. For example, the infrastructure equipment may send sensory data (e.g., video streaming feeds) from a time window that extends pre- and post-incident to an appropriate authority and/or cloud destination (e.g., the roadside unit (RSU) infrastructure cloud) to provide proof of witness. In this manner, the event reconstruction process is triggered by the roadside infrastructure, as described further below in connection with FIG. 58.

FIG. 58 illustrates a process flow 5800 for anomaly detection and reconstruction orchestrated by roadside unit (RSU) infrastructure over IP networks. In particular, the RSU local cloud performs analytics using object recognition techniques and generates an event trigger to its own RSU cloud (block 5802), while simultaneously uploading its content to that cloud (block 5804). In parallel, the other entities involved (e.g., vehicles) also upload their data to their own local clouds (block 5806). The RSU cloud performs further analytics, obtains additional information on the entities involved in the anomaly, and sends queries to the clouds of those entities to gather their data (block 5808). Those clouds then respond with corresponding data that is responsive to the anomaly search query (e.g., based on coverage area, time delta) (block 5810). Further, as more data is collected and additional processing is performed, additional entities with potentially relevant data may be identified, and those entities may be queried for their respective data in a similar manner. The process may continue in this manner until the entire dataset associated with the anomalous incident has been collected from all entities that have been identified as relevant.

As an example, once the data solicitation requests have been sent out, the responsive data may subsequently be aggregated at the entity that initially triggered the process, such as the RSU cloud or its associated municipal authority, the vehicle manufacturer, an insurance provider, and so forth. Further, in some cases, the same anomaly may be reconstructed by multiple different participants, such as the municipal authorities that own the RSUs (e.g., to improve traffic safety measures), the vehicle manufacturers (e.g., to improve their connected vehicle technology), and the insurance providers (e.g., to understand societal accident patterns), largely using the same process described above. After the data is gathered, it must then be stitched together to re-create the event. In various embodiments, for example, event reconstruction may be performed by consolidating sensor data from multiple sources and perspectives into a multi-dimensional representation using any suitable processing techniques, such as sensor fusion, computer vision, artificial neural networks, machine learning, and so forth.

In some embodiments, the various clouds may provide application programming interfaces (APIs) that allow other clouds or entities to query for and receive data in a format that can be parsed and decoded by the recipients. Further, each individual database within each individual cloud may be responsible for determining the legitimacy of the entities that request or query for data, including whether they have permission to receive the responsive data. Similarly, the receiver of the data may be responsible for determining the authenticity of data received in response to its query. In various embodiments, these types of safeguards can be implemented using an offline process, or they can take place in real-time if the requisite systems and authorizations for data access have been properly deployed and configured.

FIGS. 59-60 illustrates a process flow for anomaly detection and reconstruction over information-centric networks (ICNs). For example, in the illustrated process flow, it is assumed that the participating entities shown in the use case of FIG. 57 (e.g., vehicles, surrounding infrastructure, and/or any other bystanders or witnesses within the anomaly coverage area) are part of an ICN-enabled network. As discussed further below, there are two important differences between ICN and IP networks that can be exploited to improve operational efficiency in this context.

First, an ICN network is capable of routing data by name (which is often a series of attributes related to the data, such as its purpose, owner, location, and/or other contextual information) rather than by IP address, which enables location-independent routing. This capability can be leveraged through the use of a "fuzzy request," which requests anomaly-related data based on a name that includes the time and location of the anomaly, as well as a delta of uncertainty, among other potential characteristics or attributes. In this manner, the fuzzy request acts as a query to the network itself, but without having to know the identities or IP addresses of the entities that detected the anomaly. Further, the delta of uncertainty allows responses from any entities that were located within a scoped physical region of interest—and that collected qualifying data of interest—at a time when the anomaly occurred plus or minus a threshold margin of error before and after the anomalous event.

Second, an ICN network offers caching natively at the routing layer, meaning as data passes through a router it may optionally be cached for later usage (e.g., when the source of the data is unavailable due to mobility, interference, disconnectivity, an energy-saving sleep mode, and so forth). This has the side effect of making data available in multiple locations and potentially much closer to the requesters, which saves precious and often limited network resources. As a result, when a fuzzy request is solicited, any witnesses or nodes with data that was collected within the approximate time and location of the anomaly may respond to the fuzzy request, regardless of whether the data was created or merely cached at that node.

The entities that have the capability to capture, create, process and/or store sensory data and make it available in a form that can be shared at the network routing layer are known as the "producers" or "publishers" in an ICN network, while the entities that request information are known as "consumers" or "subscribers." The physical network itself is formed through the interconnection of the underlying participants using certain connectivity solution(s) (e.g., LTE, DSRC, Wi-Fi, 5G), and thus the network continuously changes as its participants join and leave (e.g., as vehicles connect to and disconnect from base stations while moving from one cell to another).

This framework enables distributed storage of anomaly information across vehicles and roadside infrastructure in the anomaly coverage area, while also allowing "subscriber" nodes (e.g., the DMV, insurance company investigation systems, vehicle manufacturer post-accident services) to pull together all pieces of the stored view of the anomaly and reconstruct the scene. Given that ICN does not require the underlying participants to be specifically known or identifiable, but instead merely requires the name and/or attributes of relevant data to be known, the process of gathering anomaly data from numerous sources is much more straightforward. Scene reconstruction can then take place in a cascaded and cooperative manner, as described further below.

FIG. 59 illustrates the overall system-level process flow 5900 for anomaly detection and reconstruction via an ICN network, while FIG. 60 illustrates the process flow 6000 at an individual node within the ICN network. Turning to FIG. 59, the process flow 5900 begins when one of the entities (either a static infrastructure element or a mobile element such as a vehicle) detects an anomaly, such as a collision. The illustrated example assumes the anomaly is detected by a roadside unit (RSU), which sends an alert to trigger the reconstruction process.

For example, upon detecting the anomaly, the RSU sends a "scoped interest" packet over the ICN network (block 5902) using multicast in order to allow the packet to be heard and/or received by the respective entities that are within the coverage range of the network. In typical ICN networks, for example, a subscriber sends an "interest packet" that contains the precise name of the desired content or data. In this case, however, because the subscriber does not know the exact name of the content, the scoped interest packet merely identifies certain attributes of the desired content. Thus, the structure of a scoped interest packet differs from traditional ICN interest packets, as a scoped interest packet is essentially a "fuzzy" request for data that satisfies certain criteria rather than a request for data with a precise name. In some embodiments, for example, a scoped interest packet may request data based on an approximate location in space and time, such as data captured within certain deltas relative to a reference location x,y,z (RefLoc) and a reference time t (RefTime).

The naming convention for such an anomaly re-construction process is designed and implemented a-priori to facilitate the search. For example, each participating publisher follows the same naming convention such that the object names of the sensory data being recorded are named consistently, such as using the following format:

GeographicalLocation/Date/Timestamp/EntityName.

The geographical location could be a standardized format that is similar to the naming mechanism for map tiles used to construct vehicular maps. The date and timestamp reflect the local date and time for the particular geographical location. The entity name could reflect a unique identity for a vehicle or the infrastructure equipment. The query contains the geographical location, date, and timestamp in the same format as the naming convention to facilitate an efficient search.

In some embodiments, a scoped interest packet may also identify and/or include a "function" for each node to apply to any data collected in response to the interest packet, such as a particular processing function for aggregating and/or compressing responsive data received at the intermediate hops before it reaches the original subscriber, thus improving network efficiency.

The scoped interest packet is received by multiple vehicles or nodes (blocks 5904 and 5906), and each node searches for responsive data and may also forward the packet along to other nodes (blocks 5908 and 5910).

The process flow of an individual node is further illustrated and described in connection with FIG. 60. For example, turning to FIG. 60, after the RSU has sent a scoped interest packet (block 6002) that is received by a vehicle or other node (block 6004), the node checks to see if another entity has issued a similar interest packet that has been buffered in the node's pending interest packet table (block 6006). If a similar interest packet has already been received, that means the node has already seen this request, and thus the node deletes the current interest packet (block 6008). If a similar interest packet has not been received, the node has not sent this request, and thus the node performs longest prefix matching for the named content within its cache to search for responsive content that matches the query parameters (block 6010). If responsive content is identified, the node then saves the content (block 6014).

However, unlike a conventional ICN where the transaction ends once a node provides matching content in response to an interest packet, here the node forwards the interest packet to other potentially relevant nodes (block 6014) and also stores the packet in its pending interest table to avoid processing duplicative interest packets for the same query or incident. In order to bound the region where the interest packet propagates, a "scoped" region of interest is defined in the interest packet, such that the interest packet continues to propagate within the scoped region until the requisite "proximity" is exceeded. In some cases, for example, the scoped region may be defined as a certain radius around the anomalous event, such as a radius that corresponds to the maximum range or visibility of cameras that could potentially capture the event. If a particular node does not find any matching content for a given "scoped interest" packet, that is an indication that the query has reached its geographical boundary, and thus the node does not forward the packet any further (block 6012).

As responsive data packets are received by the various nodes and end points in response to the forwarded scoped interest packet, each node may wait for a certain timer T to expire in order to gather all responses before sending its own response to the scoped interest packet (block 6016). In this manner, the ultimate response contains a comprehensive collection of data from many content providers rather than only a single content provider. This approach enables a many-to-one type of transaction at the network layer, where a single request associated with a scoped interest packet can be satisfied by multiple providers who in turn may forward the scoped interest packet along, although whether each provider also accumulates responses from multiple providers may be dependent on the type of query and depth of the network. For example, given that many responses may be received at the intermediate nodes, the nodes may choose to aggregate and/or filter the received responses before sending them along with their own response (block 6018).

Figure 61:
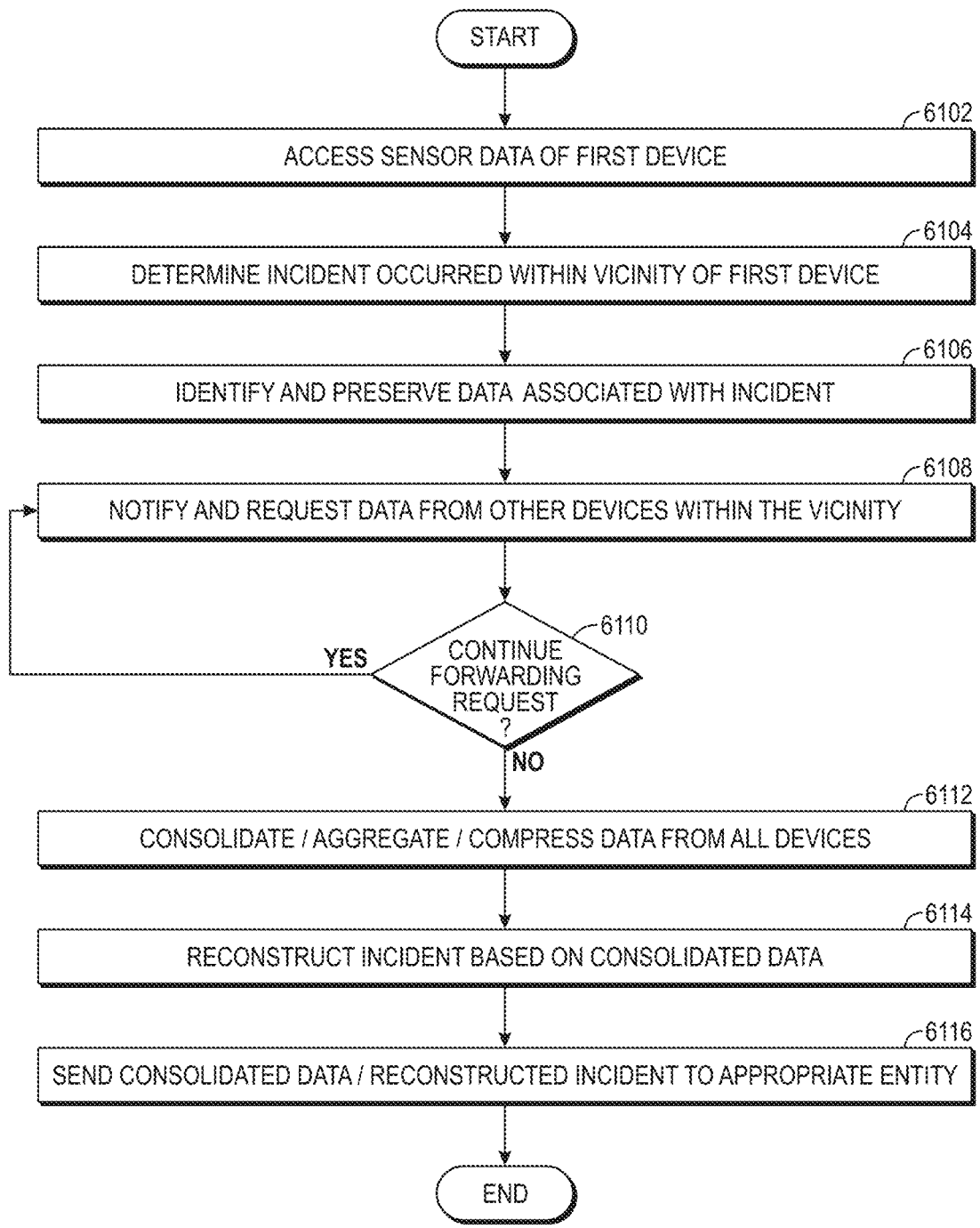
FIG. 61 illustrates a flowchart for an example embodiment of a ubiquitous visual computing witness.

FIG. 61 illustrates a flowchart 6100 for an example embodiment of a ubiquitous visual computing witness. In some embodiments, for example, flowchart 6100 may be implemented using the visual computing architecture and functionality described throughout this disclosure.

The flowchart begins at block 6102 by accessing sensor data captured by one or more sensors of a first device. The first device, for example, may be a processing device with one or more processors, sensors, and/or communication interfaces. The sensors can include any type of device used for capturing data associated with a surrounding or operating environment, such as vision sensors for generating visual representations of a surrounding environment (e.g., cameras, depth sensors, ultraviolet (UV) sensors, laser rangefinders (e.g., light detection and ranging (LIDAR)), infrared (IR) sensors, electro-optical/infrared (EO/IR) sensors), internal sensors of vehicles and other types of equipment, and so forth. In some embodiments, for example, the first device may be associated with a vehicle and the sensors may include a combination of vision sensors and internal mechanical sensors. Alternatively, the first device may be associated with a surveillance system and the sensors may include one or more vision sensors.

The flowchart then proceeds to block 6104 to determine that an incident occurred within the vicinity of the first device. In some embodiments, for example, the incident may be detected based on an analysis of the sensor data captured by the sensors of the first device. For example, an incident may be detected by processing sensor data using any suitable approach, such as identifying unexpected or outstanding changes in sensor data (e.g., data from internal sensors of vehicles and/or other types of equipment), performing event detection and recognition using computer-vision and/or machine learning techniques, and so forth. In some embodiments, for example, an anomaly may be identified during analysis of the sensor data, and it may be determined that the anomaly is indicative of a particular incident or event. For example, during steady-state operation, sensor signals may be monitored and/or recorded to establish a baseline, and an anomaly may be identified when the sensor signals deviate from the baseline, which may be determined using statistical analysis, thresholds, rates, and so forth. Alternatively, or additionally, data from visual sensors may be analyzed using image and/or video processing techniques to identify an incident and/or event captured in the visual data (e.g., using feature recognition, image classification, artificial intelligence, machine learning, artificial neural networks, and so forth). Further, in some embodiments, detection of an incident may be triggered based on the cumulative detection of multiple anomalies, incidents, and/or events over a period of time.

Alternatively, the first device may be notified of the incident by another device. For example, in some embodiments, the first device may receive a notification associated with the incident over an information-centric network (ICN), where the notification comprises a request for data associated with the incident, and where the request for data comprises an indication of a plurality of attributes associated with the incident, which the first device can use to identify relevant data associated with the incident.

The flowchart then proceeds to block 6106 to identify and preserve data associated with the incident. In particular, the sensor data captured by the first device may be analyzed in order to identify relevant sensor data that is associated with the incident. In some cases, for example, sensor data captured by the first device around the approximate time and location of the incident may be deemed relevant to the incident. Accordingly, the relevant sensor data may be preserved, such as by designating it with a high priority and/or quality of service (QoS) designation, and storing it on a suitable memory or storage device. Alternatively, in some embodiments, a snapshot of all available sensor data may be preserved in response to an incident, with different designations for the most relevant data versus the remaining data. In this manner, the full collection of sensor data will be available for subsequent processing and/or analysis (e.g., offline), if needed.

The flowchart then proceeds to block 6108 to notify and request data from other devices within the vicinity. For example, the first device may broadcast/multicast a notification with a request for data associated with the incident to other devices within the vicinity of the first device. In various embodiments, for example, the notification may be transmitted over an information-centric network (ICN) and/or an IP-based network. Further, in some embodiments, the notification may identify various attributes associated with the incident, and/or a name or identifier associated with the incident, which the receiving devices can use to identify relevant data associated with the incident.

The flowchart then proceeds to block 6110 to determine whether to continue forwarding the request. For example, when the notification is received by other devices within the vicinity of the first device, each receiving device may determine whether it has any relevant data associated with the incident, as well as whether to continue forwarding the notification. In some embodiments, for example, each receiving device may search for relevant data (e.g., sensor data) based on the attributes of the incident that were provided in the notification, such as the time and/or location of the incident. Moreover, if relevant data is identified by a particular device, that device may forward the notification and request for data to other devices within its vicinity. However, if no relevant data is identified by that device, the device may decline to forward the notification.

The flowchart then proceeds to block 6112 to consolidate, aggregate, and/or compress the relevant data identified and/or received by the respective devices. For example, as each device identifies its own relevant data and also receives relevant data from other devices that it forwarded the notification to, each device may consolidate, aggregate, and/or compress its collection of data before providing data in response to the notification. In this manner, all relevant data from the respective devices is eventually collected and consolidated in response to the notification associated with the incident.

The flowchart then proceeds to block 6114 to reconstruct the incident based on the consolidated data. In various embodiments, for example, incident reconstruction may be performed by generating a multi-dimensional representation of the incident from the consolidated data using any suitable processing techniques, such as sensor fusion, computer vision, artificial neural networks, machine learning, and so forth.

The flowchart then proceeds to block 6116 to send the consolidated data and/or reconstructed incident to an appropriate entity, such as a police department, DMV, insurance company, vehicle manufacturer, or any other person or entity that needs the data.

At this point, the flowchart may be complete. In some embodiments, however, the flowchart may restart and/or certain blocks may be repeated. For example, in some embodiments, the flowchart may restart at block 6102 to continue detecting, reconstructing, and/or reporting incidents of interest.

Converged Node

In the Internet-of-Things (IoT), there are increasing numbers of sensors connecting to networks. Many of them, such as cameras, are generating high-volume time-sensitive data streams. Because these sensors are joining at the very edges of a network, their data typically flows in the direction from the edge towards the cloud, which is the reverse direction from how the network was originally provisioned. Moreover, the size of a single data stream can be significant from a bandwidth perspective, and thus often results in latency constraints for real-time applications. Furthermore, many of these flows are continuous in nature. Thus, if many high-volume streams simultaneously arrive at and converge upon the same router, which is often the case in typical hierarchical and/or wireless network topologies, it is possible that these data flows will not fit either in memory, local storage, and/or along the next hop in the network (which may lead to denial of service if the router is overloaded with traffic beyond its capacity). Even when the flows are not high-volume or continuous, if the number of flows is extremely high, the aggregated bandwidth requirements still might exceed the available resources (both on and off platform).

These scenarios present a problem of data implosion. Current congestion control techniques are inadequate, as they only partially address the problem when there are simply too many data streams competing for router buffer queue resources in the network. For example, a normal layer 3 (L3) router has several strategies to manage an oversized incoming data stream: (1) simply do not forward packets that do not fit (e.g., drop them); or (2) indirectly signal the source, as well as intermediate routers, of the mismatch in required bandwidth versus available bandwidth (e.g., explicit congestion notification (ECN) in IP headers). At the transport layer (e.g., TCP), retransmission timeouts are used to detect congestion to reduce the flow of packets until the congestion is eased. At the application layer, a sender of data has the opportunity to (1) ask or negotiate configuration details up front before the data exchange begins, or (2) infer from routing hints along the path how to fit the data over the route and/or transform individual data streams (e.g., by taking a data flow out of its original format and converting it into a format that would fit the most constrained part of the path through the system), which can be achieved by dynamically renegotiating with the application how to fit the data over the network. Congestion can also be addressed by adding more resources, such as more bandwidth using a bigger and more expensive backbone for the aggregated flows, but that is often a very expensive and impractical solution given the flexibility and potential scale of IoT.

The existing congestion control techniques at the application, transport, and routing layer are insufficient, as the IoT capacity problem exists due to the increase in flows versus existing capacity, rather than a temporary congestion problem that relates solely to peak or busy hour traffic. Further, adding network capacity without incurring significant costs is not possible with the existing solutions.

Although congestion control algorithms seek to minimize data over-run at traditional router nodes in the network, congestion ultimately leads to a growing queue of packets, which increases end-to-end delay. When a queue overflows, meaning there is no more room to store arriving data, a router begins to drop packets, which may have a big impact on flows that require the delivery of in-order packets or even a modicum of impact on the delivery of flows that require reliable (but possibly out-of-order) delivery of packets, which might need to wait a roundtrip for a retransmission of any packet losses. For example, delay and/or packet loss can be highly disruptive, not to mention unacceptable for a camera mounted on a connected car whose data is meant to be archived as the black box or ground truth for anomalous car or environmental incidents.

Accordingly, this disclosure presents various embodiments of a "converged node" that is designed to efficiently route/process/cache visual data streams flowing in an N-to-1 manner in edge and fog computing systems. The converged node enables the continued transmission of data even when there is a vast difference between the amount of incoming data and resources available for the outgoing data. This is possible due to the collective processing and caching of contextually-related streams, such as when multiple cameras capture images from different but overlapping perspectives.

The basic idea of the converged node is to extend the functionality of a traditional L3 router to comprehend and prevent the implosion of IoT data flows (e.g., the many-to-1 nature of data flowing upstream from a dense camera deployment in a smart environment). Because multiple incoming streams are often contextually related (e.g., in space, time, and possibly other ways), converged node IoT routers offer a new strategy: process, analyze, and transform the streams together. For example, a converged node effectively takes multiple incoming streams and transforms them into a single output stream by performing transformative compute functions on them, such as analytics, machine learning, artificial intelligence, and so forth, which serves as a new kind of "compression." The new emergent stream is then stored for re-use by contributing and/or nearby stakeholders.

The converged node implicates several new requirements for L3 routers in order to service IoT deployments that have a need for supporting reverse data flows at scale (e.g., high-volume, continuous, low-latency, and/or high-density flows) while avoiding the data implosion problem. For example, with respect to a converged node, the network data flows converge on the node and may be combined or merged from multiple incoming streams into a single outgoing stream (while in-flight and en-route to somewhere else). The implications of this convergence of flows are that the routing, processing, and compute sub-systems can be co-designed in hardware to support low-latency handling of the data (e.g., via an internal shared data bus or shared memory). The extended capabilities of the L3 router, as implemented by the new converged node, are described further below.

The functionality of a converged node can be implemented in software, although additional efficiencies can be gained in a hardware solution (e.g., using accelerators and/or FPGAs). For example, a hardware version can employ zero-copy design, which means it would avoid copying/moving data to each sub-system for consideration, and instead moves the functionality/service/operation to the data itself, subscribing to the philosophy of "moving the compute to the data."

The converged node provides a solution to network congestion that is scalable in a cost-efficient manner and provides greater performance than existing solutions. For example, converged node routers can provide significant cost and performance benefits for network operators and other entities that deploy servers for edge computing in real networks, particularly with respect to video and visual data flows. Additionally, this solution is highly applicable to contexts where the end-to-end reverse flows pass through multiple converged nodes, such as when data is organized by geographic region and thus passes up a hierarchical or multi-tiered topology (e.g., layered administrative domains or clouds), which is often the case for video surveillance, energy monitoring, and healthcare use cases, among other examples.

The converged node also provides benefits relating to time-sensitive capabilities, such as the utility of high-resolution timestamps (e.g., both to meet time-constrained delivery and time-sensitive coordination across multiple streams), implementing time coordinated compute (TCC) capabilities, and so forth.

As noted above, a converged node can be implemented by extending the functionality of a traditional router, such as an L3 router. The process flow within this extended "converged node" router may be as follows: (1) comprehend and manage the serious data implosion problem for IoT edge and fog systems; (2) process multiple contextually-related streams simultaneously; (3) look beyond packet headers to analyze if and how a stream is interesting or notable; (4) look beyond packet headers to analyze if and how the streams are related and might be "compressed", in the broader sense of the term; (5) identify a functional strategy to emerge with a single new stream going forward, which may employ different functions for different scenarios, necessitating the ability to dynamically request and fetch functions/services/methods; (6) cache the new stream for re-use by contextually-related stakeholders, particularly those that are mobile, wireless, low-power, and/or proximate, for greater resource efficiency; (7) route the new stream in the reverse direction, which is where it was headed; (8) provide the option to route the new stream in other directions, e.g., within a local edge cloud and/or across neighboring clouds; (9) co-design the routing, computing and caching sub-systems to minimize time delay on platform; (10) employ zero-copy HW design techniques to implement efficient hand-off of data between sub-systems; and (11) leverage time-synchronization capabilities in the platform to synchronize across multiple data streams, in preparation for the analysis/transformation phase of the N-to-1 process.

There are various ways in which streams might be considered to be contextually related to each other. For example, in some embodiments, a broad correlation between the name of the content and different streams may be used. In an ICN context, all the streams that respond to a specific ICN Interest packet asking for data with a particular content "name" are considered contextually-related. The system could re-use the entries in the Pending Interest Table (PIT) as the entries in a directory for "contextually-related" groups. In a non-ICN context, the system still can leverage the name of the content or name-like attributes to organize streams into contextually-related groups, such as the URL/URI of the content, or the transport packet header tuples (e.g., sender and receiver addresses and port numbers), or the streams originating from the same subnet address (e.g., same subnet address pre-fix). The use of name-based techniques is beneficial over using deep-packet inspection of the content itself, which is a highly resource-intensive process. Alternatively, in some embodiments, in the visual realm, separate from ICN, streams within a "region of interest" (e.g., proximity in space and time) may be organized into contextually-related groups of packets.

In some embodiments, for example, a converged node may include the following capabilities on top of traditional router functionality: (1) analyzing data in data flows beyond packet headers; (2) defining what it means to be contextually-related (e.g., within a geographic region of interest, owned by same vendor, running the same version of malware software, and so forth); (3) collectively processing N contextually-related incoming data flows; (4) recommending a function to perform across these flows to "compress" them before they are routed/cached; (5) transforming the N streams into a single, new, less-resource-consuming data flow; (6) potentially caching/storing the new stream locally, such as for request and retrieval by nearby proximate sensors that may have contributed to the new stream and/or by those who have an interest in the results; and (7) routing the new data stream to its next intended upstream destination, which may be the northern direction in which the data was originally flowing, but may also include a broader dissemination, such as in the East-West direction to peer clouds or in the southern direction to interested parties.

Figure 62:
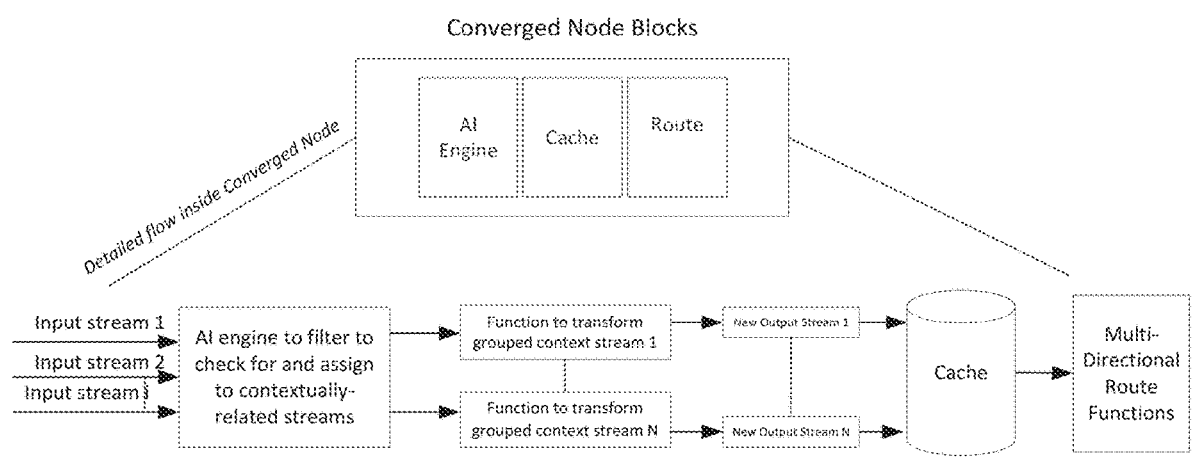
FIG. 62 illustrates an example embodiment of a converged node router.
Figure 63:
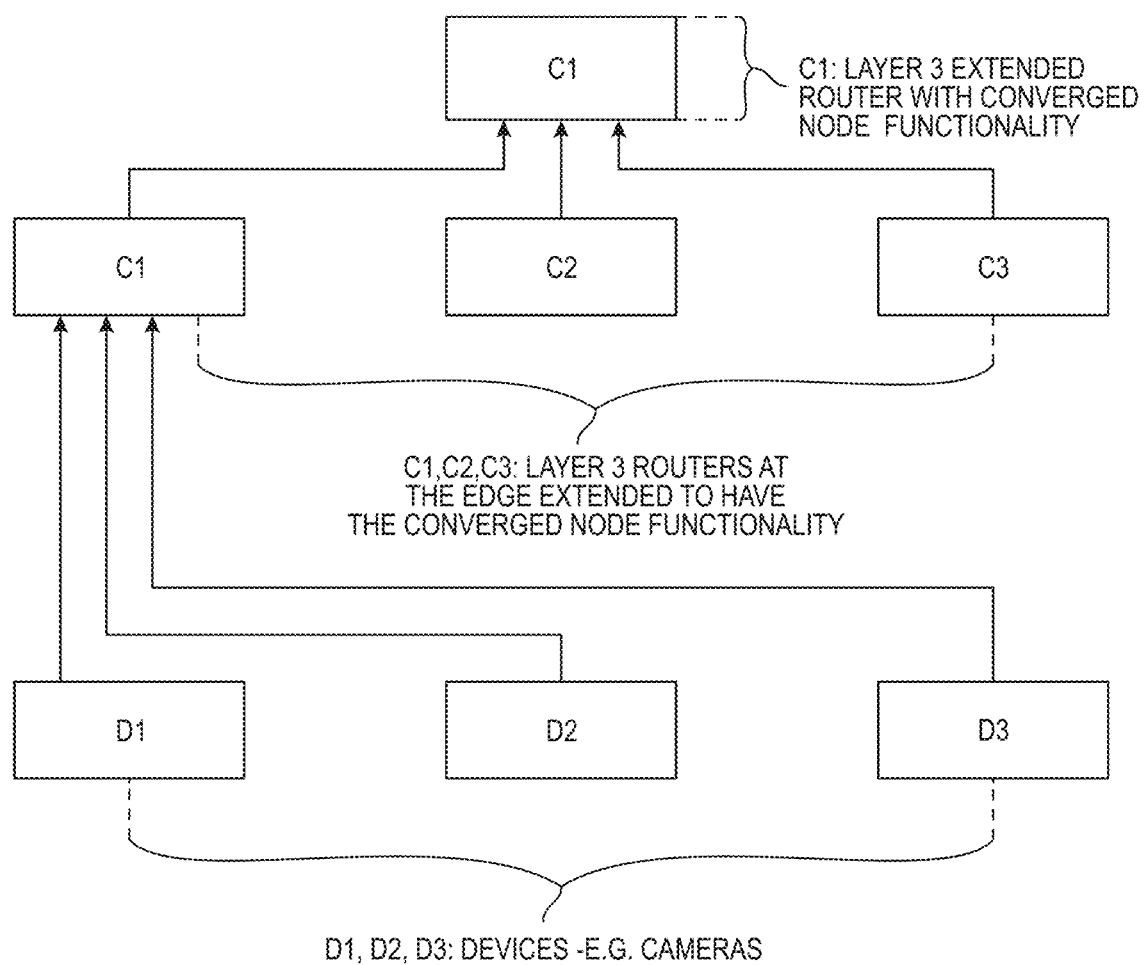
FIG. 63 illustrates an example network topology using converged node routers.

While these functions are generally described as being performed at a single converged node in the reverse data flow path (e.g., as shown in FIG. 62), they may be encountered and repeated multiple times in a cascading fashion until the data stream reaches its final archival resting place, as might be the case in a digital surveillance system that supports multiple levels of N-to-1 converged data flows. This end-to-end data flow and the processing-caching-routing capabilities surrounding it may be referred to as a reverse content distribution network (rCDN). The converged nodes are viewed as the extended routers along the end-to-end path in an rCDN, as shown in FIG. 63.

The converged node differs from previous L3 router solutions in that it requires the router to look inside the data stream beyond the packet header but rather focus on the content "packets payload," which is the more traditional focus of an L3 router. Additionally, the converged node is capable of performing its described functionality while the data streams are in-flight versus post-facto. The converged node router performs an N-to-1 transformation, which may represent a range of processing capabilities, including but not limited to compression, encryption, transcoding, labeling, aggregation/grouping some flows into larger flows based on contextual commonality, sub-sampling, combination (e.g., stitching), and analytics (e.g., which broadly refers to any type of analysis, whether it is statistical analysis, machine learning (ML), deep learning (DL) or some other form of artificial intelligence or machine learning).

With respect to the analytics functionality of the converged node, the process may take the data out of its original data format and convert it into another format. This might be the case with summarization of phenomena within the data stream, such as object recognition and object counting, or with the labeling of phenomena within the data stream, to create a new stream of metadata that tracks the appearance of interesting events in the visual field of view.

A key benefit of the proposed method is that it applies to any dense IoT deployment suffering from N-to-1 data implosion, whether or not the streams are video/visual in nature.

Furthermore, this technique couples nicely with information-centric network architectures, although it is not dependent on them.

There are numerous novel concepts associated with the converged node, including: comprehending and managing the serious data implosion problem for IoT edge and fog systems; processing multiple contextually-related streams simultaneously; looking beyond packet headers to analyze if and how a stream is interesting or notable; looking beyond packet headers to analyze if and how the streams are related and might be "compressed" (in a broader sense of the term); identifying a functional strategy to emerge with a single new stream going forward, which may employ different functions for different scenarios, necessitating the ability to dynamically request and fetch functions/services/methods; caching the new stream for re-use by contextually-related stakeholders, particularly those that are mobile, wireless, low-power, and/or proximate, for greater resource efficiency; routing the new stream in the reverse direction, which is where it was headed; providing the option to route the new stream in other directions, such as within a local edge cloud and/or across neighboring clouds; co-designing the routing, computing, and caching sub-systems to minimize time delay on the platform; employing zero-copy hardware design techniques to implement efficient hand-off of data between sub-systems; and leveraging time-synchronization capabilities in the platform to synchronize across multiple data streams, in preparation for the analysis/transformation phase of the N-to-1 process.

Automated Semantic Inference Using Smart Cameras

Machine learning can be used for visual object recognition using smart cameras. For example, a smart camera can leverage machine learning (ML)-based object recognition to detect an object in a camera's field-of-view by training an ML engine using a community of similar objects to produce a reference template (RT). In this manner, when a camera scans a previously unseen field of objects, it applies pattern recognition algorithms that produce template results that are compared with reference template (RT) values. A machine learning designer can then name a reference template in a way that characterizes the object that it recognizes. For example, after training several spherical objects, the reference template may be given a name such as "ball" or "sphere." In order to distinguish between different types of objects with the same shape (e.g., ping pong ball, basketball, soccer ball), additional training is needed for each object. For example, the reference template for "soccer ball" may differ from the reference template for more abstract forms, such as "ball" or "sphere."

Further, object classification may be used with formal logic modeling (e.g., taxonomies, ontologies, and semantic entailment tags) to describe "things" in terms of a rich class library that relates specific things to abstract things. For example, semantic entailment methods build class hierarchies of object abstractions, where objects near the root are more abstract than objects near the leaves.

There may be various drawbacks associated with these object recognition approaches, however. For example, object recognition requires training for each specific object that needs to be recognized. Accordingly, developing a reference template (RT) database for a spectrum of objects ranging from highly abstract to specific requires training that is designed for each object classification, which can be labor intensive. Further, recognition of abstract objects typically relies on a convention that allows less precision in the RT matching probability in order to avoid false negatives. For example, a weak probability (e.g., 70% match rather than 99% match) may be used to conclude that a more abstract "ball" is matched when the subjects in view are more specific (e.g., ping pong ball, basketball, soccer ball). This approach would fail to match a football, however, which is a ball but is not spherical. Moreover, performing object recognition using the full universe of reference templates for every object that could potentially be captured is highly processing intensive and may be infeasible in many cases, particularly for resource-constrained devices.

Further, leveraging semantic modeling for object recognition also presents various challenges. For example, semantic libraries typically require a universal or commonly accepted tagging syntax to be defined for objects in the hierarchy in order to correctly relate them to an application domain, and updates to the model often require human vetting to ensure semantic relationships are accurate. Further, semantic databases and ontologies often require large storage resources. Accordingly, it can be challenging to create, maintain, and store a comprehensive semantic library used for object recognition purposes.

Figure 66:
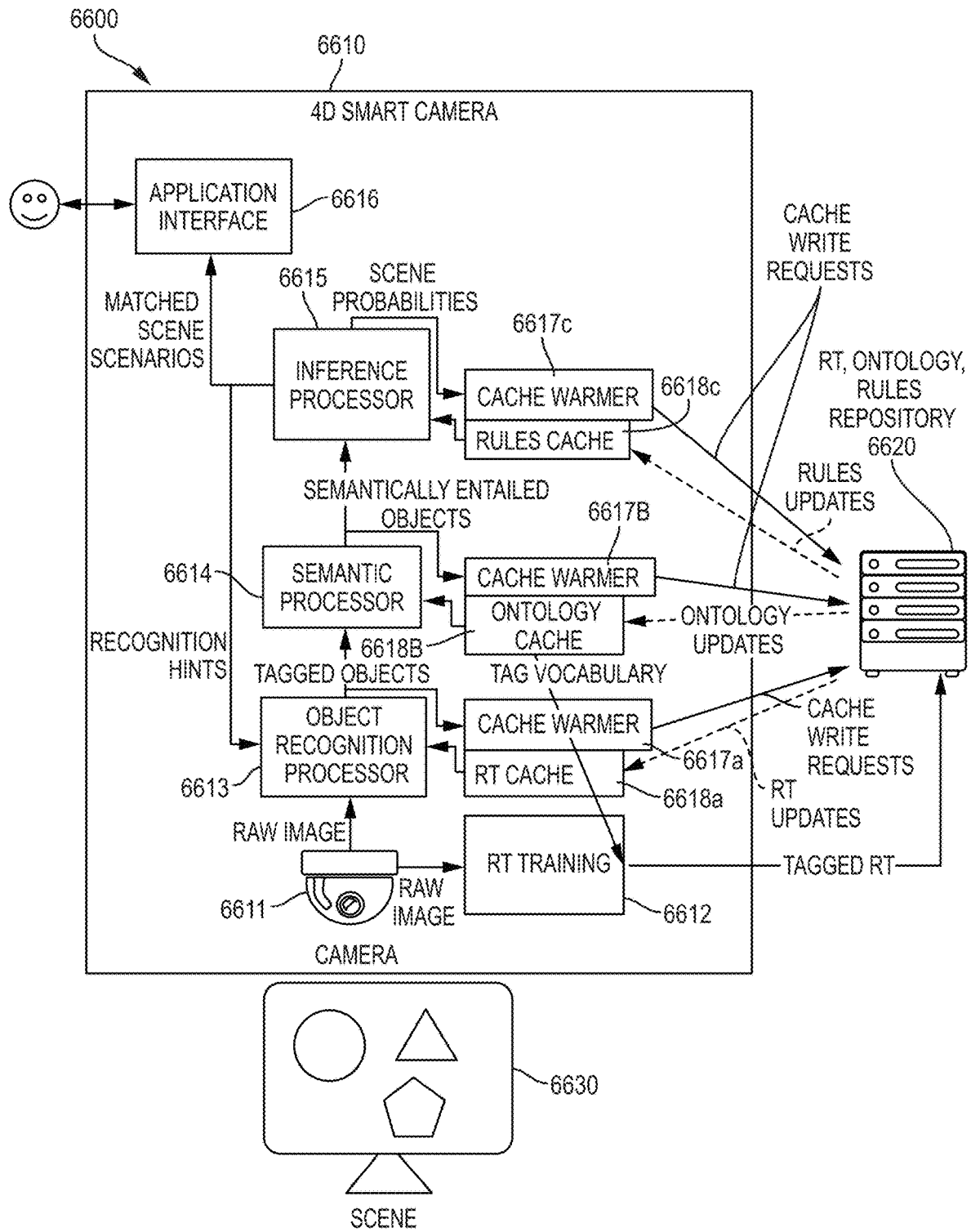
FIGS. 66, 67, and 68 illustrate examples embodiments associated with automated semantic inference of visual features and scenes using smart cameras.
Figure 67:
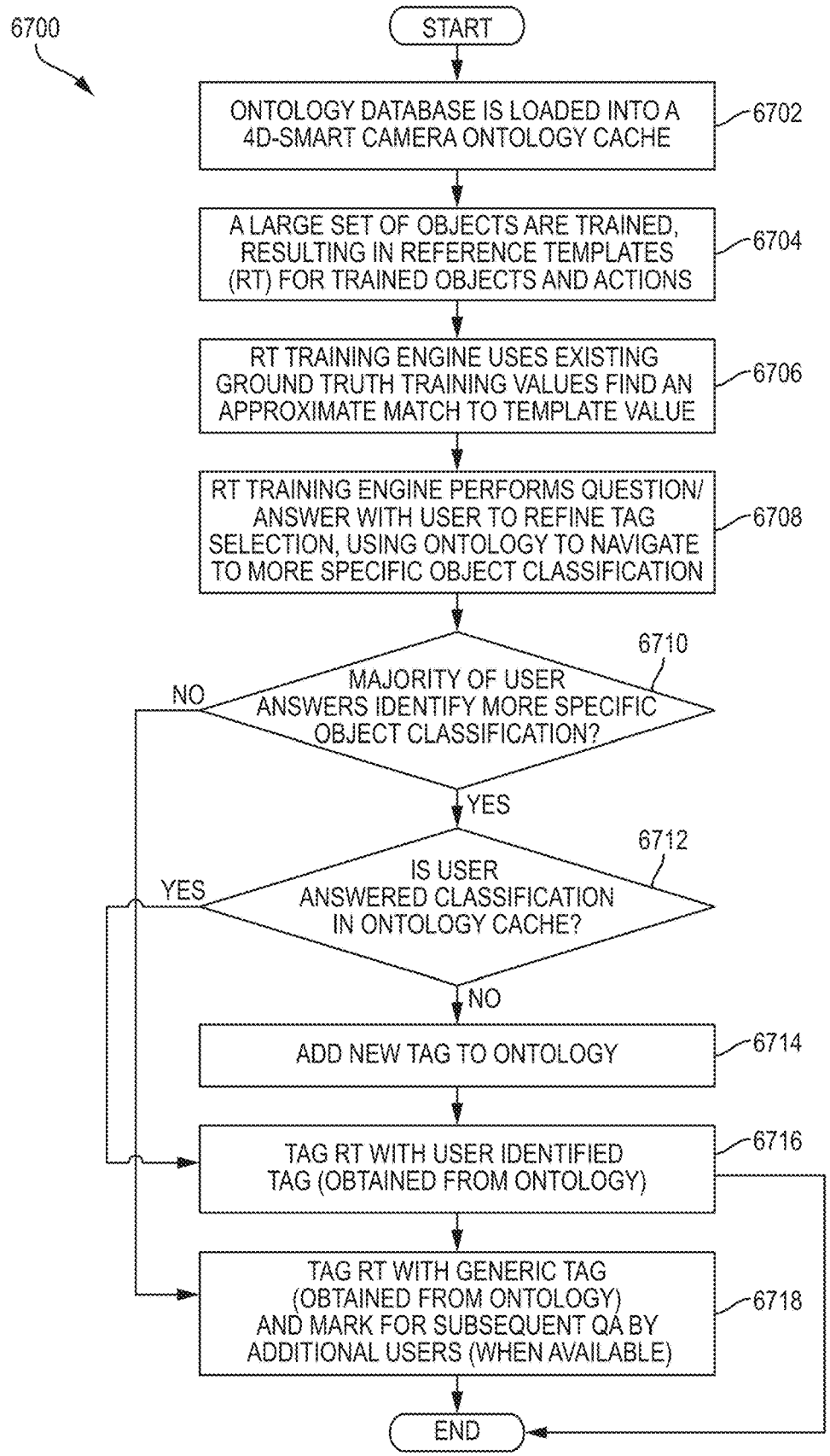
Figure 68:
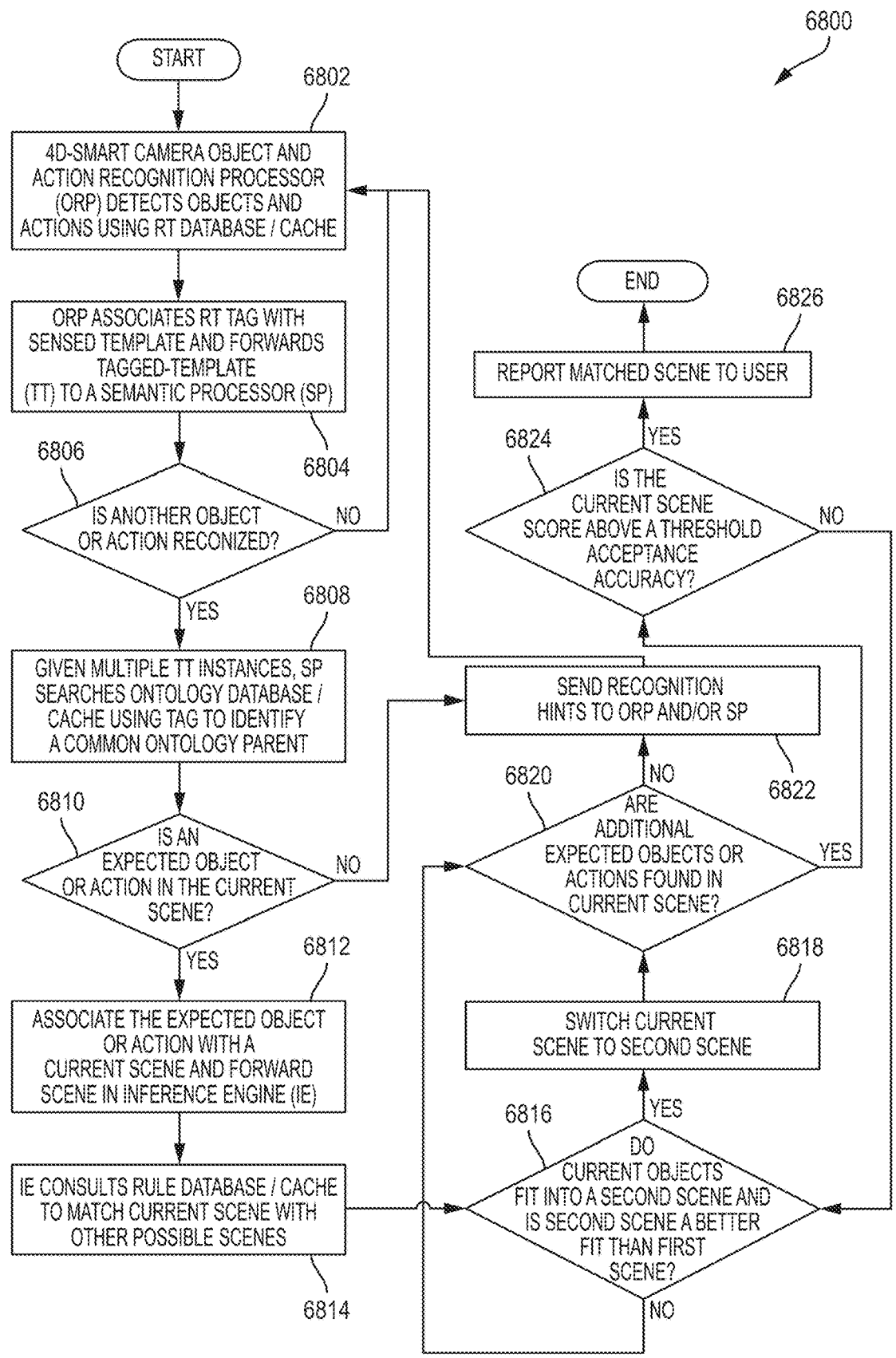

Accordingly, this disclosure presents various embodiments for recognizing scenes captured by cameras in an intelligent and efficient manner. For example, FIGS. 66-68 illustrate embodiments for performing automated semantic inferencing of features in visual scenes captured by cameras. These embodiments integrate both machine learning (ML) object recognition and semantic modeling technologies within smart cameras, thus enabling more effective reasoning about object interactions that occur within the field-of-view of a camera. In some embodiments, for example, a visual scene captured by a smart camera may be interpreted, recognized, and/or classified by recursively identifying features in the scene using feature recognition, semantic entailment, and rule-based scene inferencing.

For example, a feature recognition phase (e.g., object or action recognition) may be leveraged to identify an initial set of features in the underlying visual data associated with the captured scene. In this phase, the visual data is processed using machine learning feature recognition techniques based on an initial collection of reference templates (RTs) designed for recognizing certain commonly-detected features. A feature can be any aspect or characteristic associated with the visual scene, such as an object, action, condition, and so forth, and each feature may be represented and/or detected at a variety of levels of abstraction. A reference template can be any representation or model associated with a particular feature that facilitates recognition of that feature using a machine learning model. In some embodiments, for example, a reference template for a particular feature may be generated during the training phase of a machine learning model based on a collection of training images containing the feature. Moreover, in some embodiments, separate reference templates may be trained on a feature at multiple levels of abstraction.

Based on the feature(s) that are initially detected in the feature recognition phase, a semantic processing phase can then be leveraged to identify additional and/or more specific features that the visual data may be expected to contain (e.g., based on their relationship with the identified features). For example, an additional feature may be distinct from—but related to—a previously identified feature(s), or the additional feature may simply be a different level of abstraction of a previously identified feature (e.g., a more-specific version of an abstract feature). In some embodiments, for example, the additional features can be identified based on a defined ontology, such as an object ontology that represents or defines a hierarchy of objects and their associated relationships at multiple levels of abstraction.

Based on the feature(s) that are initially detected in the feature recognition phase, a semantic processing phase can then be leveraged to identify additional and/or more specific features that the visual data may be expected to contain (e.g., based on their relationship with the identified features). In some embodiments, for example, the additional features can be identified based on a defined ontology, such as an object ontology that defines or represents a hierarchy of objects and their associated relationships at multiple levels of abstraction. In some cases, for example, an additional feature identified using the ontology may simply be a different level of abstraction of a previously detected feature (e.g., a more-specific version of an abstract object that was detected initially), or alternatively, the additional feature may be distinct from—but related to—the previously detected feature(s).

Based on the additional features that are identified from the ontology in the semantic processing phase, the corresponding reference templates (RTs) for those additional features can then be retrieved from an appropriate source, such as a local cache on the smart camera or an external network resource (e.g., a cloud-based database, repository, or server). The feature recognition phase can then be performed again using these reference templates in order to determine whether any of the additional features are detected in the visual data, and based on any such detected features, the semantic processing phase can similarly be performed again to further identify additional features that are expected in the visual data. The process may continue cycling through multiple iterations of the feature recognition and semantic processing phases in this manner in order to continue detecting features in the visual data.

Based on all features that have been detected thus far during the feature recognition and semantic processing phases, an inference processing phase can then be leveraged to identify scenes that potentially match the visual data, identify additional features that may be expected in those scenes, and/or ultimately recognize the particular scene represented in the visual data. In some embodiments, for example, the inference processing phase may leverage a collection of inference rules designed for recognition of different visual scenes. For example, each inference rule may specify various conditions that are typically associated with a particular visual scene. In this manner, the particular scene associated with an inference rule can be recognized by evaluating the specified conditions against the visual data. If most or all of the conditions for the particular scene are satisfied by the visual data, then the particular scene may be recognized as a match with a high probability. If few or none of the conditions for the particular scene are satisfied by the visual data, then the particular scene may be deemed a low-probability match or no match altogether.

In this manner, the visual data may be evaluated against a collection of inference rules in order to identify inference rules that are potential matches. For example, if a particular inference rule is identified as a potential match, but not all conditions of the rule are satisfied, the unmatched conditions may be used to infer additional features that the visual data may be expected to contain. For example, the unmatched conditions may specify that certain additional features (e.g., objects, actions) are typically present in the particular scene associated with the inference rule. Accordingly, based on the additional features that are identified or inferred during the inference processing phase, the feature recognition and/or semantic processing phases may be performed again to (1) determine if the additional features are detected in the visual data (e.g., based on the corresponding reference templates) and/or (2) identify additional features that are semantically related to the newly detected features.

In this manner, the process may continue cycling through the feature recognition, semantic processing, and inference processing phases until enough features are detected to match the visual data to an inference rule with a sufficient level of confidence. In some cases, for example, the process may continue until a rule is matched above some threshold probability level, a time limit or maximum number of iterations is reached, the rate of progress per iteration falls below a threshold (e.g., few or no additional features are identified with each iteration, the match probability for a particular rule stops increasing with each iteration or only increases marginally), and so forth. Once an inference rule is confidently matched, it can then be concluded that the visual data represents the particular scene associated with that inference rule, and the scene recognition process may then be complete.

To illustrate, consider an example of visual data corresponding to a beach scene. During the feature recognition phase, both "water" and "ball" may be generically detected in the visual data based on the initial collection of reference templates. Further, during the semantic processing phase, the ontology may indicate that the "ball" is expected to be a "beach ball" (e.g., based on the presence of both a "ball" and "water"), and thus "beach ball" may be identified as an additional feature that the visual data could potentially contain. Accordingly, after retrieving the reference template for "beach ball" and performing feature recognition using that reference template, it may be determined that a "beach ball" is in fact present in the visual data. During the inference processing phase, an inference rule associated with a beach scene may be identified as a potential match based on the presence of the "beach ball" and "water" in the visual data, and the inference rule may further indicate that a "beach towel" is typically expected in a scene with those objects. Accordingly, after retrieving the appropriate reference template and performing feature recognition, a "beach towel" may then be detected in the visual data. This process may continue for multiple iterations until enough features are detected in the visual data to confidently match the visual data to the beach scene associated with the particular inference rule.

This approach is particularly suitable for resource-constrained devices such as smart cameras, as it enables them to perform intelligent feature and scene recognition in a resource-efficient manner. For example, the described approach enables a smart camera to focus the scope of its visual processing on features and/or scenes that it expects to detect in the visual data, thus allowing its processing resources to be utilized more efficiently. Similarly, the smart camera can limit its locally stored data to that which is required for the focused visual processing scope. For example, the smart camera can locally store certain reference templates, ontology data, and/or inference rules that are associated with commonly detected features and scenes, while other reference templates, ontology data, and inference rules can be retrieved from an external resource on an on-demand basis.

Further, in some embodiments, a smart camera may leverage cache warmers to proactively warm its cache(s) with potentially relevant reference templates, ontology data, and/or inference rules. For example, based on the current processing state (e.g., the set of features, ontological relationships, inferences, and/or scenes that have been detected, identified, and/or derived thus far), the cache warmers may identify certain reference templates, ontology data, and/or inference rules that are likely to be needed in the near future. Accordingly, the cache warmers may retrieve the identified reference templates, ontology data, and/or inference rules from the appropriate resource (e.g., a cloud-based repository) and load that information into the cache(s) of the smart camera. In this manner, when those resources are needed by the smart camera, they will already be locally available in its cache(s). Thus, storage constraints are reduced by only storing data that is currently needed, while access latency is minimized by proactively retrieving any additional data that may subsequently be needed.

The described embodiments provide numerous advantages, including sophisticated reasoning and interpretation of visual scenes in a resource-efficient manner. For example, given a still image of a picnic at the beach, a smart camera can generate metadata (e.g., exchangeable image file format (XIF) data) that identifies objects within the image (e.g., the sun, a beach ball, and a plate), while also automatically naming or categorizing the particular scene represented in the image (e.g., "picnic at the beach"). Further, combined with other contextual information such as location data (e.g., GPS data), the auto-generated name could also include the name of the specific beach (e.g., "picnic at Cannon beach"). As another example, this technology could be used for a soccer sporting event to identify and/or distinguish the game ball from other nearby balls (e.g., balls that are out of play, on the sidelines, and/or in the stands), analyze the field, goal, ball in play, and player positions, and/or detect rule violations (e.g., fouls and penalties, such as an offsides player). In this manner, the technology enables the camera to play a stronger role in refereeing the game. Further, semantic modeling and ontologies can be leveraged in a manner that enables dynamic addition of unseen object classes. For example, given a new object type that is not included in an existing ontology, user interactions such as crowdsourcing can be leveraged to automatically create a new tag and add it into the ontology or taxonomy.

FIG. 66 illustrates an example embodiment of a scene recognition system 6600. In the illustrated embodiment, scene recognition system 6600 includes a four-dimensional (4D) smart camera 6610, a central repository 6620 for storing scene recognition data (e.g., reference templates, ontologies, and/or inference rules), and a scene or environment 6630 to be processed by the smart camera 6610.

4D smart camera 6610 may be implemented using 4D smart camera technology, which may refer to an enhanced camera technology that integrates a variety of underlying technologies, such as three-dimensional (3D) cameras (e.g., cameras with depth support), specialized machine learning and/or neural network processors (e.g., Movidius), advanced storage and/or memory technologies (e.g., 3D XPoint and Optane), contextual sensors (e.g., location or GPS sensors, accelerometers, gyroscopes), and so forth.

In the illustrated embodiment, for example, 4D smart camera 6610 includes the following components:

(1) one or more cameras 6611 and/or other vision sensors for capturing visual scenes;

(2) training logic 6612 for training machine learning models and/or generating reference templates for feature/object recognition;

(3) an object recognition processor 6613, which may include a machine learning (ML) or neural net computing platform (e.g., Movidius or Neuron platforms) with access to a reference template (RT) database (e.g., repository 6620) for feature/object recognition;

(4) a semantic processor 6614 with access to: (i) an ontology and/or taxonomy database (e.g., repository 6620) that relates a rich set of objects at various levels of abstraction, and (ii) a tag vocabulary (e.g., repository 6620) derived from the ontology database and used to tag objects in the RT database;

(5) an inference processor 6615 with access to a set of goal-oriented inference rules (e.g., repository 6620) designed to recognize specific visual scenes and/or detect "interesting" object interaction conditions (e.g., rule violations during a sporting event, a picnic at the beach, and so forth);

(6) local caches 6618*a-c* for caching reference templates, ontologies, and/or inference rules retrieved from repository 6620;

(7) cache warmers 6617*a-c* that continuously update the caches 6618*a-c* with interesting reference templates, ontologies, and rules; and (8) an application interface 6616 to communicate with a visual computing application.

In various embodiments, object recognition processor 6613, semantic processor 6614, and inference processor 6615 may be implemented using any suitable combination of hardware and/or software logic, and may further be implemented as separate logical or physical components or combined into one or more integrated components. In some embodiments, for example, processors 6613-6615 may be implemented using general-purpose central processing units (CPUs), graphics processing units (GPUs), and/or special-purpose processors designed for artificial intelligence, machine learning, and/or neural network applications (e.g., using application-specific integrated circuits (ASICs) or field-programmable gate array (FPGAs)), among other examples.

4D smart camera 6610 enables sophisticated reasoning about object interaction semantics in a resource-efficient manner. Initially, a training phase 6612 may be performed by either smart camera 6610 or by another camera or device. During the training phase, a camera observes training scene(s) where known objects are tagged using a tag vocabulary supplied by an ontology. The training agent may optimize the training by selecting a variety of semantically similar objects with different shapes or dimensions (e.g., football, rugby ball, marble, ping pong ball, planet, and so forth), knowing that the object ontology will allow "sphere" semantics to be inferred given that the ontology for "ball" also describes "sphere" as well as other more abstract and more specific representations of "ball." The reference templates (RTs) are stored in a repository 6620 for subsequent use by 4D smart camera 6610 (or another smart camera) to perform object recognition.

For example, subsequent to training, camera 6611 observes a scene 6630 containing objects that are matched or recognized using an ML or neural net object recognition processor (ORP) 6613 (e.g., Intel Movidius or Neuron). A reference template (RT) cache 6618*a* (e.g., Intel 3DXpoint) contains a set of object recognition reference templates designed for commonly recognized objects. The more frequently an object is recognized, the greater the probability that the reference template will be found in the cache 6618*a*. Object recognition processor 6613 identifies one or more objects (as many as can be found in the scene given available resources) and passes them to semantic processor (SP) 6614.

Semantic processor 6614 accesses an ontology cache 6618*b* to obtain the ontology elements that relate the various semantically entailed objects to a broader (or narrower) semantic context. For example, the ontology may include class hierarchies of object abstractions, where objects near the root are more abstract than objects near the leaves. Semantic processor 6614 can reason about the fuzzy equivalence of intermediate or leaf-node objects by traversing the hierarchy to find a common parent node, or semantic processor 6614 can reason or infer information about a particular object node based on its child node(s).

The objects identified by semantic processor 6614 are passed to inference processor (IP) 6615, where goal-oriented inference rules are applied. The rules are a set of matching criteria that, when matched, imply a more significant context or scene (e.g., a soccer game, an event at the beach). In some embodiments, inference processor 6615 may optimize object recognition and semantic entailment by giving hints to expected objects. For example, if one rule of inference processor 6615 describes a "picnic at the beach," then object recognition processor 6613 might expect to find additional objects in the visual data, such as "sun", "ocean," "plate," and so forth.

Object recognition processor 6613 may give processing priority to recognition of expected objects that are identified by either semantic processor 6614 and/or inference processor 6615. If found, the new objects may be processed for semantic entailment by semantic processor 6614 and passed to inference processor (IP) 6615, which may more completely match one of the possible contexts associated with the inference rules. Hence, 4D smart camera 6610 can optimize rule matching to focus on the scene context that is most likely to be the actual context.

If inference processor 6615 matches a rule with high probability, it discloses its choice for the scene context and scenario to an application processor 6616 that may be used for improved human-computer interactions. On the other hand, if inference processor 6615 matches a rule with lower probability, it may attempt to improve the probability by supplying hints regarding additional expected features or objects (as described above), or its cache warmer 6617c may send cache update requests to the rules repository 6620 directing it to supply "similar" rules that could match with a higher score (e.g., higher than the currently identified rule(s)). Similarly, semantic processor 6614 may warm its cache (e.g., using cache warmer 6617b) by requesting ontology data that is "near" the matching ontology elements.

FIG. 67 illustrates a flowchart 6700 for an example embodiment of reference template training with semantic entailment tagging. In some embodiments, for example, the flowchart of FIG. 67 may be applied as a pre-requisite to the flowchart of FIG. 68. Once a reference template (RT) database is sufficiently populated (e.g., using the flowchart of FIG. 67), it may then be used to perform the operations described in connection with FIG. 68.

The flowchart begins at block 6702, where the ontology database is loaded into a 4D-smart camera ontology cache. The flowchart then proceeds to block 6704, where training is performed on a large set of objects, resulting in reference templates (RTs) for the trained objects, actions, or other features. The flowchart then proceeds to block 6706, where the RT training engine uses existing ground truth training values to find an approximate match to the template value.

The flowchart then proceeds to block 6708, where the RT training engine performs questions and answers with users to refine the tag selection, using the ontology to navigate to more specific object classifications.

The flowchart then proceeds to block 6710, where it is determined whether a majority of the users' answers identify a more specific object classification. If the answer at block 6710 is NO, the flowchart then proceeds to block 6718, where the reference template (RT) is tagged with a generic tag (e.g., a tag obtained from the ontology) and marked for subsequent question and answer (Q/A) by additional users when available. If the answer at block 6710 is YES, the flowchart then proceeds to block 6712.

At block 6712, it is determined whether the user answered classification is in the ontology cache. If the answer at block 6712 is NO, the flowchart then proceeds to block 6714, where a new tag is added to the ontology. If the answer at block 6712 is YES, the flowchart then proceeds to block 6716, where the reference template (RT) is tagged with the user identified tag (obtained from the ontology).

At this point, the flowchart may be complete. In some embodiments, however, the flowchart may restart and/or certain blocks may be repeated. For example, in some embodiments, the flowchart may restart at block 6702 to continue the reference template training process.

FIG. 68 illustrates a flowchart 6800 for an example embodiment of scene recognition. For example, the illustrated flowchart may be used for recognizing scenes based on the appearance of objects and actions that correspond to a rule base of scenes that are known to be interesting to the user.

The flowchart of FIG. 68 combines object and action recognition using visual machine learning techniques with semantic processing and inference processing to construct a set of scenes in which sensed objects and actions may interact. Inference rules describe possible or expected interaction patterns and may suggest additional expected objects and actions that have not yet been detected by the sensor(s) and/or object recognition processor. Hints may be given to the object recognition processor and/or sensors in order to better calibrate or focus the sensing activity for recognition of the expected objects or actions. For example, the hint may allow a lower threshold for ML matching in order to allow for variance in real-world objects, or it may be used by a semantic processor to look for adjacent objects or actions in order to identify reference templates that were not originally part of the RT cache.

This approach makes visual content recognition software and hardware "smarter" by calibrating the scene according to expected or common interaction dynamics. This will decrease recognition latency and improve recognition accuracy for assistive user awareness applications.

The flowchart begins at block 6802, where a 4D smart camera object recognition processor (ORP) detects features, such as objects and actions, using a reference template (RT) database and/or cache.

The flowchart then proceeds to block 6804, where the object recognition processor associates an RT tag with the sensed template and forwards the tagged-template (TT) to a semantic processor (SP).

The flowchart then proceeds to block 6806 to determine whether another object or action has been recognized. If the answer at block 6806 is NO, the flowchart proceeds back to block 6802. If the answer at block 6806 is YES, the flowchart proceeds to block 6808, where given multiple TT instances, the semantic processor searches the ontology database and/or cache using a tag to identify a common ontology parent.

The flowchart then proceeds to block 6810 to determine whether an expected object or action is in the current scene. If the answer at block 6810 is NO, the flowchart then proceeds to block 6822. If the answer at block 6810 is YES, the flowchart then proceeds to block 6812, where the expected object or action is associated with a current scene, and the scene is then forwarded to an inference engine (IE).

The flowchart then proceeds to block 6814, where the inference engine consults a rule database and/or cache to match the current scene with other possible scenes.

The flowchart then proceeds to block 6816 to determine whether the current objects match another second scene that is a better fit than the first scene. If the answer at block 6816 is NO, the flowchart proceeds to block 6820. If the answer at block 6816 is YES, the flowchart proceeds to block 6818, where the current scene is switched to the second scene, and the flowchart then proceeds to block 6820.

At block 6820, it is determined whether additional expected objects and/or actions are found in the current scene. If the answer at block 6820 is NO, the flowchart then proceeds to block 6822. If the answer at block 6820 is YES, the flowchart then proceeds to block 6824.

At block 6822, recognition hints are sent to the object recognition processor and/or the semantic processor, and the flowchart proceeds back to block 6802.

At block 6824, it is determined whether the score of the current scene is above an acceptable accuracy threshold. If the answer at block 6824 is NO, the flowchart proceeds back to block 6816. If the answer at block 6824 is YES, the flowchart then proceeds to block 6826, where the matched scene is reported to a user.

At this point, the flowchart may be complete. In some embodiments, however, the flowchart may restart and/or certain blocks may be repeated.

Visual Fog Stream Multiplexing for Improved Security

Visual Fog deployment scenarios can include thousands of camera sensors transmitting video streams to thousands of viewers. In live media streaming, streams may not be delivered directly from sensor to viewer and may be buffered, streamed, and/or replayed by intermediate nodes. These intermediate nodes, in essence, perform a hop-by-hop routing function. This makes it easier for potential attackers to pose as routing nodes to attempt various types of man-in-the-middle (MITM) attacks.

Existing solutions trust the buffering/routing nodes to avoid 'malicious' routes and to keep content hidden (if not already encrypted). Since the video streaming formats need to support intermediate nodes, they are susceptible to malicious transmission interception, and there is not much a sender can do to prevent such attacks. For example, if content is encrypted, the sender and receiver must have the encryption key, but with visual fog use cases, there could be thousands of viewers and thousands of senders each requiring different keys. Ensuring the proper keys are available at the right time is not a scalable solution.

Figure 69:
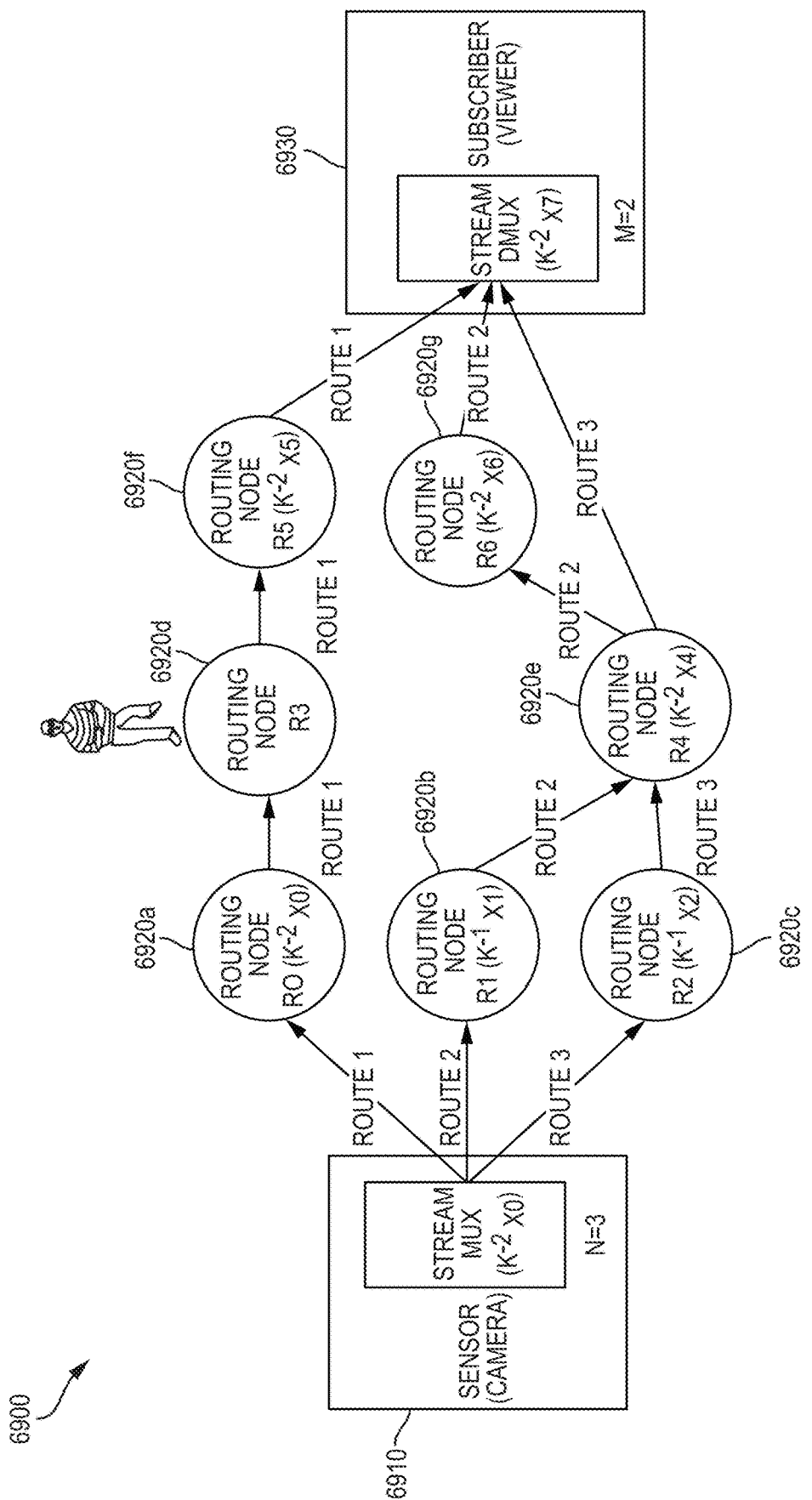
FIGS. 69 and 70 illustrate example embodiments associated with visual fog stream multiplexing for improved security.
Figure 70:
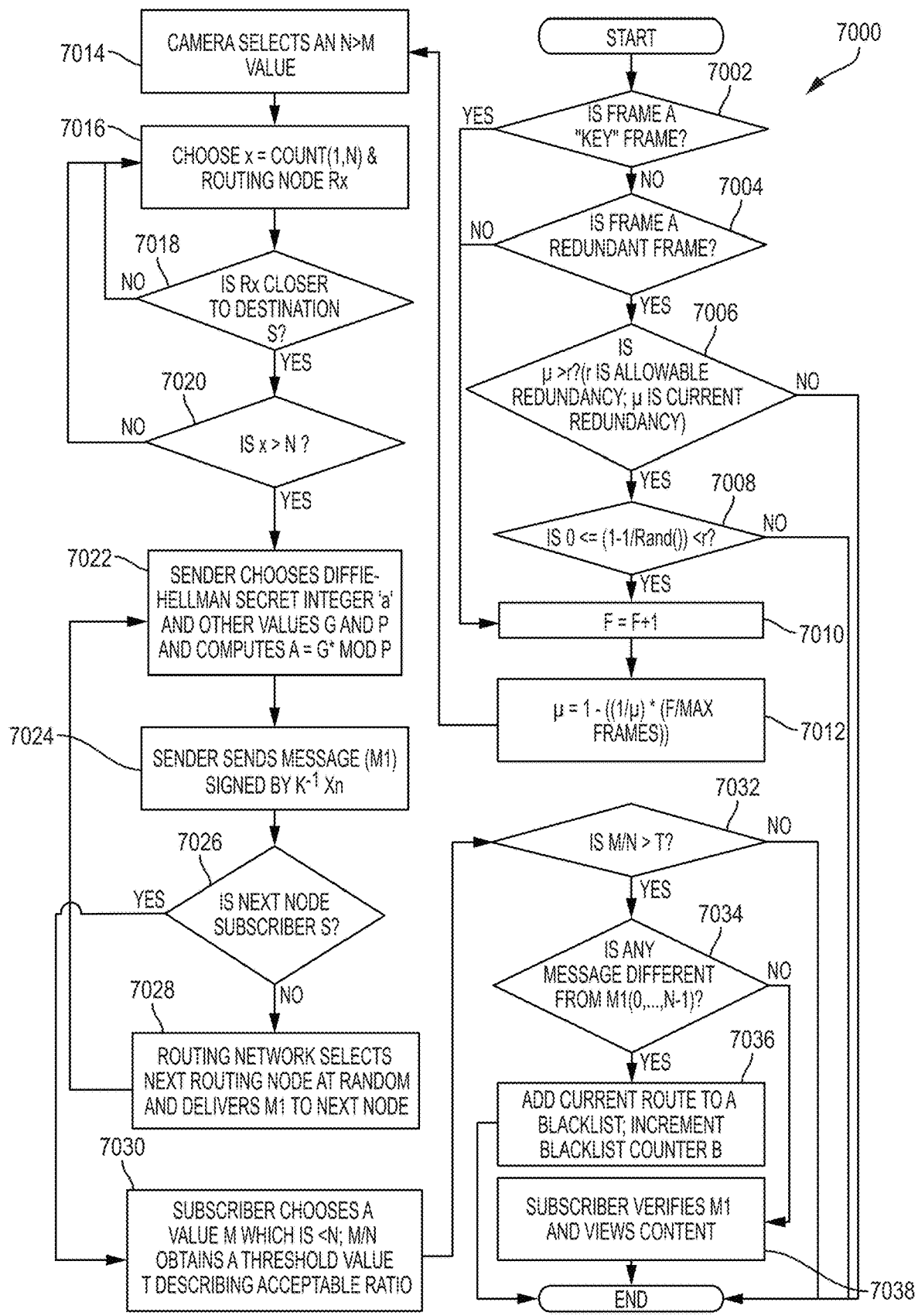

Accordingly, FIGS. 69-70 illustrate example embodiments associated with visual fog stream multiplexing for improved security. The described approach uses intermediate routing capabilities to its advantage by randomizing the choice of which intermediate node(s) will be used to stream the content. A series of randomized intermediaries can be very effective at preventing attackers from anticipating a route (and therefore targeting a man-in-the-middle attack).

The described approach also multiplexes content across multiple routes so that even if one stream is successfully attacked only a subset of the content is subject to attacker manipulations. For example, if an attacker injected frames into a stream, there would be a threshold of M streams that are the same versus (N-M) minority of streams that differ. These can be ignored.

Streams can be encrypted on demand using keys generated for each streaming session (e.g., using Diffie-Hellman). If the legitimate router/intermediary nodes are vetted and a member of an enhanced privacy ID (EPID) group, they can authenticate as trusted intermediaries making it difficult for the attacker to assert itself as an intermediary. Alternatively, group membership may be asserted using traditional asymmetric cryptography by assigning a group name attribute to a certificate and by recycling asymmetric keys frequently. Another alternative based on symmetric key cryptography shares the group symmetric key with each group participant and recycles the key each time a group member is removed from the group.

The described embodiments provide numerous advantages. For example, this approach increases availability of visual fog video content due to built-in redundancy. In use cases where bandwidth is not a concern, redundancy applies to all frames. In use cases where bandwidth is a concern, redundancy applies to key frames and optionally applies to other frames. For example, in live media streaming, I-frames must have redundancy whereas P-frames or B-frames may not have redundancy; in live 360 VR video streaming, low-resolution panorama must have redundancy whereas high-resolution user-specific views may not have redundancy.

In addition, the M-of-N threshold mechanism ensures man-in-the-middle attacks are less successful because M successful attacks are required to spoof the viewers. In use cases where bandwidth is a concern, delivery of key frames, which are needed to reconstruct other frames, is guaranteed.

Further, key management can scale to accommodate the M-of-N and redundancy fan out, EPID group keys can be used to authenticate trustworthy intermediary/router nodes, and randomization of routes makes it difficult for attacker to target particular content.

FIG. 69 illustrates an example embodiment of a system 6900 for visual fog stream multiplexing.

The system consists of a visual fog camera and/or sensor 6910 and one or more subscriber (viewers) 6930 of a content stream. Content streams may be consumed using a set of intermediate nodes 6920*a-g* that buffer, store, and forward video content, which are called routing nodes. There may be multiple (N) copies of the content stream transmitted from camera 6910 to subscriber(s) 6930 so that multiple subscribers may consume content discretely (having distinct playback control). Large content streams may be divided into multiple content images that are partitioned at the camera 6910 and stitched together at the subscriber 6930. Buffering and other streaming techniques may be used to provide a seamless streaming user experience, if desired.

The illustrated approach produces additional redundant copies that are communicated over different routes involving several intermediate routing nodes 6920. Each routing node 6920 randomizes its selection of the next hop node so that potential attackers cannot easily predict a final route. The subscriber(s) 6930 purposefully subscribe to at least (M) redundant copies of the content so that they can perform an M-of-N comparison of redundant streams. The purpose of doing the comparison is to detect possible tampering. For example, if a malicious routing node (R3) inserted itself into a route, there would be (M−1) redundant copies of the content with which to determine which is the valid copy.

In use cases where bandwidth is a concern, the illustrated approach only makes additional redundant copies of key frames, while selectively producing redundant copies of other frames. An application specific ratio for determining the percentage of redundancy may be calculated given the network infrastructure. Alternatively, the ratio can also be adjusted online based on QoS (e.g., using a PID controller).

The following function can be used for determining the total number of routes: Total=Product(Count(S), Count(N));

where subscriber Sx selects M copies from at least N received copies of Total copies sent. This approach is used when it is not practical to implement cryptography, key exchange, and/or or authentication.

In some cases, it may be practical to implement vetting procedures for routing nodes where the decision to perform the routing function can be controlled. Under these conditions the routing nodes are assigned an EPID group credential that authorizes them to function as a routing node. An EPID group key can be used to authenticate routing nodes:
EPID Group_X=(Name_X, Pub_key (Kx), Priv_keys $(K^{-1}_{X0}, K^{-1}_{X1}, \ldots, K^{-1}_{Xz})$,
where z is the number of routing nodes (R)+subscribers (S)+1 camera (C).

The EPID private key may be used to sign an integrity check value associated with each image. Alternatively, if content is to be encrypted, a Diffie-Hellman key exchange may be performed prior to content delivery, where $G^A$ and $G^B$ values are signed by the EPID private key ($K^{-1}_{Xn}$). The routing node (or subscriber) selected to receive the content verifies the signature using the EPID public key (Kx). This ensures only authorized routing nodes can handle the content images, thus minimizing the potential for a successful man-in-the-middle attack.

FIG. 70 illustrates a flowchart 7000 for an example embodiment of visual fog stream multiplexing.

In the illustrated flowchart, for example, a camera may send multiple copies of an image through a multi-hop routing network, where an attacker cannot easily predict which router or other MITM hosts to attack and cannot easily compromise a threshold T of nodes to fool the subscriber's threshold policy.

The flowchart begins at block 7002 by determining whether a particular frame is a "key" frame. If the answer at block 7002 is YES, the flowchart proceeds to block 7010. If the answer at block 7002 is NO, the flowchart proceeds to block 7004.

At block 7004, it is determined whether the frame is a redundant frame. If the answer at block 7004 is NO, the flowchart proceeds to block 7010. If the answer at block 7004 is YES, the flowchart proceeds to block 7006.

At block 7006, it is determined whether the current redundancy (μ) is greater than the allowable redundancy (r): μ>r? If the answer at block 7006 is NO, the flowchart is complete. If the answer at block 7006 is YES, the flowchart proceeds to block 7008.

At block 7008, it is determined whether the following equation is satisfied:

$$0 \le 1 - \frac{1}{rand_0} < r.$$

If the answer at block 7008 is NO, the flowchart is complete. If the answer at block 7008 is YES, the flowchart proceeds to block 7010.

At block 7010, a frame counter F is incremented: F=F+1. The flowchart then proceeds to block 7012, where the following equation is computed:

$$\mu = 1\left(\frac{1}{\mu} * \frac{F}{\text{max\_frames}}\right).$$

The flowchart then proceeds to block 7014, where the camera selects an N>M value.

The flowchart then proceeds to block 7016 to choose a routing node $R_x$, where x=Count(1,N). The flowchart then proceeds to block 7018 to determine whether routing node $R_x$ is closer to destination S. If the answer at block 7018 is NO, the flowchart proceeds back to block 7016. If the answer at block 7018 is YES, the flowchart proceeds to block 7020.

At block 7020, it is determined whether x is greater than N: x>N? If the answer at block 7020 is NO, the flowchart proceeds back to block 7016. If the answer at block 7020 is YES, the flowchart proceeds to block 7022, where the sender chooses a Diffie-Hellman secret integer a and other values G and P, and computes $A=G^a$ mod P. The flowchart then proceeds to block 7024, where the sender sends message M1 signed by $K^{-1}_{Xn}$.

The flowchart then proceeds to block 7026 to determine whether the next node is subscriber S. If the answer at block 7026 is NO, the flowchart proceeds to block 7028. If the answer at block 7026 is YES, the flowchart proceeds to block 7030.

At block 7028, the routing network selects the next routing node at random and delivers message M1 to the next node, and the flowchart proceeds back to block 7022.

At block 7030, the subscriber chooses a value M that is less than N, and M/N obtains a threshold value T describing an acceptable ratio.

The flowchart then proceeds to block 7032 to determine whether M/N is greater than T: M/N>T? If the answer at block 7032 is NO, the flowchart is complete. If the answer at block 7032 is YES, the flowchart proceeds to block 7034.

At block 7034, it is determined whether any message is different in the set of messages M1(0, . . . , N−1). If the answer at block 7034 is YES, the flowchart proceeds to block 7036, where the current route is added to a blacklist, and a blacklist counter B is incremented. If the answer at block 7034 is NO, the flowchart proceeds to block 7038, where the subscriber verifies message M1 and views its contents.

At this point, the flowchart is complete. In some embodiments, however, the flowchart may restart and/or certain blocks may be repeated.

Privacy Preserving Visual Question Answering (VQA) with Sanitization

Visual computing systems typically process raw visual data as input. For example, the raw visual data captured by a smart camera may be transmitted to the cloud for further processing and analytics. In many cases, however, transmission of raw visual data can compromise privacy, as certain privacy-sensitive information may be revealed or depicted by the visual data.

In particular, visual question answering (VQA) involves computing systems that are capable of automatically answering questions about visual representations of data (e.g., images and video), such as questions posed by humans in a certain form or syntax (e.g., natural language) about certain images or videos. VQA serves as the most fundamental means for end-users to meaningfully interact with the massive volumes and abundancy of visual data captured in the real world. In real-world settings, for example, videos are recorded practically everywhere (e.g., in all retailers and at every street corner). Brick-and-mortar retailers, for example, may want to collect as much video data as possible to derive (actionable) shopper insights, while shoppers may want to prevent the disclosure of their identities and/or other personal information. Existing visual processing systems, however, typically derive analytics and insights from raw images as input (e.g., by generating attention maps), which can compromise the privacy of people captured in the images, as it may reveal their identity and/or other personal information.

Accordingly, this disclosure presents a privacy-preserving VQA system that uses intermediate topological spatiotemporal representations to mask the identity of people captured in videos. For example, by injecting a novel intermediate representation of a person into the visual processing pipeline, visual queries can be answered without revealing the identity and/or compromising the privacy of the person.

The described approach uses an intermediate sanitized representation of a raw image to serve as the input to a VQA system. In this manner, this approach is privacy-preserving, as it conceals the identities of people captured in the original images, yet it still enables meaningful analytics to be derived, as the topological spatial and temporal relationships of the original images are preserved. This is particularly beneficial in the retail context, as it enables shopper insights to be derived for retail analytics purposes without revealing the identities of shoppers.

Figure 71:
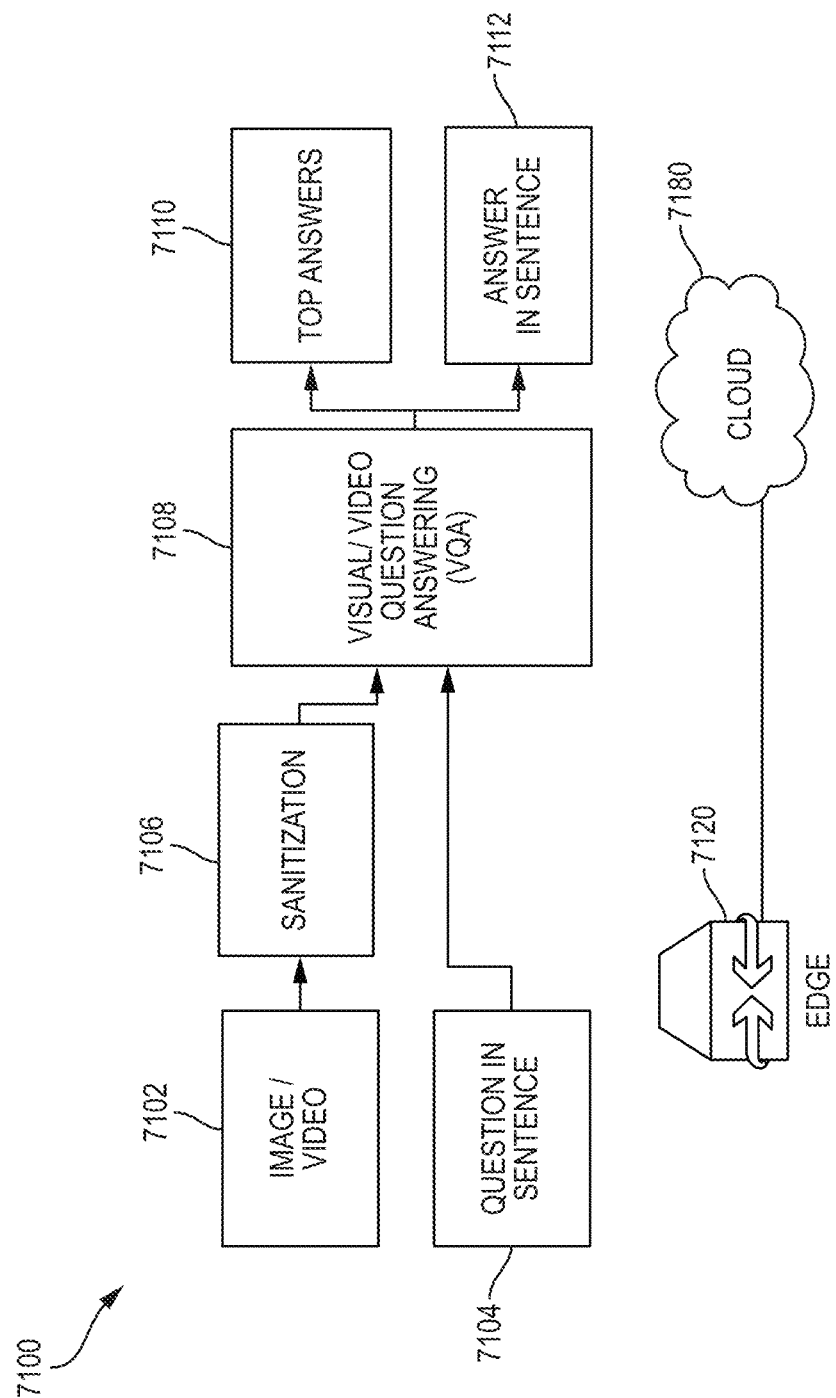
FIG. 71 illustrates an example embodiment of a privacy-preserving VQA dataflow.

FIG. 71 illustrates an example embodiment of a privacy-preserving VQA dataflow 7100. The illustrated dataflow introduces sanitization (reference numeral 7106) into the visual processing pipeline in order to convert an original image or video into a modified privacy-preserving VQA input.

Any sanitization technique can be used that preserves the topological spatial and temporal relationships of the original raw visual data. In some cases, the sanitization technique may be sufficiently lightweight such that it can be performed by resource-constrained devices (e.g., devices with power constraints and/or limited computing capabilities) before they pass the visual data along to the cloud for further VQA processing.

In some embodiments, for example, the sanitization technique may involve adding random noise to the original image. For example, the amount of random noise may be controlled such that the identity of a person in the original image is concealed while the overall characteristics of the scene in the image are preserved.

Figure 72:
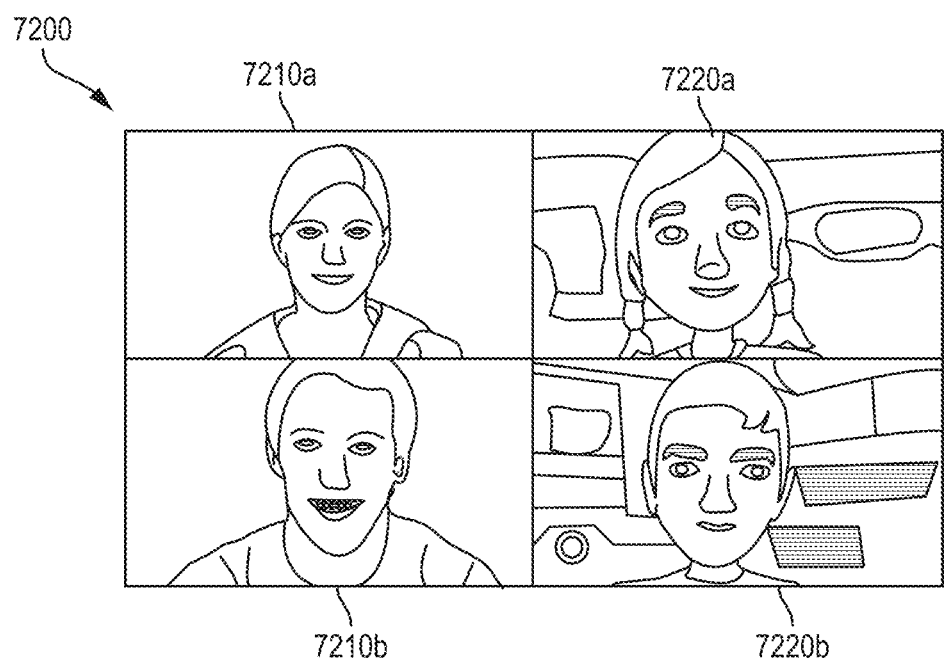
FIGS. 72 and 73 illustrate example sanitization techniques for a privacy-preserving VQA dataflow.

The sanitization technique may also involve the use of avatars to mask the identities of people captured in an image, as shown by FIG. 72. For example, since the identity of person is revealed by their face, facial detection can be performed on the original image, and any detected faces can then be replaced with avatars. In some cases, for example, a person's face (e.g., reference numeral 7210a or 7210b) may be replaced with an avatar (e.g., reference numeral 7220a or 7220b) that resembles the facial characteristics of the person without being sufficiently detailed to reveal the identity of the person. In this manner, the person's identity is effectively eliminated in the pixel domain, while still delivering a contextual user experience involving multiple participants who can be disambiguated from the others within the collaboration context. Furthermore, demographic context that is typically inferable from surrounding visual frames can be removed, obfuscated, and/or or augmented with some other virtual context.

Figure 73:
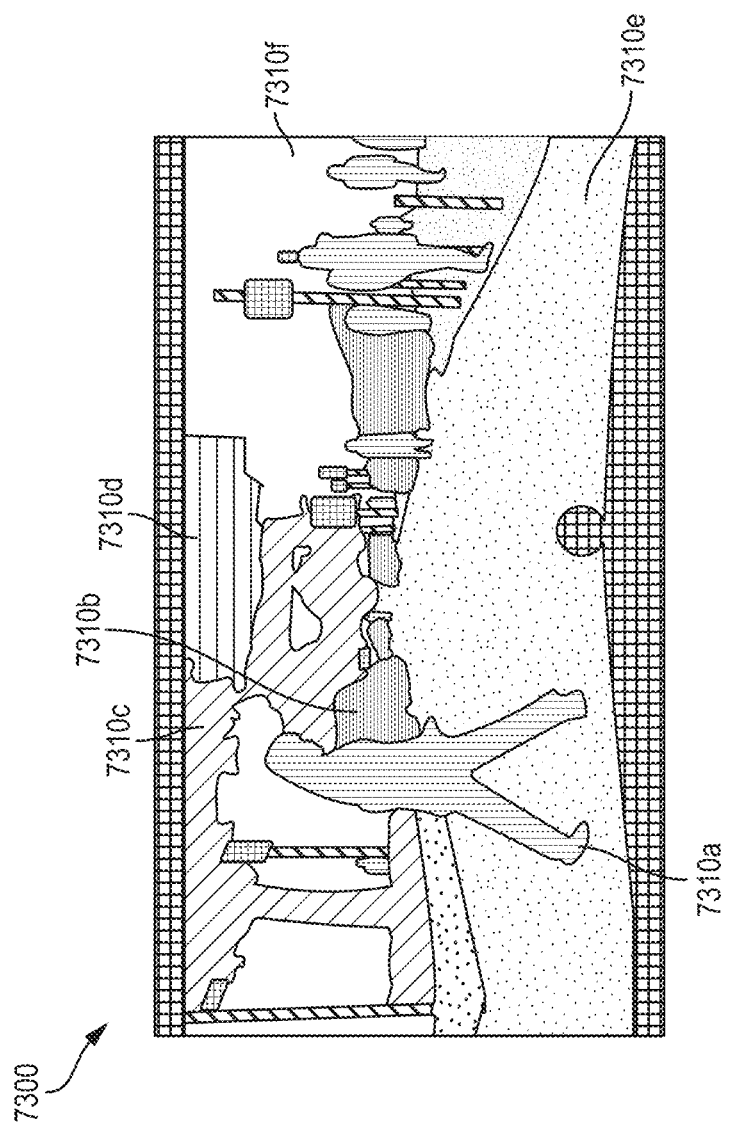

The sanitization technique may also involve pixel-level labeling with segmentation, as shown by FIG. 73. For example, an original image 7300 can be converted into a form that uses discrete pixel labeling for each type of object 7310a-e represented in the image, such as people, trees, roads, vehicles, buildings, the sky, and so forth. In FIG. 73, for example, each object type is represented using a different pattern or color.

This privacy-preserving visual processing approach serves as the key to scaling out VQA systems (e.g., VQA system 7100 of FIG. 71), as the identities of people can be eliminated at the edge of a visual computing network, yet the powerful cloud computing infrastructure can still be leveraged just as effectively for analytics purposes.

Sanitization also may be informed by convolutional neural networks (CNNs), recurrent neural networks (RNNs), and/or shepherd interpolation neural networks (SINNs), where a trained "dot product" may be used to filter privacy-sensitive learned content. For example, a convolutional layer uses the layer's parameters consisting of a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input. An additional layer may use a "stop list" of kernels that are coded to be privacy-sensitive, such as "faces of humans" or "geographic locations." When a content filter having privacy sensitive input is detected, the privacy filter kernels are activated to detect if there is a privacy sensitivity. If true, the convolutional layers will also recognize privacy sensitivity, which may be used to flag or trigger application of any of the above privacy mitigation strategies.

Figure 93:
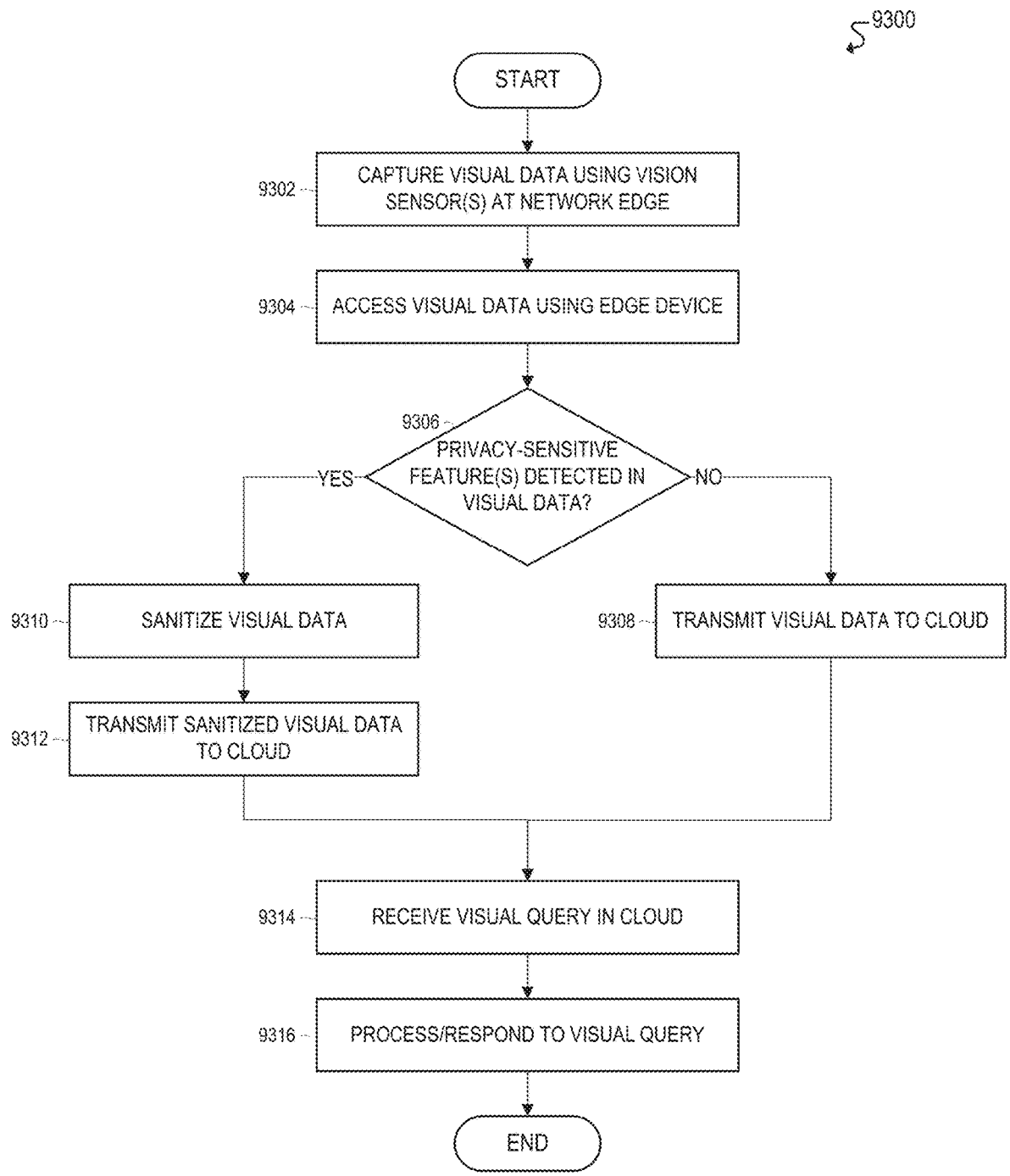
FIG. 93 illustrates a flowchart for an example embodiment of privacy-preserving sanitization for visual computing queries.

FIG. 93 illustrates a flowchart 9300 for an example embodiment of privacy-preserving sanitization for visual computing queries. In various embodiments, for example, flowchart 9300 may be implemented using the visual computing architecture and functionality described throughout this disclosure.

The flowchart may begin at block 9302, where visual data is captured by one or more vision sensors (e.g., a camera) at the network edge.

The flowchart may then proceed to block 9304, where the visual data is accessed by an edge device. In some embodiments, for example, the edge device may be the same device that contains the vision sensor(s) used to capture the visual data (e.g., a smart camera), or the edge device may be a separate processing device that receives or obtains the visual data captured by those vision sensor(s).

The flowchart may then proceed to block 9306 to determine whether any privacy-sensitive features are detected in the visual data. For example, certain features in the visual data may contain a visual indication of privacy-sensitive information. The face of a person, for example, visually indicates the identity of the person, which can violate that person's privacy. As another example, certain features in the visual data may visually indicate the location of a person. Accordingly, before the visual data is transmitted to the cloud, the edge device may process the visual data to identify any such privacy-sensitive features. In some embodiments, for example, the edge device may apply a machine learning model to the visual data, which may be trained to recognize the particular feature(s). The machine learning model may be implemented, for example, using a convolutional neural network (CNN) with convolutional layers and filters that are designed to detect those feature(s). Any suitable type of pattern matching technique, however, may also be used to detect the relevant feature(s). In some embodiments, for example, a reference template of privacy-sensitive features may be constructed, and the reference template may be used by the machine learning model to determine if any of those privacy-sensitive features are present in the visual data.

In general, in the context of visual computing, a feature can be any arbitrary representation of visual data (e.g., videos, images, or subsets thereof) that describes its distinct characteristic(s), which allows the feature to be detected in visual data using any type or combination of visual or image processing techniques (e.g., machine learning, neural networks, pattern recognition, and so forth). For example, a feature can include any aspect or characteristic associated with a visual scene, such as an object, action, condition, or any partial sub-feature(s) thereof, and each feature may be represented at a variety of levels of abstraction (e.g., based on hierarchies of features, characteristics, objects, actions, and so forth). With respect to objects, for example, every object class has a unique set of characteristics or features that can help in detecting objects of that class, including size, shape, color (including shade, tone, hue, and tint), arrangement of underlying features or characteristics, and so forth. For example, face detection may be performed by detecting a set of eyes, nose, and lips in the proper arrangement (e.g., eyes above nose, nose between eyes and above lips), and each of those facial features may themselves be detected based on their underlying characteristics or features. In this manner, feature detection can be leveraged to detect privacy-sensitive features in visual data.

If no privacy-sensitive features are detected in the visual data, the flowchart may then proceed to block 9308, where the visual data is transmitted from the edge to the cloud. For example, the edge device may transmit the visual data to a cloud-based visual computing device or server over a network (e.g., via a communication interface of the edge device).

If a privacy-sensitive feature is detected in the visual data, however, the flowchart may then proceed to block 9310, where the visual data is sanitized in order to mask or conceal the privacy-sensitive information associated with the particular feature, thus causing sanitized visual data to be produced.

In some embodiments, for example, random noise may be inserted or added into the sanitized visual data to mask the privacy-sensitive information. For example, in order to mask the identity of a person, a certain amount of noise may be added to the person's face to prevent facial recognition algorithms from identifying the person. Similarly, the person's face may be blurred.

As another example, in some embodiments, a person's face may be replaced with an avatar that resembles the person. For example, an avatar that resembles the person may be generated and/or selected from a collection of existing avatars. In some cases, for example, an avatar may be selected that resembles one or more characteristics or facial features of the person's face (e.g., hair, eyes, noise, mouth, skin). The person's face can then be replaced with the avatar in the sanitized visual data. In this manner, the person's identity is concealed, while the avatar still provides a good user experience for use cases where the visual data is viewed by humans.

As another example, a privacy-sensitive feature may be replaced with discrete pixel labels in the sanitized visual data. For example, the pixels associated with the privacy-sensitive feature may be identified, and those pixels may then be replaced with data or labels indicating the type of feature. The pixels corresponding to a person, for example, may be replaced with a label that identifies those pixels as representing a person. In this manner, both the shape of the feature and the type of feature are reflected in the sanitized visual data, but the original pixel values for the feature are removed, thus masking the visual appearance of the feature. Moreover, the feature can still be visually displayed in the sanitized visual data, such as by using a single color to represent all pixels associated with that feature or feature type.

In some embodiments (e.g., depending on the level of visual detail that must be preserved for a particular use case), this approach may be applied to all features in the visual data rather than only privacy-sensitive features. For example, image segmentation may be used to identify the various different features and/or objects that appear in the visual data, such as people, roads, cars, buildings, grass/trees, the sky, and so forth. Moreover, the pixels associated with each detected feature or object may be replaced with labels or other data that indicate the type of feature or object. Further, in some cases, each feature or object type may be represented using a different color. In this manner, any privacy-sensitive information is masked in the sanitized visual data, the storage size of the sanitized visual data is reduced, and the sanitized visual data may also be in a format that is more suitable for subsequent visual processing (e.g., in the cloud).

The flowchart may then proceed to block 9312, where the sanitized visual data is transmitted to the cloud. For example, the edge device may transmit the sanitized visual data to a cloud-based visual computing device or server over a network (e.g., via a communication interface of the edge device). In this manner, the cloud-based visual computing device can use the sanitized visual data to process any visual queries relating to the original visual data, while the privacy-sensitive information associated with the original visual data is never sent to the cloud.

The flowchart may then proceed to block 9314, where a visual query associated with the visual data is received in the cloud. In some cases, for example, the visual query may contain a question associated with what is represented in the visual data. Moreover, the visual query may be received from the edge device that captured or processed the visual data, or the visual query may be received from another device altogether.

The flowchart may then proceed to block 9316, where the visual query is processed and responded to in the cloud. For example, a cloud-based visual computing device may perform the requisite processing for responding to the visual query using the sanitized or un-sanitized visual data transmitted by the edge device (e.g., at block 9312 or 9308).

In some cases, for example, the visual query may contain a question in natural language syntax about the contents of the visual data. Accordingly, the cloud computing device may use a recurrent neural network (RNN) to interpret the natural language question.

After interpreting the question, the cloud computing device may then perform the requisite processing in order to determine an answer to the question. In some embodiments, for example, the cloud computing device may process the sanitized or un-sanitized visual data using a convolutional neural network (CNN) to understand what is represented in the visual data. Once the visual data has been interpreted, the cloud computing device may then determine an answer to the question. Further, in some embodiments, the cloud computing device may use an RNN to generate a natural language representation of the answer. The cloud computing device may then respond to the visual query (e.g., by providing the natural language answer) and/or take any other appropriate action.

At this point, the flowchart may be complete. In some embodiments, however, the flowchart may restart and/or certain blocks may be repeated. For example, in some embodiments, the flowchart may restart at block 9302 to continue capturing and sanitizing visual data and processing associated visual queries.

Variable Size Tiles for Array-Based Storage

Video processing is increasingly becoming a fundamental tool for software systems to perform high level tasks, be it for identifying shopper behaviors in retail stores, video surveillance systems for security, traffic monitoring, autonomous driver assistance systems, virtual reality systems, real-time 3D model generation for sports broadcasts, and many more. Typical instantiations of such systems involve processing pipelines where each pipeline stage runs some video algorithm and emits its output for a downstream stage to process further. Often, resource constrained environments deploy such processing in the cloud. A critical aspect of the overall performance (both latency and throughput) of such systems is the ability to efficiently store and retrieve massive amounts of video data.

Video processing algorithms typically operate on subsections of an image or video frame. Such "regions of interest" (ROIs) within an image or video frame identify important objects or features, and often are the source of further analysis. However, extracting these regions from storage is often time consuming. Because of the way traditional image formats are stored, it is necessary to read the entire image first before the ROI can be read. Even when storing the image in an array-based storage manager, the sub-section may span multiple areas in the array, causing more data than necessary to be read. Thus, access to regions of interest within an image can often be time consuming.

As discussed above in connection with FIG. 22, in some cases, images/video could be stored using an analytic image format (e.g., implemented using an array-based storage manager such as TileDB) that is designed to facilitate visual data processing. Using an array data manager for the analytic format is beneficial, as it provides fast access to sub-sections within frames and images by creating logical tiles over the image. These tiles are compressed individually and written so that only the tiles that contain the relevant information are read back. Additionally, in some embodiments, the analytic image format may be implemented using only LZ4 compression, which improves performance over traditional formats that require more complex encoding and decoding.

When implementing this analytic image format using an array-based storage manager (e.g., TileDB), the storage manager typically provides a mechanism to specify tile layout via a configuration schema. However, the ability to define tiles is fairly coarse grained, only allowing for fixed-sized tiles that are not application-aware in any fashion. Consequently, ROIs often span multiple tiles. Retrieving such ROIs involves reading extra information into a contiguous memory buffer before the extraneous regions can be cropped out. Thus, while using the analytic image format results in less data being read than traditional image formats (e.g., which have to read the entire file), there still may be some unnecessary data movement.

Accordingly, an analytic image format with variable-sized tiles for different regions of interest (ROIs) is presented in connection with FIGS. 74-81. For example, when an image or video frame is stored in array-based storage, it can be divided into variable-sized tiles, and these tiles can be defined based on application-relevant regions of interest within the image or frame. In this manner, the regions of interest within images are the driving force behind how the images are stored within an array-based storage manager, which ultimately improves image access speeds.

This improved analytic image format provides various advantages. For example, image storage and retrieval are primary bottlenecks in a burgeoning class of important video processing systems, such as advanced driver-assistance systems (ADAS), Internet-of-Things (IoT), surveillance, virtual reality, real-time 3D video creation, and so forth. The described techniques and algorithms can be used to create application-specified variable-sized tile definitions for an analytic image format, which allows ROIs to be stored in a manner such that the speed of access to these regions will be improved. Given that ROIs are usually much smaller than the entire image (e.g., in an American football game, a player is often about a 100×100 pixel region in a 3840×2160 pixel frame), tile boundaries that match ROI boundaries also translate into a decrease in data movement, as well as reduced post-processing once the file data has been read in order to retrieve ROIs. Further, storage-system level knowledge of important sub-sections of stored application data opens up numerous avenues for creating platform-level features for further improving access to such data.

An array data manager such as TileDB can be used as the underlying storage manager of the analytic image format. TileDB, for example, is optimized for managing the storage and retrieval of dense and sparse arrays. An array is divided into tiles, each tile is compressed and written sequentially to disk. TileDB currently supports identically sized tiles (e.g., the height and width must respectively be the same for all tiles). Thus, an array data manager must be developed or otherwise extended to support varying sized tiles within images/video frames. Moreover, region of interest information (e.g., bounding boxes that indicate the starting coordinates (x, y) and height and width) must be provided by existing algorithms, such as algorithms that run further upstream in the application's video or image processing pipeline. In this manner, the ROI information can be used to define tile boundaries that are used by the array storage manager (e.g., TileDB) to store the image/video frame. For example, an array in TileDB is defined by a schema; the schema holds information on the size of the array and the size of the tiles. This schema definition can be extended to indicate whether the tile size is fixed or variable, and in the case of variable size tiles, an indication of what algorithm should be used may be further provided.

This disclosure describes multiple embodiments of techniques that leverage variable-sized tiles to define a tile layout that matches the application-specified ROI boundaries, as described further below.

The first algorithm is illustrated by FIGS. 74-75. In particular, the first algorithm is a recursive quadrant division algorithm (shown in FIG. 74), wherein the image is recursively divided into four tiles. Bounding box information is used to determine which tiles contain regions of interest (the logic is described in FIG. 75). The algorithm continues until the regions of interest are fully contained within a set of tiles. The final step in the algorithm is an optional merge step, where tiles that are not bounding any region of interest are merged together to form a smaller number of larger tiles. The general form of this is simply the recursive division algorithm; variations on it range from adding a parameter to indicate the number of tiles to divide into (nine rather than four, for example) to a more complex alternative such as performing a binary division along each dimension.

Figures 76A, 76B, 76C:
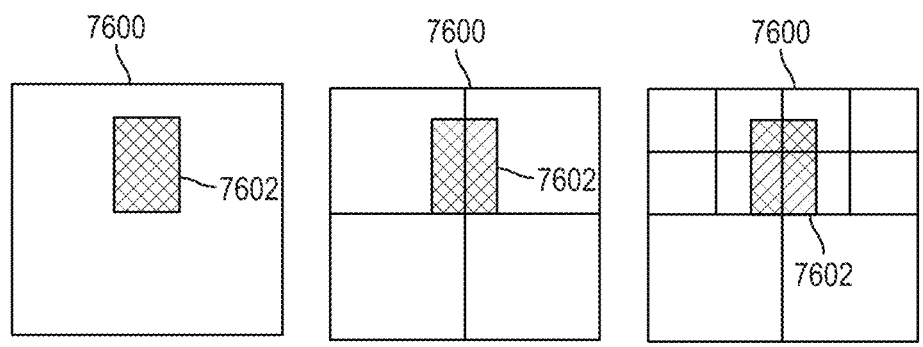
FIGS. 76A-E illustrate an example of a recursive quadrant division algorithm on an image with a single region of interest.
Figures 76D, 76E:
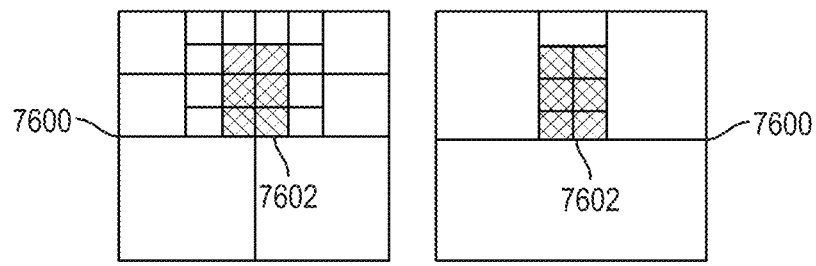
Figure 77A:
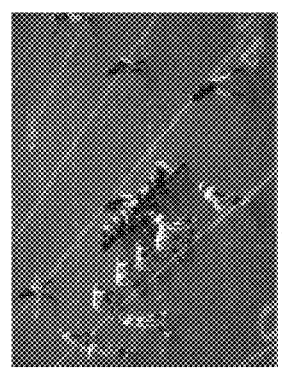
FIGS. 77A-F illustrate an example of a recursive quadrant division algorithm on an image with multiple regions of interest.
Figure 77B:
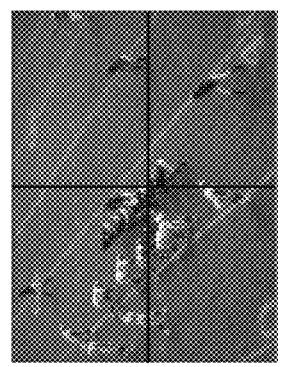
Figure 77C:
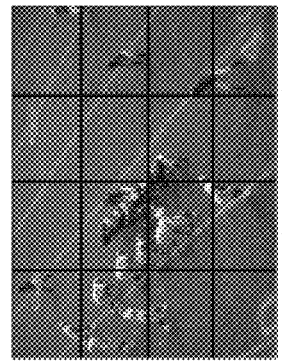
Figure 77D:
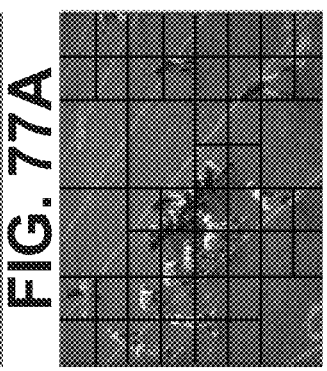
Figure 77E:
Figure 77F:
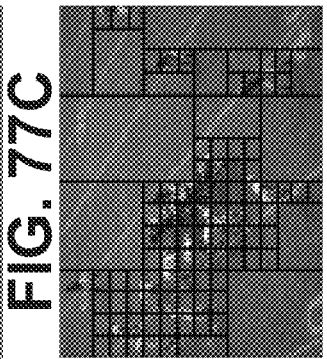

FIGS. 76A-E illustrate a simple example of the recursive division algorithm. First, a region of interest 7602 within an image 7600 is identified (as shown by the shaded rectangle in FIG. 76A). The recursive quadrant algorithm divides the image 7600 into four tiles (as shown in FIG. 76B), and then identifies the top two quadrants/tiles as containing the region of interest. These two tiles are further sub-divided into quadrants/tiles, leaving the bottom two quadrants/tiles untouched (as shown by FIG. 76C). The tiles containing the region of interest are recursively identified and sub-divided in this manner until the region of interest 7602 is exclusively contained within entire tiles (as shown by FIG. 76D). The last step then combines the tiles that do not bound the region of interest 7602 into larger tiles (as shown by FIG. 76E).

FIGS. 77A-F illustrate an example of the recursive quadrant division algorithm with multiple regions of interest that are spread across the image. In this example, the regions of interest represent the players and the referee. Each iteration of the algorithm is shown in a separate subfigure, ending with the final subfigure (FIG. 77F), where every region of interest is encapsulated by three to six tiles, while the other tiles have been combined to form larger tiles.

The recursive division algorithm often requires a further subdivision in order to get some of the region of interest, as was necessary for the player in the top of FIGS. 77A-F. Moving from FIG. 77D to 77E requires dividing an area that is mainly grass except for the player's feet. In some embodiments, the parameters of the recursive division algorithm can be varied to allow for a different division rule (such as dividing into nine rather than four), but this comes at the cost of an increase in the number of tiles needed to identify a region of interest.

The second algorithm is illustrated by FIGS. 78-79. In particular, FIGS. 78A-B illustrates pseudocode for a region-based tiling algorithm, while FIGS. 79A-B illustrates pseudocode for identifying obstructions associated with tiles constructed using the region-based tiling algorithm. For example, the region-based tiling algorithm defines an initial set of tiles as the regions of interest (as shown by the pseudocode of FIGS. 78A-B). Additional tiles are then determined by extending the tile width and height as far as possible, where the goal is to determine if there are any regions of interest (or other tiles) which obstruct the construction of the current tile in either the x or y dimension (as shown by the pseudocode of FIGS. 79A-B). Accordingly, this algorithm addresses the shortcoming noted above with respect to the first algorithm.

FIGS. 80A-C illustrate an example of the second algorithm (e.g., the region-based tiling algorithm of FIGS. 78-79). The illustrated example of FIGS. 80A-C is based on the same image used in the example of FIGS. 76A-E. With the region-based tiling algorithm, a region of interest 8002 is first identified within an image 8000 (as shown in FIG. 80A), and the region of interest is the first tile to be defined (as shown in FIG. 80B). From there, a starting point is added at (0,0), which is the top left corner of the image. There is no obstructing tile in the x direction, so the tile extends the entire width of the image. In the y direction, however, the region of interest is obstructing the tile creation, creating the bottom boundary of the tile. A starting point at the bottom left corner of the tile is added (as shown in FIG. 80C), and the algorithm continues. For simplicity, the illustrated example exclusively uses rectangular tiles, but some embodiments may be implemented using arbitrary polygon tiles of varying shapes and sizes.

A primary benefit of the region-based tiling approach is that the tiles can be more accurate with respect to the region of interest, which results in fewer tiles. However, the recursive quadrant division algorithm may be more appropriate when there are overlapping regions of interest, as explained further below in connection with FIGS. 81A-C.

Figure 81A:
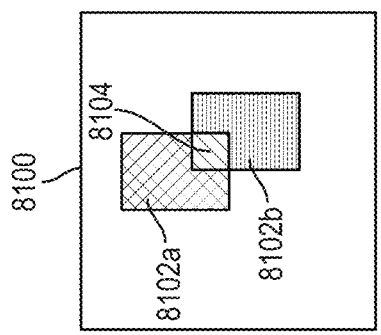
FIGS. 81A-C illustrate an example of various tiling algorithms on an image with multiple overlapping regions of interest.
Figure 81B:
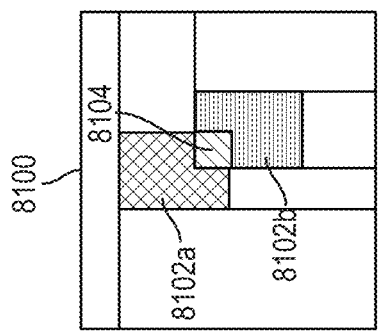
Figure 81C:
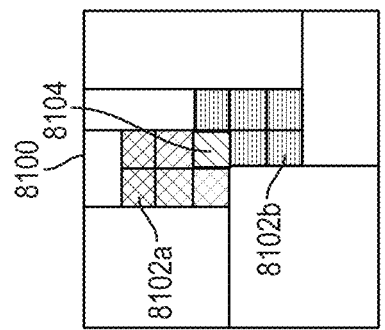

FIGS. 81A-C illustrate an example using an image 8100 with multiple overlapping regions of interest 8102$a,b$ (as initially shown in FIG. 81A). Using the region-based tiling algorithm, it is not possible to identify the overlapping pixel(s) 8104 as existing in both regions of interest 8102$a,b$ (as shown by FIG. 81B). In fact, one of the regions of interest 8102$b$ ends up as a polygon when trying to divide by region. With the recursive division algorithm, however, it is possible to request the overlapping tile 8104 for both regions of interest 8102$a,b$ (as shown in FIG. 81C).

Thus, the region-based tiling algorithm cannot handle overlapping regions of interest, while the recursive division algorithm allows overlapping pixel(s) to exist in both regions of interest. Accordingly, depending on the usage scenario, the respective embodiments described above each have pros and cons. For maximum flexibility, a portfolio of techniques for choosing the layout of variable-sized tiles can be offered, thus enabling the applications to control the storage of relevant sub-sections of data using the most efficient approach.

Integrated Online and in-Store Customer Shopping Experience

Despite the success and convenience of online shopping, shoppers nowadays are still drawn to brick-and-mortar retailers before making purchases (e.g., to view, touch, and/or test a product). In fact, because of this, many retailers whose presence began exclusively online have since extended their footprint to include a physical presence.

The integrated approach makes it possible to offer complementary benefits for improved customer engagement (e.g., adding online/offline incentives based on prior offline/online activities). However, connecting the online and offline shopping experiences (e.g., website vs. physical store) is not trivial.

Reliable customer models are hard to construct and update. Brick-and-mortar retail stores lack the mechanisms to build customers' profiles based on their activities in the same way that online stores can. For instance, when a customer is visiting an online store, the store captures every click or mouse hover that a customer makes. In online stores, clicks and other mouse events are important data points that are used to model a customer. In contrast, in a brick-and-mortar store, there are many actions taken by the customer while visiting the store that are not accounted for in their profile.

For example, most customer modeling techniques in brick-and-mortar stores rely on completed transactions (e.g., purchases and sometimes returns). That is, the store only knows what the customer bought, but little or nothing about other products that the customer may have been interested in while visiting the store. Moreover, many solutions are tailored towards either online shopping or offline shopping, but not both, thus leaving those respective shopping experiences disjointed. Further, as opposed to online stores, many techniques in brick-and-mortar stores do not capture the interest in a product shown by a (potential) customer, for instance, by standing in front of the product's display for a few minutes. A byproduct of this limitation is that the brick-and-mortar store cannot follow up on potential customers' interests.

Accordingly, this disclosure presents various embodiments that address this limitation in brick-and-mortar stores, and further bridge the gap between online and in-store customer activity. These embodiments incorporate various data points into the customer model that are generated from actions taken by the customer during a visit to the store and/or that are inferred from visual data. These data points are then used to improve customer modeling. An improved customer model can produce better analytics, resulting in, among other things, better recommendations to the customer. In this manner, the described embodiments use novel customer modeling to bridge the gap between the online and offline shopping experiences.

Figure 82:
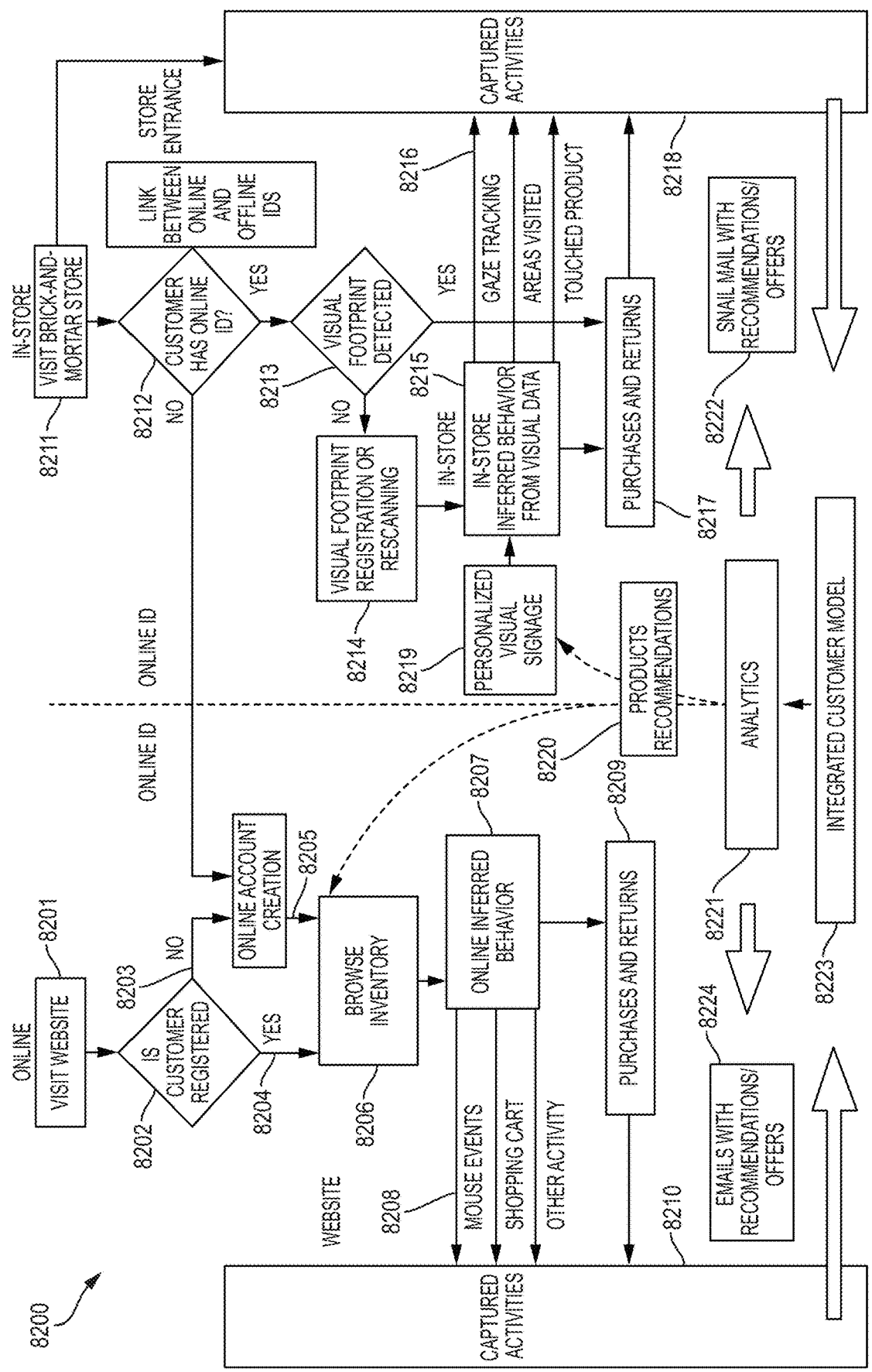
FIG. 82 illustrates an example of an integrated customer model based on both online and offline customer activity.
Figure 83:
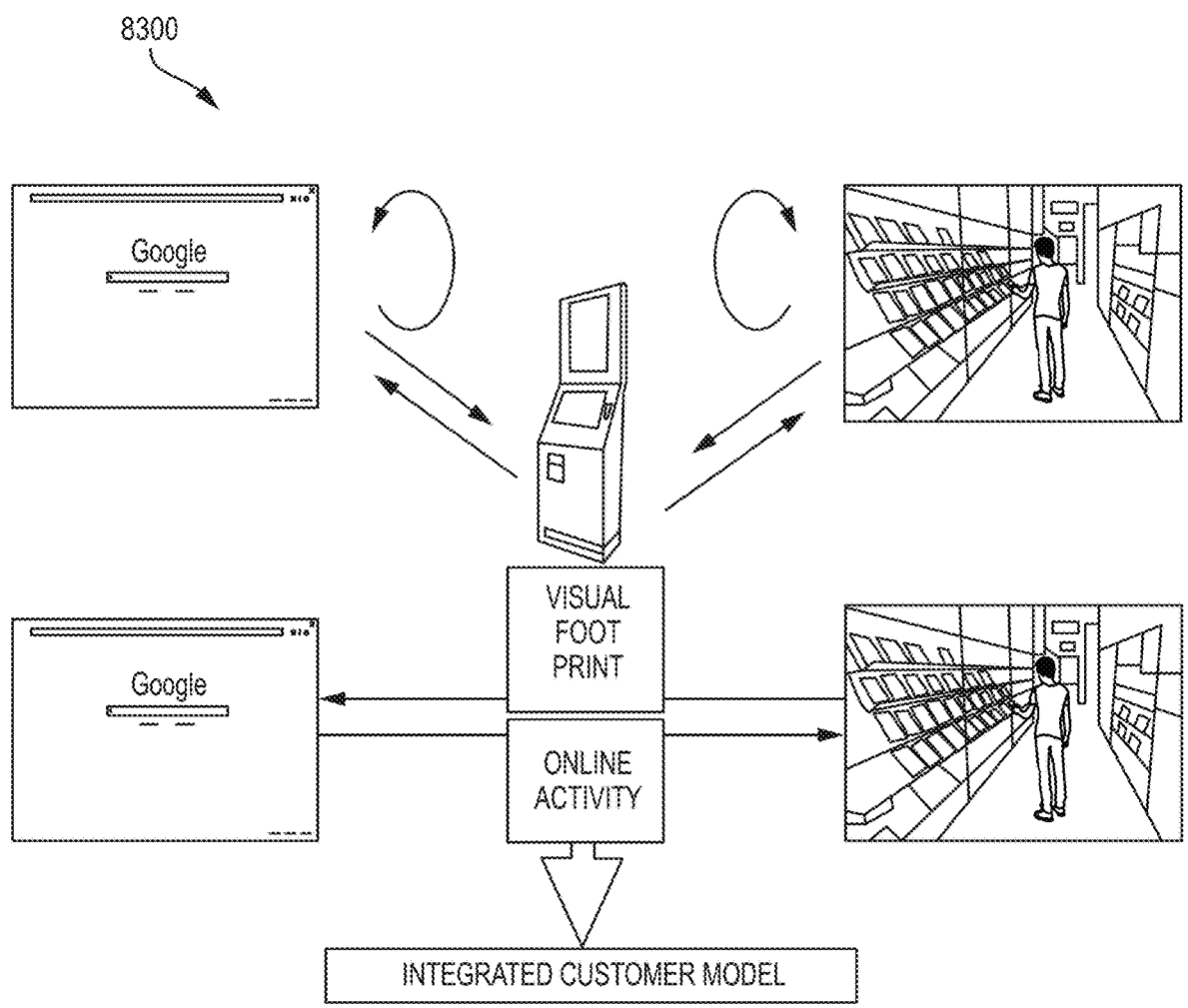
FIG. 83 illustrates an example of linking the in-store visual footprint and online activity of a customer.

FIGS. 82-83 illustrate examples associated with improved retail customer models. In particular, FIG. 82 illustrates an example 8200 of an integrated customer model based on both online and offline customer activity, while FIG. 83 illustrates an example 8300 of linking the in-store visual footprint and online activity of a customer. Intelligent brick-and-mortar stores are being developed in which a massive amount of visual data, from cameras installed inside the store, is available. In these intelligent stores, the customer is usually tracked while moving in the store and charged based on algorithms that infer the acquisition of a product, sometimes based on the analysis of data captured by sensors, such as cameras. In the example of FIG. 82, the traditional customer model is extended to include customer behavior that is inferred from visual data captured in brick-and-mortar stores, which is combined with other purchases and activities of the customer (either online or in-store) to construct an improved customer model (FIG. 82, 8223).

This approach provides a device-free and seamless shopping experience by integrating online and offline identities. As illustrated in FIGS. 82-83, this goal is accomplished by linking a customer's digital presence with their visual footprint captured by the cameras in a brick-and-mortar store (FIG. 82, 8213). Valuable activities (e.g., perceived interest in a product while visiting the store, clicks on the website, and so forth) are linked to bridge both the brick-and-mortar and online activities (FIG. 82, 8207-8210, 8215-8218) of the customer. The integrated customer model can then be fed to machine learning algorithms (FIG. 82, 8221) to, among other things, provide better recommendations of products and services (FIG. 82, 8206, 8219-8222, 8224).

In some cases, a user may be required to opt-in to the linking of these identities, as linking may otherwise present a privacy violation (e.g., based on an associated privacy policy or PLA). Furthermore, a seamless or otherwise desirable in-store user experience may be achieved (without violating user privacy policies) by assigning the online/offline identities to a set of groups/categories designed to improve user experience. For example, a "VEGAN" category could be defined such that products fitting the category are featured and/or marketed to in-store identities based on an offline experience that may have associated the VEGAN category with the offline identity. Membership in the category may be achieved cryptographically using an EPID cryptographic group key wherein the offline/instore/online experience first registers the group key and where an SGX or other TEE is used to share the group key across offline/instore/online identities. Consequently, if an offline identity experience results in membership in the VEGAN group, the TEE will share the group key with an in-store identity such that the in-store identity may choose to authenticate as the VEGAN group participant only—opting instead to withhold any unique identity. Consequently, the in-store experience may be augmented by knowledge of membership in the VEGAN group (but nothing else as that could represent an undesirable privacy violating user experience).

This approach provides numerous advantages. In particular, it serves as a foundation for effectively interweaving online and offline shopping experiences in the retail sector. For example, the described solution facilitates a seamless transition between online shopping and offline shopping. By having a mapping between an online profile and an in-store visual footprint (FIG. 82, 8213), the described solution can use a customer's activities, either online or in-store, to ensure that both the customer's personas and activities, online and in-store, are incorporated in the customer model (FIG. 82, 8210, 8218). These novel techniques for customer modeling can further be added to other retail solutions that incorporate visual data analysis, thus rendering such retail applications even more appealing.

Further, this solution is device free, as it does not require any device to be carried by the customer. The customer creates an account online (FIG. 82, 8203) that is mapped to its presence offline (FIG. 82, 8213). The first time the customer enters a physical store, the customer logs in at a kiosk and is gently and quickly scanned to capture a visual footprint (FIG. 82, 8214), and once the initial visual footprint is available, it is updated and tracked during each posterior visit (FIG. 82, 8213), without the need to subject the customer to another full scan. The estimated time for a full scan is less than a minute. Once complete, the customer no longer has to log onto their online account while in the store, as long as the visual footprint is still considered to be valid.

Businesses that do not maximize the interaction with their customers, both online and in brick-and-mortar stores, are likely to fail. Accordingly, using additional non-traditional data points from visual data (FIG. 82, 8216) (as described further below), the described solution infers customer behavior (FIG. 82, 8215) and captures interesting data points from relevant customer activities in-store.

Figure 84:
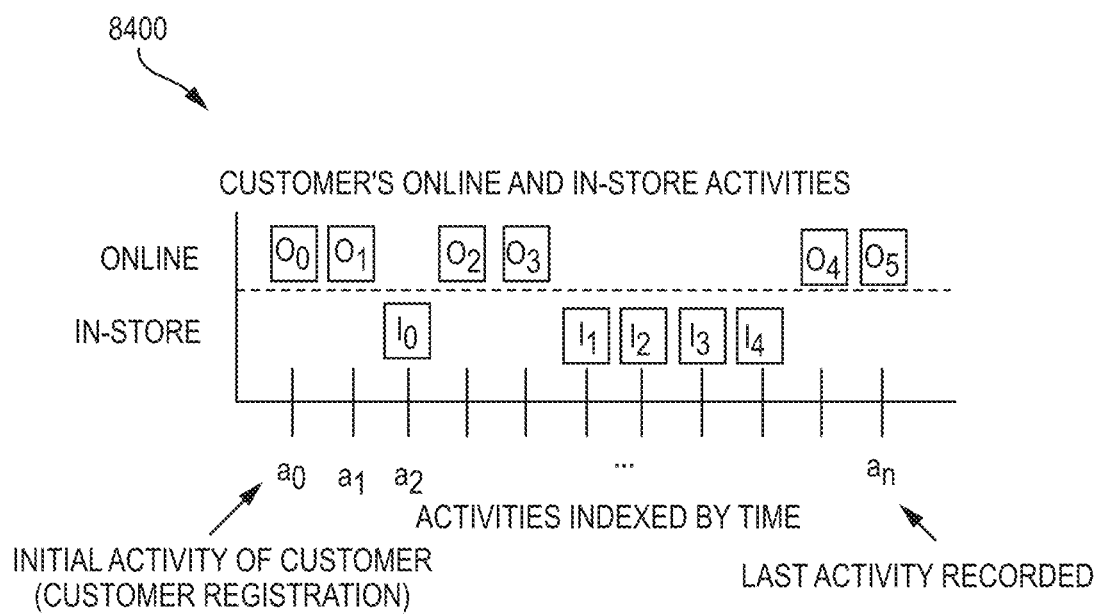
FIG. 84 illustrates an example of using online and in-store customer activities to construct a robust customer model.

FIG. 84 illustrates an example 8400 of using online and in-store customer activities to construct a more robust customer model. As shown in FIG. 84, data points from both online and in-store activities are combined into a more complete customer model. For example, relevant activities, $\sigma_k$, are indexed using the time when the activity was recorded. Customer activities can be classified as online activities, $O_i$, or in-store activities $I_j$. There is an implicit mapping that can be taken into account by an analytics component. For instance, pages or sections visited online can be mapped to areas visited in the physical store. The resulting integrated customer model produces better results from analytics (FIG. 82, 8221) that can be used to improve the interactions between the business and the customer (e.g., by providing better product recommendations (FIG. 82, 8206, 8219, 8220, 8224)).

The described solution pays particular attention to the interaction that the customer has with products while visiting the store, particularly for products that the customer does not end up buying (FIG. 82, 8215-8217, 8219). In a similar manner as online stores, brick-and-mortar stores can use this data to better identify customer needs (FIG. 82, 8221) and follow-up using traditional channels (e.g., mail, email (FIG. 82, 8222, 8224)) and/or non-traditional channels (e.g., personalized visual signage (FIG. 82, 8219)).

Figure 85:
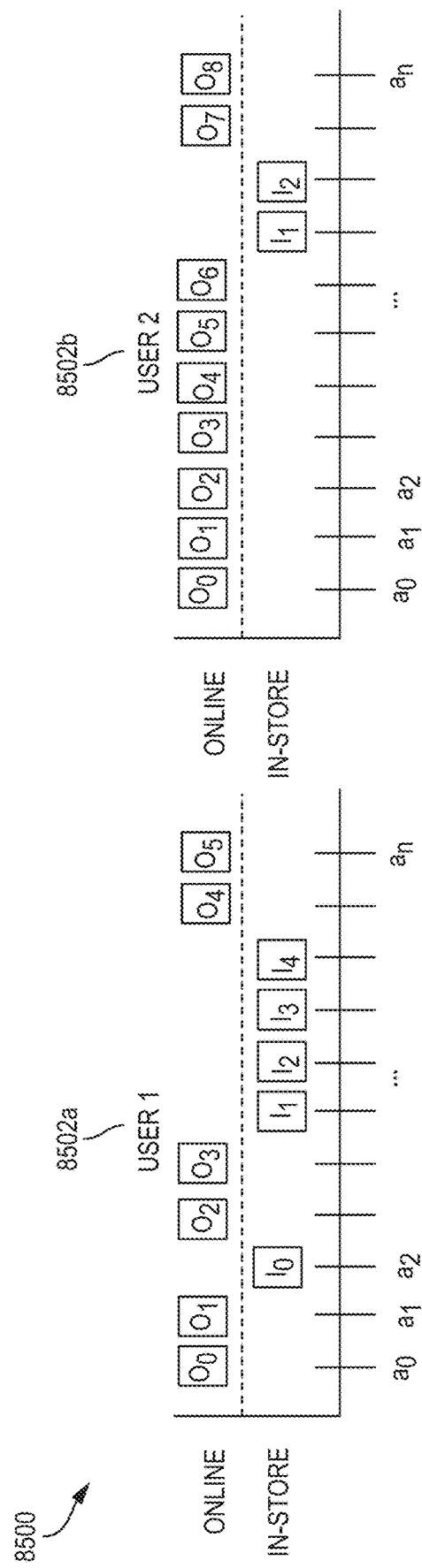
FIG. 85 illustrates a comparison of the shopping activities of multiple users.

FIG. 85 illustrates an example 8500 with a comparison of the activities of multiple users or customers 8502a,b. In particular, a realistic comparison of the behavior of two users is conducted based on both their online activities and in-store activities (FIG. 82, 8221). As shown in FIG. 85, user 1 has a more balanced distribution between online and in-store activities than user 2. Using the integrated customer model and non-traditional data points obtained from visual data, a business has access to more comprehensive customer profiles, which allows it to gain a better understanding of the desires and needs of its customers. Further, the described solution also enables a business to map online activity to in-store activity. As mentioned above, the webpages visited by the user can be mapped to physical areas in a store. Hence, the business has a better understanding of the potential behaviors and desires of their users when visiting the store.

An example of the different types of customer activity involved in the described solution (both online and in-store) is illustrated in TABLE 2.

TABLE 2

Customer activity

| ACTIVITY TYPE | ONLINE ACTIVITY ($O_i$) | IN-STORE ACTIVITY ($I_j$) |
|---|---|---|
| Online registration | The customer registers in the system for the first time (FIG. 82, 8205). The customer can proceed to use the online front-end (FIG. 82, 8201) of the system to purchase or browse products. | |
| Initial capture of visual footprint in brick-and-mortar store | | The first time that the customer visits the brick-and-mortar store (FIG. 82, 8211, 8212), she has to login to her online account at a kiosk located at the entrance of the store (FIG. 82, 8212). Once logged in, a configuration of cameras captures the customer visual footprint that is used for future visits (FIG. 82, 8214). Using this visual footprint, the store can infer customer activity data points from each in-store visit (FIG. 82, 8213, 8215, 8216). |
| Other online or in-store activities | Traditional data points, e.g., mouse events, text entered by the customer while visiting the online store, including product searches, are collected and used to improve the customer model (FIG. 82, 8207-8210). | Non-traditional data points are also collected by inferring customer's preferences inferred from her behavior as captured in visual data (FIG. 82, 8215-8218). |

As shown in TABLE 2, a customer initially registers in the system online. Once the customer is registered, every relevant activity is collected and used to improve the customer model. In addition to data points obtained from online activities, several non-traditional data points are also added to the customer model. These data points are obtained from the analysis of visual data (FIG. 82, 8215).

As an example, the amount of time a customer spends in certain area(s) of a store can be tracked as additional data points. In particular, a customer is continuously tracked using vision sensors (e.g., cameras) when visiting a store. Areas where the customer tends to spend a significant amount of time are important data points for future marketing of products. These data points are obtained from analyzing temporal information about areas visited by the customer while in the store. Similar to what occurs in online stores, if the customer is spending significant time in a particular area, that behavior is registered as a data point used in the generation of the improved customer model. The store then can follow up as appropriate (e.g., via mail/email about promotions), thus improving the relationship with the customer.

Figure 86:
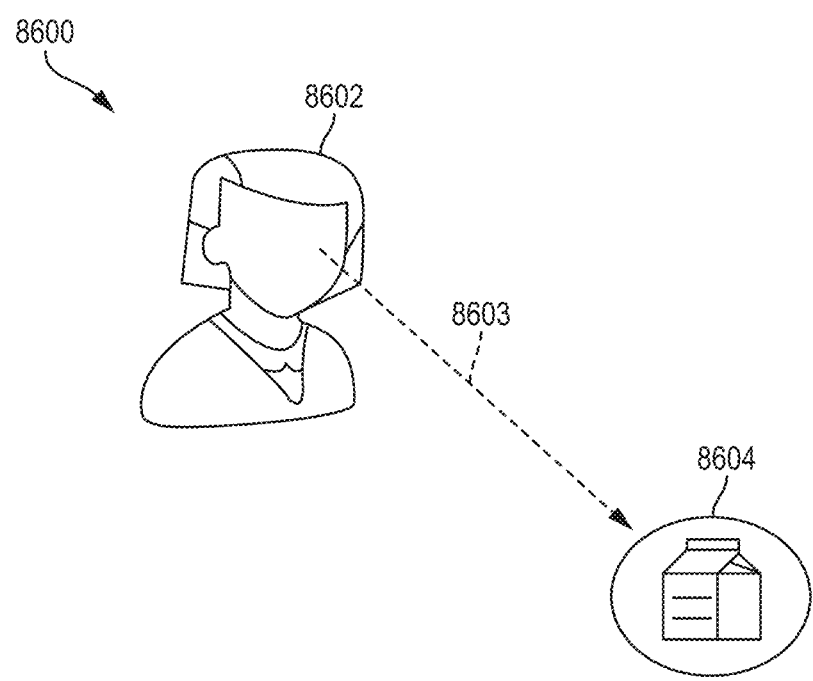
FIG. 86 illustrates an example of using head pose to infer customer data points.

As another example, head pose estimation, customer posture detection, and product position tracking can be used to derive additional data points. For example, FIG. 86 illustrates an example 8600 of using head pose to infer customer data points. In particular, based on customer head pose estimation 8603 combined with product position tracking, it can be inferred that a customer 8602 is observing a particular product 8604. If the observation exceeds a temporal threshold, a data point is generated and used to improve the customer model. For example, while inside a store, a customer may gaze in the direction of a product. This behavior is timed, and if a threshold is exceeded, a data point is generated for this event. In this manner, if the customer has been observing a particular article, the store can subsequently follow up with the customer to provide additional information about the product. This solution fills the vacuum that is missing in traditional customer modeling. Using a combination of temporal thresholding and analysis of visual data, additional data points are added to the customer model, allowing the store to reach out and follow-up with the customer with offers and other information. By improving customer modeling, the store is expected to increase sales.

As another example, products that a customer interacts with (e.g., by touching with their hands) can be tracked as additional data points. In some embodiments, for example, these data points can be generated by triangulating the position of a customer's hands as captured by multiple cameras, in conjunction with a mapping of the products on display. For instance, if a customer's hand is close or has touched the shelf where some products are located (e.g., laundry detergents), and a temporal threshold has been exceeded, a data point is generated in connection with the customer's apparent interest in a particular product/brand.

Using these additional data points from in-store visual data, a better model of the customer can be constructed. For instance, in addition to knowing that customer X has bought products <k, l, m>, it can also be determined that the customer has shown interest in products <n, o>, either in-store or online. This approach provides valuable information to a store. The improved customer models can be used in conjunction with recommendation systems to follow up with offers to customers. This will result in increased sales for brick-and-mortar stores, along with improved customer relationships.

The following are examples of the types of customer activities that can be tracked and leveraged by this solution:
(1) traditional activities that are used to build online customer profiles: timestamp of visit, products clicked on and other mouse events, searches, and so forth;
(2) traditional activities that are used to build a profile of the customer in-store: purchases, returns, and so forth;
(3) additional activities inferred from in-store visual data: products observed for a time above a threshold $t_1$, Areas visited for a time above a threshold $t_2$, products touched by the customer, and so forth.

In this manner, an improved customer model can be built using all of the above categories of data points, as opposed to just the first or second categories.

Figure 87:
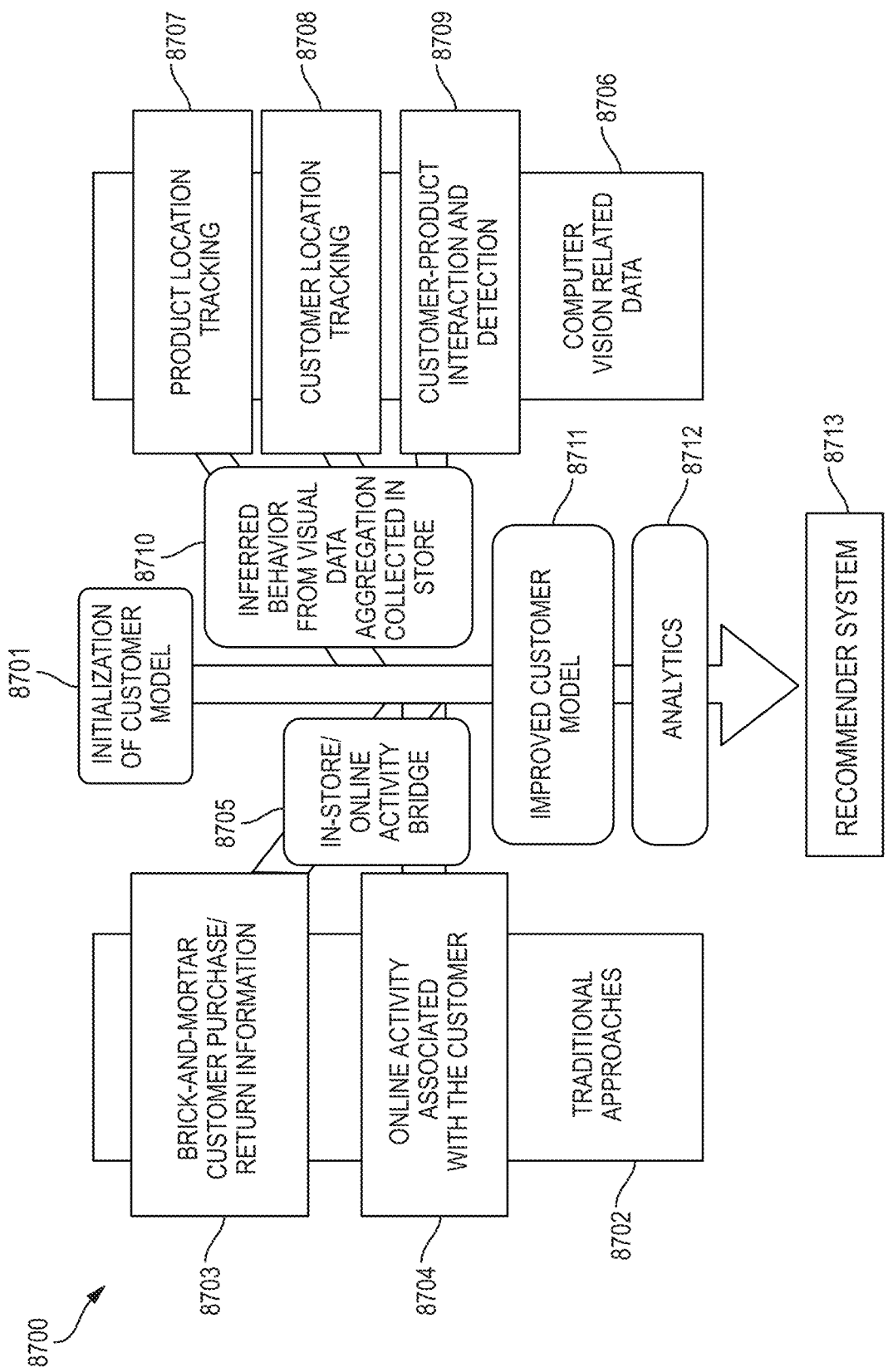
FIG. 87 illustrates an example dataflow for creating an improved customer model using both traditional and visual data.

FIG. 87 illustrates an example dataflow 8700 for creating an improved customer model using both traditional and visual data. For example, traditional in-store data points (e.g., product purchases) and online data points (FIG. 82, 8207-8210, 8217) are used in conjunction with data points for inferred customer behavior derived from visual data captured in-store (FIG. 82, 8215, 8216). By combining traditional data points with visual data points, a better customer model is generated.

Figure 88:
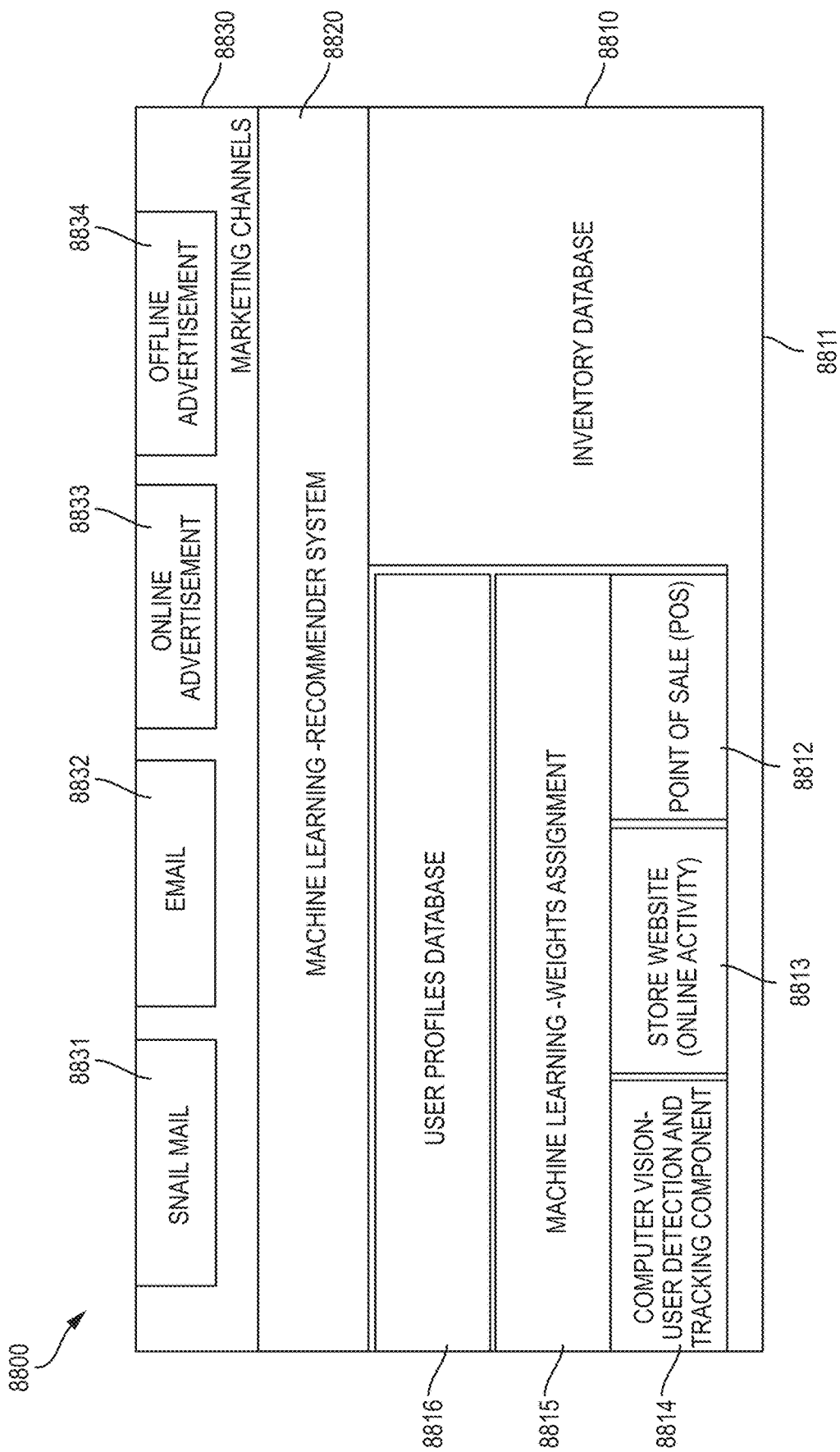
FIG. 88 illustrates the architecture of an example application that leverages integrated online and in-store customer profiles.

FIG. 88 illustrates the architecture of an example application 8800 that leverages integrated online and in-store customer profiles. In particular, a better customer profile is generated by combining data points obtained from three sources: customer behavior in-store inferred from visual data (FIG. 82, 8215), customer's online activity (FIG. 82, 8210) and in-store purchase information (FIG. 82, 8217). Using the improved customer model and inventory information, the store can then proceed to recommend products to the customer, which results in a more meaningful relationship with the customer based on the improved customer model. The weight assigned to each data point generated from a customer action is weighed differently depending on the type of business. Traditional machine learning algorithms can be used to find the best assignment of weights to each type of data point.

While customers are typically comfortable with sharing personal information with retailers online, having their visual footprint tracked and stored when visiting brick-and-mortar businesses may raise potential privacy concerns. Accordingly, this solution can be combined with other embodiments described throughout this disclosure—or otherwise available—that relate to privacy protection for visual computing systems. For example, this solution can be combined with solutions that focus on protecting the identity of people captured by cameras. Cameras are ubiquitous in retail stores, and with the development of better and more affordable devices, the number of cameras deployed in the real-world is only expected to grow. This solution leverages that trend to help retailers create better models of their customers, and it can be adapted to provide the appropriate level of privacy depending on the context.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a communication interface to communicate with a visual computing device over a network; and a processor to: access visual data captured by a camera; detect a particular feature in the visual data, wherein the particular feature comprises a visual indication of privacy-sensitive information; sanitize the visual data to mask the privacy-sensitive information associated with the particular feature, wherein sanitizing the visual data causes sanitized visual data to be produced; and transmit, via the communication interface, the sanitized visual data to the visual computing device over the network, wherein the visual computing device is to use the sanitized visual data to process a visual query associated with the visual data.

In one example embodiment of an apparatus, the processor to detect the particular feature in the visual data is further to: apply a machine learning model to the visual data, wherein the machine learning model is trained to recognize the particular feature.

In one example embodiment of an apparatus, the particular feature comprises a face of a person, and the privacy-sensitive information comprises an identity of the person.

In one example embodiment of an apparatus, the processor to sanitize the visual data to mask the privacy-sensitive information associated with the particular feature is further to: select an avatar to represent the face; and replace the face with the avatar in the sanitized visual data.

In one example embodiment of an apparatus, the processor to select the avatar to represent the face is further to: determine that the avatar resembles one or more characteristics of the face.

In one example embodiment of an apparatus, the processor to sanitize the visual data to mask the privacy-sensitive information associated with the particular feature is further to: insert random noise into the sanitized visual data to mask the privacy-sensitive information.

In one example embodiment of an apparatus, the processor to sanitize the visual data to mask the privacy-sensitive information associated with the particular feature is further to: blur the particular feature in the sanitized visual data.

In one example embodiment of an apparatus, the processor to sanitize the visual data to mask the privacy-sensitive information associated with the particular feature is further to: identify one or more pixels associated with the particular feature; and replace the one or more pixels with an indication of a type of the particular feature in the sanitized visual data.

One or more embodiments may include a system, comprising: one or more vision sensors to capture visual data associated with an environment; a communication interface to communicate with a visual computing device over a network; and one or more processing devices to: access the visual data captured by the one or more vision sensors; detect a particular feature in the visual data, wherein the particular feature comprises a visual indication of privacy-sensitive information; sanitize the visual data to mask the privacy-sensitive information associated with the particular feature, wherein sanitizing the visual data causes sanitized visual data to be produced; and transmit, via the communication interface, the sanitized visual data to the visual computing device over the network, wherein the visual computing device is to use the sanitized visual data to process a visual query associated with the visual data.

In one example embodiment of a system, the one or more vision sensors comprise a camera.

In one example embodiment of a system, the one or more processing devices to detect the particular feature in the visual data are further to: apply a machine learning model to the visual data, wherein the machine learning model is trained to recognize the particular feature.

In one example embodiment of a system, the particular feature comprises a face of a person, and the privacy-sensitive information comprises an identity of the person.

In one example embodiment of a system, the one or more processing devices to sanitize the visual data to mask the privacy-sensitive information associated with the particular feature are further to: select an avatar to represent the face; and replace the face with the avatar in the sanitized visual data.

In one example embodiment of a system, the one or more processing devices to select the avatar to represent the face are further to: determine that the avatar resembles one or more characteristics of the face.

In one example embodiment of a system, the one or more processing devices to sanitize the visual data to mask the privacy-sensitive information associated with the particular feature are further to: insert random noise into the sanitized visual data to mask the privacy-sensitive information.

In one example embodiment of a system, the one or more processing devices to sanitize the visual data to mask the privacy-sensitive information associated with the particular feature are further to: blur the particular feature in the sanitized visual data.

In one example embodiment of a system, the one or more processing devices to sanitize the visual data to mask the privacy-sensitive information associated with the particular feature are further to: identify one or more pixels associated with the particular feature; and replace the one or more pixels with an indication of a type of the particular feature in the sanitized visual data.

One or more embodiments may include at least one machine accessible storage medium having instructions stored thereon, wherein the instructions, when executed on a machine, cause the machine to: access visual data captured by a camera; detect a particular feature in the visual data, wherein the particular feature comprises a visual indication of privacy-sensitive information; sanitize the visual data to mask the privacy-sensitive information associated with the particular feature, wherein sanitizing the visual data causes sanitized visual data to be produced; and transmit the sanitized visual data to a visual computing device over a network, wherein the visual computing device is to use the sanitized visual data to process a visual query associated with the visual data.

In one example embodiment of a storage medium: the particular feature comprises a face of a person; the privacy-sensitive information comprises an identity of the person; and the instructions that cause the machine to sanitize the visual data to mask the privacy-sensitive information associated with the particular feature further cause the machine to: select an avatar to represent the face; and replace the face with the avatar in the sanitized visual data.

In one example embodiment of a storage medium, the instructions that cause the machine to sanitize the visual data to mask the privacy-sensitive information associated with the particular feature further cause the machine to: insert random noise into the sanitized visual data to mask the privacy-sensitive information.

In one example embodiment of a storage medium, the instructions that cause the machine to sanitize the visual data to mask the privacy-sensitive information associated with the particular feature further cause the machine to: identify one or more pixels associated with the particular feature; and replace the one or more pixels with an indication of a type of the particular feature in the sanitized visual data.

One or more embodiments may include a method, comprising: accessing visual data captured by a camera; detecting a particular feature in the visual data, wherein the particular feature comprises a visual indication of privacy-sensitive information; sanitizing the visual data to mask the privacy-sensitive information associated with the particular feature, wherein sanitizing the visual data causes sanitized visual data to be produced; and transmitting the sanitized visual data to a visual computing device over a network, wherein the visual computing device is to use the sanitized visual data to process a visual query associated with the visual data.

In one example embodiment of a method: the particular feature comprises a face of a person; the privacy-sensitive information comprises an identity of the person; and sanitizing the visual data to mask the privacy-sensitive information associated with the particular feature comprises: selecting an avatar to represent the face; and replacing the face with the avatar in the sanitized visual data.

In one example embodiment of a method, sanitizing the visual data to mask the privacy-sensitive information associated with the particular feature comprises: inserting random noise into the sanitized visual data to mask the privacy-sensitive information.

In one example embodiment of a method, sanitizing the visual data to mask the privacy-sensitive information associated with the particular feature comprises: identifying one or more pixels associated with the particular feature; and replacing the one or more pixels with an indication of a type of the particular feature in the sanitized visual data.

What is claimed is:
1. An apparatus, comprising:
   a communication interface to communicate with a visual computing device over a network; and
   a processor to:
      access visual data captured by a camera;
      perform a privacy analysis on the visual data using a convolutional neural network (CNN), wherein the CNN is trained to detect a plurality of features, and wherein the CNN comprises:

a plurality of convolutional layers for detecting the plurality of features based on a plurality of convolution filters that activate when convolved with the visual data; and a stop list of filters indicating a subset of the plurality of convolution filters that correspond to one or more privacy-sensitive features from the plurality of features, wherein the one or more privacy-sensitive features are to be sanitized from the visual data;

detect the one or more privacy-sensitive features in the visual data based on the privacy analysis using the CNN;

sanitize the visual data to mask the one or more privacy-sensitive features, wherein sanitizing the visual data causes sanitized visual data to be produced; and transmit, via the communication interface, the sanitized visual data to the visual computing device over the network, wherein the visual computing device is to use the sanitized visual data to process a visual query associated with the visual data.

2. The apparatus of claim 1, wherein the one or more privacy-sensitive features comprise a face of a person.

3. The apparatus of claim 2, wherein the processor to sanitize the visual data to mask the one or more privacy-sensitive features is further to:
select an avatar to represent the face; and
replace the face with the avatar in the sanitized visual data.

4. The apparatus of claim 3, wherein the processor to select the avatar to represent the face is further to:
determine that the avatar resembles one or more characteristics of the face.

5. The apparatus of claim 1, wherein the processor to sanitize the visual data to mask the one or more privacy-sensitive features is further to:
insert random noise into the sanitized visual data to mask the one or more privacy-sensitive features.

6. The apparatus of claim 1, wherein the processor to sanitize the visual data to mask the one or more privacy-sensitive features is further to:
blur the one or more privacy-sensitive features in the sanitized visual data.

7. The apparatus of claim 1, wherein the processor to sanitize the visual data to mask the one or more privacy-sensitive features is further to:
identify a set of pixels corresponding to the one or more privacy-sensitive features in the visual data; and
replace the set of pixels with corresponding feature labels in the sanitized visual data, wherein the corresponding feature labels indicate one or more feature types of the one or more privacy-sensitive features corresponding to the set of pixels.

8. A system, comprising:
one or more vision sensors to capture visual data associated with an environment;
a communication interface to communicate with a visual computing device over a network; and
one or more processing devices to:
access the visual data captured by the one or more vision sensors;
perform a privacy analysis on the visual data using a convolutional neural network (CNN), wherein the CNN is trained to detect a plurality of features, and wherein the CNN comprises:

a plurality of convolutional layers for detecting the plurality of features based on a plurality of convolution filters that activate when convolved with the visual data; and a stop list of filters indicating a subset of the plurality of convolution filters that correspond to one or more privacy-sensitive features from the plurality of features, wherein the one or more privacy-sensitive features are to be sanitized from the visual data;

detect the one or more privacy-sensitive features in the visual data based on the privacy analysis using the CNN;

sanitize the visual data to mask the one or more privacy-sensitive features, wherein sanitizing the visual data causes sanitized visual data to be produced; and transmit, via the communication interface, the sanitized visual data to the visual computing device over the network, wherein the visual computing device is to use the sanitized visual data to process a visual query associated with the visual data.

9. The system of claim 8, wherein the one or more vision sensors comprise a camera.

10. The system of claim 8, wherein the one or more privacy-sensitive features comprise a face of a person.

11. The system of claim 10, wherein the one or more processing devices to sanitize the visual data to mask the one or more privacy-sensitive features are further to:
select an avatar to represent the face; and
replace the face with the avatar in the sanitized visual data.

12. The system of claim 11, wherein the one or more processing devices to select the avatar to represent the face are further to:
determine that the avatar resembles one or more characteristics of the face.

13. The system of claim 8, wherein the one or more processing devices to sanitize the visual data to mask the one or more privacy-sensitive features are further to:
insert random noise into the sanitized visual data to mask the one or more privacy-sensitive features.

14. The system of claim 8, wherein the one or more processing devices to sanitize the visual data to mask the one or more privacy-sensitive features are further to:
blur the one or more privacy-sensitive features in the sanitized visual data.

15. The system of claim 8, wherein the one or more processing devices to sanitize the visual data to mask the one or more privacy-sensitive features are further to:
identify a set of pixels corresponding to the one or more privacy-sensitive features in the visual data; and
replace the set of pixels with corresponding feature labels in the sanitized visual data, wherein the corresponding feature labels indicate one or more feature types of the one or more privacy-sensitive features corresponding to the set of pixels.

16. At least one non-transitory machine accessible storage medium having instructions stored thereon, wherein the instructions, when executed on a machine, cause the machine to:
access visual data captured by a camera;
perform a privacy analysis on the visual data using a convolutional neural network (CNN), wherein the CNN is trained to detect a plurality of features, and wherein the CNN comprises:

a plurality of convolutional layers for detecting the plurality of features based on a plurality of convolution filters that activate when convolved with the visual data; and a stop list of filters indicating a subset of the plurality of convolution filters that correspond to one or more privacy-sensitive features from the plurality of features, wherein the one or more privacy-sensitive features are to be sanitized from the visual data;

detect the one or more privacy-sensitive features in the visual data based on the privacy analysis using the CNN;

sanitize the visual data to mask the one or more privacy-sensitive features, wherein sanitizing the visual data causes sanitized visual data to be produced; and transmit the sanitized visual data to a visual computing device over a network, wherein the visual computing device is to use the sanitized visual data to process a visual query associated with the visual data.

17. The storage medium of claim 16, wherein:

the one or more privacy-sensitive features comprise a face of a person; and the instructions that cause the machine to sanitize the visual data to mask the one or more privacy-sensitive features further cause the machine to:

select an avatar to represent the face; and replace the face with the avatar in the sanitized visual data.

18. The storage medium of claim 16, wherein the instructions that cause the machine to sanitize the visual data to mask the one or more privacy-sensitive features further cause the machine to:

insert random noise into the sanitized visual data to mask the one or more privacy-sensitive features.

19. The storage medium of claim 16, wherein the instructions that cause the machine to sanitize the visual data to mask the one or more privacy-sensitive features-further cause the machine to:

identify a set of pixels corresponding to the one or more privacy-sensitive features in the visual data; and replace the set of pixels with corresponding feature labels in the sanitized visual data, wherein the corresponding feature labels indicate one or more feature types of the one or more privacy-sensitive features corresponding to the set of pixels.

20. A method, comprising:

accessing visual data captured by a camera;

performing a privacy analysis on the visual data using a convolutional neural network (CNN), wherein the CNN is trained to detect a plurality of features, and wherein the CNN comprises:

a plurality of convolutional layers for detecting the plurality of features based on a plurality of convolution filters that activate when convolved with the visual data; and a stop list of filters indicating a subset of the plurality of convolution filters that correspond to one or more privacy-sensitive features from the plurality of features, wherein the one or more privacy-sensitive features are to be sanitized from the visual data;

detecting the one or more privacy-sensitive features in the visual data based on the privacy analysis using the CNN;

sanitizing the visual data to mask the one or more privacy-sensitive features, wherein sanitizing the visual data causes sanitized visual data to be produced; and transmitting the sanitized visual data to a visual computing device over a network, wherein the visual computing device is to use the sanitized visual data to process a visual query associated with the visual data.

21. The method of claim 20, wherein:

the one or more privacy-sensitive features comprise a face of a person; and sanitizing the visual data to mask the one or more privacy-sensitive features comprises:

selecting an avatar to represent the face; and replacing the face with the avatar in the sanitized visual data.

22. The method of claim 20, wherein sanitizing the visual data to mask the one or more privacy-sensitive features comprises:

inserting random noise into the sanitized visual data to mask the one or more privacy-sensitive features.

23. The method of claim 20, wherein sanitizing the visual data to mask the one or more privacy-sensitive features comprises:

identifying a set of pixels corresponding to the one or more privacy-sensitive features in the visual data; and replacing the set of pixels with corresponding feature labels in the sanitized visual data, wherein the corresponding feature labels indicate one or more feature types of the one or more privacy-sensitive features corresponding to the set of pixels.

* * * * *